(12) United States Patent
van Coppenolle et al.

(10) Patent No.: US 9,628,539 B2
(45) Date of Patent: *Apr. 18, 2017

(54) METHOD AND APPARATUS FOR DISTRIBUTED UPLOAD OF CONTENT

(71) Applicant: Right Brain Interface NV, Hasselt (BE)

(72) Inventors: Bart P. E. van Coppenolle, Leuven (BE); Philip W. J. Vandormael, Leuven (BE)

(73) Assignee: Right Brain Interface NV, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,042

(22) Filed: Jul. 31, 2014

(65) Prior Publication Data

US 2015/0032847 A1    Jan. 29, 2015

Related U.S. Application Data

(63) Continuation of application No. 13/627,452, filed on Sep. 26, 2012, now Pat. No. 8,799,483, which is a continuation of application No. 13/278,361, filed on Oct. 21, 2011, now Pat. No. 8,301,770.

(60) Provisional application No. 61/405,460, filed on Oct. 21, 2010, provisional application No. 61/405,466, (Continued)

(51) Int. Cl.

| | | |
|---|---|---|
| *G06F 15/16* | (2006.01) | |
| *H04L 29/06* | (2006.01) | |
| *H04L 12/00* | (2006.01) | |
| *G06Q 30/06* | (2012.01) | |
| *G06N 3/08* | (2006.01) | |
| *H04N 21/254* | (2011.01) | |
| *H04N 21/482* | (2011.01) | |
| *H04N 21/81* | (2011.01) | |

(52) U.S. Cl.
CPC ............. *H04L 65/608* (2013.01); *G06N 3/08* (2013.01); *G06Q 30/06* (2013.01); *H04L 12/00* (2013.01); *H04L 63/10* (2013.01); *H04L 65/4069* (2013.01); *H04N 21/2542* (2013.01); *H04N 21/4826* (2013.01); *H04N 21/812* (2013.01)

(58) Field of Classification Search
CPC ...................................................... H04L 12/00
USPC ................................................. 709/225, 227
See application file for complete search history.

(56) References Cited

U.S. PATENT DOCUMENTS

2008/0082507 A1*   4/2008   Tarantino .......... G06F 17/30657

* cited by examiner

*Primary Examiner* — Adnan Mirza
(74) *Attorney, Agent, or Firm* — Burns & Levinson LLP; Bruce D. Jobse

(57) ABSTRACT

A system and method for distributed uploading of content utilizes one or more viewer systems, coupled over a network to a remote content source, to download content to the viewer system(s) at a first time and to retransmit at least a portion of the received content to a remote storage system along with authorization/identification indicia identifying the viewer system. In one embodiment, fractional portions of the same content program from multiple different viewer systems are aggregated at the remote storage system for subsequent download streaming to a requesting of the viewer system for viewing thereby at a second time, which is time-shifted from the initial transmission from the content source.

19 Claims, 72 Drawing Sheets

Related U.S. Application Data filed on Oct. 21, 2010, provisional application No. 61/412,206, filed on Nov. 10, 2010, provisional application No. 61/479,648, filed on Apr. 27, 2011, provisional application No. 61/540,812, filed on Sep. 29, 2011, provisional application No. 61/540,259, filed on Sep. 28, 2011.

| | |
|---|---|
| Fearcoefficient ontology component 1 | Fearcoefficient value |
| Fearcoefficient ontology component 2 | Fearcoefficient value |
| Fearcoefficient ontology component... | Fearcoefficient value |
| Fearcoefficient ontology component N | Fearcoefficient value |
| Desirecoefficient ontology component 1 | Desirecoefficient value |
| Desirecoefficient ontology component 2 | Desirecoefficient value |
| Desirecoefficient ontology component... | Desirecoefficient value |
| Desirecoefficient ontology component N | Desirecoefficient value |
| Contentidentifier1 | IdentifierValue |
| Exception mood disk area 1 | Relaxed/Passionate Value |
| Contentidentifier2 | IdentifierValue |
| Exception mood disk area 2 | Relaxed/Passionate Value |
| Contentidentifier... | IdentifierValue |
| Exception mood disk area... | Relaxed/Passionate Value |
| ContentidentifierN | IdentifierValue |
| Exception mood disk area N | Relaxed/Passionate Value |

FIG. 10A1

| Viewer ID | Network Address | | |
|---|---|---|---|
| Subscription Type/Level | | | |
| Gender | Age | Marital Status | |
| Genre Preference 1 | Preference Value | | |
| Genre Preference 2 | Preference Value | | |
| Preference 1 | Preference Type | Preference Value | |
| Preference 2 | Preference Type | Preference Value | |
| ⋮ | ⋮ | ⋮ | |
| Preference N | Preference Type N | Preference Value N | |
| Last Specific Request | Date | | |
| Last Event | Date | Action | Elapsed Time |
| Average View Time | | | |
| Event | Date | Action | Elapsed Time |
| ⋮ | ⋮ | ⋮ | ⋮ |
| Event | Date | Action | Elapsed Time |

*FIG. 10A*

| Channel ID | |
|---|---|
| Filter 1 | Filter Value |
| ... | Filter Value |
| Filter N | Filter Value |
| Fear coordinate | Fear Value |
| Desire coordinate | Desire Value |
| Cut-off type | Type Value |
| Cut-off | Cut-off Value |
| Sorting field | Sorting Field Value |
| Sorting order | Sorting Order Value |

FIG. 10B1

| Channel ID | Network Address |
|---|---|
| Viewer ID | Network Address |

| Group ID 1 | Group ID 2 | ... | Group ID N |
|---|---|---|---|

| Last Modified | Object Count |
|---|---|

| Content Object Last Viewed ||

| Dominant Preference 1 | Preference Value |
|---|---|
| Dominant Preference 2 | Preference Value |
| ⋮ | ⋮ |
| Dominant Preference N | Preference Value |
| Sub-dominant Preference 1 | Preference Value |
| Sub-dominant Preference 2 | Preference Value |
| ⋮ | |
| Sub-dominant Preference N | Preference Value |

72A encompasses the above fields.

| Preference Bucket 1 ID |
|---|
| Preference Bucket 2 |
| ⋮ |
| Preference Bucket N |

72B encompasses the Preference Bucket fields.

FIG. 10B

| Content Object ID | Data Type |
|---|---|
| Content Object ID Memory Reference ||
| Duration | Series/Episode |
| Genre | Actor Lead 1 |
| Producer | Actor Lead 2 |
| Date | Publisher |

*FIG. 10C*

ContentObjectID
ContentObjectIDMemoryReference
Date of broadcast
Time of broadcast
Start time of broadcast
End time of broadcast
Broadcast channel
Title
Year of production
Country of production
Main genre
Sub genre
Episode Title
Episode number
Episode year
Director
Cast
Description
Parental rating
Producer
Publisher
Pre-catalogued mood disk area

*FIG. 10C1*

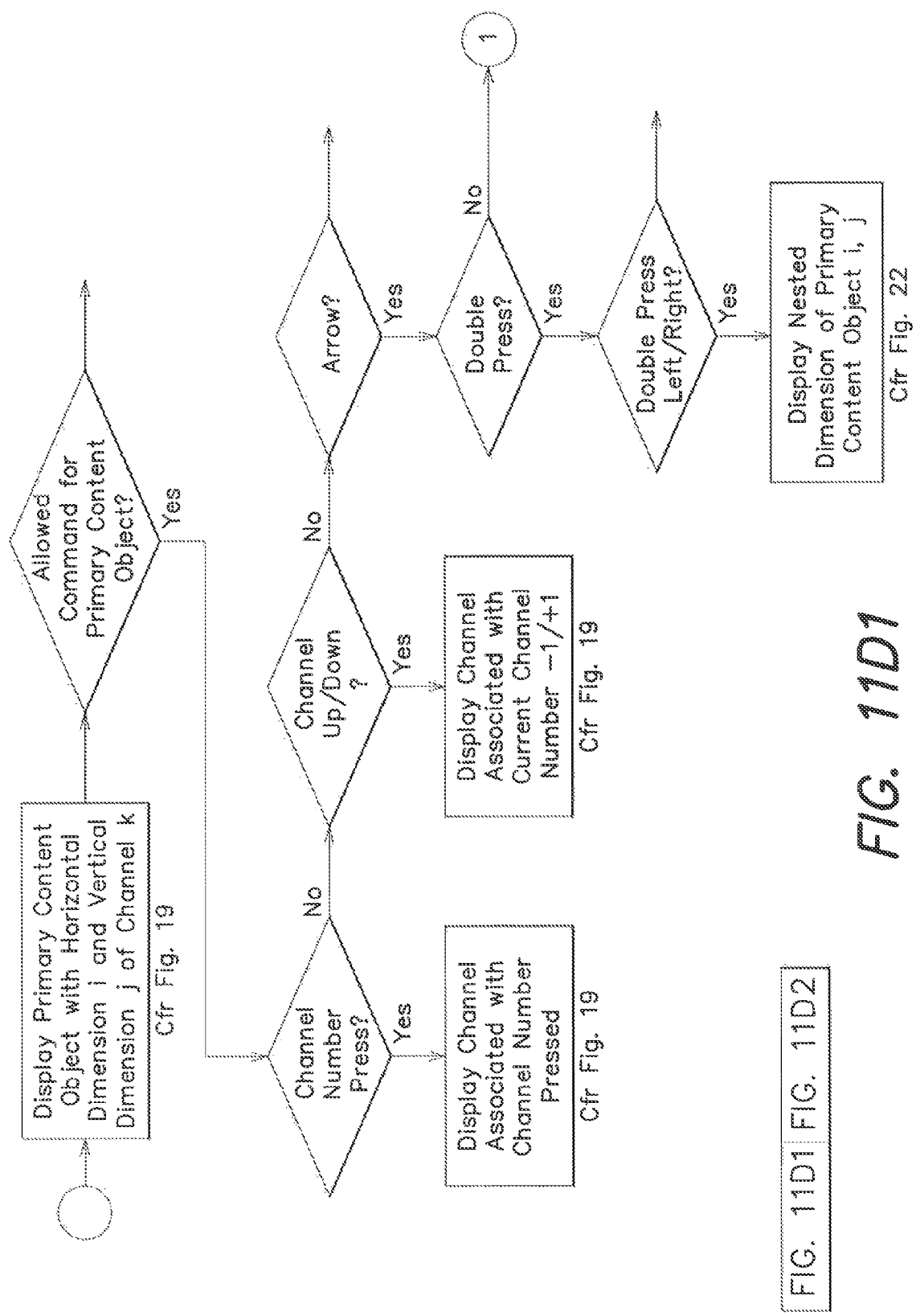
FIG. 11D1

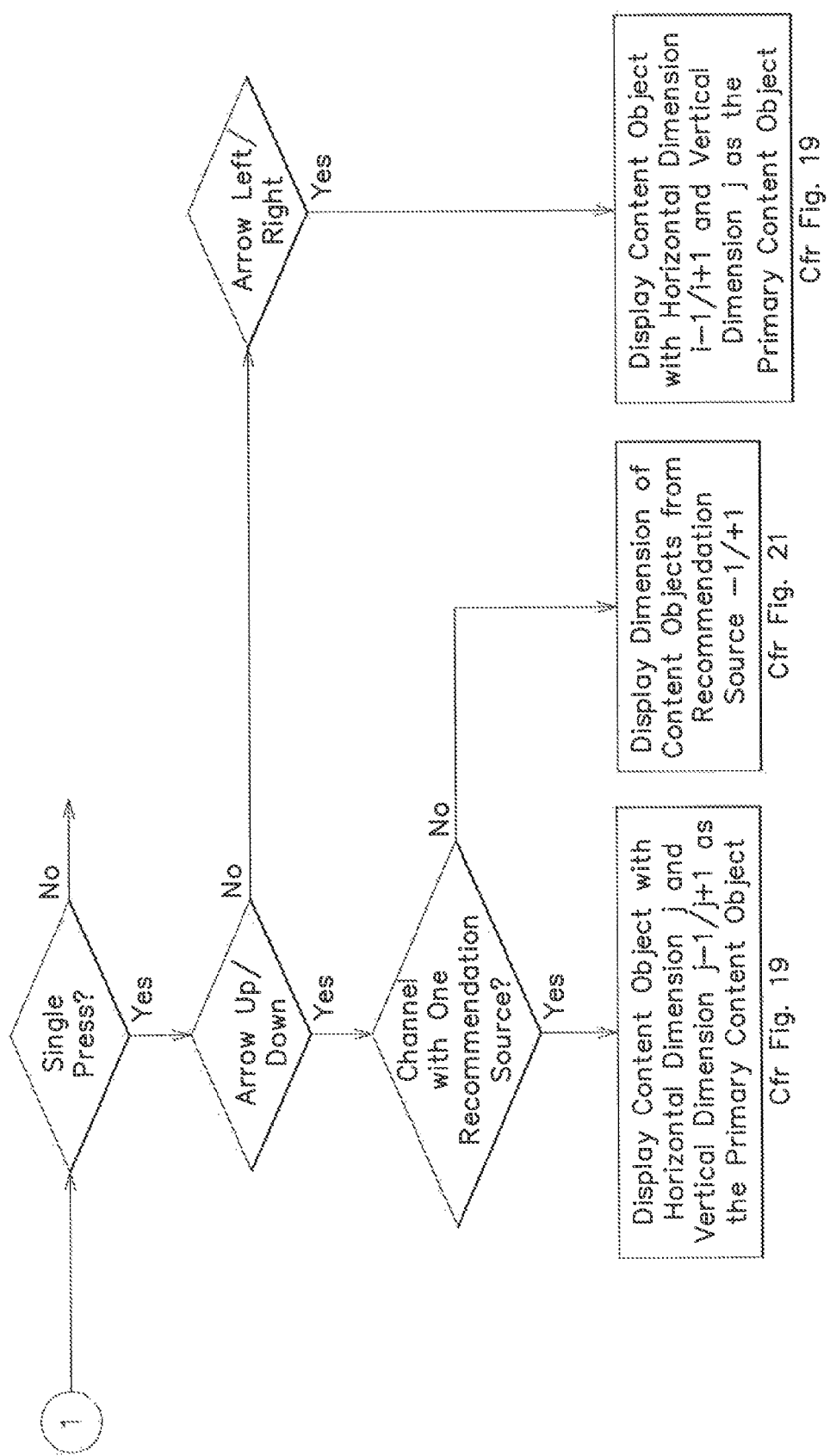
FIG. 11D2

95

| Content Object ID | Channel/Group ID |
| --- | --- |
| Content Object Memory Reference | |
| Ranking Value | Position Value |
| Content Object Meta Data File Reference | |
| Link 1 | Link 2 | • • • | Link n |

FIG. 12C

|  |  |  | ••• |  |  |  |
|---|---|---|---|---|---|---|
|  |  |  | C4tu3 |  |  |  |
|  |  |  | C4tu2 |  |  |  |
|  |  |  | C4tu1 |  |  |  |
| C1t | C2t | C3t | C4t | C5t | ••• | Cnt |
| ••• C4t-3 | C4t-2 | C4t-1 | C4td1 |  |  |  |
|  |  |  | C4td2 |  |  |  |
|  |  |  | C4td3 |  |  |  |
|  |  |  | ••• |  |  |  |

FIG. 12D

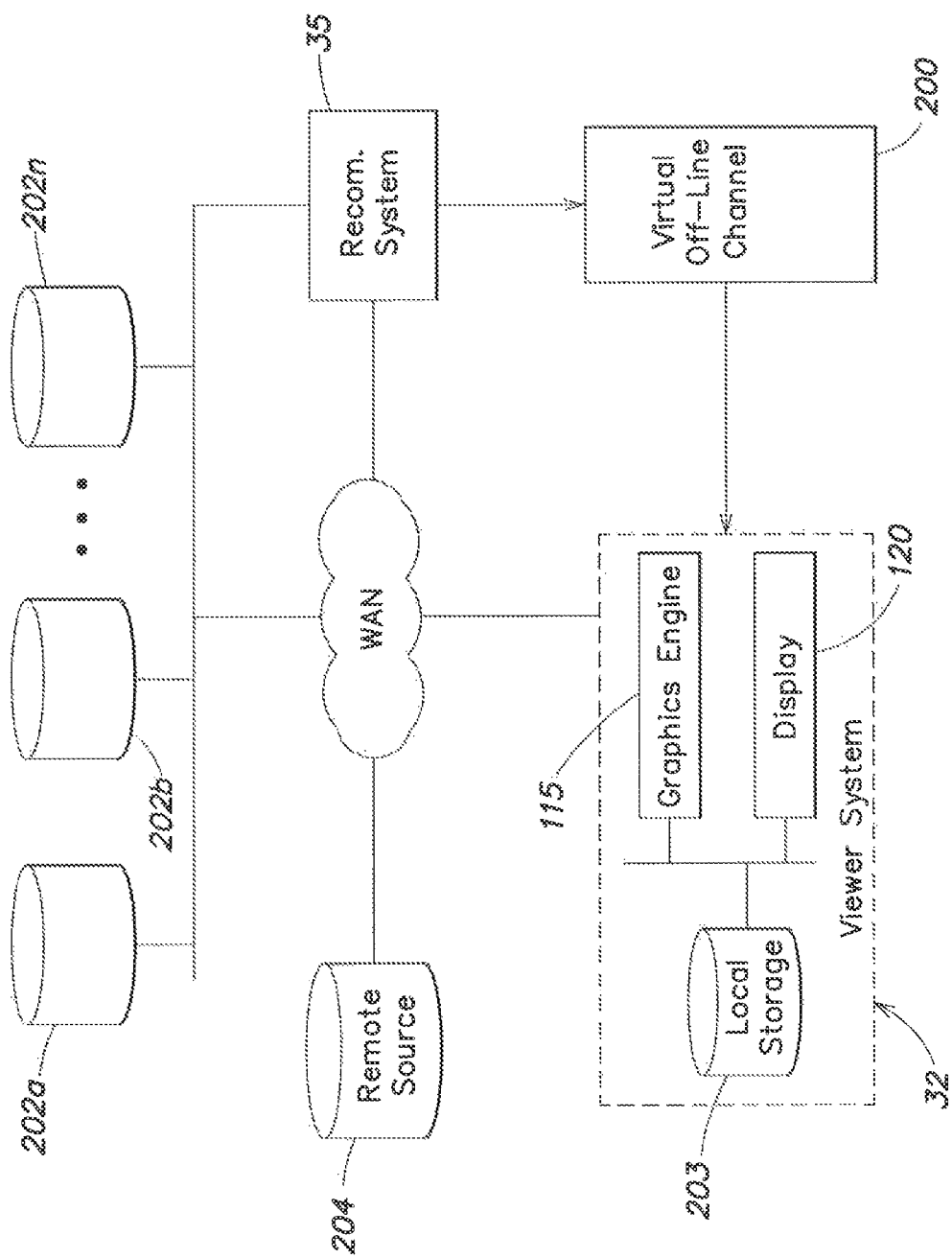

METHOD AND APPARATUS FOR DISTRIBUTED UPLOAD OF CONTENT

RELATED APPLICATIONS

This application claims priority to the following U.S. Patent Applications, the subject matters of which are incorporated herein by this reference for all purposes, including the following:

U.S. Provisional Patent Application Ser. No. 61/405,460, filed on Oct. 21, 2010, entitled METHOD AND APPARATUS FOR NEUROPSYCHOLOGICAL MODELING OF PURCHASING BEHAVIOR;

U.S. Provisional Patent Application Ser. No. 61/405,466, filed on Oct. 21, 2010, entitled BRAIN HEMISPHERES OPTIMIZED TANDEM USER INTERFACE;

U.S. Provisional Patent Application Ser. No. 61/412,206, filed on Nov. 10, 2010, entitled METHOD AND APPARATUS FOR DISTRIBUTED UPLOAD OF CONTENT;

U.S. Provisional Patent Application Ser. No. 61/479,648, filed on Apr. 27, 2011, entitled METHOD AND APPARATUS FOR CONTENT PRESENTATION IN A TANDEM USER INTERFACE;

U.S. Provisional Patent Application Ser. No. 61/540,259, filed on Sep. 28, 2011, entitled METHOD AND APPARATUS FOR NEUROPSYCHOLOGICAL MODELING OF HUMAN EXPERIENCE AND BEHAVIOR; and U.S. Provisional Patent Application Ser. No. 61/540,812, filed on Sep. 29, 2011, entitled METHOD AND APPARATUS FOR ESTABLISHING VIRTUAL CHANNELS IN A VIEWING ENVIRONMENT.

In addition, the subject matters of the following commonly owned U.S. Patent Applications filed on even date herewith with are incorporated herein by this reference for all purposes, including the following:

U.S. patent application Ser. No. 13/278,789, entitled METHOD AND APPARATUS FOR NEUROPSYCHOLOGICAL MODELING OF PURCHASING BEHAVIOR; and U.S. patent application Ser. No. 13/278,922, entitled METHOD AND APPARATUS FOR CONTENT PRESENTATION IN A TANDEM USER INTERFACE.

FIELD OF THE INVENTION

The disclosure relates to human behavior, and, more specifically, to a method and apparatus for distributed upload of content to enable time shifted viewing thereof.

BACKGROUND

According to Neurophysiology and neuropsychology the human brain comprises a left hemisphere and a right hemisphere, which each have a distinct personality or consciousness and a distinct way of processing information. For simplicity, these will be referred to as the left brain and the right brain, respectively. The left brain is known for analytic, categorical thinking and textual, sequential processing. The right brain is known for synthetic, intuitive, holistic thinking and visual-spatial, parallel processing. Therefore, some processes or even simple exposure to certain stimuli will rather activate the right brain and some other rather the left brain.

For example, textual information will rather activate the left brain, visual-spatial information rather the right. Similarly, the act of searching through menus will rather activate the left brain, whereas navigating with e.g. a joystick through a natural landscape or space will rather activate the right brain. Therefore, experience interfaces will rather activate the left or right brain, depending on the type of elements used for interfacing: e.g. visual-spatial or textual elements. Such left right activation will also depend on the type of actions and thinking that are required for using these elements. As explained in the remainder of this text, hemispheric brain activity can also be linked to human emotions and moods. Thus, a product interface can support a certain mood, depending on the way its front-end and back-end are designed, and depending on the processes required to operate such interface.

The problem with current human interfaces is that they require us to process information or perform actions that are not in line with the mood experience for which the product was designed. Or, in other words, these interfaces, at some point during the user experience, tend to activate a part of the brain, which subsequently alters our emotions and thus our mood in a non-desirable way. For example, people watch television for relaxation. Going through menus is an unwelcome interruption when one is in a relaxed mood: it alters our mood from relaxation to frustration.

A need exists for a technique that starts from the desired experienced mood and derives the experience interface including its front-end design, back-end design and its operation taking into account the mood changes induced by the specific brain activity necessary for the interface process and work flow.

Also a need exists for an interface that brings people in the right mood for certain activities or processes that today are not yet optimally served. Such applications, underserved from an experience point of view are illustrated and grouped in six embodiments.

Internet, Media and TV Experience System

Recommendation technology is used to help people find products they like on the internet, through other media or elsewhere. As such, recommenders support the trend towards higher personalization of experiences, and thus make up an important part of the back- and front-end of today's interfaces for internet, media or television. However, there are some issues with today's recommenders.

Some platforms, like television, hardly use recommender technology. Television content providers, video on demand (VOD) content providers or broadcasters preselect programs based on assumptions about the wishes of groups. They provide a selection of programs they believe will most appeal to the class of viewers who subscribe to a channel or a group of channels. Specific genre channels like e.g. cooking channels provide some individualization, compared to the more general channels, but also they contain a pre-selection of programs. Also, viewers need to actively search for programs: they need to search through Electronic Program Guide and menus with their remote control to find something of their interest, forcing them into a frustrated mood.

The recommenders that are currently used fail in a very important aspect: i.e. they do not consider people's desired mood. Therefore they cannot recommend content that is specifically suited to support a person's desired mood. Neuropsychology teaches that human emotions and moods are two-dimensional or bivalent, rather than bipolar. In other words, people may feel attracted (positive valence) or repulsed (negative valence) by content, or they may experience mixed emotions; such as when watching a bloody surgery that both fascinates and disgusts them. It is the relative strength of our positive and negative emotions, which determines our mood. An overall positive emotion, like passion, does not imply a lack of negative emotions. On the contrary, when a person is passionate about something/someone, they typically have both high positive and high negative emotions. A relaxed mood on the hand is characterized by high positive and low negative emotions.

Therefore important information is lost, when people rate content uni-dimensionally, e.g. as is done on a scale from 1 to 5. Such rating does give us a vague, overall indication of how much a person liked a product, but it cannot tell us in which mood the product placed the person. It cannot tell us for example, whether a person rated a television show four stars, because he found it very relaxing, or because he was excited about e.g. the important new scientific insights he picked up from the show. In order to discover such information, a personal interview or written analysis would be needed, but this bipolar rating alone would not disclose such information.

Also, active rating of products or services tends to activate the analytic, critical left brain, even more if written support of the rating is needed. As a result, products or services that are objectively or qualitatively more interesting tend to get higher scores, than products or services that are just relaxing or speak more to one's emotional side. This poses a problem when, after a hard day at work, all that is needed is relaxation. Therefore, we cannot be guided by explicit ratings, and we are certainly not in the mood to read plenty of reviews, before deciding which relaxing movie to watch.

Moreover, current recommenders do not consider the nature of the platform on which they are used. For example, people tend to want to relax in front of television, and surf the internet for the things they are passionate about. In other words, different platforms are associated with different, desired moods. Current recommenders have not this into account.

Also, current recommenders do not consider the type of transaction for which they are intended. The transaction may be buying, selling, renting, licensing or any type of legal transaction in a business-to-business or business-to-consumer context, but may also be a simple selection, viewing or experience in the most general sense. In the remainder of this text, business-to-business is abbreviated to B2B, and business-to-consumer to B2C.

Most consumers prefer to buy non-investment goods while in a relaxed mood. People, who buy on behalf of a business on the other hand, are typically in another mood, one that involves a higher level of concentration. Recommenders should take these context differences into account in order to optimize performance and output.

Accordingly, the need exists for a system and technique that allows products or content, e.g. audio, video, graphic, advertising, website, brochure, etc. to be pre-selected from one or more content sources and to be presented with a higher degree of accuracy to an individual's particular taste or desired mood on a specific platform and to solicit for a specific type of transaction.

The Different Focus of the Prior Art

Current recommenders for audio, video, advertising, books, . . . can be classified into multiple groups according to their level of personalization. The first group of recommenders provides only generic suggestions, which are identical for every viewer. Examples are recommendations based on mass publicity, popularity or average ratings. The second group provides roughly personalized recommendations for which the personalization is trivial, for example a recommendation based on the favorite genre of the viewer. Often this second group of recommendations is based on demographics like age, gender, occupation, family situation etc. The advantage of this group is that the results are partially personalized, the disadvantage however is that no high level of personalization can be reached since the available profile data is limited. The third group provides recommendations with the highest level of personalization with two techniques often used in combination:

Content-based recommendations: the user will be recommended items similar to the ones the user preferred in the past. The algorithms use the analysis of the content whereby items are modeled by a set of features that describe the content.

Collaborative filtering (CF) recommendations: The user will be recommended items that people with similar tastes and preferences liked in the past. These algorithms do not use the features of the items since the recommendations are only based on the behavior of a community.

Relaxation is the main reason why people watch television. Current television interfaces however frustrate people instead of relaxing them, because they require such operations like scrolling through text-based menus or EPGs (electronic program guides) and programming the recording of content.

Accordingly, a need exists for a system that provides the advantages of digital television, video and Web TV such as browsing through web content, Video-On-Demand, time shifting etc. and that simultaneously supports the relaxing nature of the television viewing experience.

Some current web TV systems allow the user to create virtual channels. However, these systems require the user to go through menus and type in key words using a keyboard-like device, while sitting in front of their television. This does not support the relaxing nature of the natural TV viewing experience. On the contrary, it often jeopardizes relaxation and sometimes even causes frustration.

Accordingly, a need exists for a system that supports relaxation while using virtual channels, by separating the management of virtual channels from the relaxed experiencing of those virtual channels.

Individual users of interfaces for broadcasted media or TV are limited to the specific time slots in which the broadcaster chooses to make a particular program available. This specific time does not necessarily match the mood and availability of the viewer. If the viewer is not available or in the mood at the time of airing of such content, the program must either be recorded or missed with the hopes that it will be re-aired later.

Recording devices which enable time shifted viewing have physical restrictions associated with the system, such as the number programs which may be recorded, or, the number programs which may be simultaneously record, but the most important disadvantage is the hassle and frustration accompanying the programming of recording and the selection and replaying of recorded content.

Although Catch-Up TV is available for time shifting, its functionality is limited and its use does not support the relaxing nature of the natural TV viewing experience. Both selection of time shifted content and programming of time shifting devices are not relaxing, involving too much left brain activity.

Accordingly, a need exists for a system and technique in which program content may be accessed and viewed in a time-shifted manner to suit the viewers' availability, convenience, and mood. A need exists for a system and technique in which program content may be accessed and viewed in a time-shifted manner, which overcomes the current limitations of existing technologies.

Media or television advertisement often interrupts the relaxing nature of watching the content, creating annoyance and frustration. When watching recorded content, one can fast-forward advertising manually, an option unavailable for broadcasted content on air. The problem with advertisement skipping in recorded time shifted content is that it potentially may jeopardize the business model of broadcasters or content creators that use advertisement as a source of income to finance the broadcasting service or content creation. Also, current systems do not verify whether a viewer actually watched an advertisement, so they cannot guarantee the advertiser value is actually created. Also current systems do not allow for the user to pull advertising of interest, such pulled advertisement of interest is of higher value to advertisers, than the mass bulk advertisement or personalized pushed advertisement.

Systems, which have tried to improve relaxation by altering the advertising viewing behavior, did not respect the advertising business of the television broadcasters. Accordingly, a need exists for a system that addresses viewing of advertising in a more flexible and relaxing way, without jeopardizing the advertising business of broadcasters. A need exists for a system that allows television viewers to delay or time shift advertising to support the relaxing nature of the natural viewing experience and at the same time does not jeopardize advertising income.

Interface for Reading, Researching or Writing

Researching and writing are activities that combine in tandem a left brain textual and systematical approach with a right brain overview eliciting creativity. This tandem activity requires a specific tandem interface specifically supporting the right brain activity and its associated mood and the left brain activity and its associated mood.

Currently textual or analytic material is typically stored in files and directories, which are accessible through interfaces with menus, tabs, etc. or through interfaces that prompt the user for typed commands. However, this interfacing does not support associative, synthetic thinking (i.e. typical right brain thinking), and may result in frustration or lack of overview and creativity, if too much analytical or textual activity (i.e. typical left brain activity) is required from the interface.

Some tools exist, which partly address this issue. For example, mind mapping software allows one to organize material in a more visual-spatial way, using branched structures, colors, some images, etc. Another example is a web tool like Pearltrees that allows one to organize and access e.g. all one's material on a specific hobby into one or more branched, schematic trees.

These tools however, miss the functionality needed for organizing, accessing and navigating content in tandem or almost concurrently in two ways, i.e. in a categorical, analytic way necessary to systematically work through the information as well as in an associative, synthetic way, necessary to create the overview eliciting creativity.

Consequently, a need exists for a system that combines creativity eliciting overview experience with disciplined craftsmanship eliciting experience by accessing both processes through separated left and right brain interfaces, combined in a tandem interface.

The metaphors used by state-of-the-art interfaces for the access and management of mainly textual or analytic material, are not optimized for the two distinguishable tandem moods. For example, mind mapping tools use simple branched structures, web tools like Pearltrees use simple schematic trees.

Although such metaphors do already help to organize material in a somewhat more visual and intuitive way, they are still very analytic and schematic, and as such do not support true associative, synthetic, exploring thinking. Such thinking requires more concrete, intuitive, conceptual metaphors that typically appeal mostly to the right brain, our seat of synthetic thinking in order to optimize the user mood.

So, a need exist for a system that addresses this need for a metaphor for organic RB interfacing and structural categorical LB interfacing.

State-of-the-art systems and interfaces for the access and management of mainly textual or analytic material do not provide an automatic way for placing orders and for paying, which is transparent and thus relaxing to the user. The use of an order placement and payment system typically requires such things as selecting a provider, entering of profile access data, like username and password, entering or verifying of bank credentials, etc. Most of the time, the hassle involved in doing this, is an unwelcome interruption to the task one is actually performing, i.e. to the reading, researching or writing of texts or presentations. This frustrating interruption makes us losing the overview and therefore often stops the creative process.

Subsequently, a need exists for an automatic order placement and payment system for content that separates the ordering from the hassle. Or, in other words, one should be able to do the ordering through a transparent and therefore relaxing interface and perform the hassle, at another moment in time, through a state-of-the-art order management interface, which allows such things as choosing a preferred supplier, entering credential etc.

Current e-reader black-white text representation and their emulators typically do not allow displaying figures in full color. Figures appeal much more to the right brain and are therefore more relaxing when in color or potentially even in 3D.

Systems that do support color display typically require the user to search through menus to change settings. Such operations interrupt the reading or researching experience and are typically frustrating, overview distorting and creativity killing and therefore unwelcome.

Consequently, a need exists for an e-reader black-white text representation emulator that allows the user to display figures in full color or 3D by performing a simple, intuitive operation, which keeps the user relaxed and does not require him to go through menus, or enter text or keywords or even change platform.

Buying System for Recurrent Customer Purchases

Purchasing of household goods, like shampoo, toilet paper and the like through internet currently requires the typical hassle of such things as making a shopping list or remembering what needs to be bought, sitting in front of a computer device to place orders at a web shop, etc. These kinds of actions are often unwelcome, since they compete with other, more pleasurable activities. Thus, a need exists for a web-based system that allows more automated recurrent purchasing. Such system is not only a more efficient and more relaxing alternative to state-of-the-art web shopping, but also to the traditional supermarket shopping.

Automatic Trading System for Securities

A fourth embodiment concerns a system for trading securities. Securities are typically optimally bought from sellers who are in panic, and sold to buyers who are passionate about these securities. However, current systems are not able to detect panic or passion in economic markets or individual trading parties at the time these moods emerge, neither are they able to automatically buy or sell securities based on such knowledge. Thus, there is a need for an automatic trading system for securities that takes into account buyers' and sellers' moods and performs automated trading activities accordingly.

Automatic Internet Bank or Investment Fund

Current banks and investment funds are too often seduced into profit-seeking decisions at the expense of objective risk management. As a result, too high risks are taken, possibly resulting in big losses or even financial system crisis. Thus, there is a need for a trading system that supports the left brain task of objective risk management and at the same time blocks the right brain profit-seeking measures. In order to minimize desire for profit and the associated right brain activity a semi-automatic proceduralized trading system needs to be designed featuring a specific tandem interface suppressing right brain activity.

Sales Training, Consultancy and Management Software

Sales strategy and related sales material, training, consultancy and sales management, including the sales and purchase of companies, in mergers and acquisitions (M&A) activity, also does not take into account the moods or emotions of the buyer. Consider for example the sales of an innovative, high-tech product or service to a business that is not yet acquainted with such product or service. Such sales projects typically require the buyer to be passionate about the seller's offering. Current B2B sales & marketing strategies however typically tend to either bore potential buyers, or leave them worried. In both cases, this leads to suboptimal or non-existent sales results.

A typical example consists of businesses trying to initiate a buying cycle by sending marketing brochures or emails full of technical specifications to prospects who did not yet buy into the vision behind the offering. Another example consists of businesses, who succeed in selling a vision, in making buyers willing to change, but who subsequently fail to hedge the buyers' private or social fears.

Current sales models do distinguish the different stages a buyer typically goes through prior to placing on order. However, they fail to link these stages to the buyers' basic emotions, moods and cortical activity. Therefore, the sales approach is not optimized towards supporting the natural mood for that stage of the buying cycle.

Also, different types of sale require different sales strategies. Business-to-business sales differ from business-to-consumer sales, and the sales of new application products differ from the sales of know application products. Also mergers and acquisitions, i.e. the purchase or sales of a company, require their specific approach.

Thus, there is a need for a model that links a buyer's typical emotions and mood, related to a specific type of sale, to a suitable sales strategy. This model may then be used in sales trainings, sales consultancy, M&A consultancy, and it may be implemented in sales management software packages, like CRM packages used for the follow-up of sales leads and sales projects, for sales analyses, etc. Such a sales strategy subsequently becomes a purchase experience strategy, depending on the context of business-to-business or business-to-consumers as well as depending on the dominant buyer's emotion being fear or desire and the mood phases that follow typically when dealing with these emotions.

SUMMARY OF THE DISCLOSURE

The disclosure relates to a neuropsychological modeling technique and resulting mathematical model for human emotions and moods applied in buyer, seller, user and experience psychology, more specifically applied in experience, interface, platform, process, and back-end design of products, processes or services. Natural experiences interfaces are based on specific characteristics of the left and right consciousness, applied in left brain, right brain or tandem interfaces.

Based on the modeling technique or model, a natural user experience mood is selected, that dictates the design of the user interface as well as the backend of the product, process or service concerned. The model or modeling technique therefore forms the basis of the design of the natural user experience, its user interface, its product process or workflow as well as its back-end.

Such neuropsychological modeling technique or model or the natural user experience or its interface or its back-end process may be applied in several embodiments including, but not limited to:

1) An internet and/or media and/or TV experience system, using a specific right brain interface as well as a tandem interface on separate hardware platforms
2) A tandem interface for reading and/or researching and/or writing,
3) A tandem user interface for an automatic internet enabled buying system for recurrent consumer purchases,
4) An automatic trading system for securities,
5) An automatic internet bank or investment fund, and
6) a model for sales trainings, consultancy and software.

Accordingly, and more generally, a need exists for a neuropsychological modeling technique and model that links basic human emotions, moods and cortical activity, to interface design strategies including their back-end, front-end and operational process of human experiences. Experiences are understood as moods that naturally and optimally occur in certain processes. Interfaces between those processes and the experiences in the human brain are optimally designed to support the natural and optimal experience in each phase of the process. Therefore left, right and tandem interfaces are used, featuring specific cortical solicitation, eliciting specific moods. Besides the modeling technique and its associated inventions, six other inventions are presented to support the specific practical relevancy and technical execution as embodiments of the modeling technique in specific applications.

Representation of Human Moods in Two-dimensional Space

According to one aspect of the disclosure, a system and technique for modeling human moods comprises a representation of human moods in a 2-dimensional space with one dimension representing emotions with negative valence and the other dimension representing emotions with positive valence. The respective emotions may be given alternative naming, e.g. 'fear' or 'reluctance' for the emotions with negative valence, and 'desire' or 'attraction' for the emotions with positive valence. One or more of multiple basic human moods may, depending on the application, be substituted by one of these variants.

Correlation of Two-dimensional Representations of Human Moods Space with Hemispheric Asymmetry According to another aspect of the disclosure, a system and technique for modeling human moods is based on the premise that that moods that are constituted of an emotion component with a more than average negative valence lead to increased activity in the left brain frontal cortex in the absence of new emotionally associated sensory input. Similarly, a system and technique for modeling human moods is based on the premise that moods that are constituted of an emotion component with a more than average positive valence lead to increased activity in the right brain frontal cortex in the absence of new emotionally associated sensory input. Thus, this also implies, that moods, which are constituted of both an emotion component with positive and negative valence, will lead to an increased activity in the cortex of both hemispheres in the absence of new emotionally associated sensory input.

Use of Mood Theory in System Design

According to another aspect of the disclosure, a system and technique for relaxing a subject viewer comprises stimulation of the right brain (*) through exposure to predominantly visual data, with minimal textual or analytical data, like tables. Such technique may be applied, e.g. to a television experience system, in a wellness setting, etc. According to another aspect of the disclosure, a system and technique for exciting a subject viewer in to a passionate mood, by stimulating both the right (*) and left brain through exposure to a mixture or balance of visual data and textual or analytical data on the other (like graphs, tables, lists, written reviews, etc). Such technique may be applied to, e.g. websites, games, sports related products and in educational products.

Use of Mood Theory in Sales Strategies

According to another aspect of the disclosure, the correlation of hemispheric asymmetry to mood theory can be applied to sales & marketing models and strategies. Specifically, a method for increasing business to customer sales comprises bringing the potential customer into a relaxed mood, by stimulating the right brain cortex (*) and not the left. This is done by using mostly visual data (e.g. visually appealing packaging) appealing to the potential customer's positive emotions, and limiting the amount of textual or analytical data. Such technique may be applied to, e.g. sales or marketing of clothes, shampoo, etc. but also to the design of business-to-consumer websites and on-line stores. In one embodiment, a method for increasing business to business sales strategies comprises bringing the potential customer into a passionate mood, by exciting both his right (*) and left brain cortex. This is done by using both visual data and textual or analytical data, like reviews, tables, etc, the visual data helping the business to open up to change and create a vision for a better future, the analytical data helping get control over any negative emotions, like personal and social fears. This may e.g. translate in packaging with a nice, but drier layout that uses more lines. It may also e.g. translate into marketing material that includes both video material and written consumer testimonials. This insight may be e.g. applied to the sales and marketing of ICT products, machinery equipment, financial products, etc. (*) It's important to note, that one cannot create desire in another person, but one can nurture a seed of desire that is already present.

Use of Bivalent Rating for Video and other Content

According to another aspect of the disclosure, a system and technique uses a bivalent (not bipolar) rating system for video and other content (like books and art), in which one rating parameter has a value that expresses the strength of emotions with positive valence towards specific content, the other parameter has a value that expresses the strength of emotions with negative valence towards that same content. The respective emotions may be given alternative naming, e.g. 'fear' or 'reluctance' for the emotions with negative valence, and 'desire' or 'attracted' or 'like it' for the emotions with positive valence. In one embodiment, a system and technique uses a multivalent rating system that incorporates the bivalent rating system described above. In one embodiment, a system and technique uses a ranking application (for video or other content) that is at least partly based on the bivalent or multivalent rating system described above.

In another embodiment, a system and technique uses a recommender application (for video or other content) that is at least partly based on the bivalent or multivalent rating system described above.

In another embodiment, a system and technique uses a metadata file that contains information on the viewing preferences of one or more viewers of video content and in which the preferences are expressed using the multivalent or bivalent rating system described above.

Tandem Interface

According to another aspect of the disclosure, a system and technique uses an interface that presents viewable content and information across a set of interface devices in a manner, which mimics typical human brain task delineation, distinguish between visual and textual tasks, for the different devices. Such a system and technique may comprise:

A first interface which presents visual content, with minimal or no text and which may be implemented with a traditional television display.

A second interface which presents a content surfing interface and purchasing interface and may be implemented on a Personal Digital Assistant (PDA) or smart phone, tablet computer or laptop computer.

Optional extra user interfaces which present mainly the textual based interfaces for content surfing and purchasing, as well as visual content and may be implemented with a traditional personal computer, including a desktop, tablet computer or laptop system, as well as other systems.

The two or more interfaces may be viewable simultaneously on separate devices. They may also be sequentially accessible from one single device.

Tandem Interface for Easy Access to and Management of Virtual Television Channels According to another aspect of the disclosure, a system and technique uses an interface that consists of one or more left brain interfaces that can operate in tandem with a (right brain) television interface, and for which applies:

The television interface and its operation allow the user easy access to virtual channels, without the need to go through any menus or to type letters, numbers or symbols on a device with keyboard like functionality. Instead, the user can scroll between any classic or virtual channels and also within these channels (i.e. between the different content objects in these channels), similar to the browsing or surfing, using only a very limited amount of buttons or similar touchscreen operations. The virtual channels may be a social medium channel, e.g. Facebook, Twitter, LinkedIn, . . . , a channel of which the user himself is the Channel Director, etc.

The one or more left brain interfaces operating in tandem with the television interface may be implemented on a smartphone, tablet, laptop, PC, etc. This interface allows the management of the virtual channels, including such things as: setting a channels' order number, choosing the content of the channel, choosing which Facebook users can post recommendations on the users' Facebook channel, etc.

Using the system and techniques disclosed herein, the television interface is designed to keep the user relaxed, i.e. in the $-3\pi/8$ to $-\pi/8$ area of the mood square/disk. The left brain interface is designed in such a way as to keep the user in a passionate or controlled mood, represented by the $-\pi/8$ to $+3\pi/8$ area of the mood square/disk.

Advertisement Account for Relaxed TV Commercial Viewing

According to another aspect of the disclosure, a system and technique uses advertisement accounts for some or all of its TV user accounts and broadcasters. For TV viewers, advertisement should not disturb the natural relaxing nature of the TV viewing experience. Therefore being able to watch advertisements of interest when TV viewers want it is a design imperative for the relaxing TV experience.

Such relaxed TV viewing experience can be achieved by simply skipping the viewing of TV commercials or other advertisement. Since advertisers pay for the free or reduced cost viewing of consumers, this solution does not satisfy interests of the supply side of the market. However a solution can be devised that reduces the frustration of the TV viewer, while at the same time protecting the value created for advertisers and broadcasters, since not frustrating the viewer is the value creation mechanism for the advertiser, on the contrary.

For advertisers and broadcasters, a TV commercial or other advertisement is more valuable if it is more personalized to the interest of the viewer, when the viewer watches it at his/her own convenience, in a relaxed mood, when the viewer pulls the advertisement rather than that the advertisement is pushed to the viewer and of course if the TV user actually watches the advertisement, instead of simply taking a break.

The credit model takes these value creation parameters into account, by crediting the advertisement account. For each viewer or viewer profile or each family or home or other group validly subscribed, combined with each broadcaster or group of cooperating broadcasters a separate advertisement account is kept. Each advertisement account is credited using the advertiser value credits model, potentially but not necessary including a monetary payment system to credit the advertisement account. Such same advertisement account is then debited using a broadcaster cost or selling price debit model, in such a way, that:

The fast-forwarding of an advertisement by a viewer or viewer group, or the automatic skipping of an advertisement, leads to a lowering of the credits on the viewer or viewer group's advertisement account with that broadcaster or group of broadcasters, based on a cost or selling price model or based on an advertiser value model, or a combination of both.

If a viewer or group of viewers watches an advertisement, the credits on the viewer's or viewer group's advertisement account with that broadcaster or group of broadcasters increase based on an advertiser and/or broadcaster value model.

Such advertiser and/or broadcaster value model may include: the length of the advertisement, its level of personalization, whether it is embedded in the broadcasted content or separately viewed, its degree of viewer pull or push, the viewer's mood estimate relative to the relaxed mood, the verification of the actual viewing etc.

To be sure a viewer actually watches an advertisement, a viewer feedback system can be implemented. Such feedback system may e.g. consist of a message, in the form of a ticker line passing by at the bottom of the TV screen, asking the viewer to press a specific number on his remote, if he is watching the advertisement. To prevent abuse, the number to press optimally changes from advertisement to advertisement, in a random or other not easily predictable way. Also, the message is optimally displayed towards the middle to end of an advertisement, rather than at its start, however not systematically to prevent abuse.

When credits on an advertisement account drop below a certain critical threshold level, the system supports the function to block the viewer or viewer group from fast forwarding commercials and/or automatically skipping commercials, for that broadcaster or group of broadcasters for whom account the critical low level has been reached, until the viewer or viewer group earns sufficiently new credits to reach a critical switch-on level e.g. by watching advertisement, or by paying a sum of money.

The purchase or rent of VOD content or any other type of purchase which contributes to the advertiser or broadcaster value creation by means of commission on such purchase or otherwise, may also result in an increase of credits on an advertisement account. In such way broadcasters can earn a commission on VOD or other sales induced by special purpose advertisement allowing for on-line TV ordering and in return grant credits on the viewer/purchaser's advertisement account.

A Dual Interface Optimized for Reading and Researching

According to another aspect of the disclosure, a system and technique comprises an interface that presents content that, in general, is mostly textual or analytic, but may also be visual, in such a manner the content can be accessed in two alternative ways at the same moment or approximately at the same moment, i.e. one shortly after the other within the same overall experience, including the following:

an associative, exploring, synthetic technique that appeals mostly to the right brain hemisphere, and tends to bring or keep the user in a relaxed, controlled or passionate mood (depending on the strength of negative emotions), by growing or keeping positive emotions high enough.

a categorical, analytic technique that appeals mostly to the left brain hemisphere. This way of organizing content helps the user keep control over too high negative emotions (an active left brain tries to converge them) and at the same time, make sure negative emotions are not too low either, as to not get bored.

Utilizing both techniques of accessing content, the user is kept in the spectrum of moods, covered by the $-3\pi/8$ to $+3\pi/8$ area of the mood disk. Possible content may be articles, papers, e-books, reviews, brochures and the like, as well as images, video material, etc.

Any number of metaphors may be utilized visual design of such an interface. One embodiment utilizes a landscape metaphor in which forests and fields and trees support the associative, exploring way of accessing mostly new content, and in which the houses, pieces of land that have been parceled out, etc. support the categorical, analytic way of accessing mostly known content, one wants to retrieve.

Automatic Order Placement System on e-reader

According to another aspect of the disclosure, a system and technique comprises an automatic order placement system which utilizes an e-reader device having interface which enables the user to buy material online by using a few, simple operations, e.g. by simply pressing OK. Then entering of bank credentials, choosing a preferred supplier, etc. can be done prior, through the left brain interface.

Full Color of Figures on e-reader

According to another aspect of the disclosure, a system and technique enables a change in the display of a figure on an e-reader from black-white to color by clicking or double clicking the figure, or by performing similar operations on a touch screen e-reader device. After such operation, either the selected figure, or all figures may be displayed in color.

System for Recurrent Consumer Purchases

According to another aspect of the disclosure, a system and technique enables recurrent consumer purchases in the following manner: consumers use their smartphone to collect information, which identifies a consumer product in a unique way, e.g. taking a picture of the barcode of the product. This information, or a processed version of it, is subsequently uploaded to a central inventory management system that automatically places orders at a supplier of choice. The smartphone interface works in tandem with a second interface, which is typically a more left-brain interface, meaning it contains more textual, analytical or menu-based items, rather than visual or graphical elements. The second interface allows such things as the management of the choice of suppliers and products, the choice of a payment method, the entrance of bank credentials, etc. This technique is linked to our mood model in the following way: The recurrent purchasing of consumer goods like shampoo, butter and toilet paper, requires the hassle of such things as remembering what needs to be bought and/or making a shopping list, going to a shop (either a classic shop or webshop), searching the needed product in the shop, etc. The disclosed system and technique decreases this type of hassle, and thus the negative emotions associated with them, so the consumer, while operating the smartphone interface, can remain in a relaxed mood, represented by the $-\pi/8$ to $-3\pi/8$ area of the mood disk. The second interface, i.e. the left brain interface, is designed in such a way as to bring/keep the consumer in a passionate or dominant mood, with the word 'passionate' used in the sense of 'positively focused' and the word 'dominant' used in the sense of 'pleasantly in control'. Thus, the consumers' mood is in the $-\pi/8$ to $+3\pi/8$ area of the mood disk.

Automatic Trading System for Securities

According to another aspect of the disclosure, a system and technique for trading securities detects the occurrence of panic and passion in economic markets, by modeling the purchasing and selling behavior of traders, using two independent emotional parameters per trader and/or per security, with one parameter having a positive valence and one having a negative valence. Panic occurs when, for a significant portion of traders, and for a significant portion of securities, the parameter with negative valence is significantly more important than the parameter with positive valence, bringing the angle in the emotion square/disk at $3\pi/4\pm\pi/8$. Passion occurs when, for a significant portion of traders, and for a significant portion of securities, the parameters with positive and negative valence are significant, bringing the angle in the emotion square/disk at $\pi/4\pm\pi/8$. The trading system automatically buys (or propose to buy) securities from traders in a panic mood, and sells (or propose to sell) securities to traders in passion, taking into some personal preferences of the user of the trading system.

Disclosed herein is a system and technique in which the traditional recommendation engine paradigm is reversed to achieve more accurate predictive model which mimics the subjects emotional motivations. Rather than classifying "subjects" objectively, the disclosed system and technique classify "objects" subjectively relative to an individual's (or small group of individuals, e.g. a family) behavior so that the resulting group of objects can be ranked and presented in a manner that provides greater emotional motivation for selection according to the individual's specific subjective desires and reluctance tastes. In the disclosed system and technique, a plurality of content objects, such as videos, music, art, books, consumer goods, financial instruments, etc., are subjectively analyzed according to a specific individual's tastes and behavioral history and presented to the individual in rankings or "channels" which it can be explored or "surfed" multi-dimensionally. Specifically, content objects are processed through a unique neuropsychological modeling engine, utilizing data specific to an individual or group of individuals, and arranged according to their eligibility and the magnitude the individual's predicted emotional motivation to select or purchase a content object. In an exemplary embodiment, once a content object is determined to be eligible based on an individuals behavioral data and mood, a ranking position within a channel, representing the individual's emotional motivation to select such content object, is determined. Content objects are arranged in a first selectable dimension, according to a desire and fear vector, that is, from lower to higher emotional motivation for possible selection and presentation according to an individual's behavioral data. Content objects may be further arranged according to a second selectable dimension based on a time vector. As contemplated, multiple sequentially arranged versions of content objects which share one or more common parameters or metadata values, such as episodes within a television series, or prequel/sequel movie releases, or books with a series, are arranged chronologically, allowing selection either forward or backward chronologically from a currently selected content object.

More specifically, a system for accurately modeling of buyer/purchaser psychology and ranking of content objects within a channel for user initiated browsing and presentation comprises a neuropsychological modeling engine, a ranking application, and a behavior modeler all of which communicate with each other as well as with a plurality of databases and a presentation system over either public or private networks. The neuropsychological modeling engine utilizes metafiles associated with a content object, a purchaser/viewer model and a channel model to derive a fear vector value representing an individual's fear (reluctance) to select or purchase the content object and to further derive a desire vector value representing the individual's desire to select or purchase the offered item. From the fear and desire vector values, the neuropsychological modeling engine derives a value $\psi$ representing an individuals mood and a value m representing an individuals motivational strength to select or purchase the content object. If the value $\psi$ representing an individuals mood is within an acceptable predetermined range, the value m is used to determine a ranking for the content object relative to other content objects associated with the channel model for possible presentation to the purchaser/viewer.

Disclosed is a system and technique for accurately modeling of buyer/purchaser psychology ranking of content objects within a channel (and parentheses for presentation to a viewer potential purchaser). According to the disclosure, a modeling system contains neuropsychological modeling engine, ranking application, and behavior modeler all of which communicate with each other as well as with a plurality of databases and a viewing system over either public or private networks. The neuropsychological modeling engine utilizes metafiles associated with a content object, a viewer model and a channel model to derive a fear vector value representing an individual's fear (reluctance) to select or purchase the content object and to further derive a desire vector value representing the individual's desire to select or purchase the offered item. From the fear and desire vector values, the neuropsychological modeling engine derives a value ψ representing an individuals mood and a value m representing an individuals motivational strength to select or purchase the content object. If the value ψ representing an individuals mood is within an acceptable predetermined range, the value m is used to determine a ranking for the content object relative to other content objects associated with the channel model.

According to one aspect of the disclosure, a method comprises: A) comparing metadata associated with a content object to metadata associated with a channel model; B) generating a fear vector value representing an individual's fear (reluctance) to select or purchase the content object; C) generating a desire vector value representing the individual's desire to select or purchase the offered item; and D) deriving from the value for the desire vector and the value for the fear vector a ranking for the content object relative to other content objects associated with the channel model. In one embodiment, D) comprises: D1) deriving, from the desire vector value and the fear vector value, a value ψ representing an individuals mood. In another embodiment, D) comprises further D2) deriving, from the desire vector value and the fear vector value, a value m representing an individuals motivational strength to select or purchase the content object. In still a further embodiment, D) further comprises: D3) if the value ψ representing an individuals mood is within an acceptable predetermined range, using the value m representing an individuals motivational strength to select or purchase the content object to determine a ranking for the content object relative to other content objects associated with the channel model.

According to another aspect of the disclosure, a system for modeling of buyer/purchaser psychology comprises: A) a network accessible memory for storing at least one channel model; B) a modeling engine operably coupled to the network accessible memory and configured to compare metadata associated with a content object to metadata associated with the channel model and for generating: i) a fear vector value representing an individual's fear (reluctance) to select or purchase the content object, ii) a desire vector value representing the individual's desire to select or purchase the offered item; and iii) a ranking for the content object relative to other content objects associated with the channel model, said ranking derived from the desire vector value and the fear vector value. In one embodiment, the modeling engine is further configured to generate: iv) a value ψ representing an individuals mood, the value ψ being derived from the desire vector value and the fear vector value, and v) a value m representing an individuals motivational strength to select or purchase the content object, the value m being derived from the desire vector value and the fear vector value. In yet another embodiment, the system further comprises: C) a ranking module responsive to the modeling engine for deriving a ranking for the content object relative to other content objects associated with the channel model from the value m generated by the modeling engine, if the value ψ generated by the modeling engine is within an acceptable predetermined range.

According to still another aspect of the disclosure, a method for modeling of buyer/purchaser psychology comprising: A) receiving data associated with a viewing event; B) comparing metadata associated with a channel model to data associated with the viewing event; and C) modifying the channel model to account for the viewing event. In one embodiment the method further comprises D) deriving at least one database query from the channel model. In yet another embodiment the method comprises: A1) comparing metadata associated with a channel model to data associated with a viewer model.

Also disclosed is a system and technique for presenting multiple, simultaneous content streams of different format on a user interface. In one embodiment, a primary content stream is presented in a substantial portion of the user interface display area while a plurality of secondary content streams are presented in smaller sized display areas or thumbnail formats. In another embodiment, the multiple secondary content streams presented on the user interface each represent selectable content having a queued relationship to the currently selected (primary) stream which is selected and updated by the current user/viewer navigation commands. Such a queued relationship may exist between and among different content streams or between separately user selectable portions of a single stream or program content.

Claim Summaries 103

According to a first aspect of the disclosure, a data structure storable in memory and capable of being processed by a computer system comprises: data identifying a first content object associated with a subject; and data identifying a ranking of the first content object related to an emotional motivation of the subject to select the first content object. In another embodiment, the data structure further comprises data identifying one of the first plurality of other content objects having an emotional motivation value equal to, greater than or less than the first content object. In yet another embodiment, the data structure further comprises data identifying a chronological ranking value of the first content object among a second plurality of content objects having at least one common parameter value with the first content object, the second plurality of content objects having a ranking value greater or less than that of the first content object.

According to another aspect of the disclosure, a method for enabling multidimensional surfing of content comprises: A) evaluating a first content object according to behavioral metadata associated with a subject to determine eligibility for ranking; B) assigning an emotional motivation value to the first content object, if eligible for ranking; and C) arranging for selection by the subject the first content object among a first plurality of content objects in order of increasing or decreasing emotional motivation values. In one embodiment, the method further comprises D) assigning a chronological ranking value to the first content object relative to a second plurality of content objects having at least one common parameter value with the first content object; and E) arranging for selection by the subject the first content object among the second plurality of content objects, in order of increasing or decreasing chronological ranking value.

Also disclosed herein is a video display system having navigation controls, such as a standard television remote control with directional cursor navigation controls (e.g. up, down, left, and right). An application executing in conjunction with the video display interface intercepts and redefines the cursor navigation control commands from the remote to enable them to be utilized as the primary mechanism for surfing/selecting channel(s) and initiating viewing of previously aggregated and ranked content objects associated with the viewer's neuropsychological behavior as described herein. In one embodiment, the up and down cursor controls of a remote may be utilized to move through content objects, previously ranked within a channel, according to increasing or decreasing emotional motivation of the subject to select such content objects relative to a subject's behavioral data. In another embodiment, the left and right cursor arrows of the remote may be utilized to select chronologically backward or forward other control objects, respectively, relative to a currently selected content object, for example, for past or future episodes of the same program series currently being viewed or recently viewed.

According to another aspect of the disclosure, a method for use with a video display system having a video display and a plurality of cursor navigation controls for moving a user selectable sub-region of the video display area sequentially and/or incrementally in one or more directions, the method comprises: A) receiving a first of the cursor navigation control commands; and B) redirecting the first cursor navigation control command to initiate presentation of a first content object from among a first plurality of content objects previously arranged according to a predefined criteria. In one embodiment, the first plurality of content objects are previously arranged in order of increasing or decreasing emotional motivation. In another embodiment, the first plurality of content objects are previously arranged in a chronological sequence relative to the same program series currently being viewed or recently viewed.

According to another aspect of the invention, a video display system comprises: a video display; a plurality of directional navigation controls for sequentially moving a user selectable sub-area of the video display in one or more directions about the video display area; and control logic for receiving command signals associated with one of the navigation controls and for redirecting the command signal to initiate presentation of a first content object from among a first plurality of content objects previously arranged according to a predefined criteria. In one embodiment, the first plurality of content objects are arranged in order of increasing or decreasing emotional motivation for selection. Selection of a navigational control associated with a first direction initiates presentation of a first content object having at least the same as or increased emotional motivation than a current or previously presented content object. Selection of a navigational control associated with a second direction, opposite the first direction, initiates presentation of a first content object having at least the same as or decreased emotional motivation for selection than a previously presented content object. In another embodiment, the first plurality of content objects are previously arranged in a chronological sequence and selection of a navigational control associated with a first direction initiates presentation of a first content object having an earlier chronological value than the current or previously presented content object. Selection of a navigational control associated with a second direction, opposite the first direction, initiates presentation of a first content object having a later chronological value than a current or previously presented content object.

Also disclosed is a user interface and associated controls that present a subject with viewable content and information across a set of interface devices and in a manner which most closely mimics human brain task delineation. Specifically, contemplated herein is the use of tandem user interfaces in which a first user interface presents visual content only, with minimal or no text, and may be implemented on a traditional television display. Such first user interface predominantly uses and/or stimulates activity in the right hemisphere of the human brain. A second user interface presents a content surfing interface and purchasing interface and may be implemented on a Personal Digital Assistant (PDA) or smart phone, tablet computer or even laptop computer. Such second user interface predominantly uses and/or stimulates activity in the left hemisphere of the human brain, and also, to a certain extent, the right hemisphere of the human brain. Optional, third and fourth user interfaces are capable of presenting mainly the textual based interfaces for content surfing and purchasing, as well as visual content and may be implemented with a traditional personal computer, including a desktop, tablet computer or laptop system, as well as other systems. Such optional third and fourth user interfaces also predominantly use and/or stimulates activity in the left hemisphere of the human brain, and, optionally, to a limited extent, the right hemisphere of the human brain. In one embodiment of the video display system, the two, three or more interfaces may be viewable simultaneously on separate devices, such as in a system that utilizes three platforms for the two brain hemispheres: a TV display (full Right, minimal Left), a smartphone/PDA (mainly Left, limited Left, limited Right optionally), a personal computer (full Left, limited Right optionally), and a tablet computer (mainly Left, limited Left, full Right optionally). In an alternative embodiment, the different interfaces may be accessible sequentially from a single device such as a TV display or personal computer display.

According to another aspect of the disclosure, a method for selecting and viewing program content comprises: A) providing a first user-interface, operably coupled to compilation of selectable and viewable content objects, for presenting substantially visual, non-textual information of the content objects; and B) providing a second user-interface operably coupled to metadata associated with the content objects for presenting substantially textual information. In one embodiment, the method further comprises C) providing a third user-interface operably coupled to the compilation of selectable and viewable content objects and the metadata associated with the content objects for presenting one of visual content and textual information.

Also disclosed is a system and technique for distributed upload of content to enable time shifted viewing thereof. In the disclosed system, a number of N customers/viewers each receive a streamed licensed copy of content (first program) from a primary source, typically an on-line content server or cable company, and forward a fractional percentage (typically 1/N or less) of the content to an aggregation server where the multiple fractional portions of the content are asynchronously reassembled into a complete copy of the content and made available for streamed transmission back to the viewers upon request, including at times outside the viewable time window made available from the original source. Note that the content storage configuration for either of the original source or aggregation server may be centralized or distributed or continuously migrating in a peer-to-peer fashion to achieve content storage at any single instant. In one embodiment, the content is captured at a viewer system, post decryption, and provided to the aggregation server in an unencrypted format. In another embodiment, the content is provided to the aggregation server in an encrypted format along with a decryption key which may be stored separately from the encrypted content. The algorithm for re-assemblage of content data packets at the aggregation server may utilize temporal or sequential identifiers associated with the content. In this manner, a complete content copy can be reassembled asynchronously from potentially dissimilar primary and secondary sources. In another embodiment, content from sources is sent directly to the aggregation server either in encrypted or unencrypted format while the authorization indicia, including, as applicable any decryption keys of data, are sent individually the respective viewer system.

According to one aspect of the disclosure, a method for distributed delayed streaming of content comprises: A) providing a network accessible memory for storing content representing a first program; B) receiving into the network accessible memory at least portions of the first program from a plurality of viewers having access to the first program from another source; C) assembling the portions received from the plurality of viewers into the first program; and D) upon receiving a request from one of the plurality of viewers, transmitting the first program to the requesting viewer. In one embodiment, the portions the first program are received from the plurality of viewers asynchronously. In another embodiment, the first program is accessible to the plurality of viewers from the other source during a first time period and wherein the first program is transmitted to the requesting viewer during a second time period not the same as the first time period.

According to another aspect of the disclosure, an apparatus for distributed delayed streaming of content comprises: A) a network accessible memory for storing content representing a first program; B) a network interface for receiving into the network accessible memory at least portions of the first program from a plurality of viewers having access to the first program from another source; C) an aggregation engine for assembling the portions received from the plurality of viewers into the first program; and D) a streaming interface for transmitting the first program to one of the plurality of viewers upon request. In one embodiment, the portions of the first program received from the plurality of viewers are identified by one of temporal or sequential identifiers associated with the first program and assembled by the aggregation engine according to such the temporal or sequential identifiers.

According to yet another aspect of the disclosure, in a computer usable memory, a data structure usable for distributed upload of content comprises: i) data identifying a portion of a content object; ii) data identifying at least one authorized viewer; iii) temporal or sequential identifier data associated with the content object; iv) data identifying the network address of the authorized viewer; and v) data identifying an encryption key for decrypting the content object. In one embodiment, the data structure may further comprise data identifying a viewer channel associated with the authorized viewer of According to still another aspect of the disclosure, a method for distributed uploading of content comprises: A) determining which of a plurality of content programs are remotely accessible from a first source for downloading to a viewer system; B) requesting download transmission of at least a portion of an accessible programs from the first source to the viewer system at a first time; and C) upload transmitting at least a portion of the accessible program received by the viewer system to a remote second source along with authorization indicia identifying of the viewer system. In one embodiment, the method further comprises D) requesting download transmission of the accessible program from the second source to the viewer system at a second time different from the first time, and E) receiving a streamed download of a portion of the accessible program from the second source, wherein the streamed download portion of the accessible program received from the remote second source is larger than the uploaded portion of the accessible program transmitted to the remote second source. Yet another embodiment, B) and C) are repeated for other of the plurality of content programs remotely accessible from the first source.

According to still yet another aspect of the disclosure, a system for distributed uploading of content comprises: A) a viewer system operably coupled over a network to a first source of content programs; B) program logic for determining which of a plurality of content programs are remotely accessible from the first source and for requesting download transmission of at least a portion of an accessible programs from the first source to the viewer system at a first time; and C) program logic for upload transmitting at least a portion of the accessible program received by the viewer system to a remote second source along with authorization indicia identifying of the viewer system. In one embodiment, system further comprises: D) program logic for requesting download transmission of the accessible program from the second source to the viewer system at a second time different from the first time, and, E) program logic for receiving a streamed download of a portion of the accessible program from the second source, wherein the streamed download portion of the accessible program received from the remote second source is larger than the uploaded portion of the accessible program transmitted to the remote second source.

Still another aspect of the disclosure, a method for distributed delayed streaming of content comprises: A) providing a network accessible memory for storing content representing a first program received from a source; B) receiving into the network accessible memory authorization indicia identifying a plurality of viewers having access to the first program from the source; and C) upon receiving a request from one of the plurality of viewers, verifying the authorization indicia determine if the requesting viewer has authorized access to the 1st program; and D) transmitting the first program to the requesting viewer upon verification of authorization. In one embodiment, the first program is accessible to the plurality of viewers from the source during a first time period and wherein the first program is transmitted to the requesting viewer during a second time period not identical to the first time period.

According to still another aspect of the disclosure, an apparatus for distributed delayed streaming of content comprises: A) a network accessible memory for storing content representing a first program received from a source; B) a network interface for receiving into the network accessible memory authorization indicia identifying a plurality of viewers having access to the first program from the source; C) a verification engine for determining, upon receiving a request from one of the plurality of viewers, if the requesting viewer has authorized access to the first program; and D) a streaming interface for transmitting the first program to the requesting viewer upon verification of authorization.

According to yet another aspect of the disclosure, in a computer usable memory, a data structure usable for distributed upload of content comprises: i) data identifying a portion of a content object; ii) temporal or sequential identifiers associated with the content object; and iii) authorization indicia identifying a viewer process. In one embodiment, the data structure further comprises iv) data identifying a user defined channel associated with the viewer process or v) data identifying an encryption key for decrypting the content object.

DESCRIPTION THE DRAWINGS

Figure 9A:
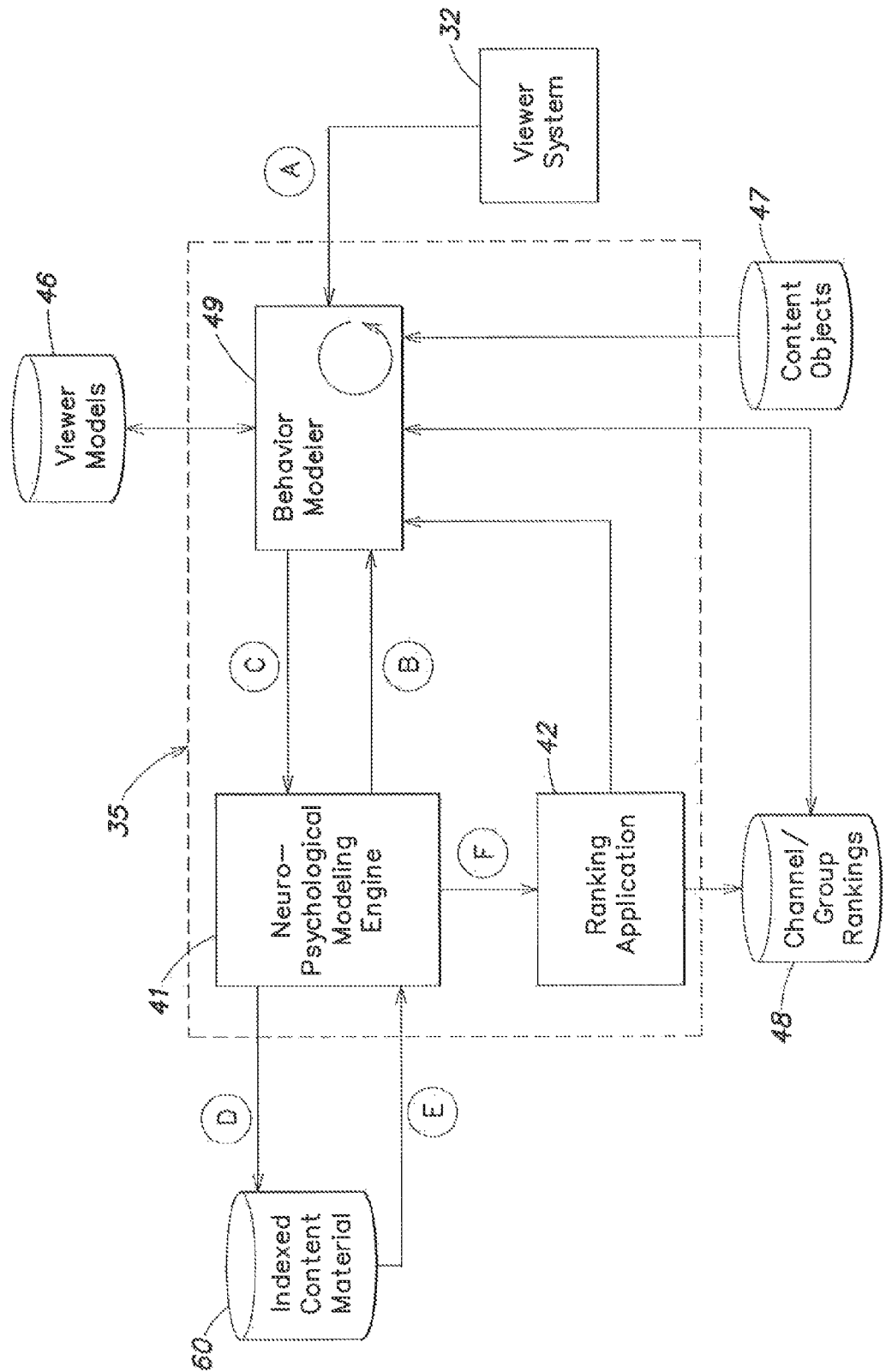
FIG. 9A illustrates conceptually the relationship the various components of the modeling system in accordance with the disclosure.
Figure 9B:
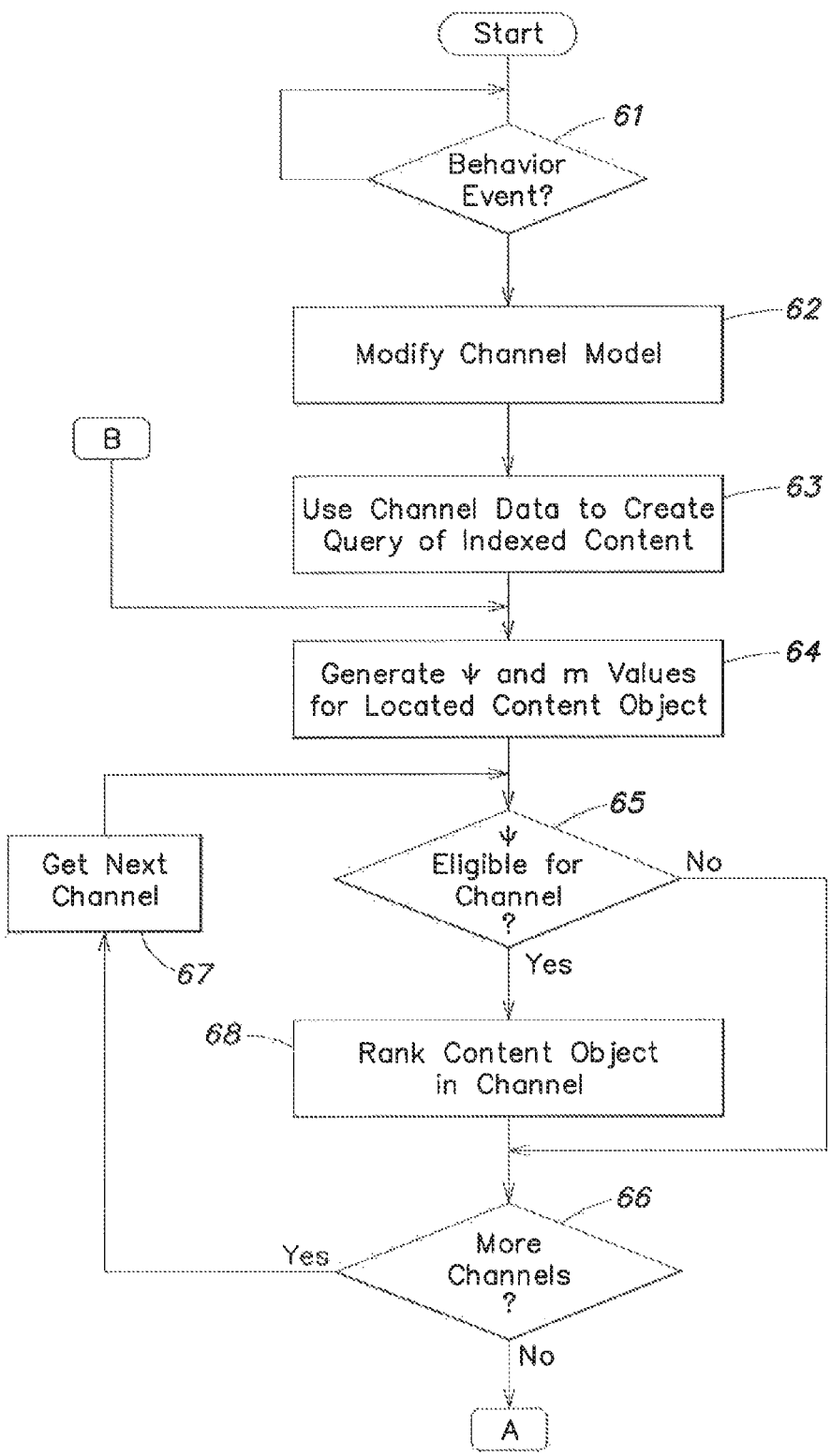
Figure 9C:
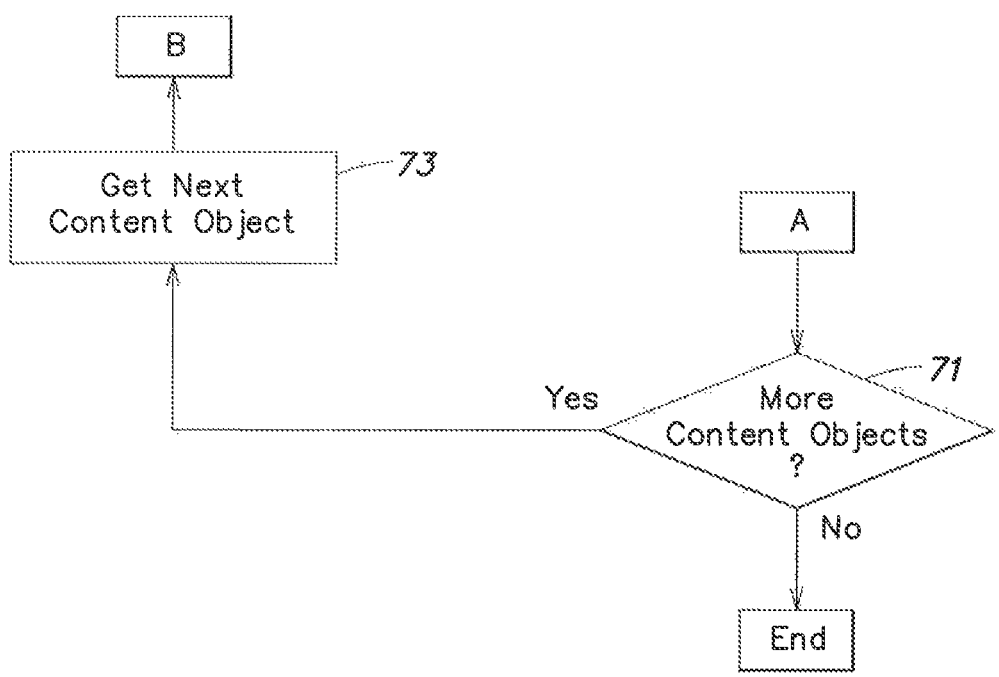
Figure 9D:
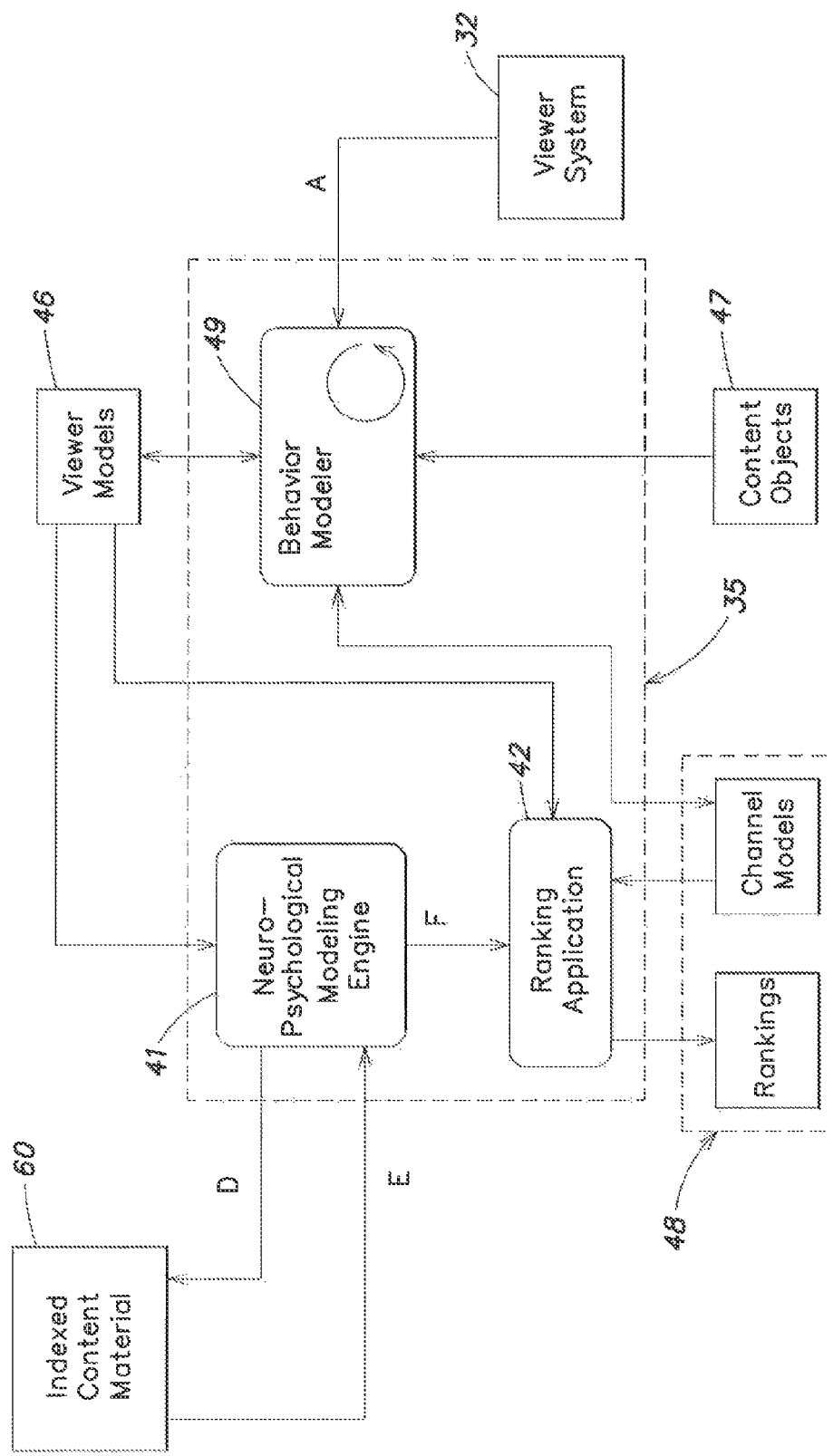
Figure 9E:
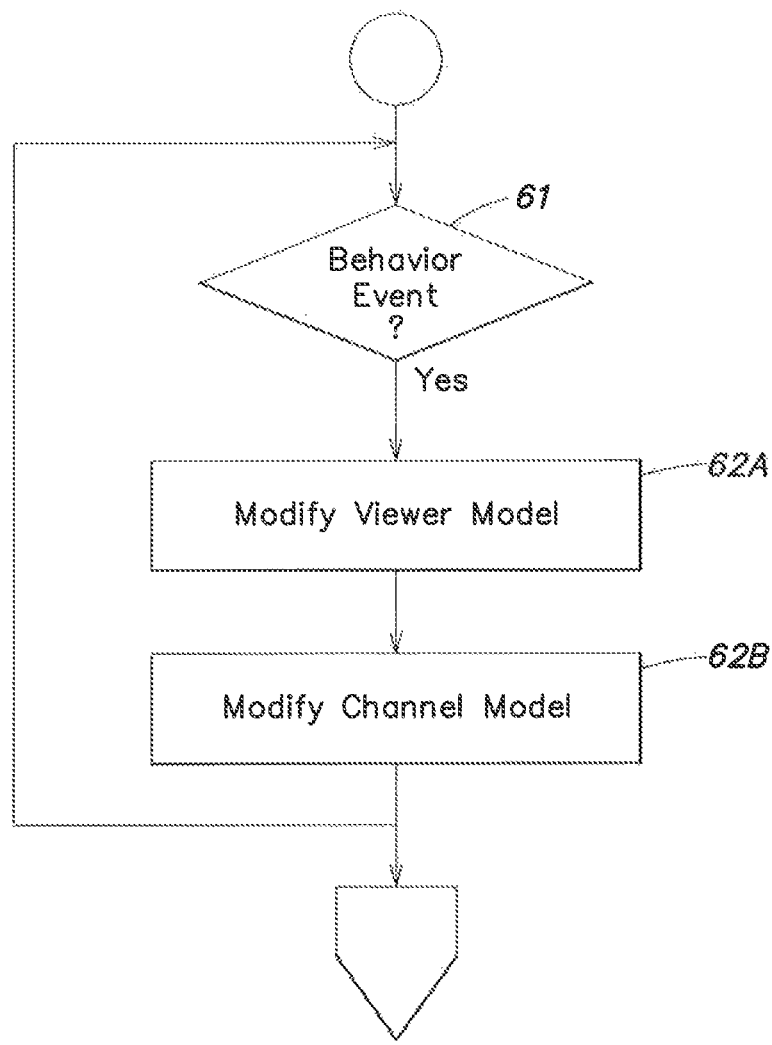
Figure 9F:
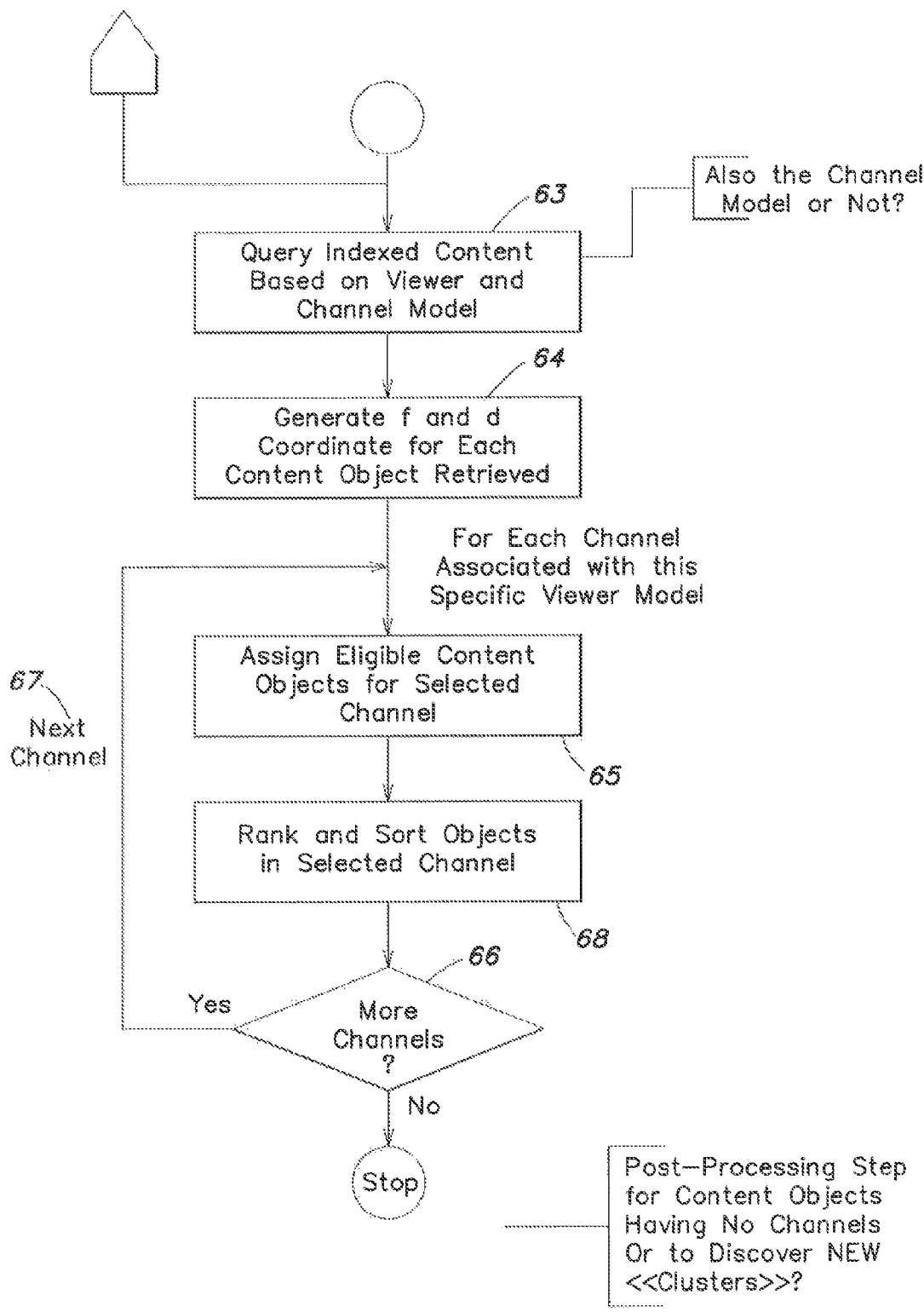

FIG. 9B-C illustrate a flow diagram of the process utilized by the neuropsychological modeling engine to provide a ranking of content objects in accordance with the disclosure;

FIG. 9D illustrates conceptually the relationship of the various components of the modeling system in accordance with the disclosure;

FIG. 9E-F collectively and conceptually illustrate an algorithmic process performed by the neuropsychological modeling engine in accordance with the disclosure;

FIGS. 10A, 10A1, 10B, 10B1, 10C, and 10C1, illustrate conceptually the data structures utilized by modeling system and/or viewer system in accordance with the disclosure.

Figure 11A:
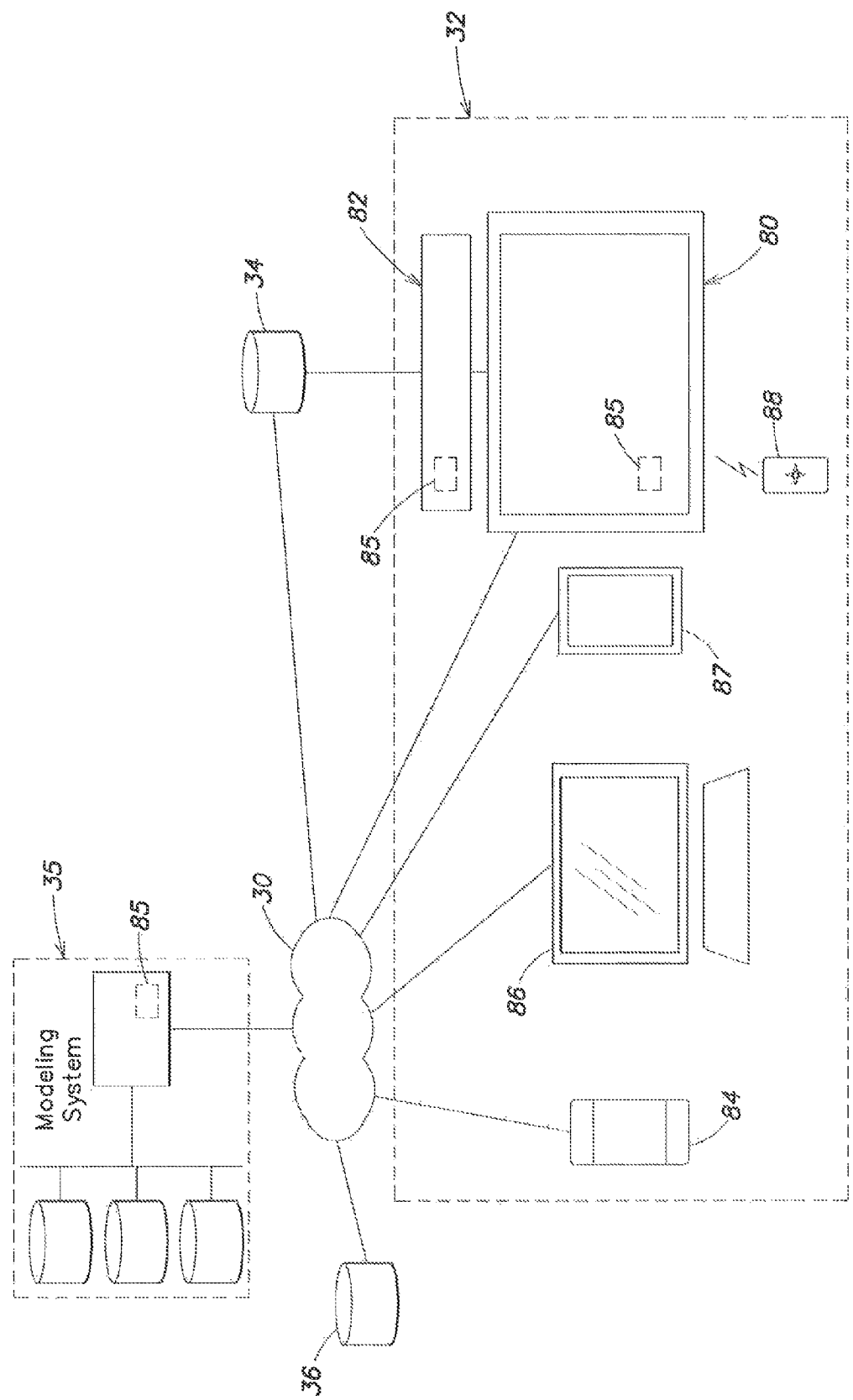
Figure 11B:
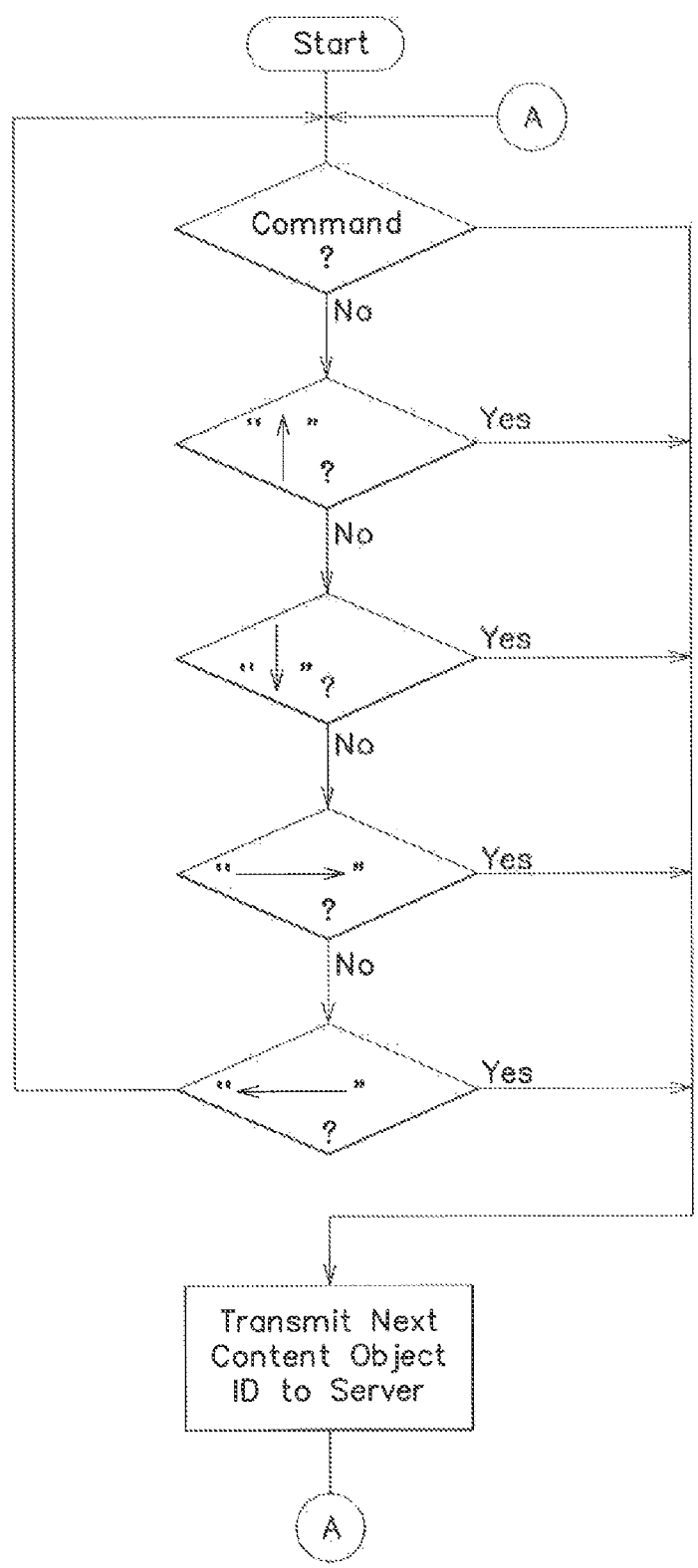

FIG. 11A illustrates conceptually an interface system for a viewer in accordance with the disclosure;

FIG. 11B illustrates conceptually the algorithmic process performed by redirection application.

Figure 1A:
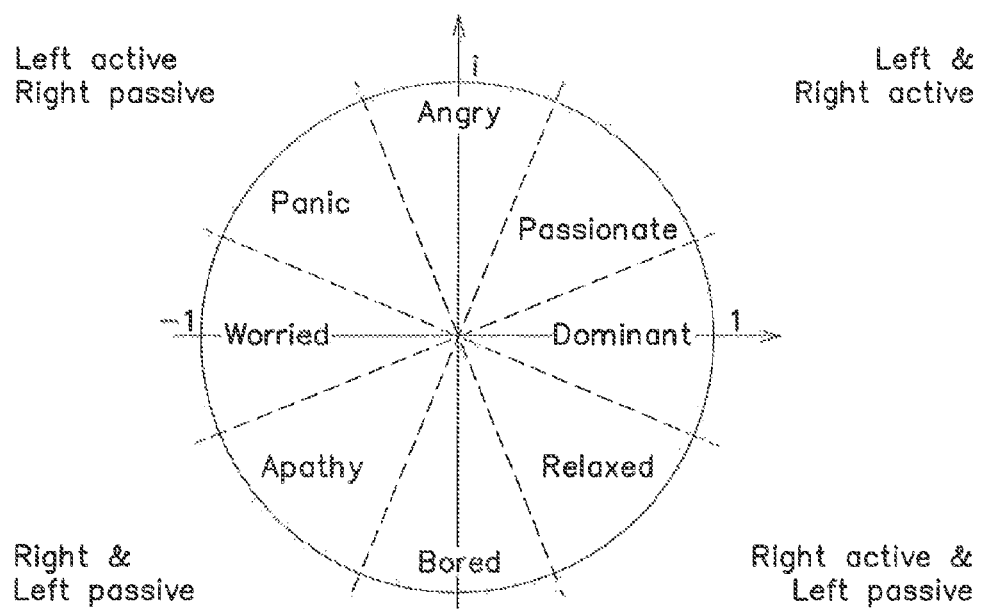
FIG. 1A illustrates conceptually the Mood disk with brain activity varying in function relative to the Real and Imaginary axis in accordance with the disclosure.
Figure 1B:
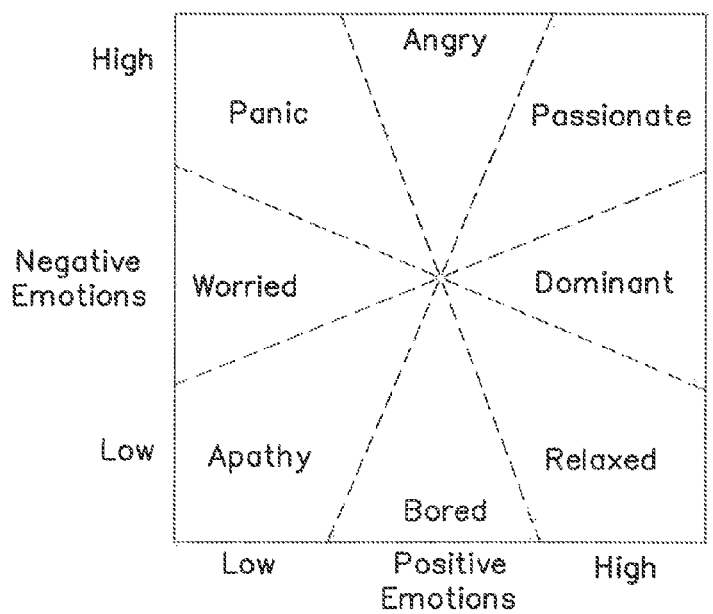
FIG. 1B illustrates conceptually the Mood square in accordance with the disclosure.
Figure 1C:
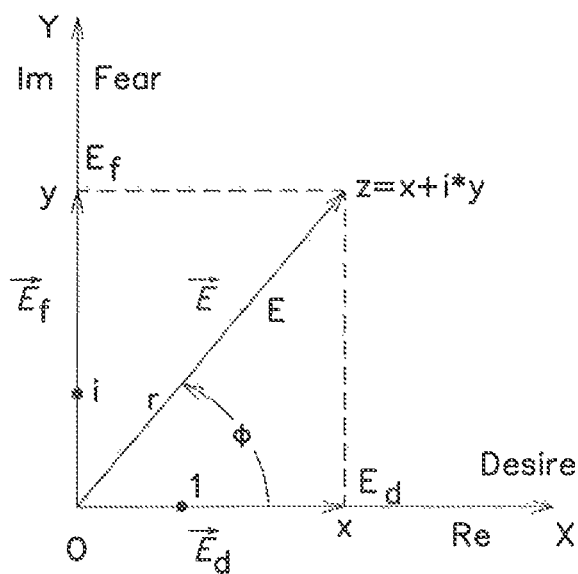
FIG. 1C is a graph illustrating the decomposition of an Emotion in its independent and fully constituent components Fear and Desire in accordance with the disclosure.
Figure 1D:
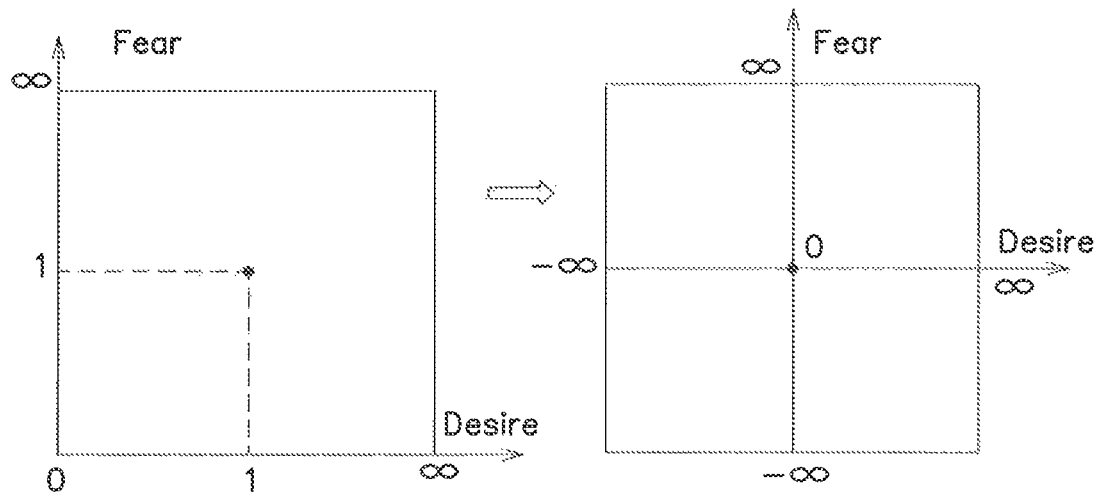
FIG. 1D illustrates the transformation from the complex plane positive quadrant to the logarithmic complex mood space in accordance with the disclosure.
Figure 1E:
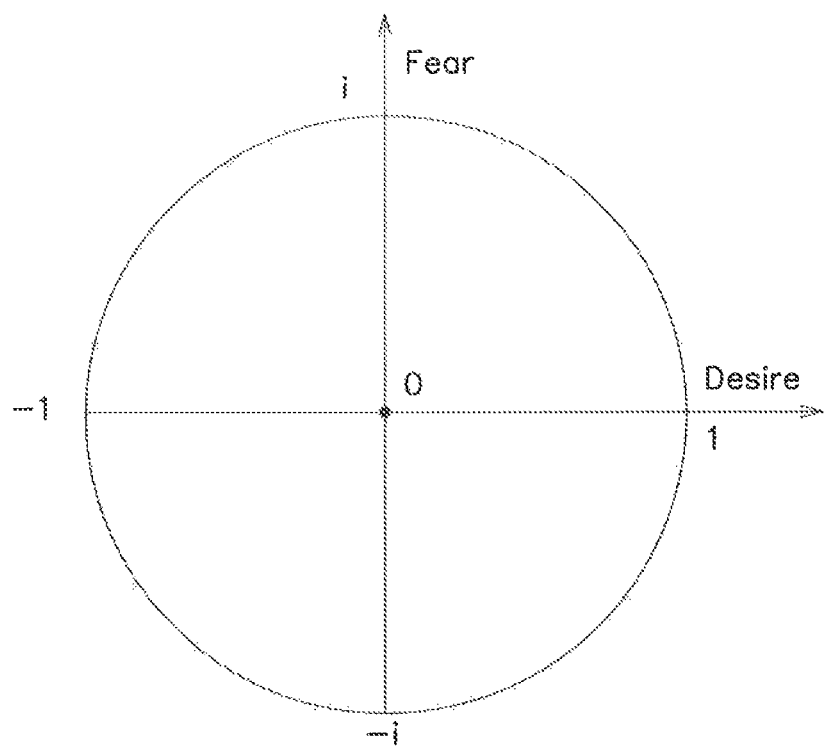
FIG. 1E illustrates the emotion and mood disk as a unity disk in accordance with the disclosure.
Figure 1F:
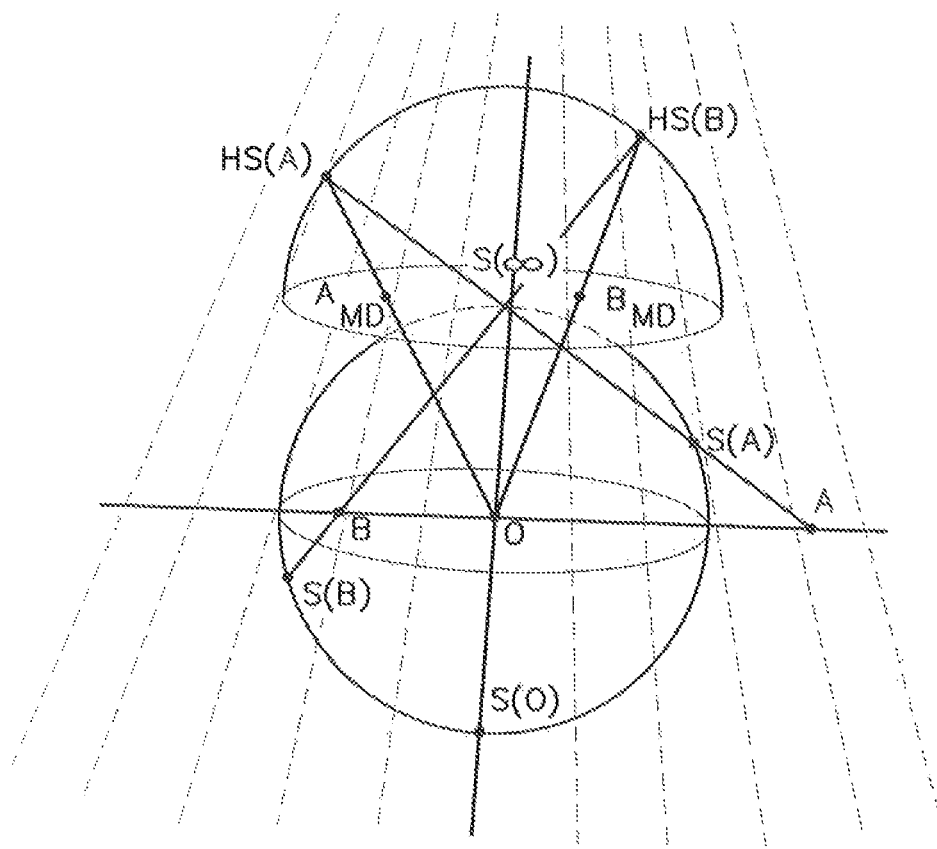
FIG. 1F illustrates the stereographic projection on a sphere and half sphere in accordance with the disclosure.
Figure 1G:
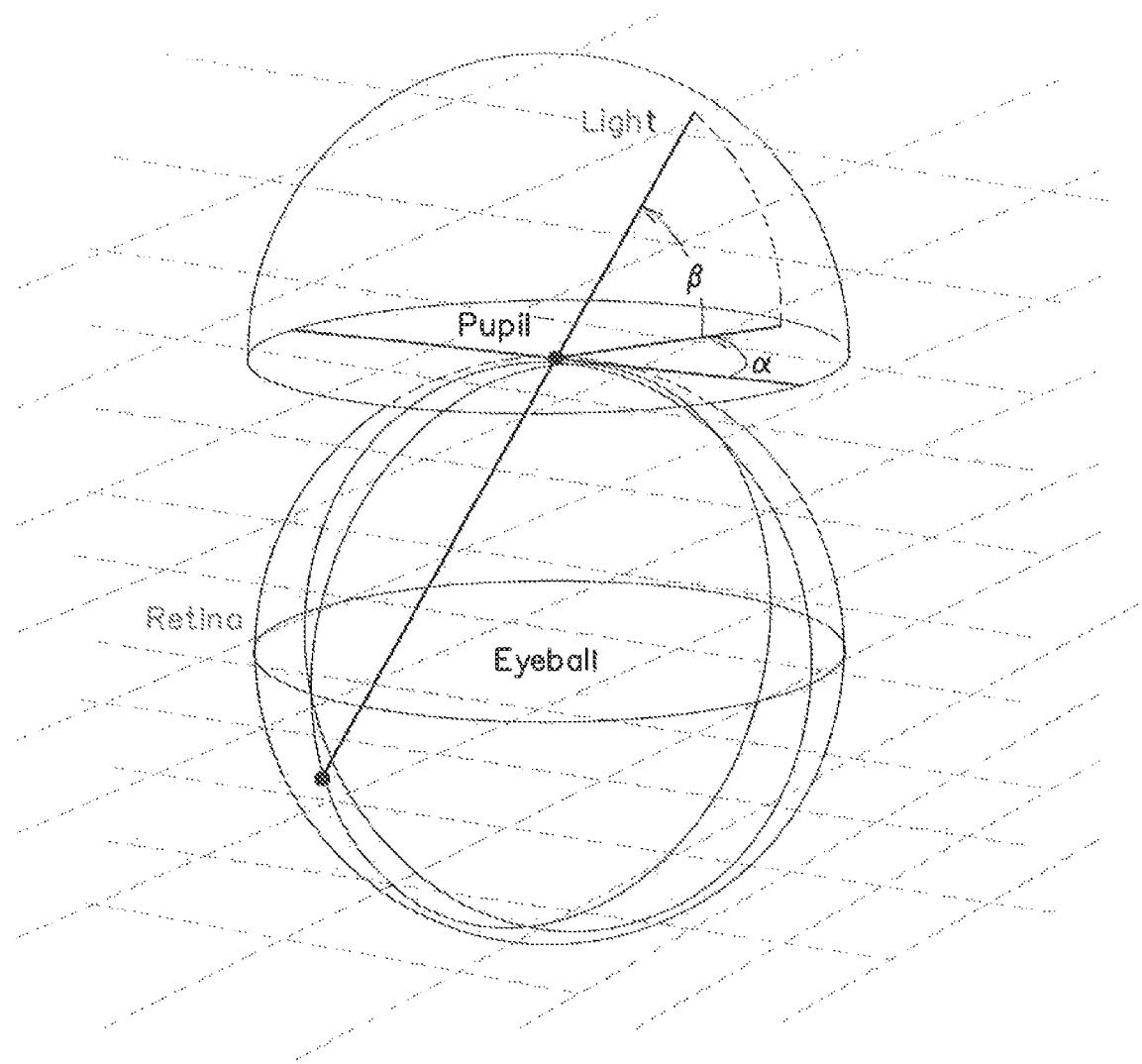
FIG. 1G illustrates the projections of the human eye and brain on visual stimuli in accordance with the disclosure.
Figure 1H:
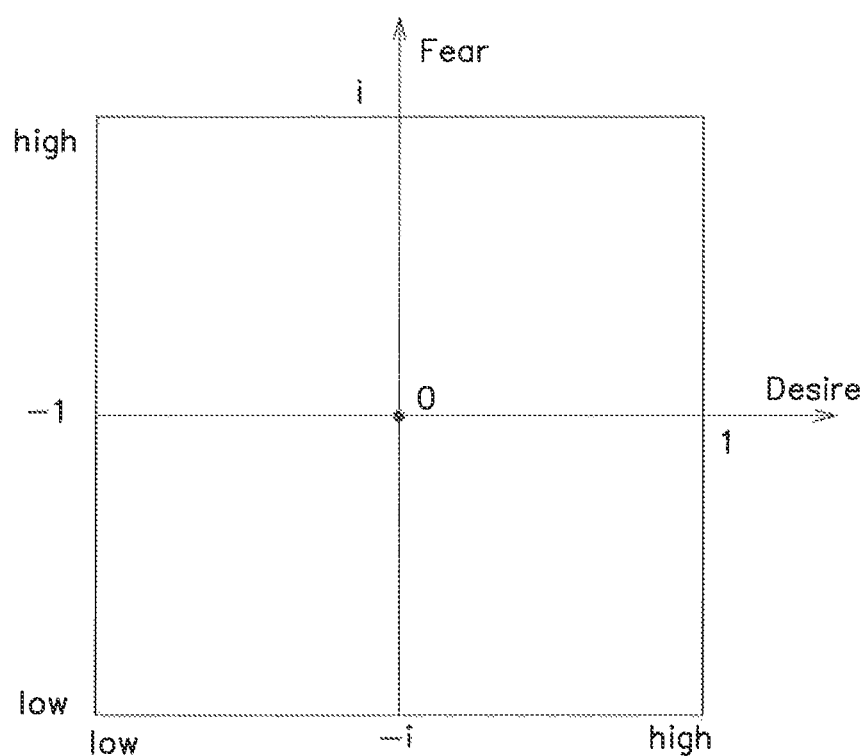
FIG. 1H illustrates the mood square, as a representation of the mood unity disk in the Chebyshev metric.
Figure 1I:
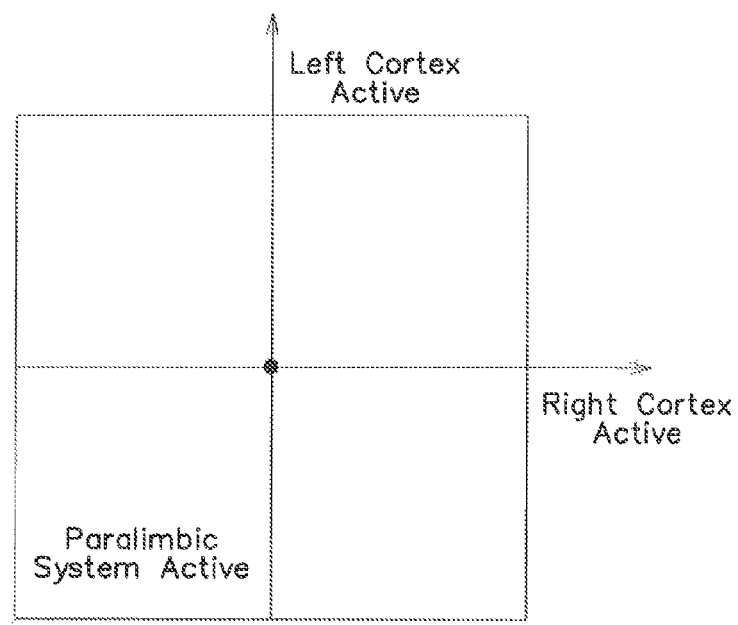
FIG. 1I illustrates cortical activity on the mood unity square in accordance with the disclosure.
Figure 1J:
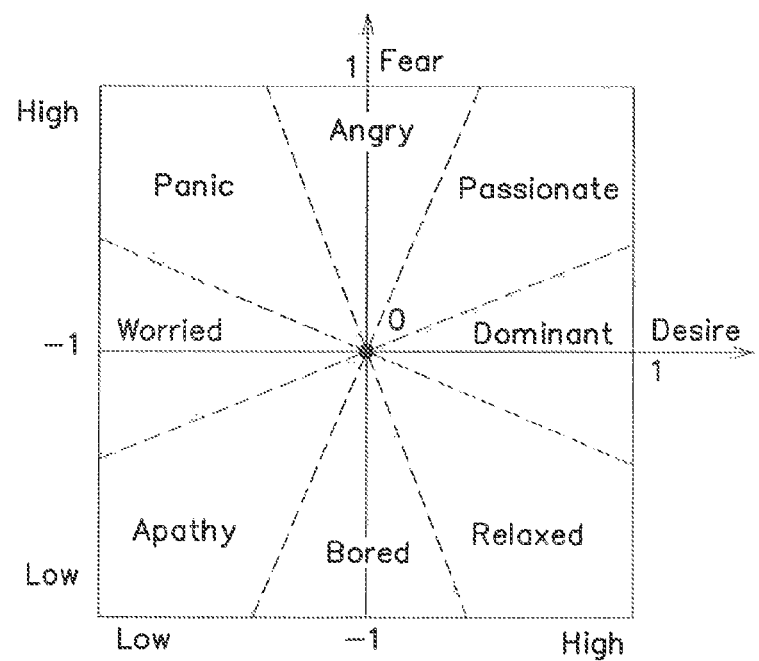
FIG. 1J illustrates the resulting stable moods on the mood unity square in accordance with the disclosure.
Figure 1K:
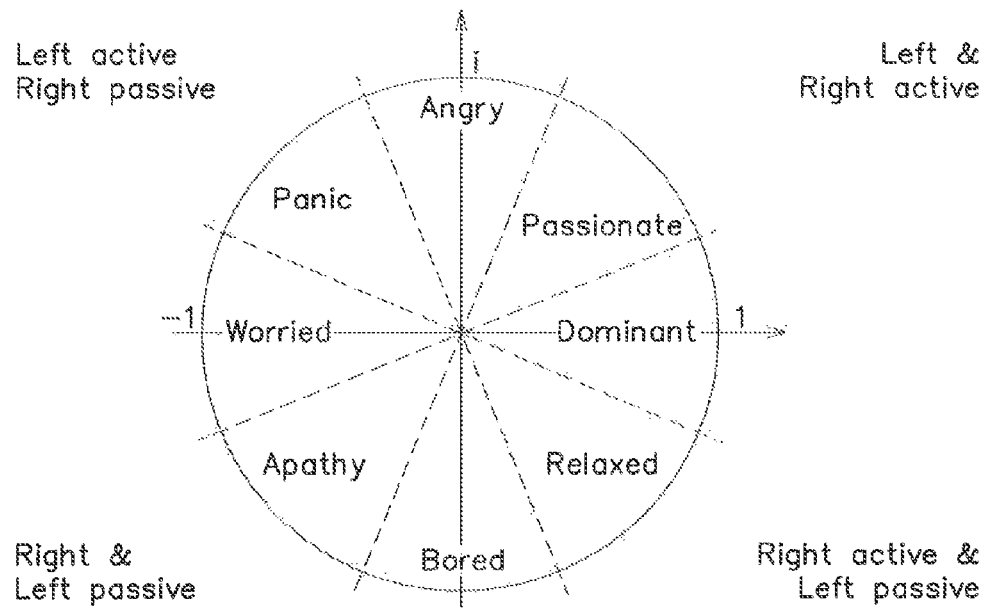
FIG. 1K illustrates the mood disk in accordance with the disclosure.
Figure 1L:
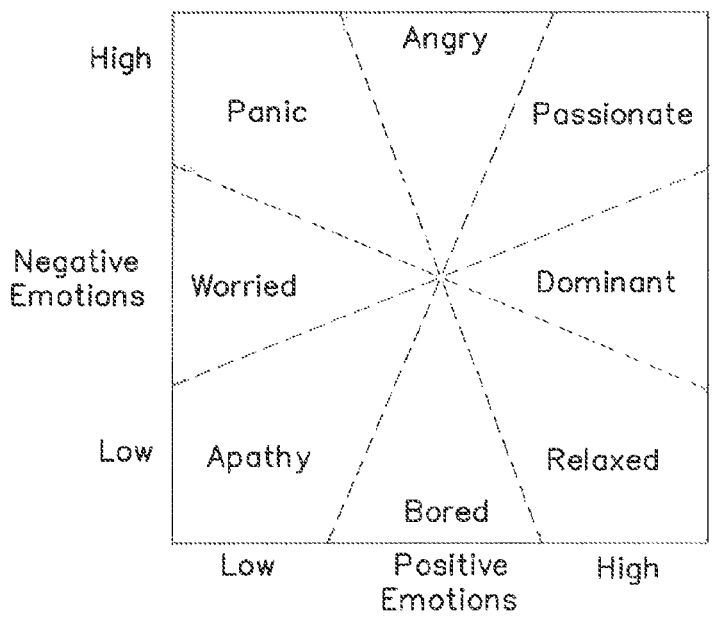
FIG. 1L illustrates the emotion and mood square in accordance with the disclosure.
Figure 1M:
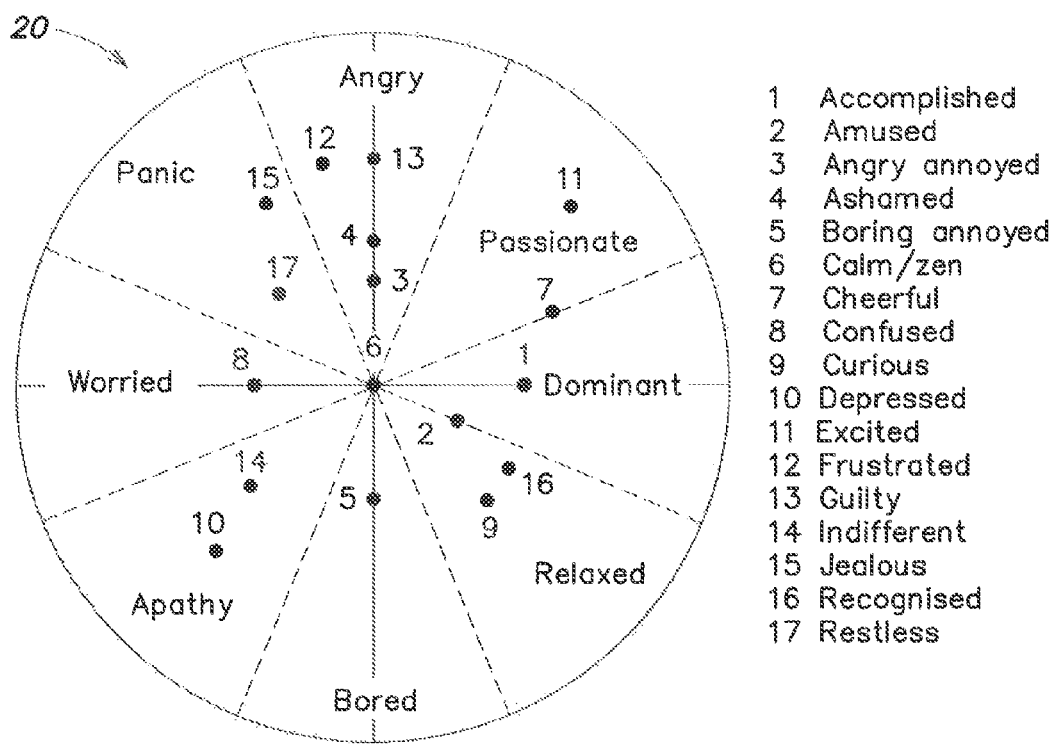
FIG. 1M illustrates a range of mood variants on the mood disk in accordance with the disclosure.
Figure 1N:
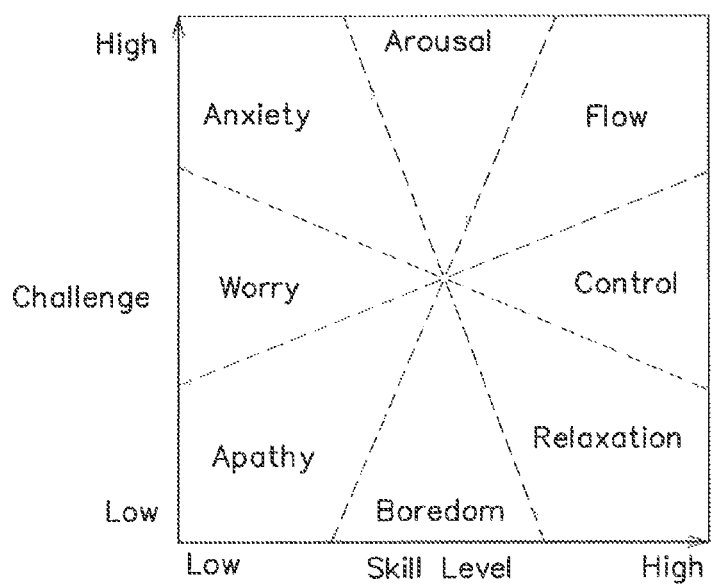
FIG. 1N illustrates a prior art mental state model as proposed by Csíkszentmihályi.
Figure 2:
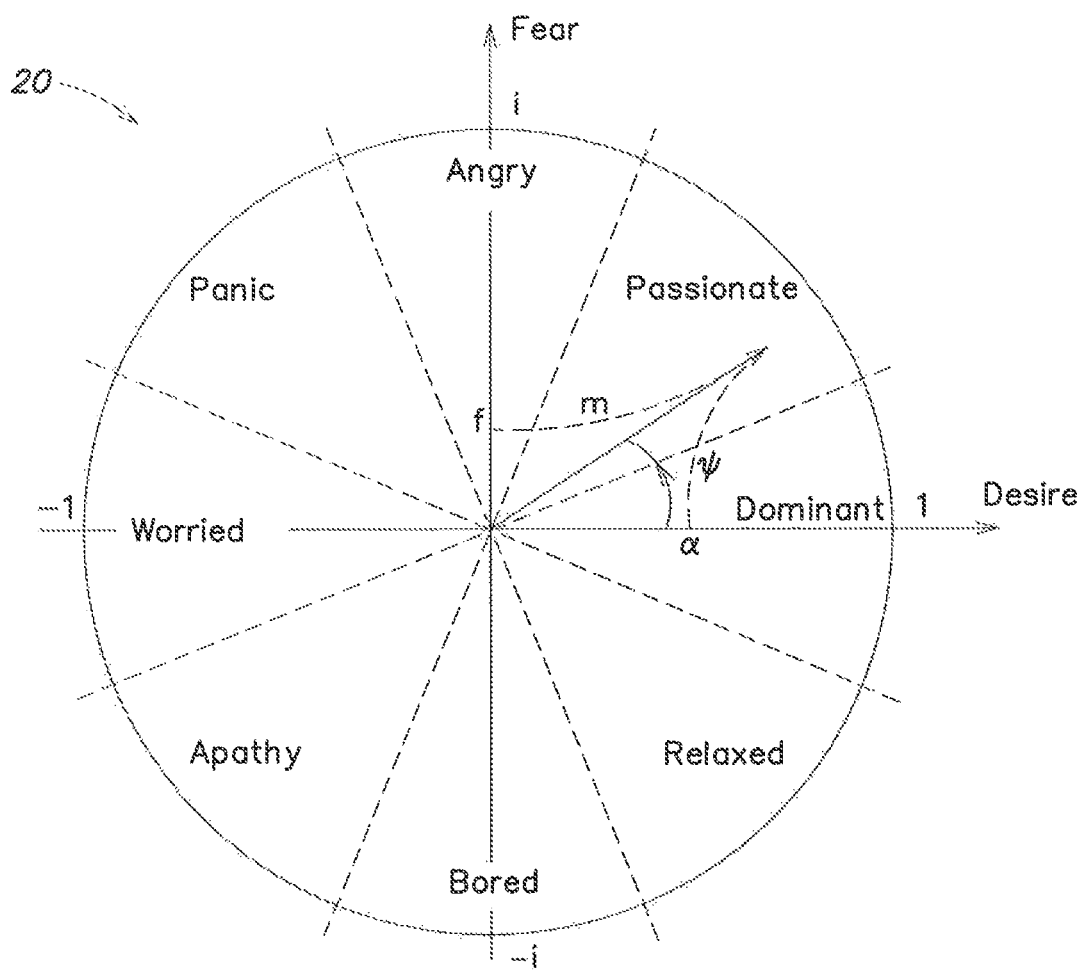
FIG. 2 is a conceptual illustration of the natural representation of the state space of human psychology in accordance with the disclosure.
Figure 11C:
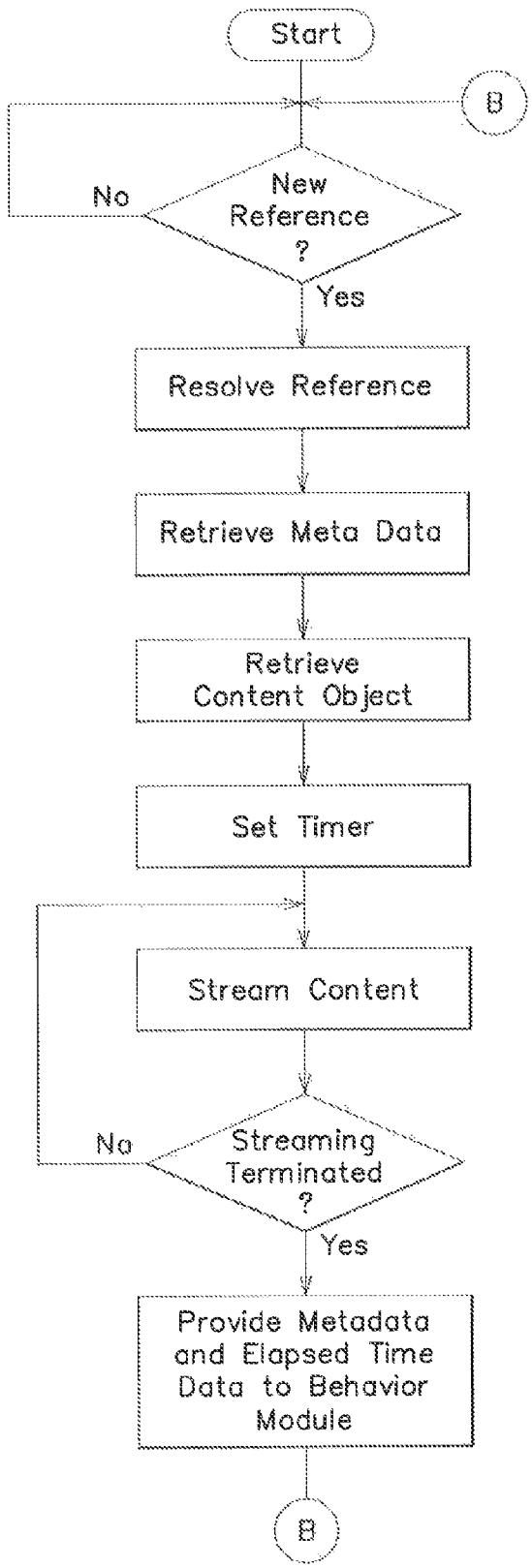

FIG. 11C illustrates conceptually the algorithmic process performed by the modeling system in accordance with the disclosure;

FIGS. 11D1 and 11D2 illustrate conceptually another algorithmic process performed by the viewer system for navigation and display of content objects in accordance with the disclosure.

Figure 12A:
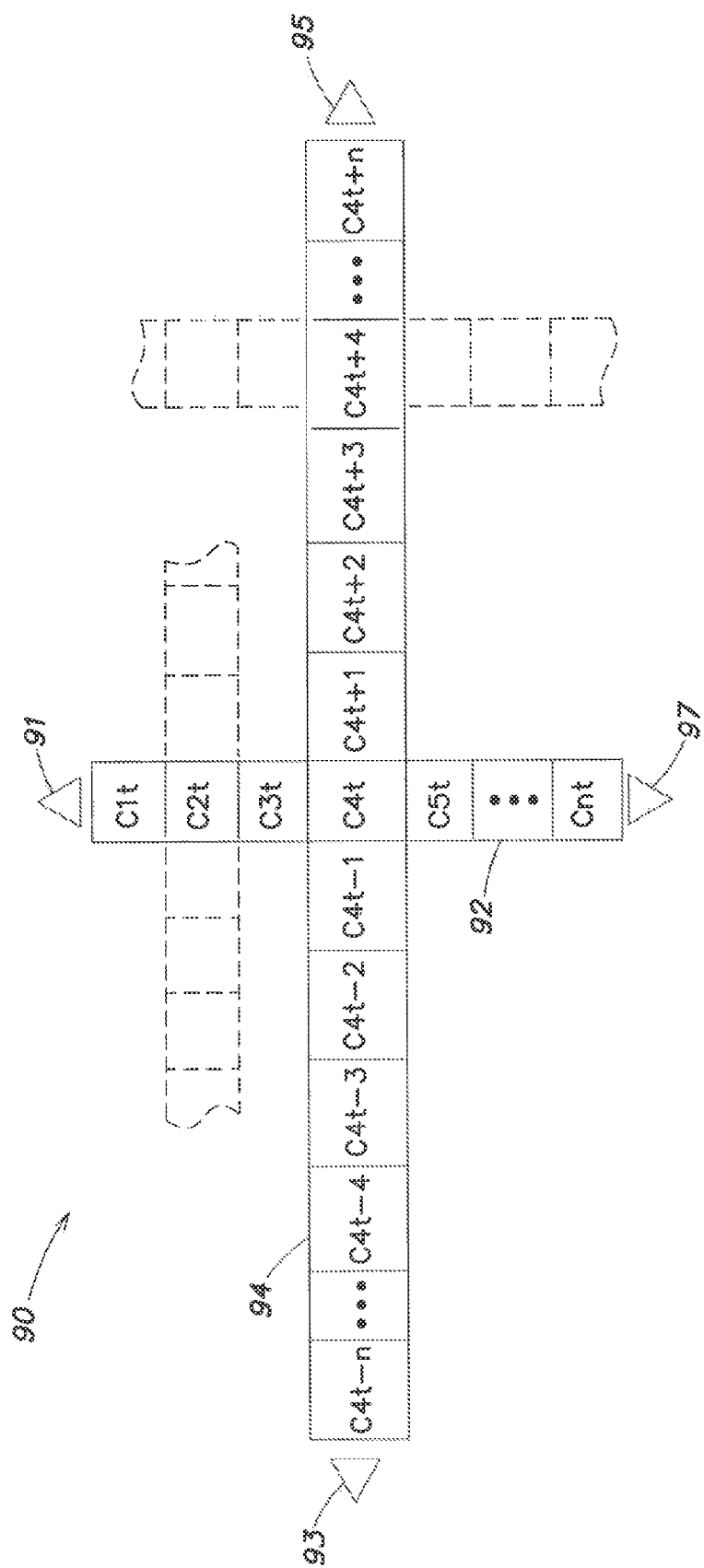
Figure 12B:
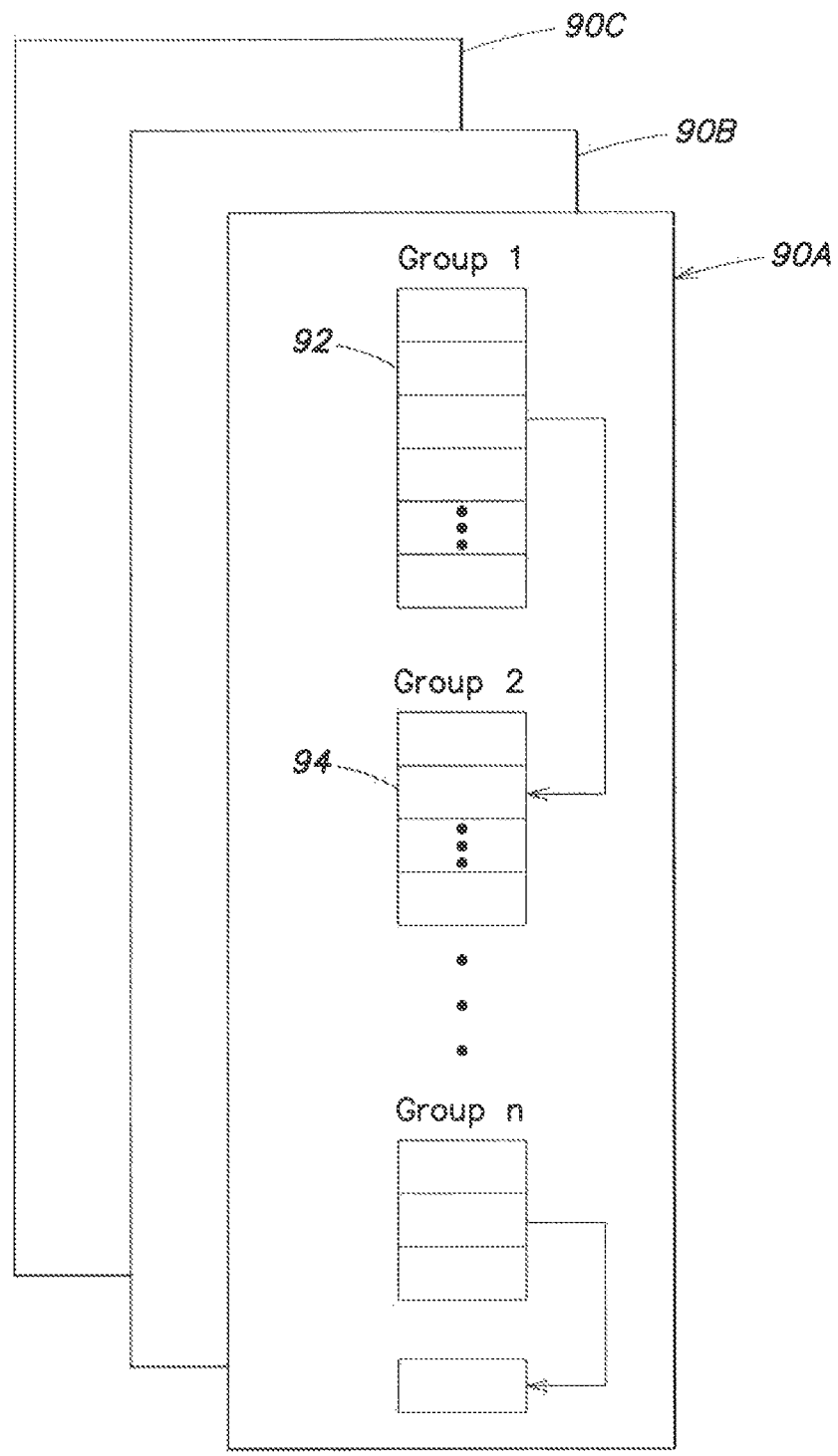
Figure 13A:
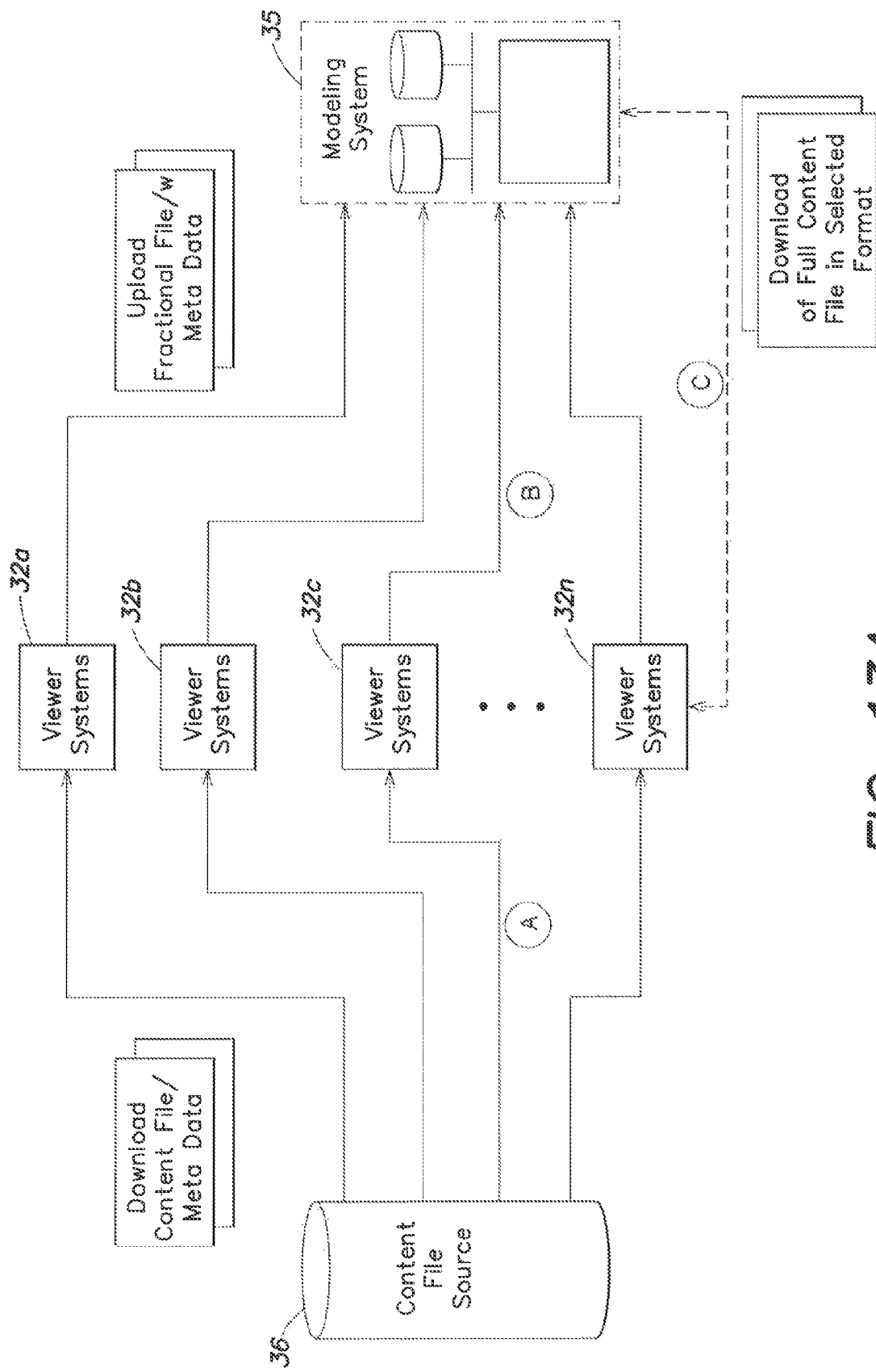
Figure 13B:
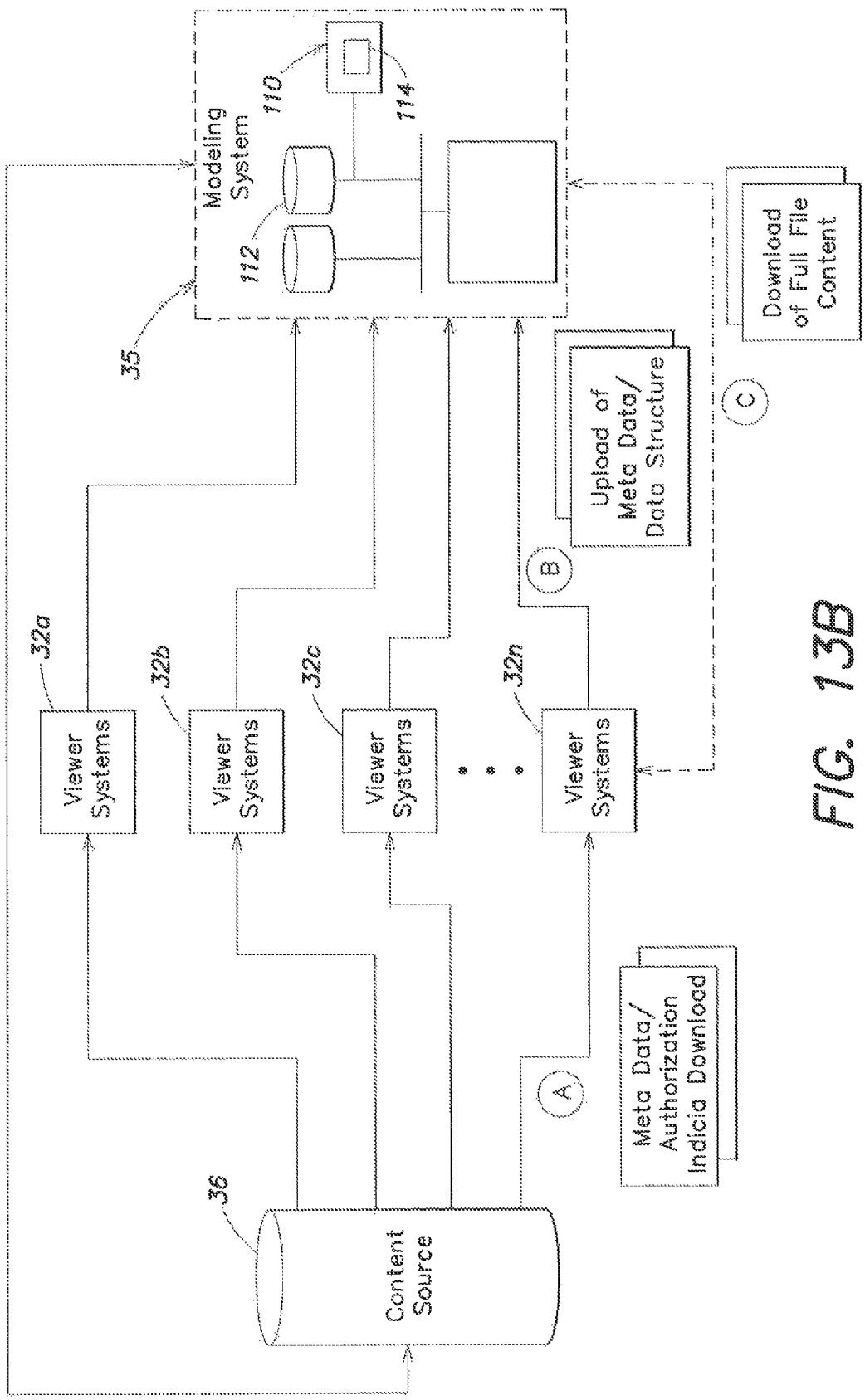
Figure 13C:
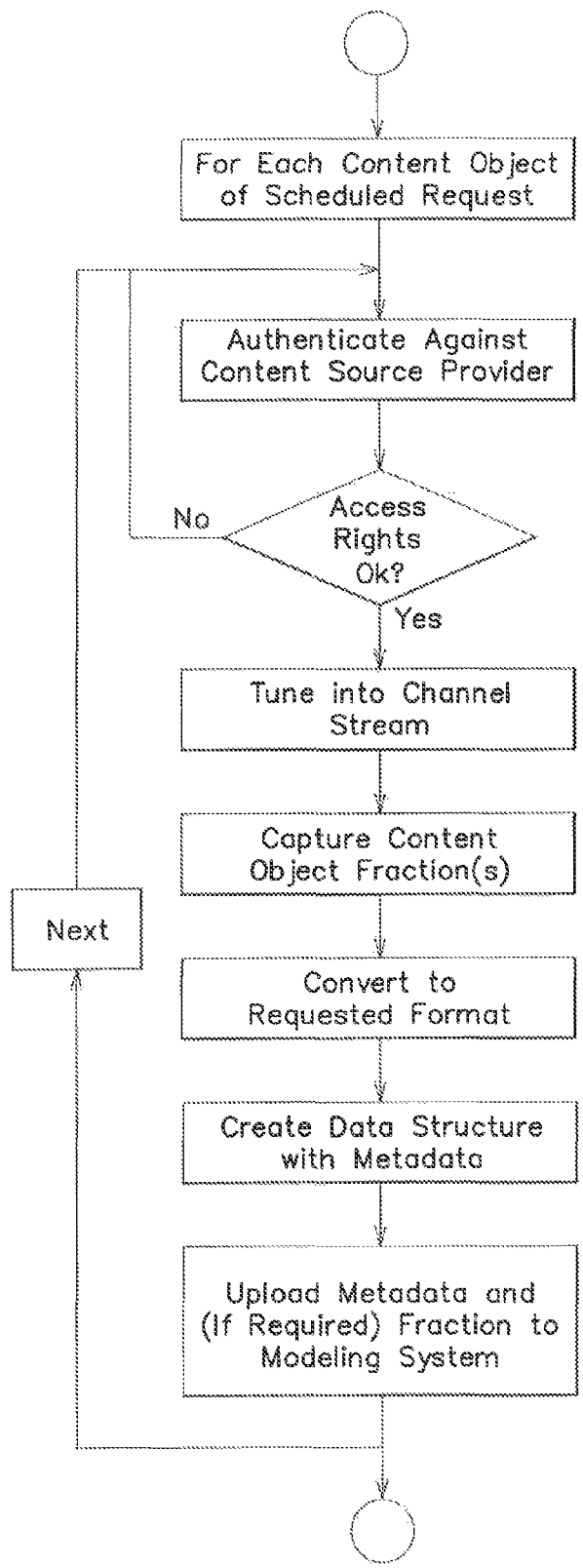
Figure 13D:
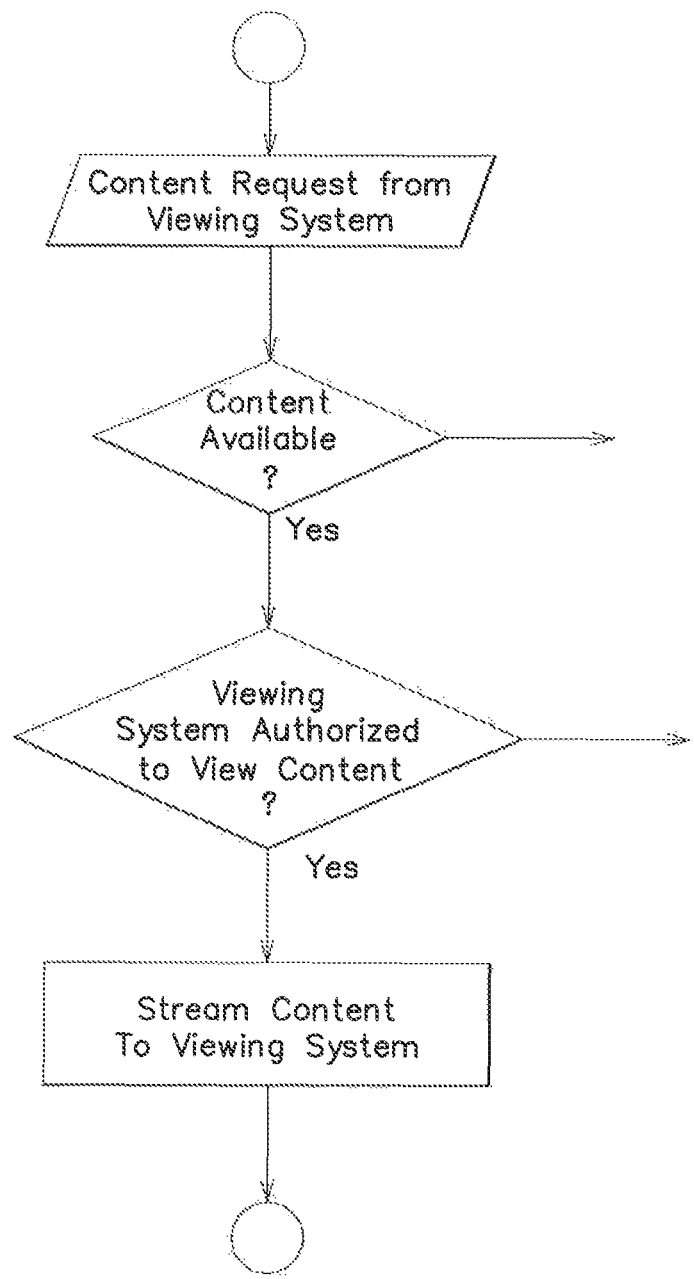
Figure 13E:
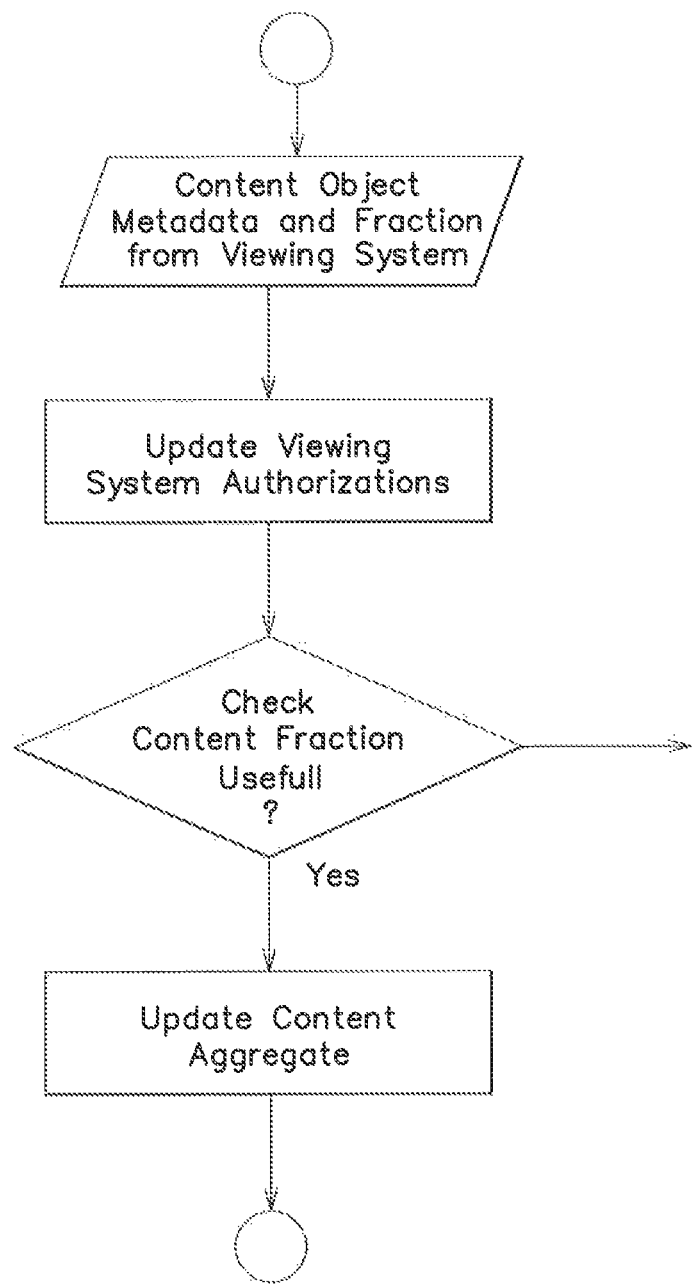
Figure 14:
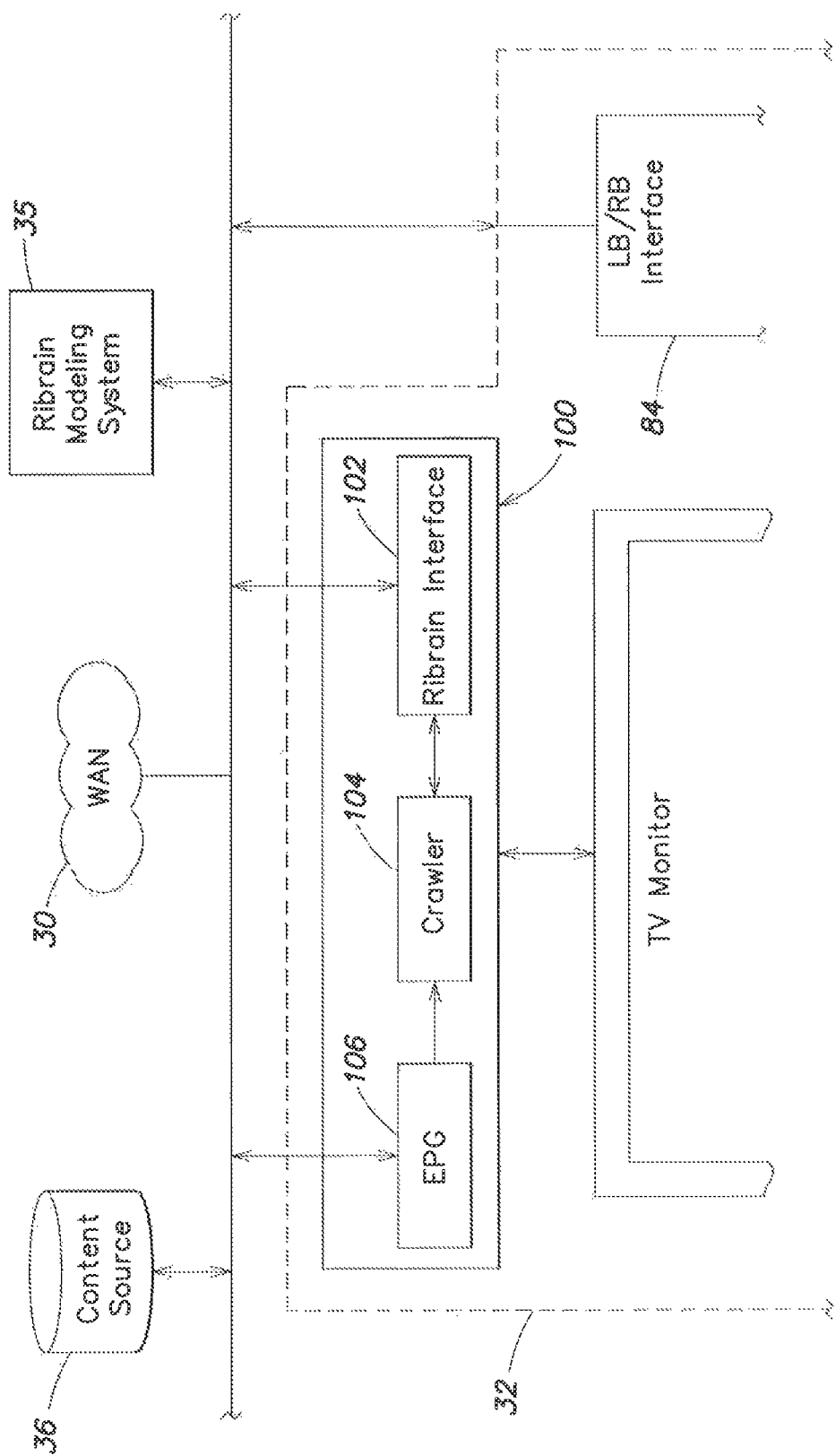
Figure 15:
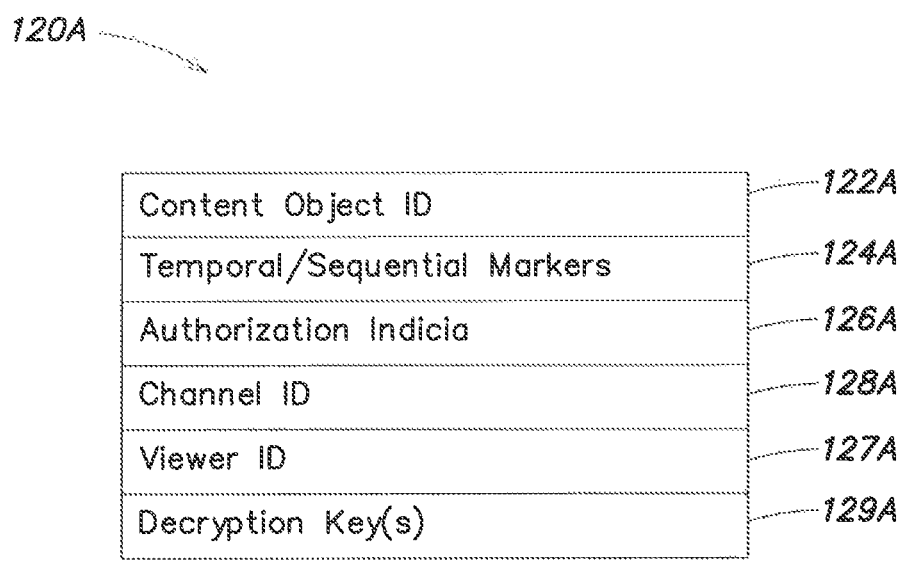
Figure 16:
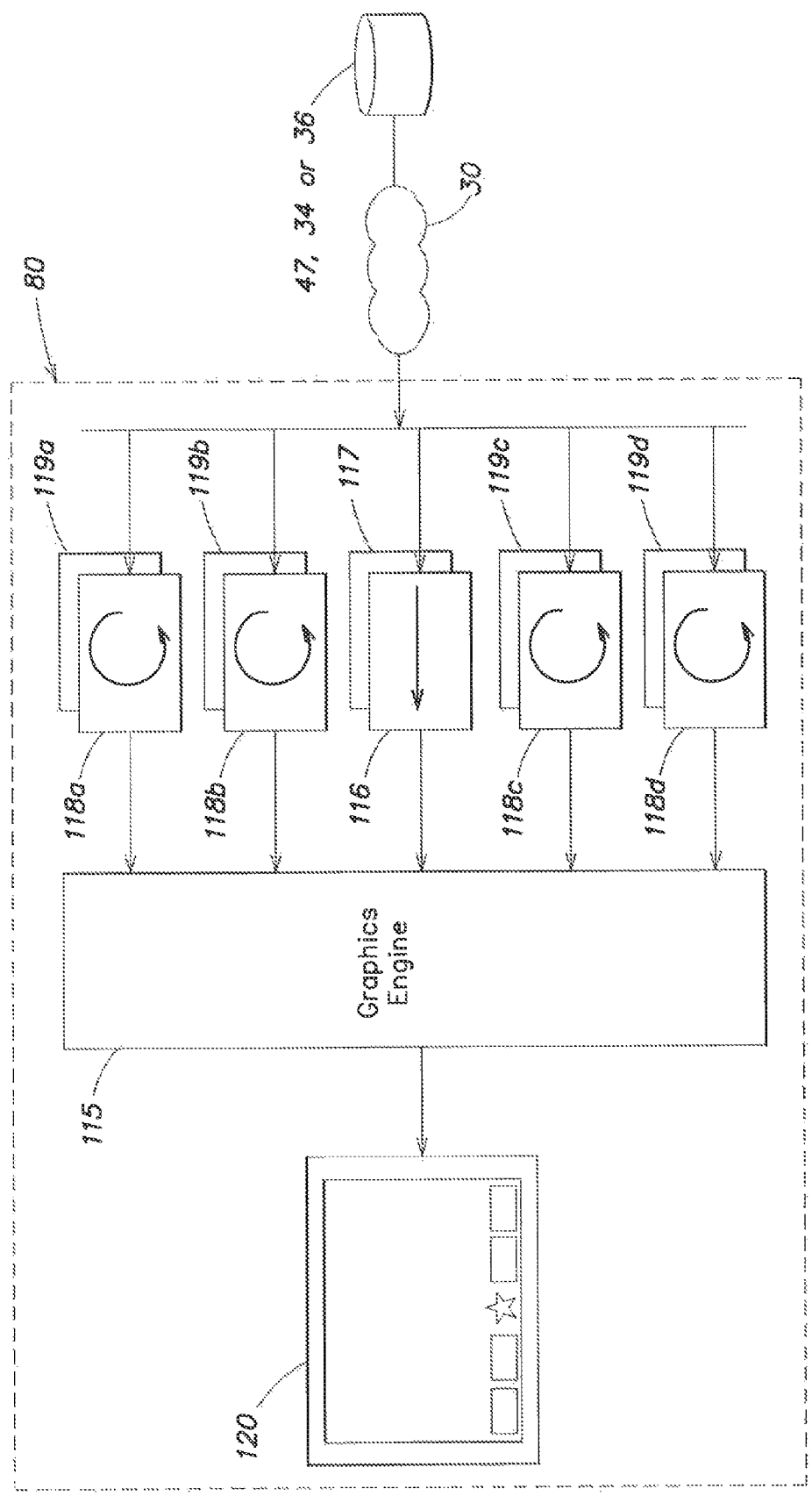
Figure 17:
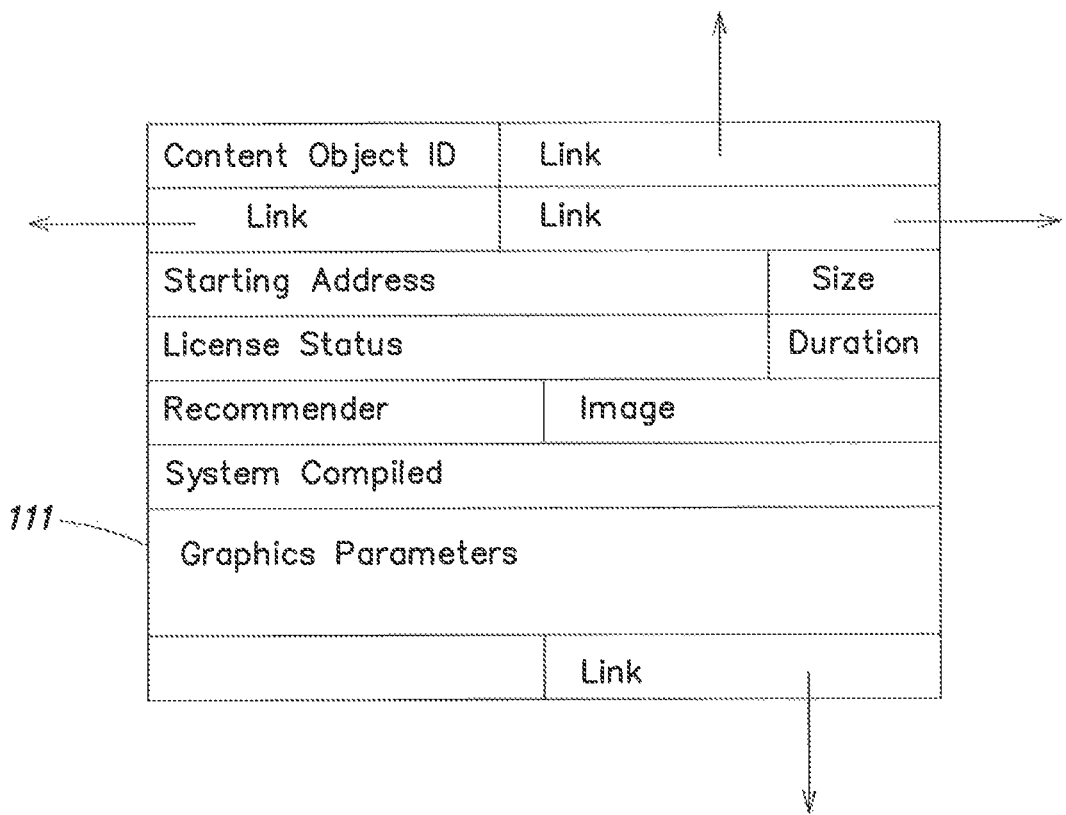
Figure 18:
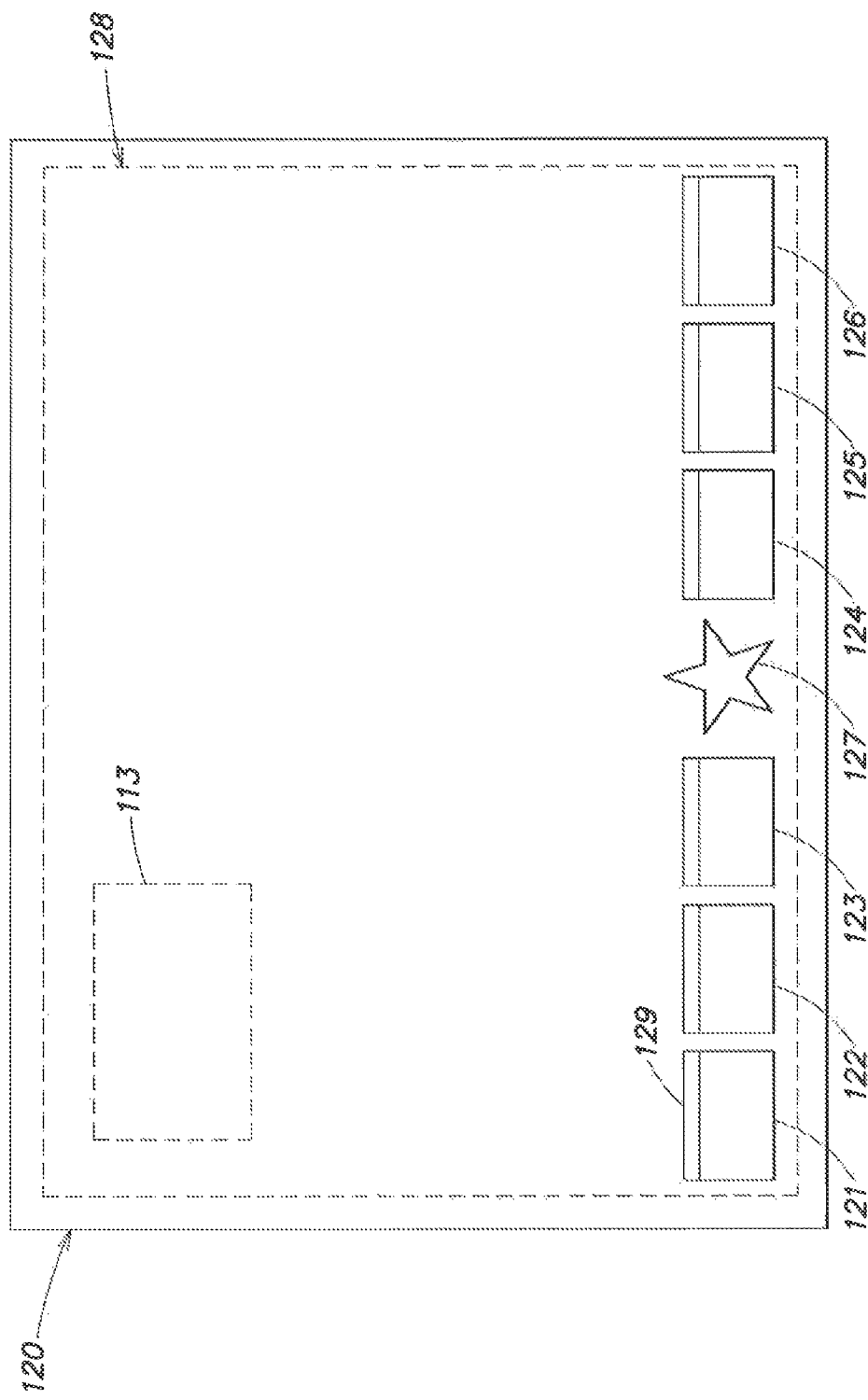
Figure 19:
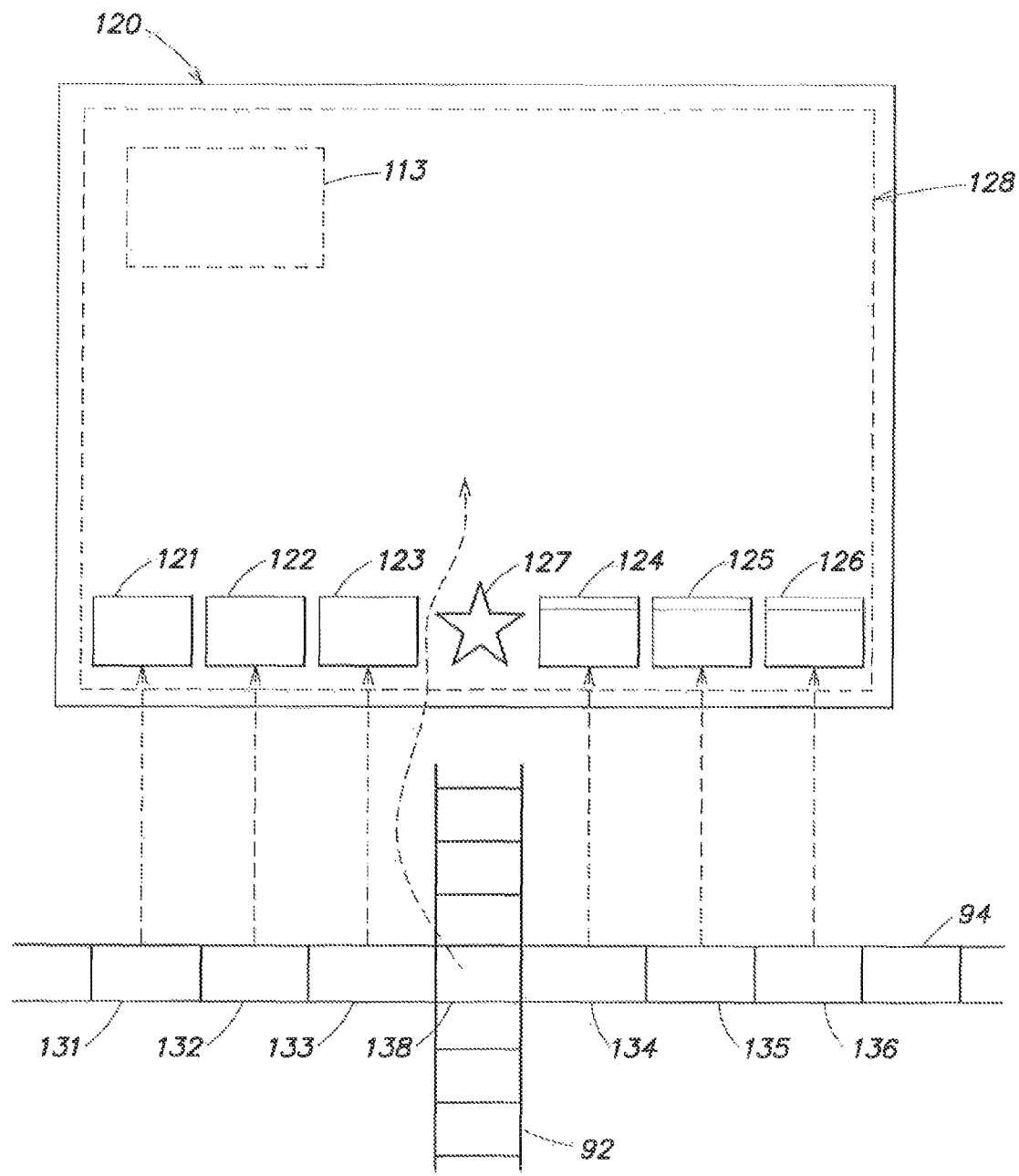
Figure 20:
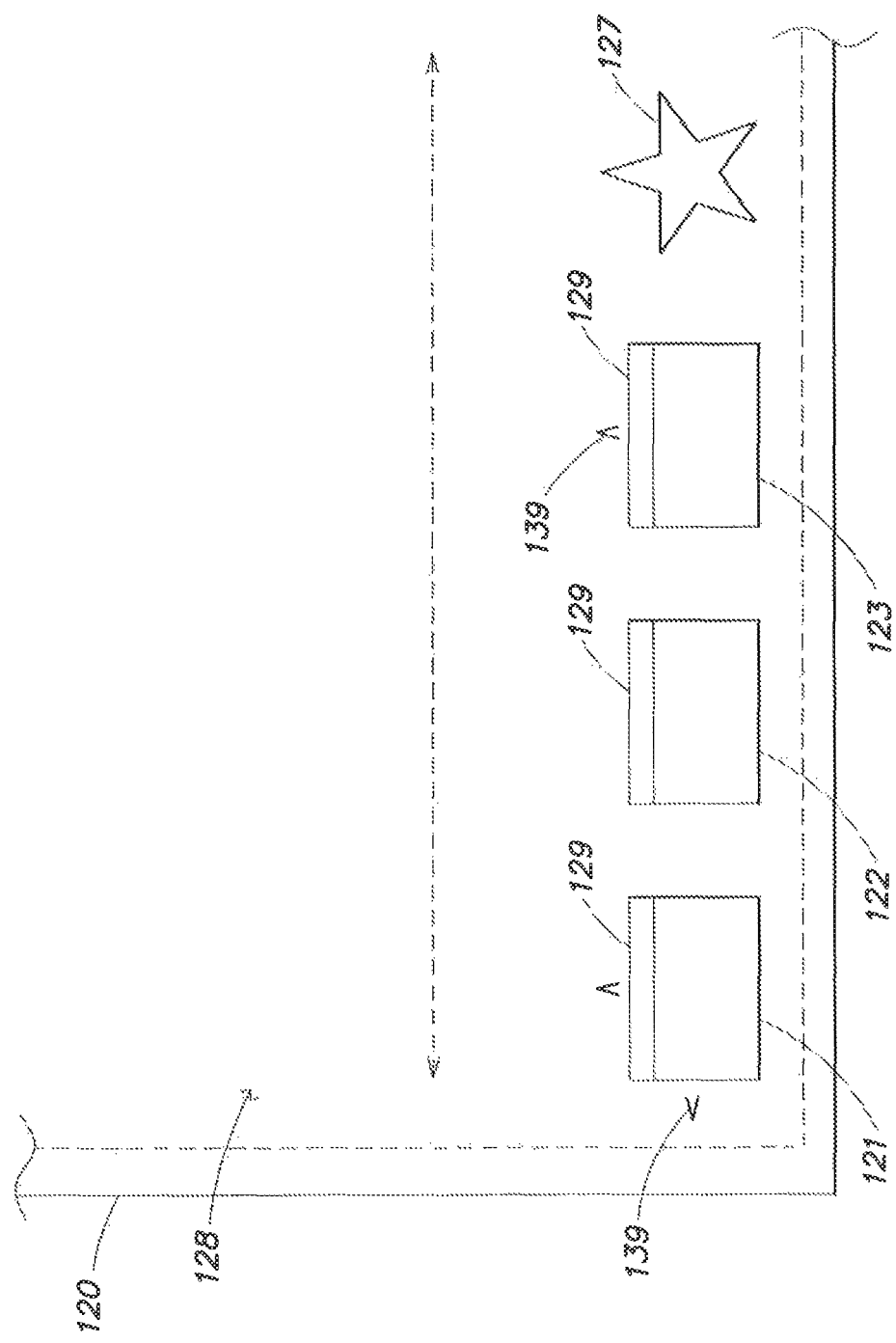
Figure 21:
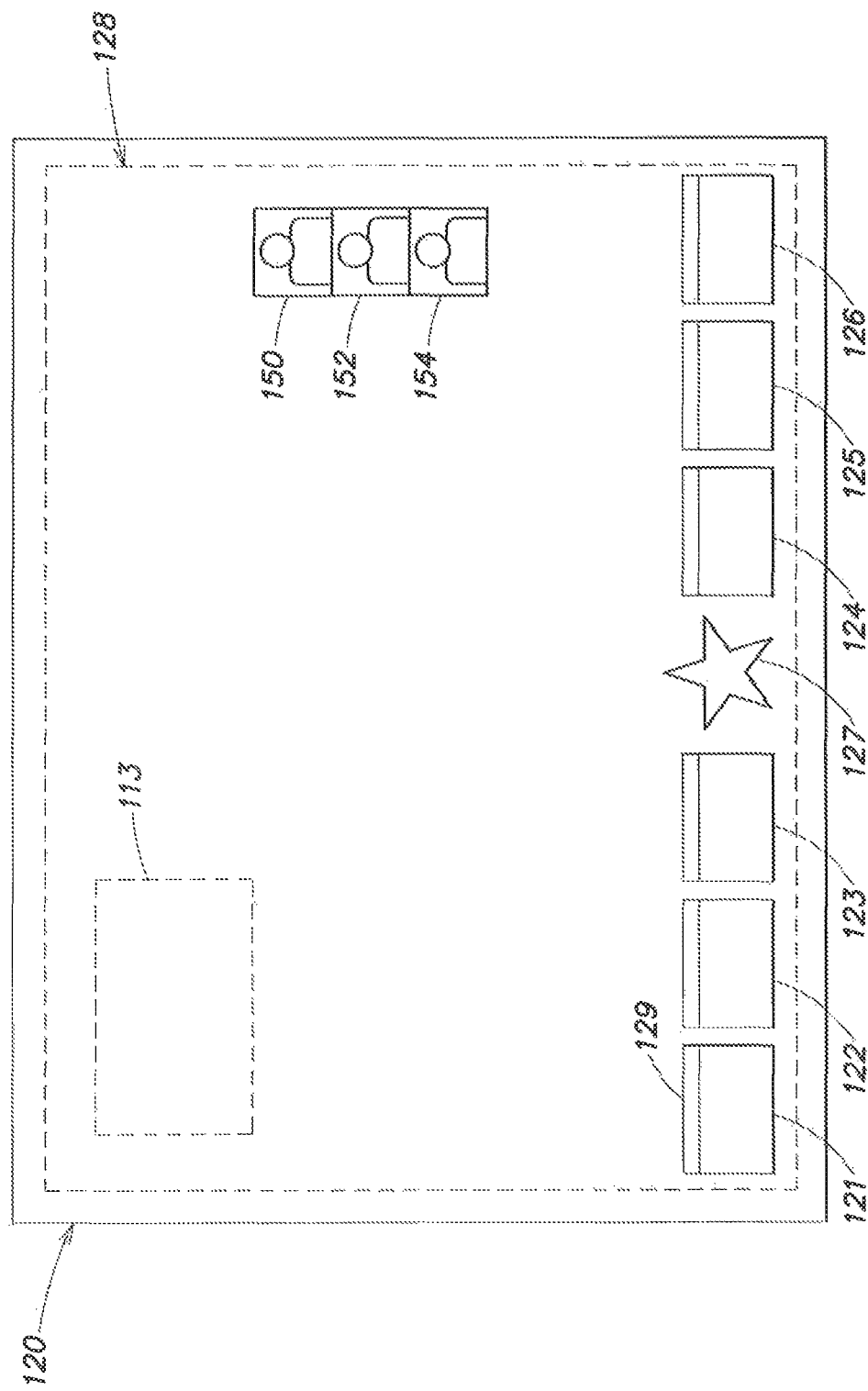
Figure 22:
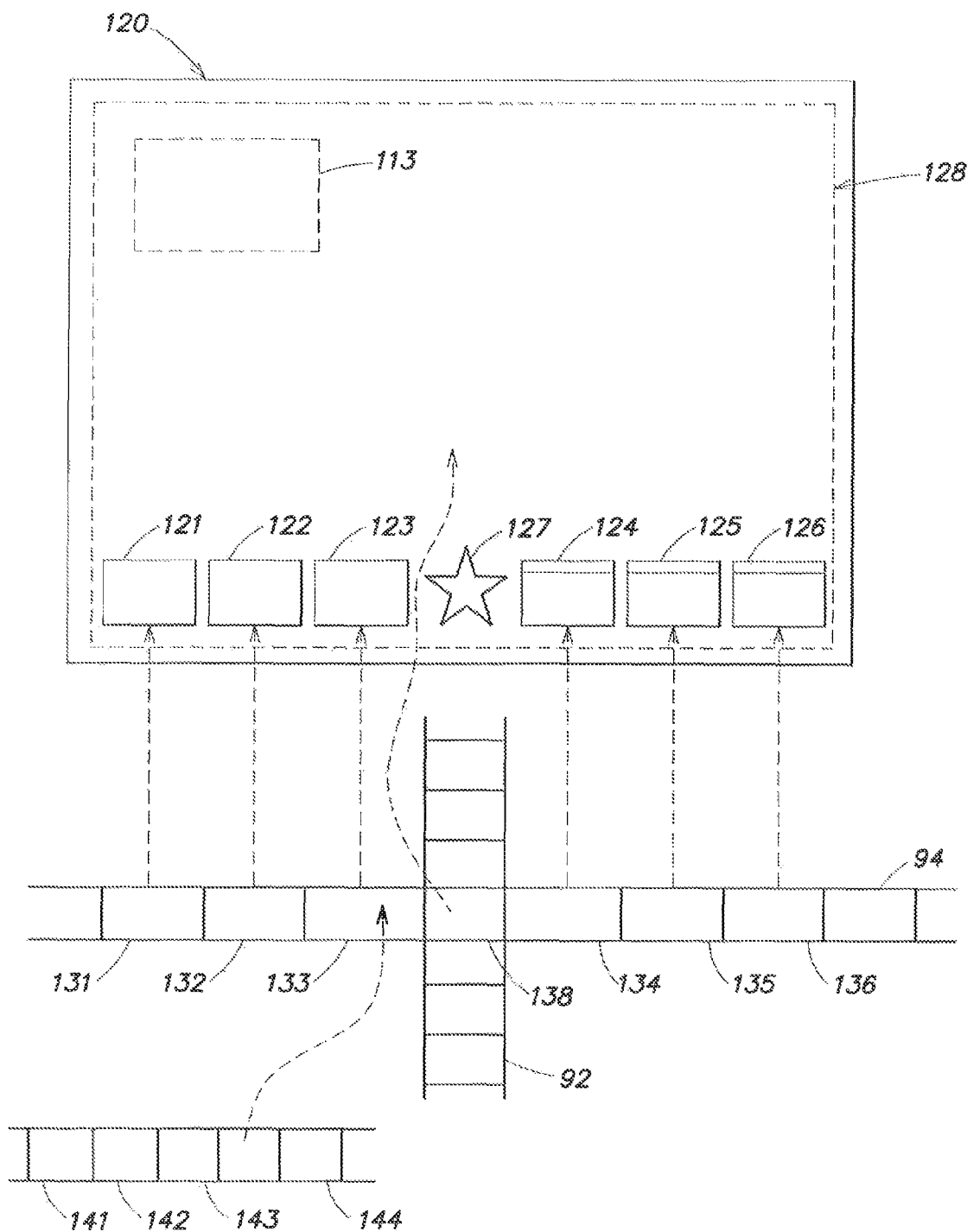
Figure 23:
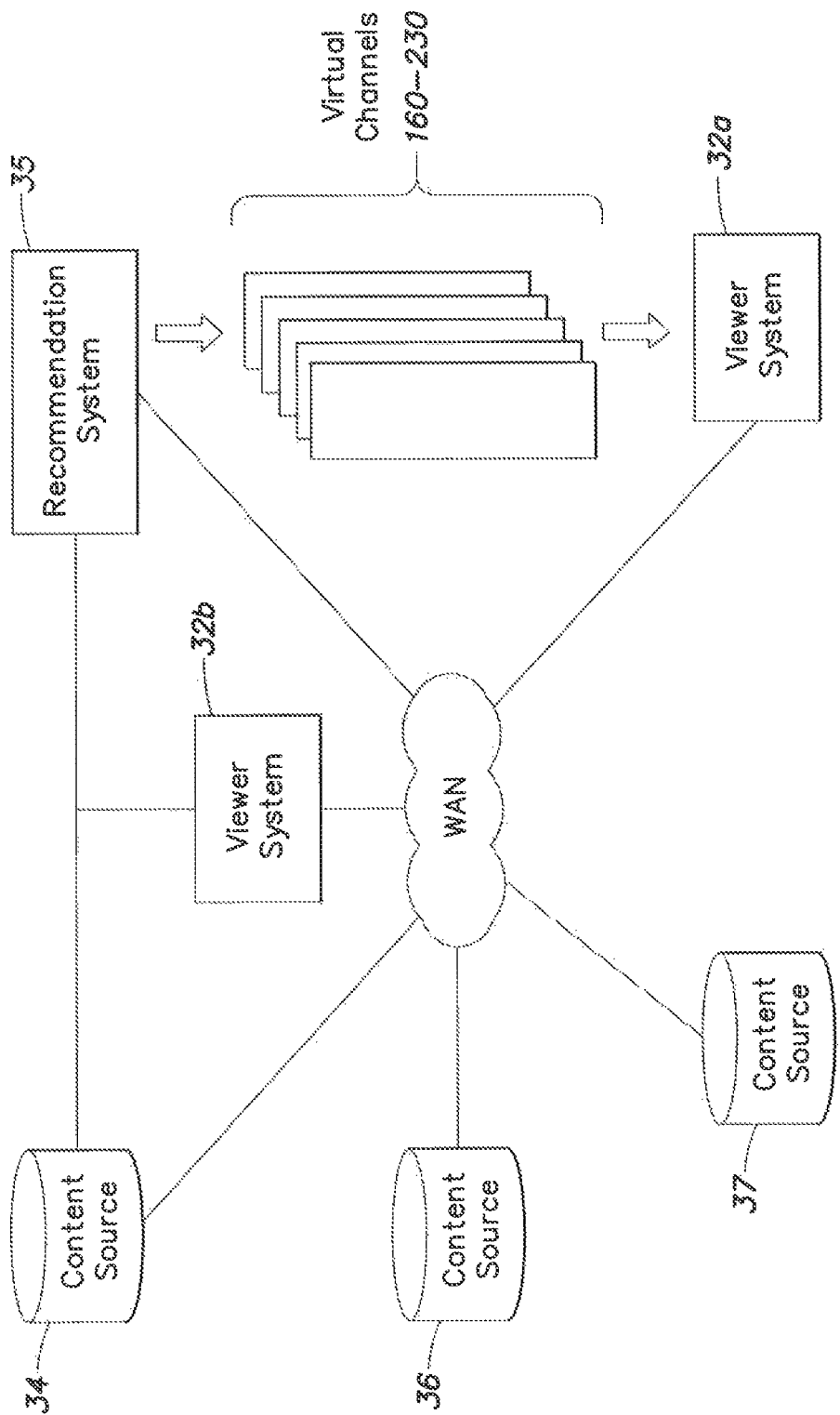
Figure 24A:
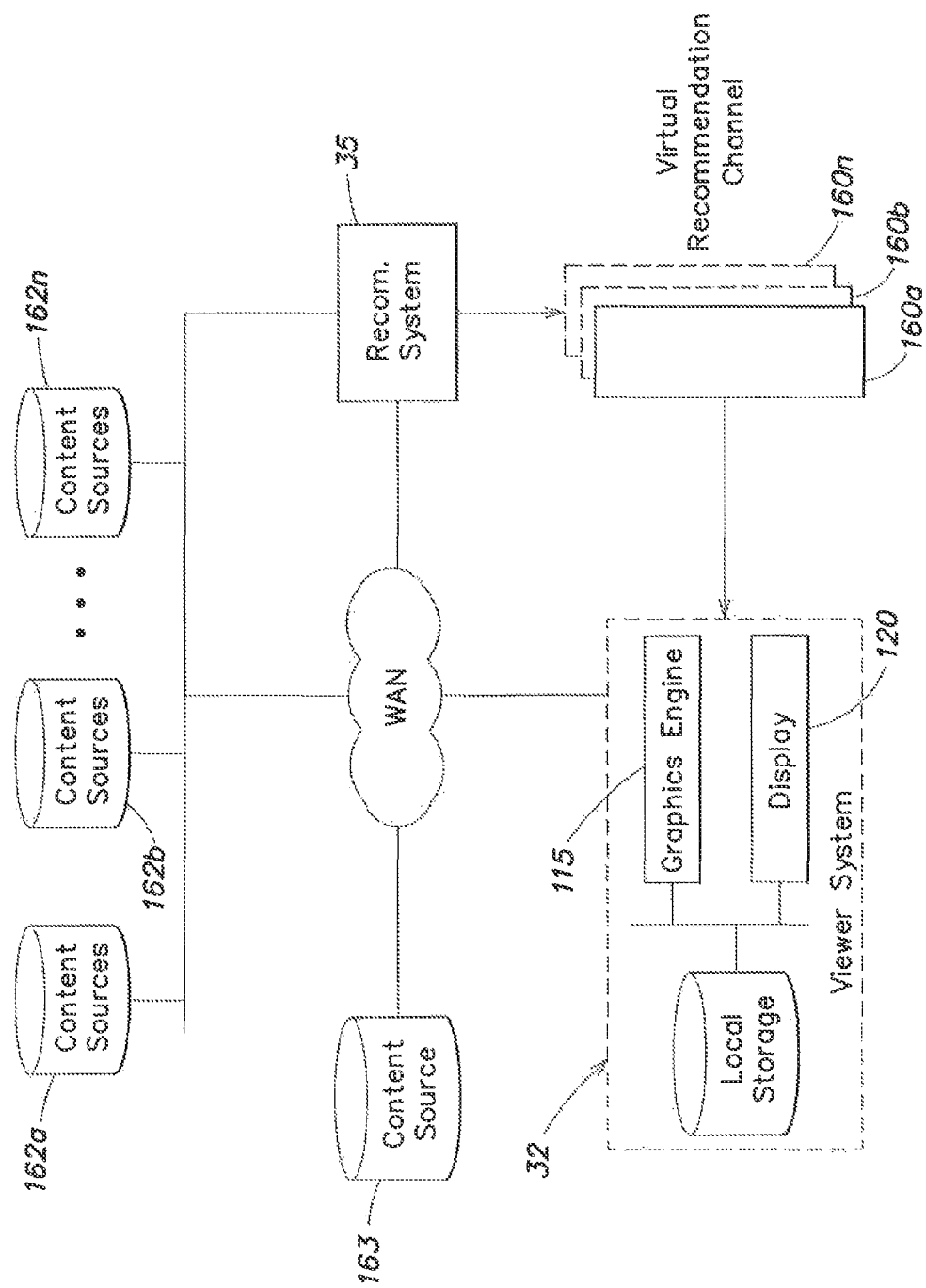
Figure 24B:
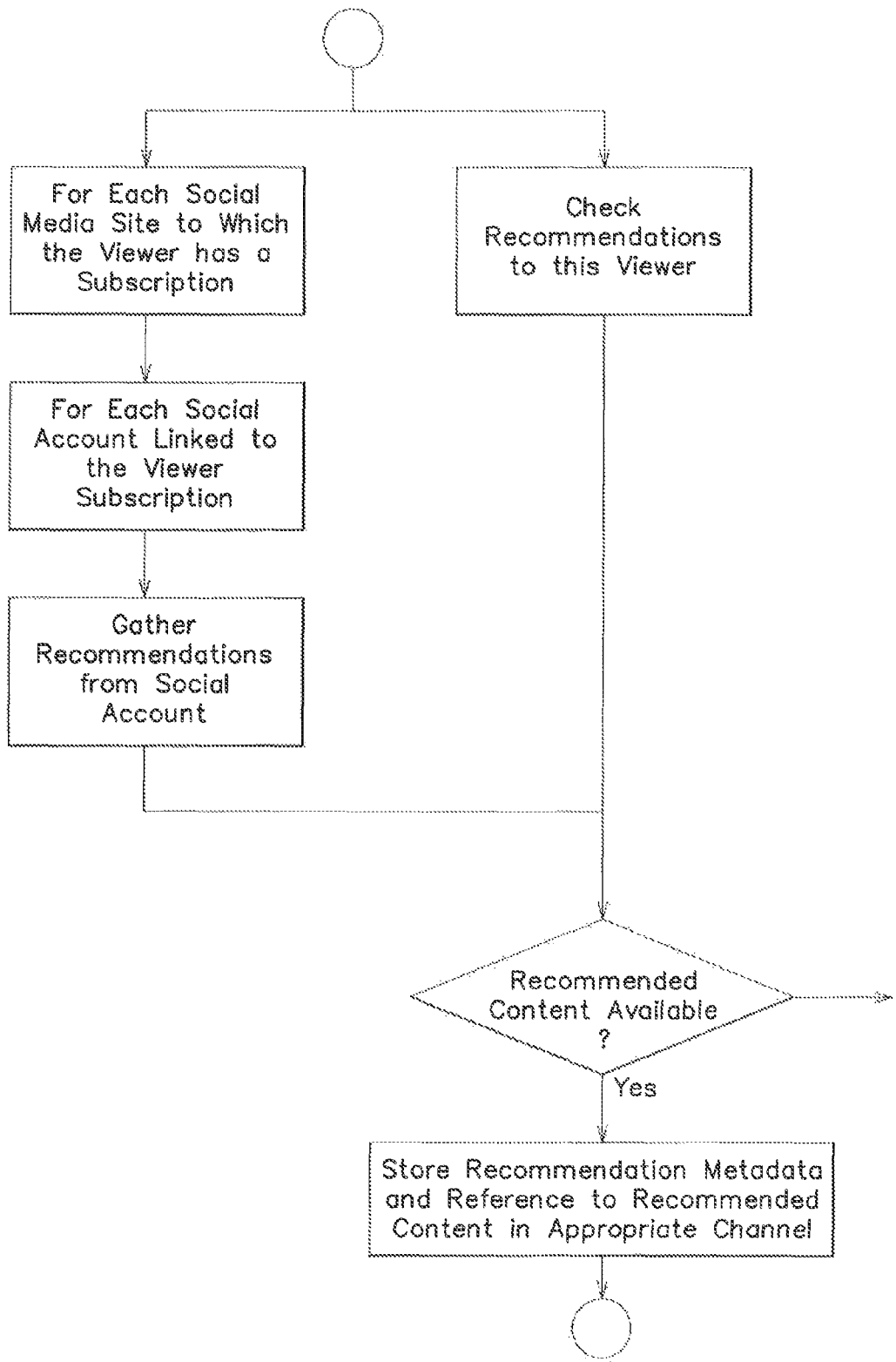
Figure 25:
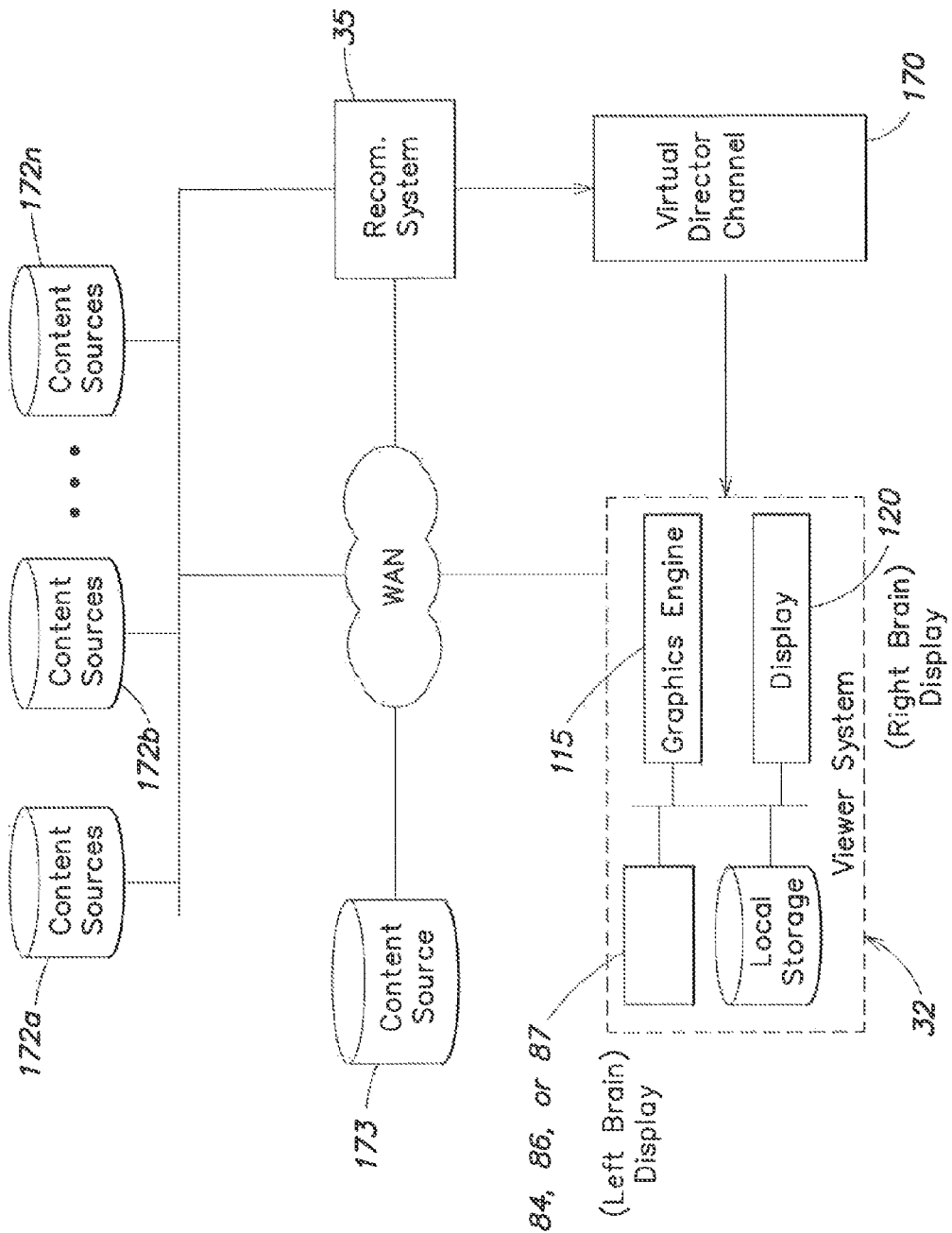
Figure 26A:
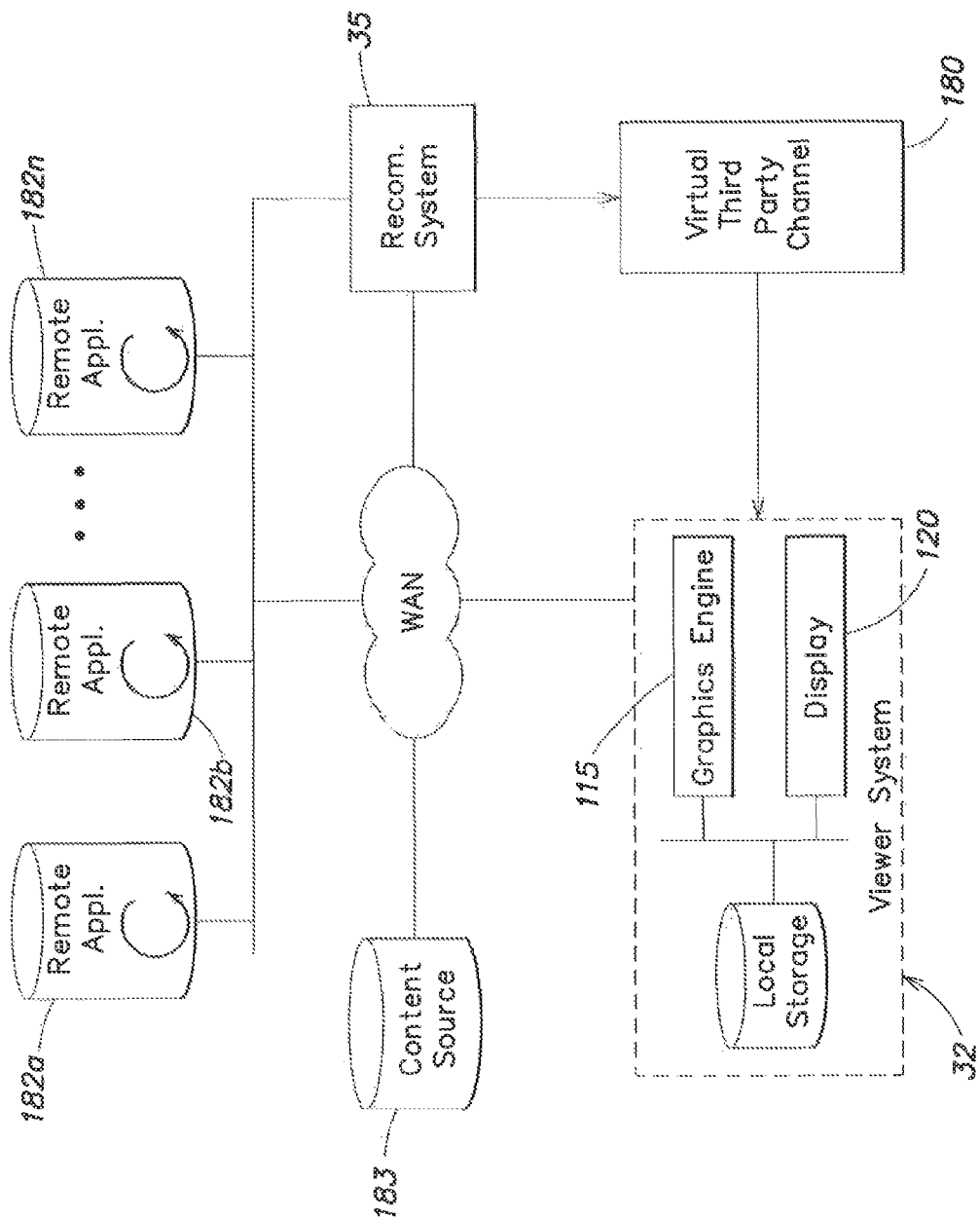
Figure 26B:
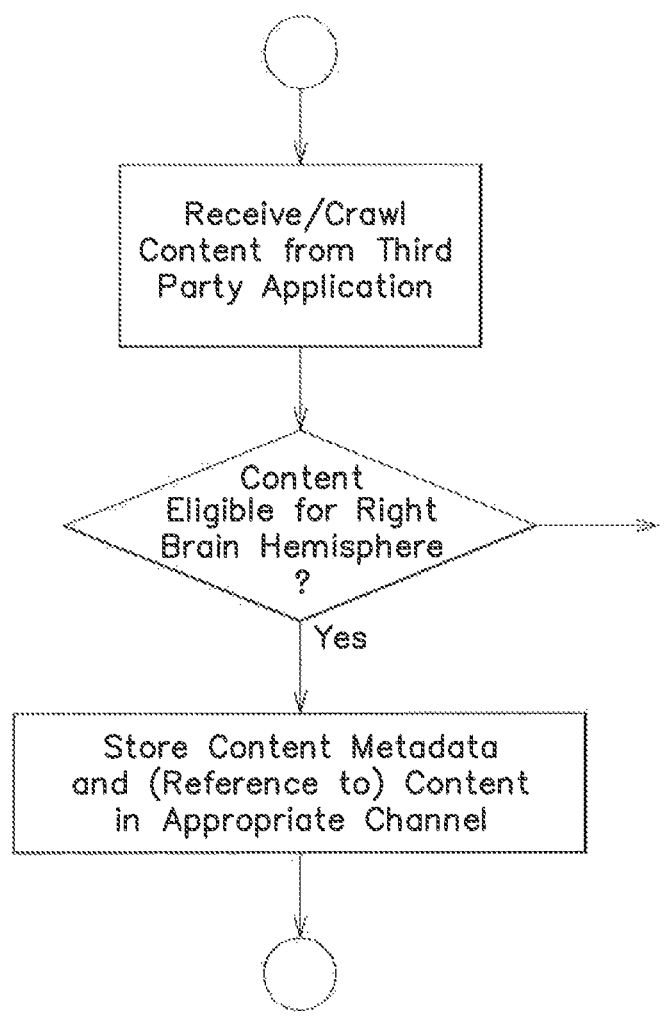
Figure 27:
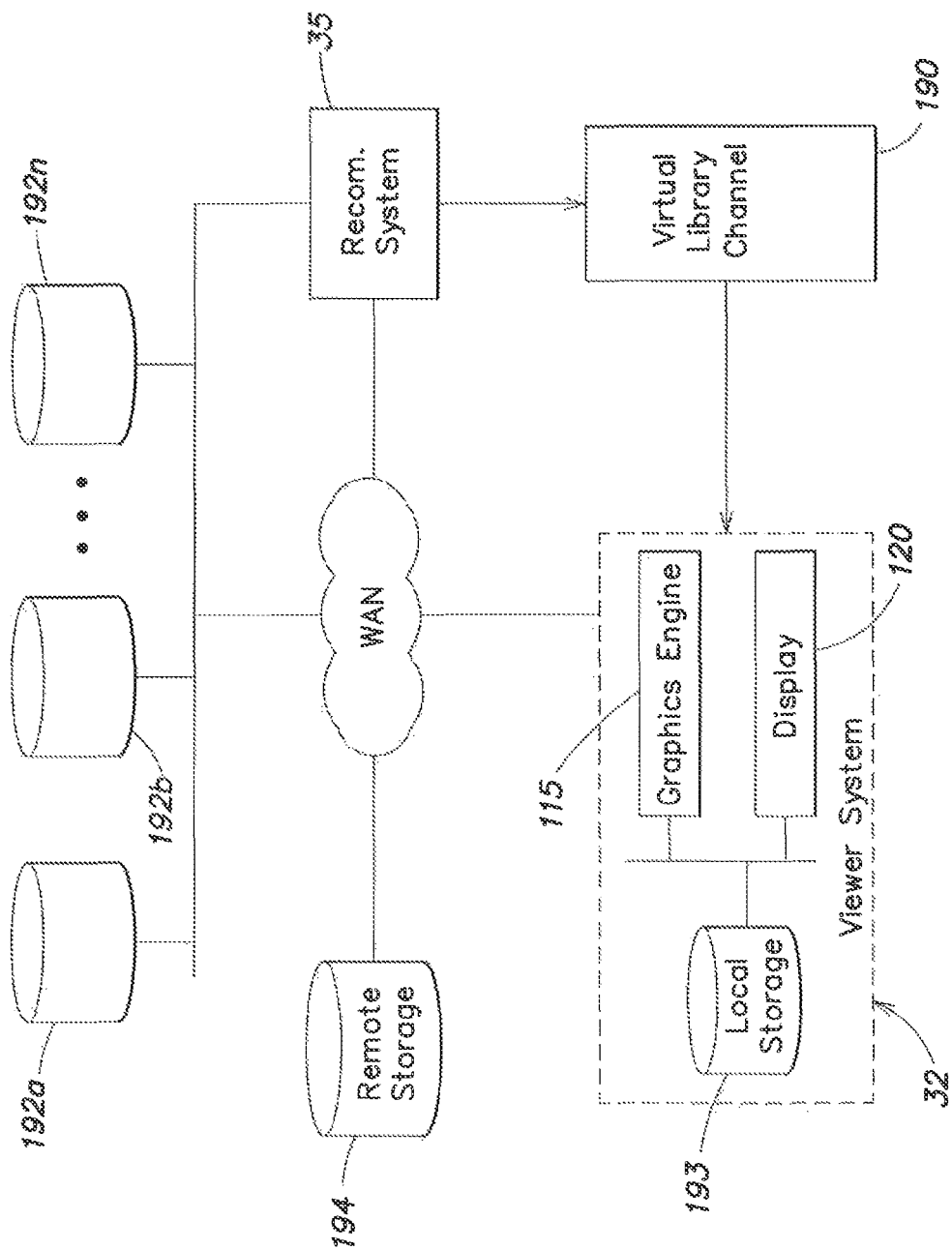
Figure 28B:
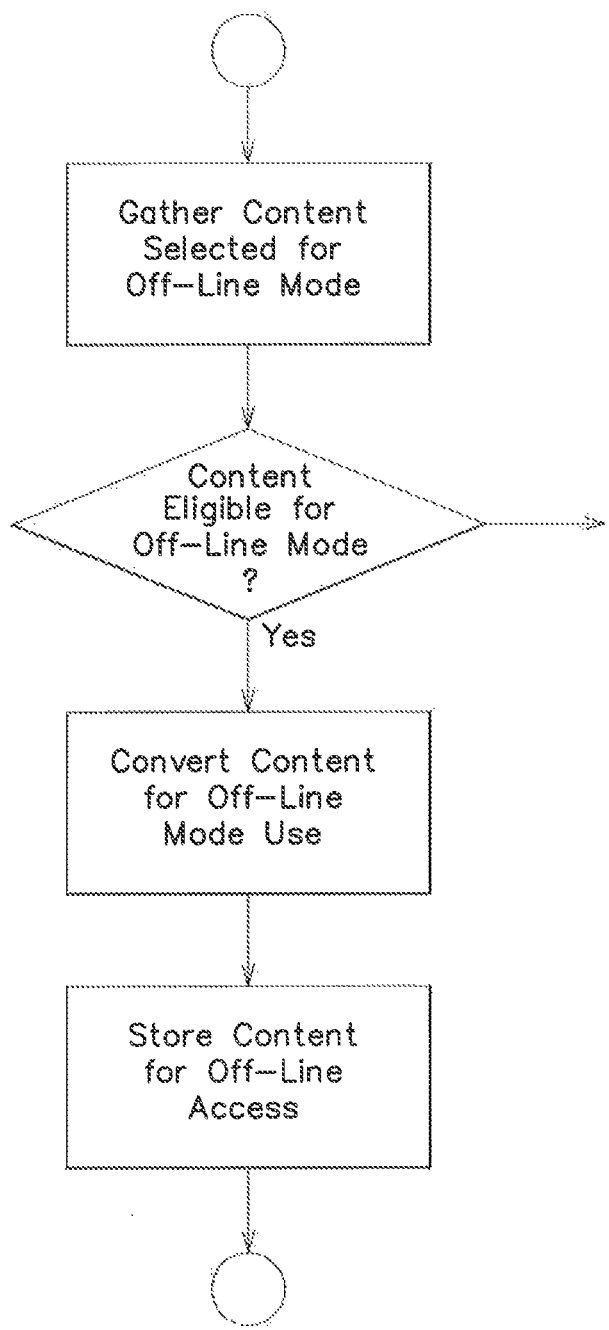
Figure 29A:
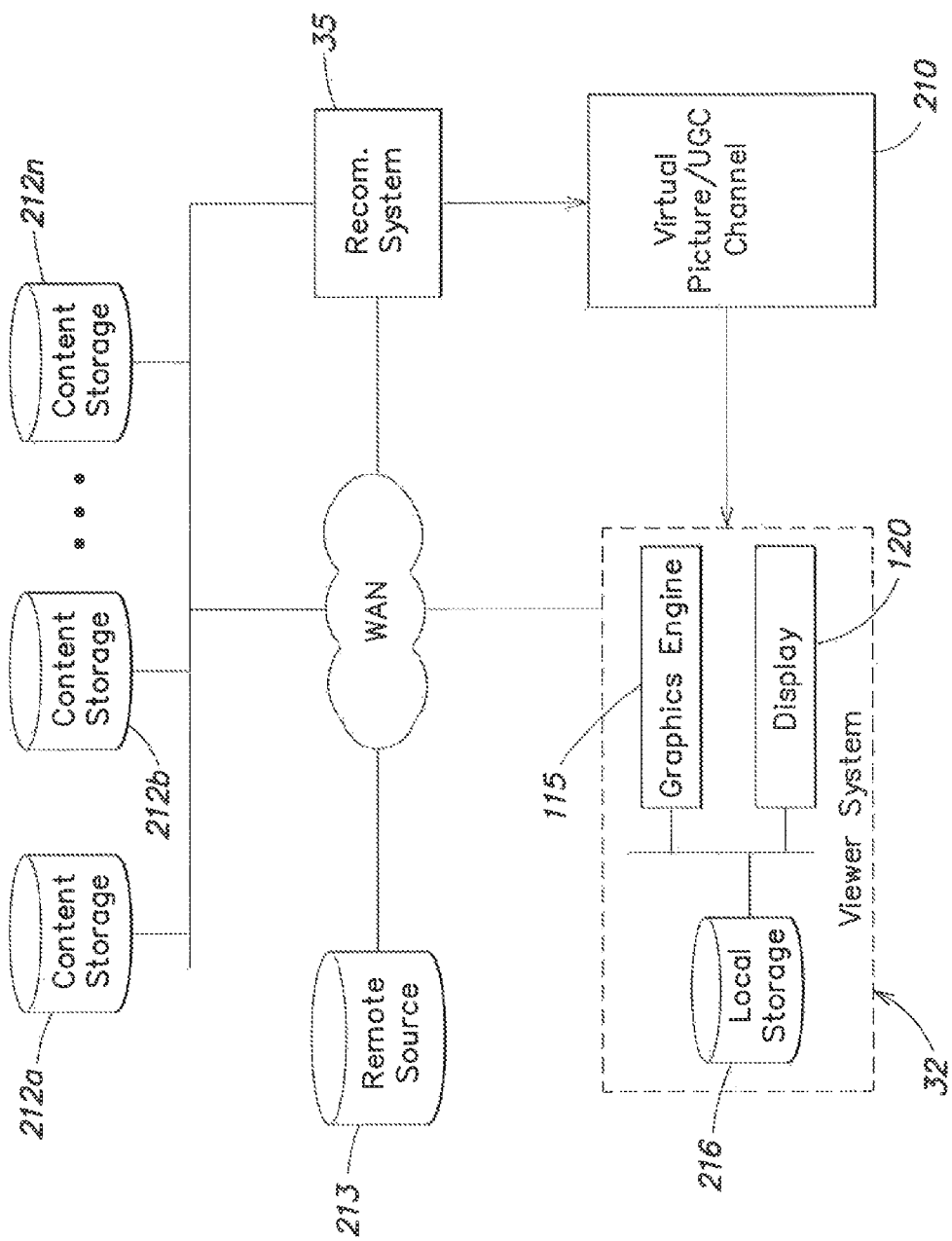
Figure 29B:
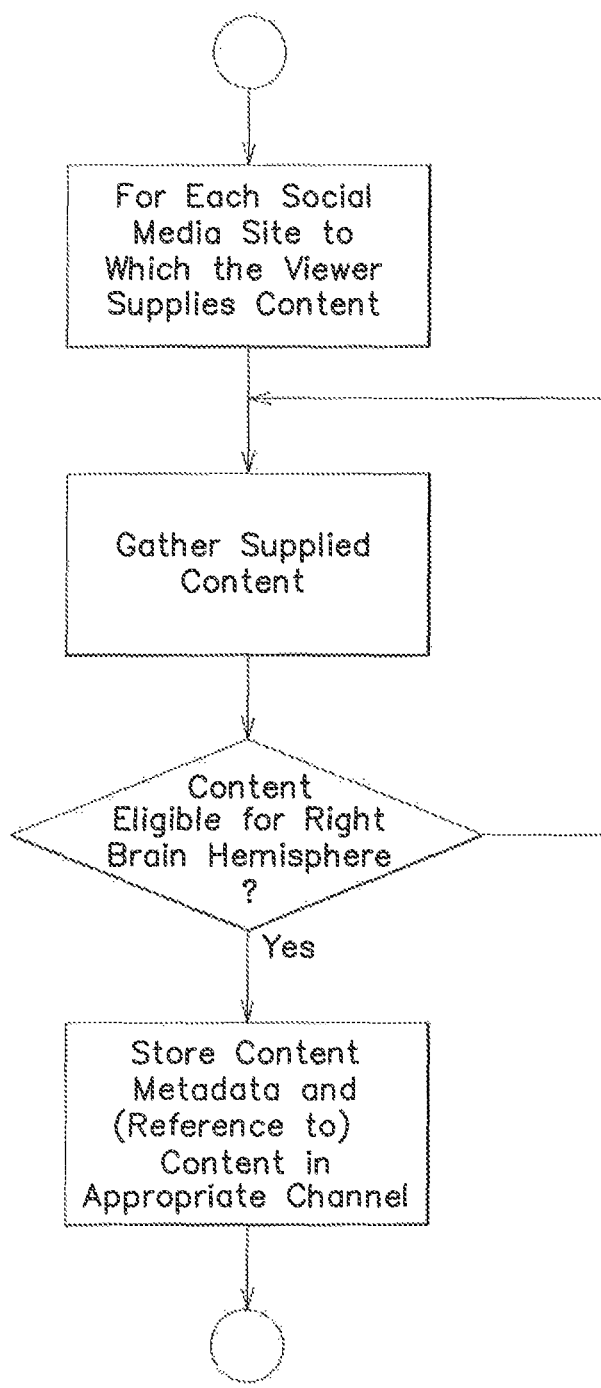
Figure 30A:
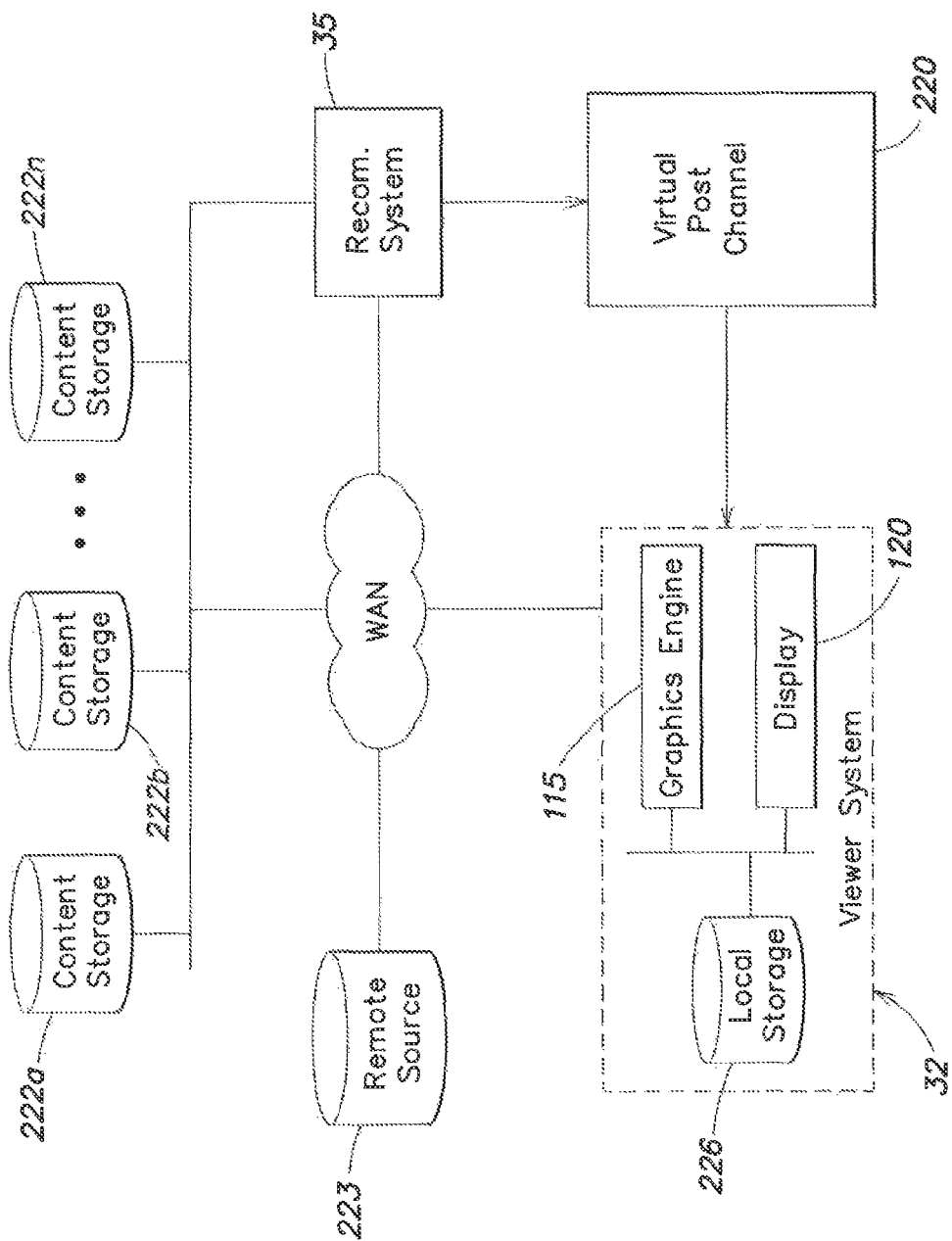
Figure 30B:
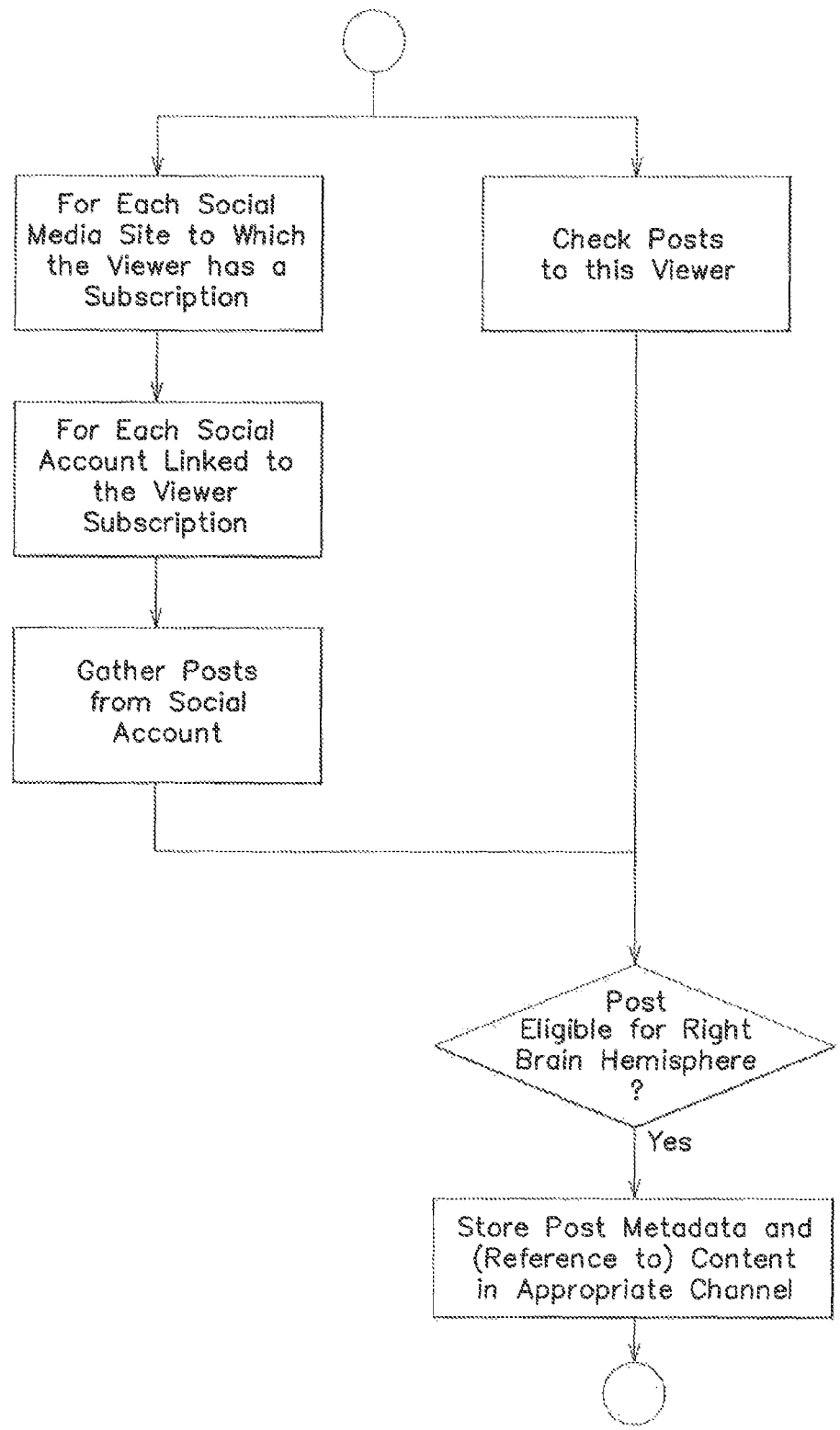
Figure 31A:
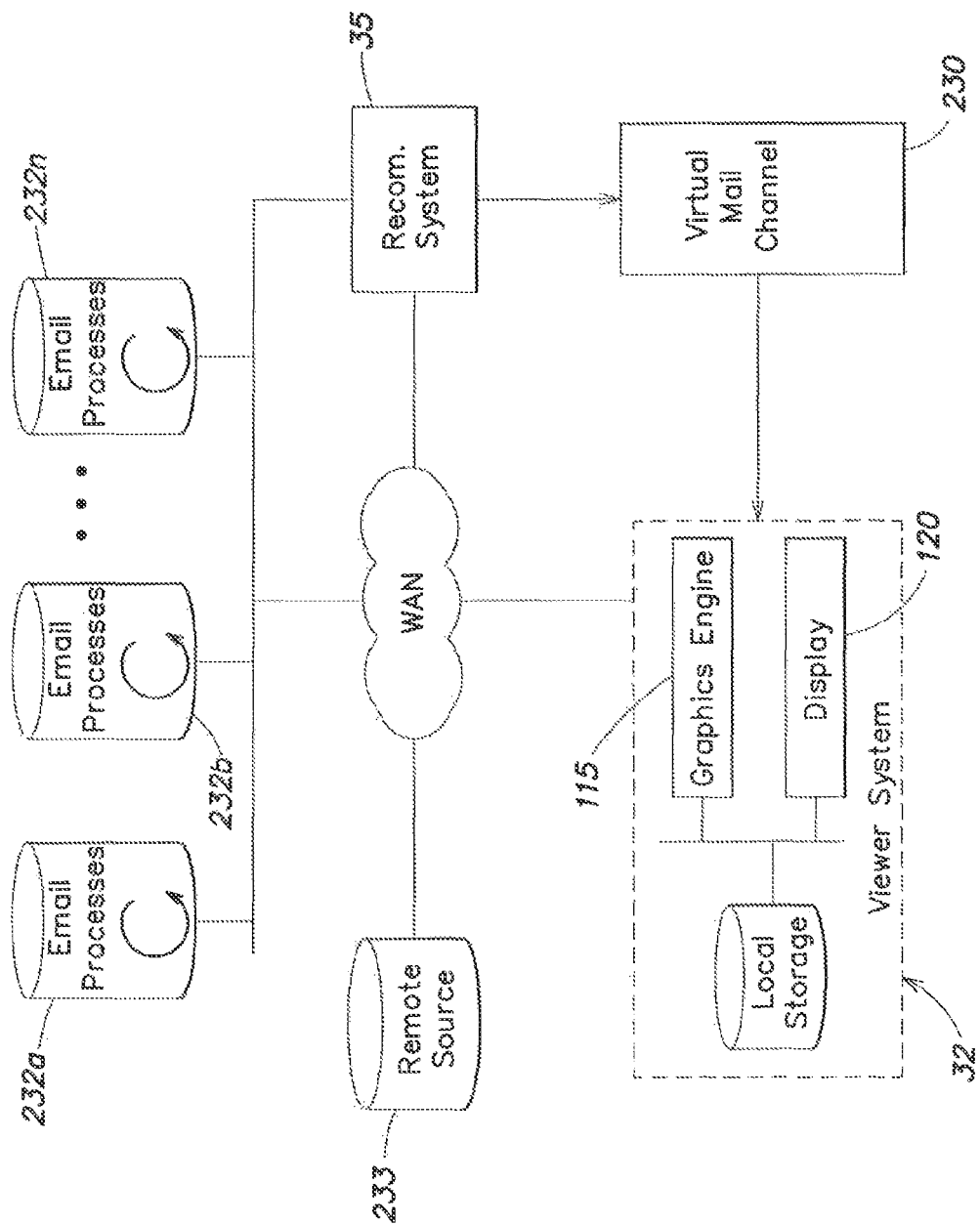
Figure 31B:
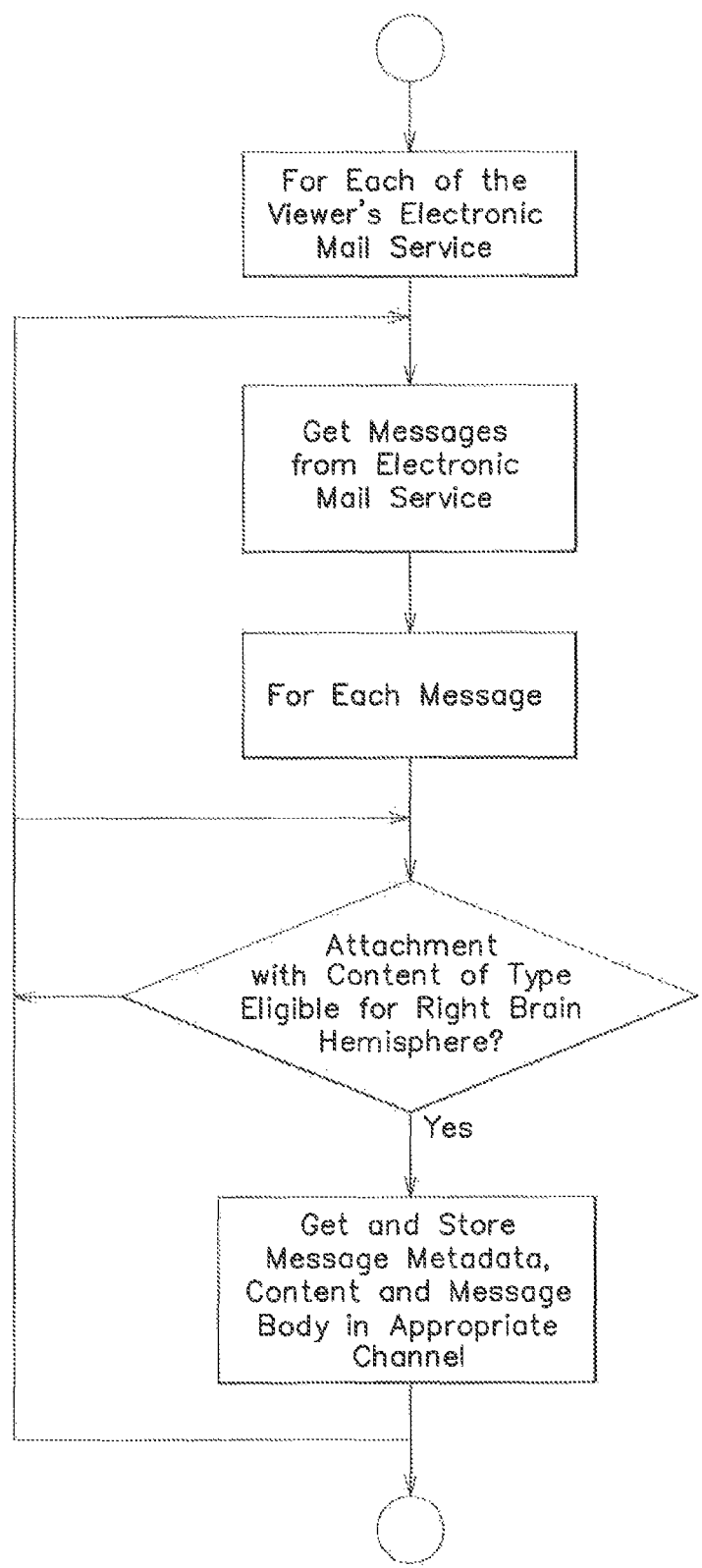
Figure 32:
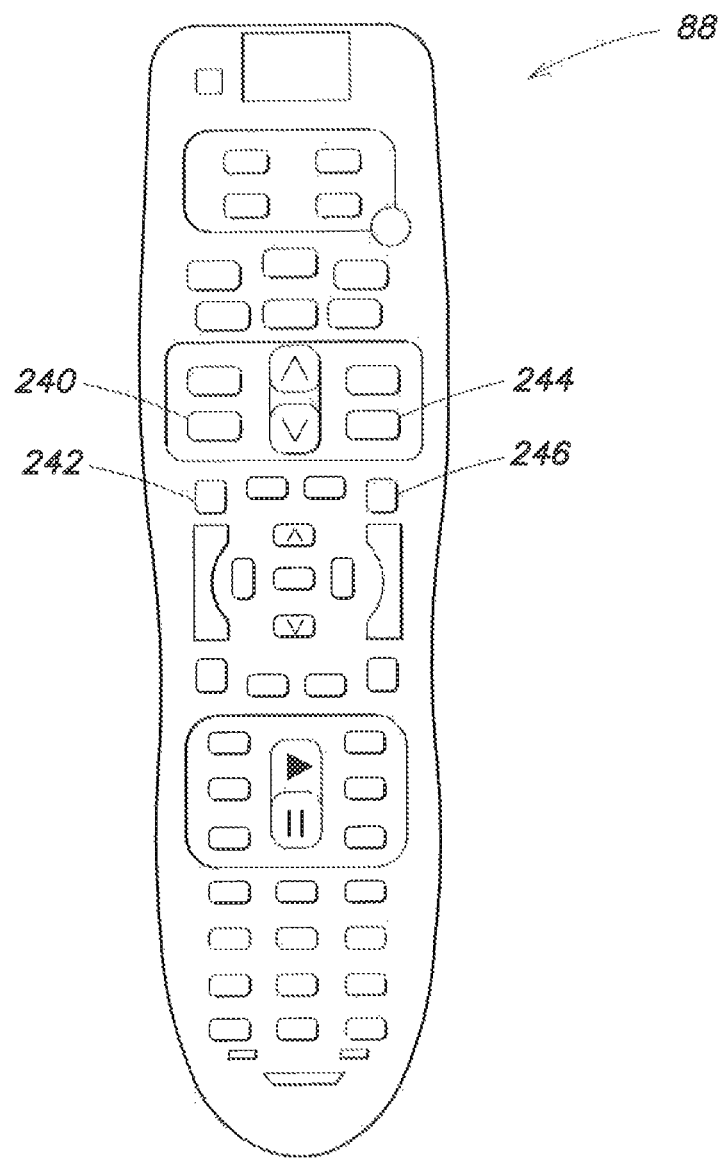
Figure 33:
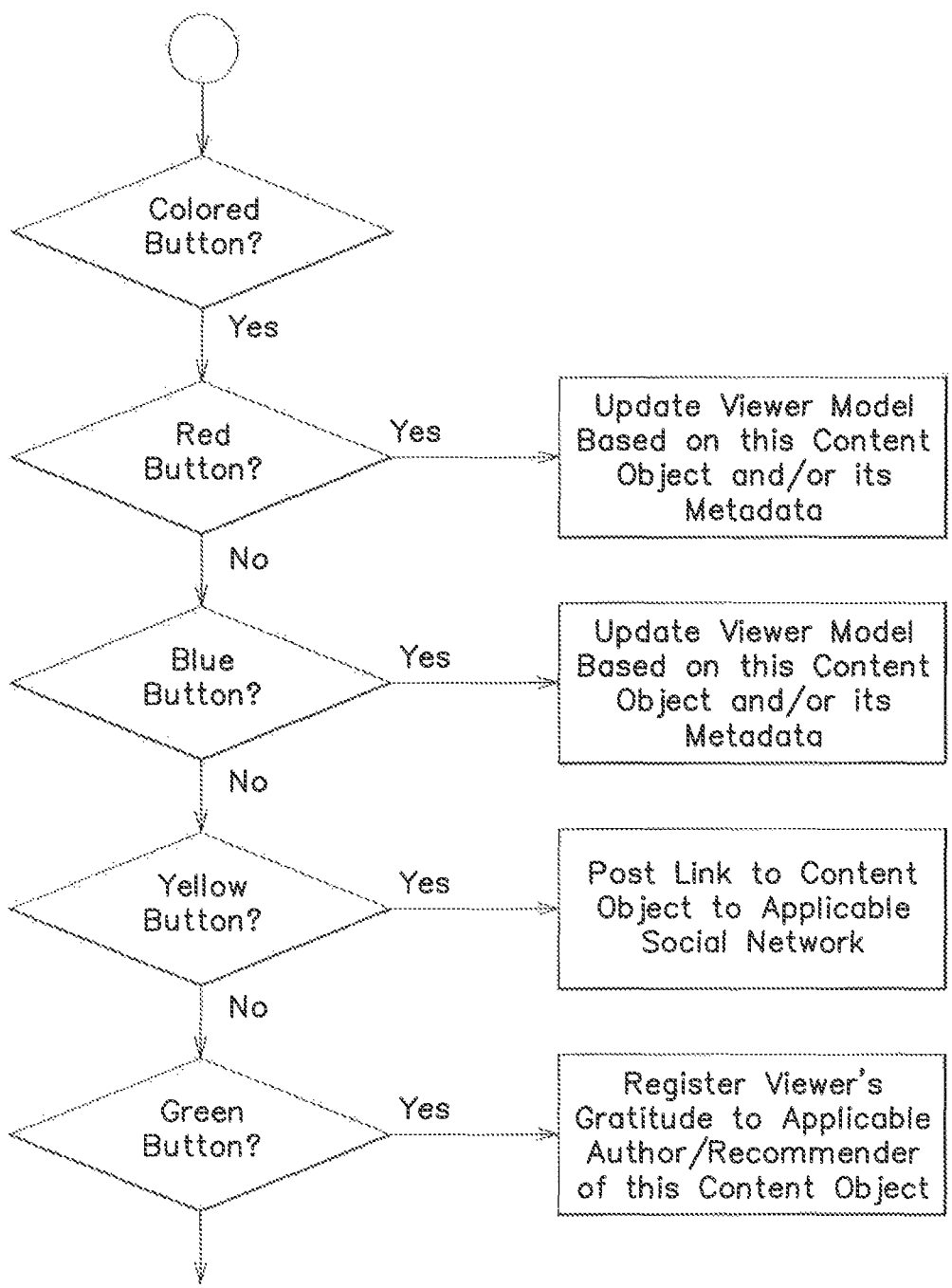
Figure 34:
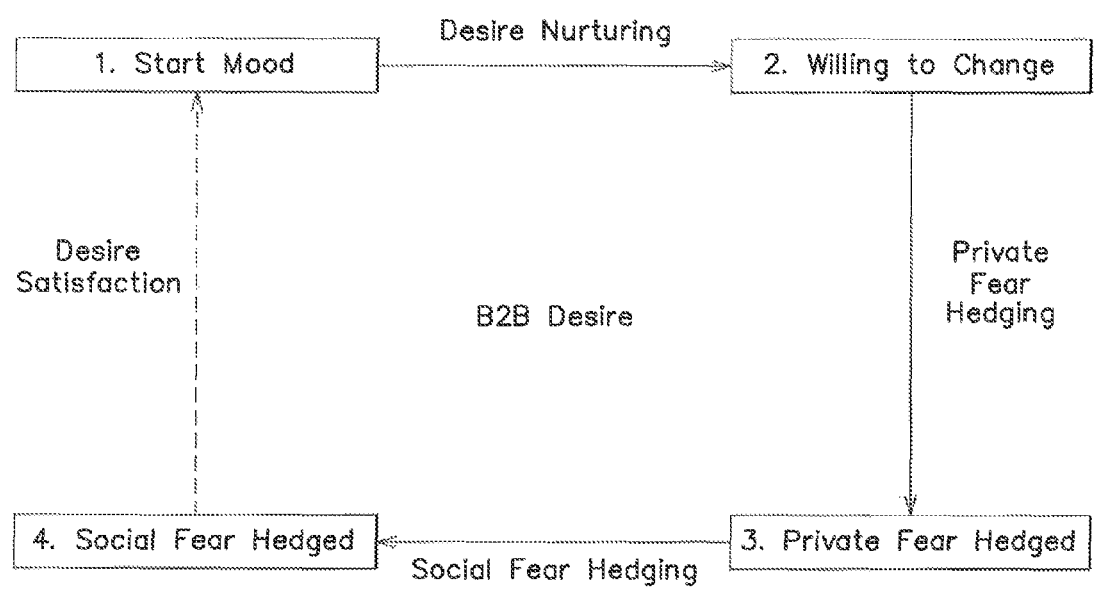
Figure 35:
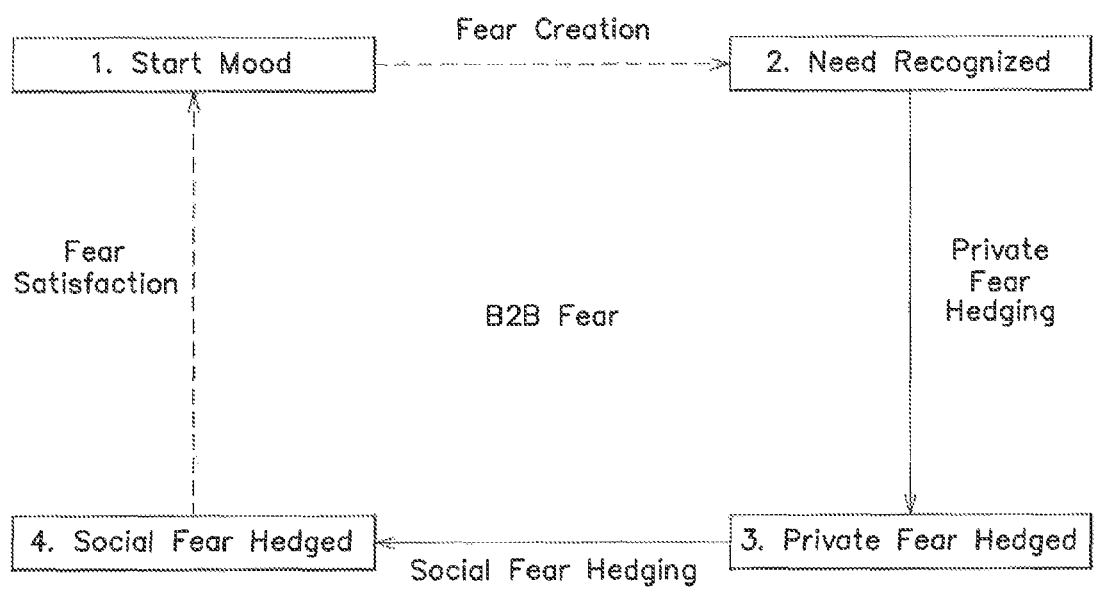
Figure 36:
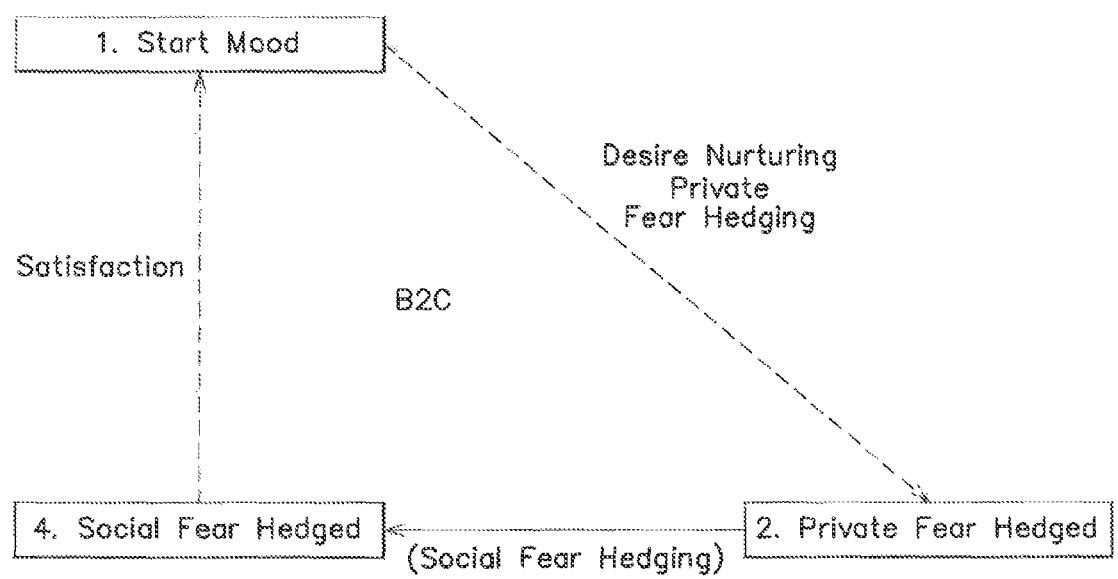
Figure 37:
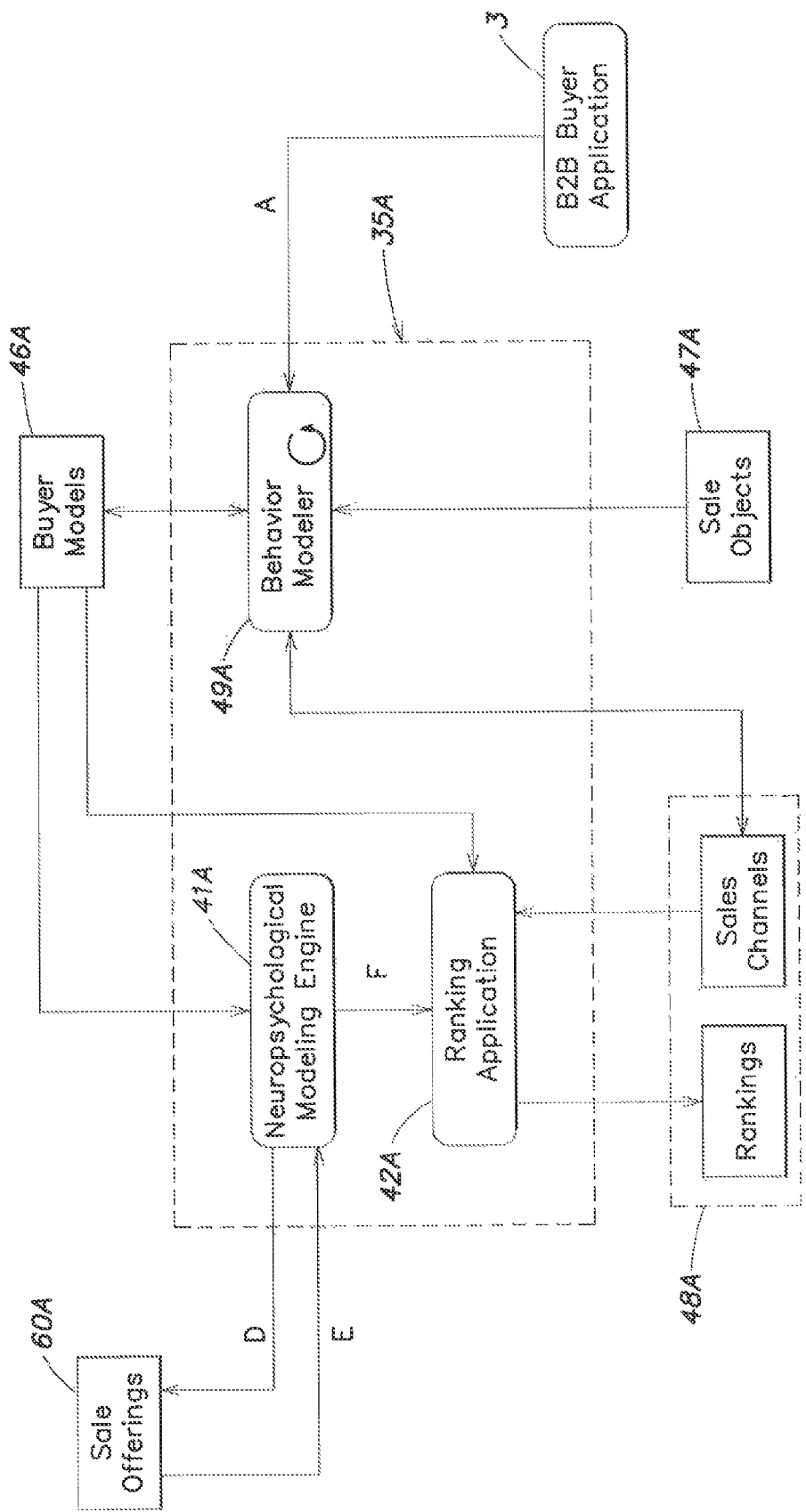

FIG. 12A illustrates conceptually a channel which enables multidimensional surfing of content using traditional cursor navigation controls in accordance with the disclosure;

FIG. 12B illustrates conceptually the implementation of a channel associated with a specific subject/viewer in accordance with the disclosure;

FIG. 12C illustrates conceptually a sample data structure from which the groups within channels may be constructed in accordance with the disclosure;

FIG. 12D also illustrates conceptually a data structure of a channel model which enables multidimensional surfing of content using traditional cursor navigation controls in accordance with the disclosure;

FIG. 13A illustrates conceptually a network environment in which the disclosed distributed upload technique may be implemented in accordance with the disclosure;

FIG. 13B illustrates conceptually a network environment in which the disclosed distributed upload technique may be implemented in accordance with the disclosure;

FIG. 13C illustrates conceptually an algorithmic process to capture and upload of content object fractions in accordance with the disclosure;

FIG. 13D illustrates conceptually an algorithmic process performed by a viewing system to request viewing of content in accordance with the disclosure;

FIG. 13E illustrates conceptually an algorithmic process to upload of content object metadata and fractional portions thereof in accordance with the disclosure;

FIG. 14 illustrates conceptually an interface system for a viewer in accordance with the disclosure;

FIG. 15 illustrates conceptually a data structure utilized in accordance with the disclosure;

FIG. 16 illustrates conceptually the relationship of components within display 80 including buffering of multiple content object data streams;

FIG. 17 illustrates conceptually a sample data structure which may be used with each displayed content object data stream;

FIG. 18 illustrates conceptually a user interface for presenting multiple content object data streams to a viewer;

FIG. 19 illustrates conceptually a user interface for presenting multiple content object data streams to a viewer;

FIG. 20 illustrates conceptually various graphic indicia associated with multiple content object data streams;

FIG. 21 illustrates conceptually a user interface for presenting multiple content object data streams that have recommended to a viewer;

FIG. 22 illustrates conceptually a user interface for presenting multiple content object data streams that allow for surfing of nested dimensions;

FIG. 23 illustrates conceptually a network environment in which multiple virtual channel as disclosed herein may be implemented;

FIG. 24A illustrates conceptually a network environment in which a virtual recommendation channel as disclosed herein may be implemented;

FIG. 24B illustrates conceptually an algorithmic process that enables a virtual recommendation channel in accordance with the disclosure;

FIG. 25 illustrates conceptually a network environment in which a virtual program director channel as disclosed herein may be implemented;

FIG. 26A illustrates conceptually a network environment in which a virtual third party channel as disclosed herein may be implemented;

FIG. 26B illustrates conceptually an algorithmic process that enables a virtual third party channel in accordance with the disclosure;

FIG. 27 illustrates conceptually a network environment in which a virtual library channel as disclosed herein may be implemented;

FIG. 28A illustrates conceptually a network environment in which a virtual off-line channel as disclosed herein may be implemented;

FIG. 28B illustrates conceptually an algorithmic process that enables a virtual off-line channel in accordance with the disclosure;

FIG. 29A illustrates conceptually a network environment in which a virtual picture/user generated content channel as disclosed herein may be implemented;

FIG. 29B illustrates conceptually an algorithmic process that enables a virtual picture/user generated content channel in accordance with the disclosure;

FIG. 30A illustrates conceptually a network environment in which a virtual post channel as disclosed herein may be implemented;

FIG. 30B illustrates conceptually an algorithmic process that enables a virtual post channel in accordance with the disclosure;

FIG. 31A illustrates conceptually a network environment in which a virtual mail channel as disclosed herein may be implemented;

FIG. 31B illustrates conceptually an algorithmic process that enables a virtual mail channel in accordance with the disclosure;

FIG. 32 illustrates conceptually a remote control having designated controls for providing explicit viewer feedback in accordance with the disclosure;

FIG. 33 illustrates conceptually an algorithmic process that enables explicit feedback from the viewer system in accordance with the disclosure;

FIG. 34 illustrates conceptually the buying cycle of desire-based B2B sales in accordance with the disclosure;

FIG. 35 illustrates conceptually the buying cycle of fear-based B2B sales in accordance with the disclosure;

FIG. 36 illustrates conceptually the buying cycle of B2C sales in accordance with the disclosure; and FIG. 37 illustrates conceptually the relationship of the various components of the modeling system in accordance with the disclosure.

DETAILED DESCRIPTION

Neuropsychological Model: Mathematically Modeling Emotions

Proposed herein are specific characteristics of the parallel human thinking in the left and right cortex, including a proposal for explaining the underlying neurotransmitter mechanism. Positive and negative human emotions are defined and the bivalence of emotions under this definition proposed. The proposed mathematical independence of positive and negative emotions is supported with their largely independent physiological constitution. This forms the basis for the mathematical classification of emotions and moods in a two dimensional emotion space. Separate forms of consciousness are defined and an explanation of how mood emerges from consciousness is provided. The moods are well described in a logarithmic complex emotion plane, formed by two perpendicular dimensions, expressing the natural Fear and Desire components. The mathematical transformation is derived from right cortex to left cortex representations and its inverse transformation as the complex 1/z function. An intuitively and logically mathematical representation of emotions and moods on the disk and the square of FIG. 1A and FIG. 1B, respectively, results. Finally, we mathematically model stable and transient emotional updates and associated mood changes by cortical transformation matrices acting on emotional Fear-Desire pairs.

Lateralized Cortical Representations

Verbal tasks activate the left cortex, spatial tasks the right. In 1996 the PET studies of Smith et al. showed that verbal tasks primarily activate left-hemisphere cortical regions whereas spatial tasks primarily activate right-hemisphere cortical regions. Multiple other studies confirm this. For example, in 2003 Cohen et al. showed that only the VWFA (visual word form area, located in the left occipito-temporal sulcus) shows a preference for alphabetic strings over simple chequerboards, whereas the R-VWFA (the right-hemispheric symmetrical region) does not. Another 2003 paper, by Jobard et al, states that the first steps of word access take place within a left occipitotemporal region. And back in 1987, Gutbrod et al. already showed that patients with right hemisphere damage are impaired in spatial tasks.

Also, it has been discovered as early as in the nineteenth century that the language disorder Aphasia typically results from lesions in the language-relevant areas of the frontal, temporal and parietal lobes of the brain, such as Broca's area, Wernicke's area, and the neural pathways between them. These are all areas that are typically located in the left hemisphere with right-handed people. When we further refer to the left or right brain we implicitly refer to what is typical in right handed people, when referring to western language.

Lateralization of Analytical and Synthetic Thinking

The left cortex adopts an analytical approach to perception and cognition, while the right cortex grasps information holistically or synthetically. In 1962 Hacaen et al. observed that patients with left brain damage may make errors of detail in copying and remembering complex figures, but the intact right hemisphere was adept at grasping the general configuration of the figure. In contrast, patients with right hemisphere damage would attempt a piecemeal strategy of copying and remembering, in which the left hemisphere was unable to integrate details within the meaningful whole. Similarly, in 1969 Bogen and Bogen showed that the isolated left brain is impaired in perceiving whole configurations of geometric designs and attempts to analyze the patterns into discrete parts. Over the next two decades a number of studies showed that these differential hemispheric skills in holistic and analytic perception extend to the normal population (Allen 1983; Kinsbourne 1978).

In 1996 Deglin et al. showed that the right hemisphere has trouble solving syllogisms, since they require logical deductive reasoning. The processing of the right hemisphere is next to holistic also intuitive. As Bowers et al. showed one automatically follows from the other, since intuition relies on a holistic mechanism of spreading activation (1990).

The above is also reflected in the connectivity or architecture of the left and right brain: whereas the left brain shows a modular architecture, the right brain shows a distributed one. This was first suggested by Semmens in 1968, after he noticed a focal left brain lesion produces a specific deficit, but a focal right brain deficit does not. In 1987 tests by Kosslyn suggested a discrete or categorical form of perception for the left brain versus a continuous or metric form of information representation for the right hemisphere. In 1991 Robertson and Lamb found that left temporoparietal lesions impair perception of local perceptual information, whereas right temporoparietal lesions impair perception of global perceptual information.

Lateralization of Convergent and Divergent Thinking

The left cortex is specialized in convergent thinking, the right in divergent thinking. Analytical thinking is convergent, whereas holistic or synthetic thinking is divergent. Indeed, both language and logic result from convergent thinking: language converges a multitude of visual and/or auditive impressions to linguistic objects. Logic converges phenomena and their interactions to deterministic relationships, leaving no place for contradictions or paradoxes.

The difference between convergent and divergent thinking also relates to the difference between serial and parallel processing respectively. Reading a text for example, requires the serial processing of words, one after the other. Spatial awareness on the other hand, requires the parallel processing of visual stimuli, which are synthetically combined into one holistic whole image.

Thus, whereas the brain areas at the frontal left are specialized in directing and organizing the convergent thinking of logic, those at the right create divergent thinking. Several studies support this. The lateralization of serial and parallel processing is for instance supported by the fact that the left cortex is specialized for unimodal sensory and motor areas, whereas the right brain is specialized for cross-modal association areas (Goldberg and Costa 1981). In 2000 Razoumnikova related divergent thinking to an increased functional connectivity of central-parietal areas of both hemispheres, as well as to a greater ipsilateral connectivity with the frontal cortex regions of the right hemisphere. In 2003 Faust et al. stated that the left hemisphere benefits most from semantically convergent primes that converge onto the dominant meaning of an ambiguous target word, whereas the right hemisphere benefits most from semantically mixed or divergent primes, which diverge on alternate meanings of the ambiguous target word.

Explaining Lateralized Thinking by Neurotransmitter Pairs

The lateralized neurotransmitter pairs dopamine-acetylcholine and norepinephrine-serotonin explain lateralized thinking. Whereas norepinephrine and serotonin are right lateralized in the brain, dopamine and acetylcholine are left lateralized (Tucker and Williamson 1984; Arato at al. 1991; Wittling 1995). Serotonin is thought generally to act as an inhibitory neurotransmitter reducing arousal and the activity of cerebral neurons, especially of the noradrenergic (i.e. norepinephrine-containing), right-hemisphere-dominant arousal system (Tucker and Williamson 1984). A similar process takes place in the left hemisphere, where dopamine inhibits stimulus-evoked acetylcholine release from cholinergic interneurons (Stoof et al. 1992).

In 1999 Hoebel et al. suggested dopamine reinforces behavior, whereas acetylcholine stops it. The reinforcement by dopamine works through inhibition and therefore is negative feedforward. The feedback by acetylcholine is excitatory and is therefore positive feedback.

This negative feedforward reinforcement by inhibition of less-essential neurons forms the proposed mechanism of convergence from noisy data to the essence, typical for left brain thinking. Since inhibition of less-essential neurons is not absolute, as in an off-switch type of inhibition, but gradual, the positive feedback by acetylcholine is necessary to control the level of inhibition.

Indeed, in the convergent left hemisphere, the main feedforward messenger is dopamine, a neurotransmitter that is known to help us to control our movements and to focus. Both control and focus require inhibition. In order to control one's movements, other non-deliberate movements need to be suppressed. And in order to focus, the remainder should not get attention. The same feedforward inhibition of dopamine, combined with the excitatory feedback of acetylcholine is proposed as the underlying mechanism of convergent thinking. The left frontal cortex reduces overall attention to give attention to the analytically reduced essence of an experience instead of to the overview.

An inverse mechanism is proposed for divergent, holistic, synthetic thinking based on the reciprocal working of norepinephrine and serotonin. Norepinephrine works in this mechanism as a positive feedforward messenger that increases arousal, activating wider parts of the brain, thus allowing us to see the whole or the big picture. Serotonin again reduces the arousal as negative feedback to control the level of arousal or frequency of neuronal activation.

Lateralized Thinking in Objects and Subjects

The left brain thinks in objects, the right in subjects. In 1997 neurologist Gazzaniga described an experiment involving pictured paintings of faces made out of fruit. They were painted in such a way, that one could easily recognize a human face in the overall image. At the same time, the individual fruit items were easily recognizable as well. When the image was presented to the left visual field of a split brain patient, and thus was processed by his right brain hemisphere, the patient recognized the face of a person. When the image was presented to the right visual field connected with the left cortex, the patient recognized and named the individual fruit items.

The results of Gazzaniga's experiment are in line with earlier research, revealing the importance of the right hemisphere in face recognition. In 1969 Benton and Van Allen showed that patients with right hemisphere lesions perform significantly worse at recognizing unfamiliar faces. Later, similar results were found in normal subjects: Droste et al. observed greater changes in the right middle cerebral artery (RMCA) than the left (LMCA) during facial recognition tasks in normal subjects (1989). In 1993 Gur et al. measured increased cerebral blood flow in the right midtemporal lobe under face recognition conditions. And in 1997 Kanwisher et al. showed that the fusiform face area (FFA) is much more robust in the right hemisphere than in the left hemisphere.

In 1992 Kosslyn et al. proposed that the left hemisphere is more adept at processing categorical spatial relationships, whereas the right hemisphere is more efficient at processing coordinate spatial relationships. Other researchers found that the left hemisphere is superior to the right in topological perception (Wang et al. 2007).

The above supports our thesis that subject and object thinking are lateralized in our brain. Objects are analytical logical language forms, while subjects are synthetic, holistic images of our own brain's representations.

Positive and Negative Emotions

People value emotions emotionally, necessitating a more objective definition of emotions and emotional valence. The word 'emotion' is derived from the Latin words 'Ex' and 'Movere', literally meaning 'moving out'. Or, in other words, emotions are the forces that drive or move people. Human emotions can have a positive and/or negative valence, depending on whether the emotions are valued positively or negatively. Valuing is done by the brain itself and is therefore subjective. Valuing is an at least partially emotional process.

In order to clarify this mutual interdependency of emotion and valuing and to objectify subjective valuing we propose the following definition of positive and negative emotion. Positive emotions are mental dispositions that attract or subject a person to another status. Negative emotions are mental dispositions that reluct or object a change of personal status.

Bivalent Emotional Valence

Emotions are bivalent rather than bipolar. Several studies have shown emotions are bivalent rather than bipolar (Diener and Emmons 1985; Watson and Tellegen 1988; Cacioppo and Berntson 1994; Lewis et al. 2006).

Based on the above definition of positive and negative emotion and given their independence or mathematically perpendicularity, emotions can be modeled in two perpendicular dimensions, rather than in one dimension where positive and negative emotion would be correlated negatively.

Therefore positive and negative emotions can be represented as two independent or perpendicular basis vectors in mathematical emotion space, allowing for decomposition of any emotion in its positive and negative emotion components, represented in a 2-dimensional domain, where emotions can be represented as vectors, coordinates or real and imaginary parts of complex numbers, such as represented in FIG. 1C.

Limbic Lateralization of Emotional Valence

In the limbic system positive emotional valence is lateralized to the right, negative to the left. The subcortical substrate for emotion in the left hemisphere has negative bias, whereas that for the right hemisphere has a positive bias (Tucker 1981; Tucker et al. 1995). A study by Wager et al. (2003) also confirmed the left-lateralization of negative emotion-related activity in the limbic system. This physiological topology supports the concept of a largely independent physiological constitution of positively and negatively valenced basic emotions.

Modeling Emotions

Decomposition of Emotions in their Natural Fear and Desire Components

Fear is defined, with capital 'F', not merely as fear, but as the general negatively valenced basic emotion. Analogous Desire is a general positive valence basic emotion. Although alternative naming is possible, this naming allows for an intuitive understanding of the more abstract mathematics.

Representing moods in this two-dimensional Fear-Desire domain allows for mathematically decomposing every specific emotion in its natural components of Fear, intuitively understood as fear and Desire, intuitively understood as desire. Such decomposition into basic emotions by projection on the orthogonal vector basis $(\vec{E}d1, \vec{E}fi)$, where $|\vec{E}d1|=1$ and $|\vec{E}fi|=1$ is mathematically expressed as:

$$\vec{E} = \vec{E}d + \vec{E}f = x^*\vec{E}d1 + y^*\vec{E}fi$$

Figure 3:
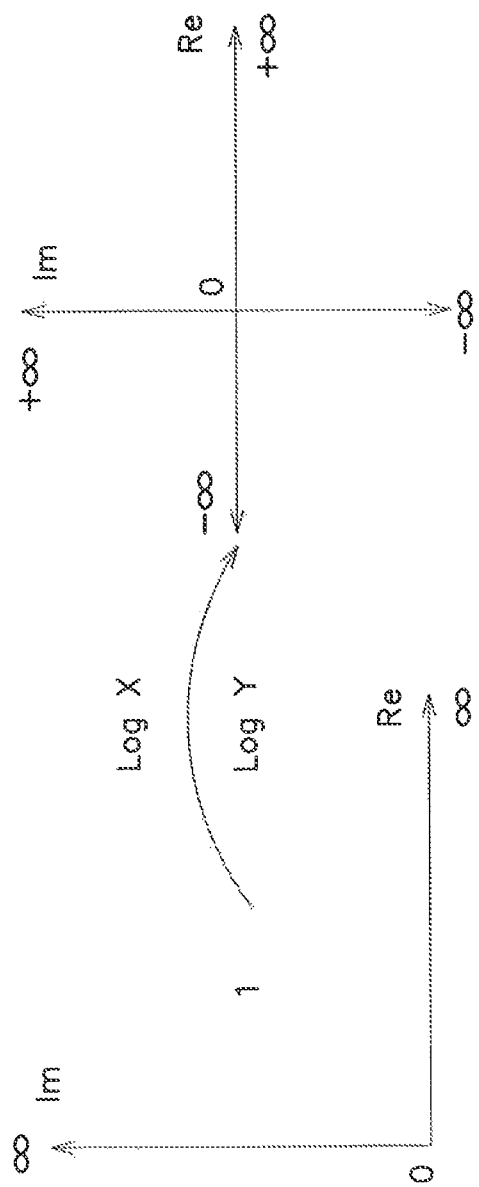
FIG. 3 is a graph illustrating morphing of the single quadrant phenomenon to the entire complex plane of the perception.

In this equation $\vec{E}$ is a vector with magnitude $|\vec{E}|=E$ and direction φ (see FIG. 3). Using complex number annotation, the desire part is the real part of the complex emotion z, fear is its imaginary part.

$$z = x + i^*y = d + i^*f$$

d and f are the Desire and Fear coordinates represented as (d,f) of a specific emotion. They result from projecting the emotion $\vec{E}$ on the orthogonal basis of Fear and Desire and can be represented in the positive quadrant of the complex plane.

The Natural Logarithmic Scale

Emotional states are most naturally represented on a logarithmic scale. This is in line with how e.g. the human perception of auditive and visual stimuli is characterized, i.e. by a logarithmic transmission from physical phenomenon to brain representation, as expressed by the Weber-Fechner law. This law, which applies to both experience and cognition, states that the relationship between the physical magnitude of stimuli and their perceived intensity is logarithmic.

Applied to e.g. our auditive senses, this means equal ratios of frequencies are perceived as equal differences in pitch. For emotions it means e.g. that the difference between low Fear and moderate Fear seems bigger than between high Fear and very high Fear, even if the absolute difference in arousal is the same in both cases.

Emotional Update Through Cortical Reflection

Moods emerge through iteratively updating emotions by reflecting them on the cortex. Emotions emerge in the deeper levels of the brain: the limbic system and the brainstem. Especially the amygdala, located in the limbic brain, plays a crucial role: it couples information of the senses on the cortex with emotions allowing the hippocampus to create our long term memory.

Emotions further instruct the frontal cortex to think or reflect upon the emotionally associated cortical representations. This emotional feedforward starts at the orbitofrontal cortex, which is therefore described as the neocortical representation of the limbic system (Nauta 1971). Other parts of the prefrontal cortex then further direct the thinking about the emotionally associated representations (Tucker et al. 1995; Davidson et al. 2000), creating attention.

The cortex reflects upon the emotionally associated information and literally reflects it, i.e. sends processed information back to the limbic system, where emotional valence can subsequently be altered. This mechanism forms an emotional cortical limbic feedforward-feedback loop. Accordingly emotions are iteratively reflected and updated. This iterative process may converge to a certain mood, where a mood is defined as a more consciously perceived and more stable emotion, spanning a certain period of time. Moods are experienced as emotional consciousness, meaning an awareness of emotions. Therefore we need to further investigate the mechanisms underlying consciousness.

Consciousness

Consciousness results from the recurrent activation of neural networks. There are multiple definitions of consciousness associated with different types of consciousness. Here, we would like to distinguish between three of them. The first type of consciousness is physiologically linked with the activity of the brain stem. It refers to the bare fact of being awake (Moruzzi and Magoun 1949).

On a higher level, we make a distinction between a second type called phenomenal consciousness and a third type called cognitive consciousness. Phenomenal consciousness is the experience of phenomena, as being aware of an emotion or a representation, without it being consciously accessed by cognitive attention (Block 1996). In phenomenal consciousness one can be conscious of subconscious representations and their associated emotions, as expressed in the statement "A subconscious feeling withheld me".

The third type of consciousness includes cognitive awareness. The statement "Sure I knew it, I just didn't think of it" expresses the existence of subconscious knowledge made conscious by thinking of it. Thinking of it means paying cognitive attention to it. Since cognition is a function of the frontal cortex (Bianchi 1922; Kraeplin 1950; Luria 1969), the involvement of the frontal cortex is a prerequisite for this type of consciousness.

Our consciousness of a phenomenon becomes cognitive when our prefrontal cortex pays attention to it by keeping it in its working memory. Cognitive consciousness emerges from remembering the phenomenon experienced at the moments immediately preceding the current moment. This remembering is not part of the long term memory, but is a short term memory sometimes called working memory. Working memory, or working attention, involves the recurrent activation of neural networks, which can be located in multiple cortical areas.

Depending whether the left or right frontal cortex is more predominantly involved, we conjecture that cognitive consciousness is either more language based or more intuitive. This is supported by Baddeley's model of working memory in which there are two short-term storage mechanisms: the phonological loop and the visuospatial sketchpad (1974).

Similar as cognitive consciousness, also phenomenal consciousness is generated by the recurrent activation of neural networks. But contrary to cognitive consciousness, phenomenal consciousness is not directed by the frontal cortex, but by the temporal lobes (Milner and Goodale 1995, Lamme 2006).

Illustrating Our Physiological Mood Model

The disclosed physiological mood model is best illustrated with the concrete example of visual perception. When a visual stimulus reaches the eyes, feedforward is launched to the primary visual cortex in the occipital lobes. Abstraction from stimulus to neural patterns is done in the occipital, parietal and temporal cortex. In the left temporal lobe objective categories are recognized, while the right temporal lobe recognizes subjects.

The experienced phenomenon emerges from the subcortical limbic association of emotional valence with the temporal cortical representations of the stimuli derived from the occipital cortex. In the subcortical limbic brain the emotion is associated with the cortical representation of the phenomenon by the amygdala and hippocampus, causing the association to remain, even after the stimulus has disappeared.

The emotion associated with the phenomenon is feed forward through the orbitofrontal cortex of the limbic brain entering the pre-frontal cortex. The attention and working memory of the pre-frontal cortex direct the cognition process based on the emotional input received from the limbic brain. The left pre frontal cortex directs objective, converging, language based cognitive consciousness, while the right pre-frontal cortex brings the subjective, diverging, holistic imaginary consciousness. Both the left and the right cognitive consciousness solicit the other areas of the brain through positive and negative feedforward and feedback as described earlier.

The cortical representation and its associated emotions are updated, each time new stimuli are experienced. These new stimuli may result from a changed physical phenomenon caused by the actions taken. However, the changing physical phenomenon may also be independent of actions taken, because emotions are not only updated when new stimuli are presented, but also when simply thinking about emotional representations, as further discussed.

Emotional consciousness is part of cognitive consciousness when under attention of the pre-frontal cortex but emotional consciousness is also part of phenomenal consciousness, when sensory input associated with the phenomenon is active or when the phenomenon is remembered and attended.

Typically, the divergent subjective thinking attention of the right pre-frontal cortex leads to an increase in emotion intensity, the arousal associated with that emotion. Similarly, the objective convergent thinking attention of the left pre-frontal cortex leads to decrease of emotion intensity.

Cognitive attention of the frontal cortex is focused. The amount of phenomena that get attention is limited. Multiple emotions however can exist in parallel, explaining why we can have mixed feelings.

Although different emotions may be part of the emotional consciousness, i.e. different recurrently activated neuron networks may be active in the limbic system at the same time, one is always most predominantly present. It is therefore a fair conjecture that the feedforward mechanism of the orbitofrontal cortex will prompt the attention of the prefrontal cortex to the cortical representations associated with this dominant emotion. When this emotion-representation feedforward-feedback system converges to a rather stable emotion over time, a mood emerges.

Representing Emotions in the Logarithmic Complex Plain

Emotions and moods are well represented in the logarithmic complex emotion plane. The emotion and mood space can be represented as the positive quadrant of the complex plane where (1, 1) represents the individuals' average level of Fear and Desire. Using the logarithmic representation of mental states, this emotion space can be transformed to a mood space that covers the entire complex plane, where 0 is mapped to $-\infty$, 1 to zero and $+\infty$ to $+\infty$, since $\exp(-\infty)=0$, $\exp(0)=1$ and $\exp(+\infty)=+\infty$. Therefore moods can be represented in the complex logarithmic mood plane of FIG. 1D.

Representing Emotions in the Mood Disk

The complex plane representing the emotion domain can be mapped onto a mood disk. In order to represent this logarithmic complex mood plane in a compacter way, without using the notion of infinity, we represent moods on a unity disk, called the mood disk, as shown in FIG. 1E.

To arrive at this disk, the logarithmic complex mood plane is first mapped onto a Riemann sphere using the inverse stereoscopic projection, indicated in FIG. 1F. The points A and B are projected through the stereoscopic projection onto the Riemann sphere as S(A) and S(B).

Using the same holographic projection this complex plane is projected as well on a half Riemann sphere with center $S(\infty)$, as shown in FIG. 6. A and S(A), as well as B and S(B) are projected onto HS(A) and HS(B) respectively. Subsequently, this half Riemann sphere is projected to the unit disk as the bottom of the half Riemann sphere by projecting from 0, projecting HS(A) onto $A_{MD}$ and HS(B) onto $B_{MD}$. The resulting unit disk projection allows for the natural representation of moods on the mood disk, without representing the intuitively less accessible notion of infinity.

Modeling the Cortical Right-Left Transformation

The projections from the positive quadrant of the complex plane onto the complex plane and further onto the half Riemann sphere and the mood disk are based on the projections our eyes and brain perform on physical visual stimuli. From these transformations the cortical right-left and left-right transformation is derived. Therefore a closer look at the right cortical spatial projection of visual stimuli and the subsequent left cortical representation in mathematical language of these spatial representations is warranted.

Referring back to FIG. 1F, let 0 be the center of the eye, $S(\infty)$ be the eye's pupil and the Riemann sphere the retina of the eye. $S(\infty)$ on the surface of the retina is indeed the projection point of the physical points laying on $\infty$ when physical reality is seen in the eye's focal plane translated parallel to itself as the complex plane of FIG. 1F. And $S(0)$ is the projection point of the center of the focal plane represented as the complex plane with center 0, which is as a static image of the focal plane of one eye represented as the half Riemann sphere. This mapping of the mathematical points of 0 and to physiological points of the human eye is shown in FIG. 1G. The mapping of 0 on $\infty$ and of $\infty$ on 0 is done by the complex function $1/z$, projecting the complex plane on itself.

The stereographic projection is the physical projection of light at certain angles of incidence alpha and beta on the retina. The overview image of spatial representation is created under the direction of the right frontal cortex. In order to imagine space outside the eye, the light projection through the pupil, is imaginarily reversed, i.e. the physical projection of the human eye is inverted, mathematically resulting in the half Riemann sphere. This inverted right cortical whole static image of visual stimuli of one eye has therefore two dimensions, the two dimensions of the surface of the retina.

Three dimensional sight occurs when static images, seen from different angels are combined. Its characteristic transformation is based on simple trigonometry but is not relevant here. Logic causes the left cortex reasoning to be linear. Looking at one aspect of a phenomenon, a language-like category is projected onto the whole image, resulting in a dimension. The entire space of the spatial right cortex representation is projected onto one dimension. Only in this linear reduction of the whole image negation becomes possible by enforcing the law of non-contradiction. The left frontal cortex logically thinks in one dimension and by repeating its characteristic reducing language projection on the space that remained after projecting the first dimension, more linearly independent dimensions are projected, resulting in multidimensional left cortex thinking such as lines, planes and cubes.

Therefore the complex plane is a left brain projection and the half Riemann sphere is a right brain projection. More specifically, the complex plane is the left pre-frontal brain representation of the spatial representation created under the direction of the right pre-frontal cortex.

The stereoscopic projection is known as the complex transformation $f(z)=1/z$ and is the transformation between left and right cortex representation. The inverse of this function is the function itself, meaning that the transformation from left to right is the same as the one from right to left, both $f(z)=1/z$, since $f(f(z))=1/(1/z)=z$.

Thus, the $1/z$ projection allows for the transformation of a left brain thinking analysis into an intuitively more accessible right brain image. Therefore this $1/z$ stereoscopic projection has been applied to represent the result of the mathematical decomposition of an emotion vector in the more intuitively accessible domain of the emotion disk.

Representing Emotions on the Mood Square

Finally, emotions and moods can naturally, intuitively and mathematically easily be represented on an emotion or mood square. The linear left brain consciousness has difficulties interpreting the non-Euclidian metric of the emotion disk. And confusion occurs easily when straight lines are represented non-linearly.

In the mood disk straight lines are represented as circles, except for the radii of the emotion disk and through any given point an infinite amount of parallel lines, represented as circles, can be drawn in the mood disk, meaning the metric is non-Euclidean.

Since the mood disk, is analytically difficult to read due to the distortion induced by the stereographic projection, we can represent it in a simpler or straighter way, more accessible to the left consciousness. We achieve this by representing the unity disk in the Chebyshev metric as a unit square, represented in FIG. 1H.

This emotion and mood unit square is both easily accessible for the right and the left brain consciousness and therefore the preferred domain to represent emotions and in fact any two dimensional phenomenon.

The words Low and High have been added to the axis, to make it more accessible to the right consciousness, since the left expression of $-1$ and $0$ may be confusing, since $-1$ means the lowest intensity and not a negative emotion and 0 does not mean zero intensity, but average intensity. The actual coordinates in the square range between $-1$ and $1$, when emotion intensity ranges from 0 to infinity. To derive these (D,F) emotion square coordinates from the (d,f) coordinates in de positive quadrant of the complex plane, the logarithmic, stereoscopic and Chebyshev calculations have to be executed.

Modeling Mood Changes

As described earlier, our brain copes with emotions by iteratively updating them by reflection over cortical representations. This mechanism, when used successfully, allows us to reduce negative emotions or to increase positive emotions.

Stress Coping

The best way to cope with stress is by objecting fearful change that occurs in the objective reality. Successful stress coping strategies typically reduce negative emotion by active objection to the reality change underlying the negative emotion, using logic and convergent left cortex thinking. E.g. the fear for a plane crash leads to objective formal procedures hedging that fear and preventing further accidents. Successfully coping with stress is done through objective labor of the left brain, reducing Fear to an acceptable or bearable level. Research shows that the left hemisphere's response is indeed specialized for stress reduction and promotion of regeneration (Wittling 2001).

Successful stress coping as Fear hedging happens when objective, analytical, convergent thinking under the direction of the left pre-frontal cortex, pays attention to the phenomenal representation associated with the Fear.

The right hemisphere on the contrary is specialized for stress responsiveness and mastering acute demands of the external environment (Wittling 2001).

As a result, the right hemisphere is e.g. typically active during stress anticipation (Davidson 2000). In such case, the right hemisphere, out of desire for a solution, searches a route to escape the negative emotion. The typical subsequent focusing happens under the direction of the left hemisphere.

Desire Nurturing

Positive emotions are not coped with as stress, but positively nurtured until they reach a motivating level. The best way to nurture Desire is by subjecting to a person. The right cortex subjects to emotions as well as projecting subjects, as persons, onto emotions. Successful Desire nurturing happens when subjective, holistic, divergent thinking under the direction of the right pre-frontal cortex, pays attention to the phenomenal representation associated with the Desire.

One may remark that Desire may not necessarily only be felt for persons, but also for objects. However, one would probably also agree with us that Desire for material objects is most often Fear for loss of these objects or Desire to be like another person.

Cortical Misuse Leads to Failure

The cortex is unsuccessfully used and therefore misused when the right cortex is used to subjectively diverge negative emotion or when the left cortex is used to objectively converge positive emotion.

Unsuccessful stress coping strategies typically increase negative emotion by subjecting to the negative emotion, typically using subjective holistic right cortex thinking. Anger is such an unsuccessful surrendering to negative emotions, which are projected onto a subject, the person who is characterized as being bad or evil. E.g. lynching a person after the occurrence of an accident does not hedge fear and does not prevent further accidents. Outing of negative emotion in anger does not reduce the negative emotion and does not lead to objective measures to object the cause of the Fear. Moreover, it's not healthy. It has been shown that people who lose their temper are 19 percent more likely to die of a heart attack than those who keep their emotions under control (Chida and Steptoe 2009).

Unsuccessful Desire nurturing happens when objective left cortex thinking is dominant. E.g. a positive evaluation of the desirability of a potential partner, based on a purely logical analysis, does not result in true love for that person.

The Cortical Transformation Matrix

The cortical transformation of the dominant emotion pair can be modeled by a 2×2 matrix. Changes in emotion and thus moods are either a result of new sensory input from the own body or environment or from interaction with other brain regions that change emotion. In the case where there is no new emotional input, the emotion is mainly changed by cortical reflection under direction of the pre-frontal cortices.

Figure 4:
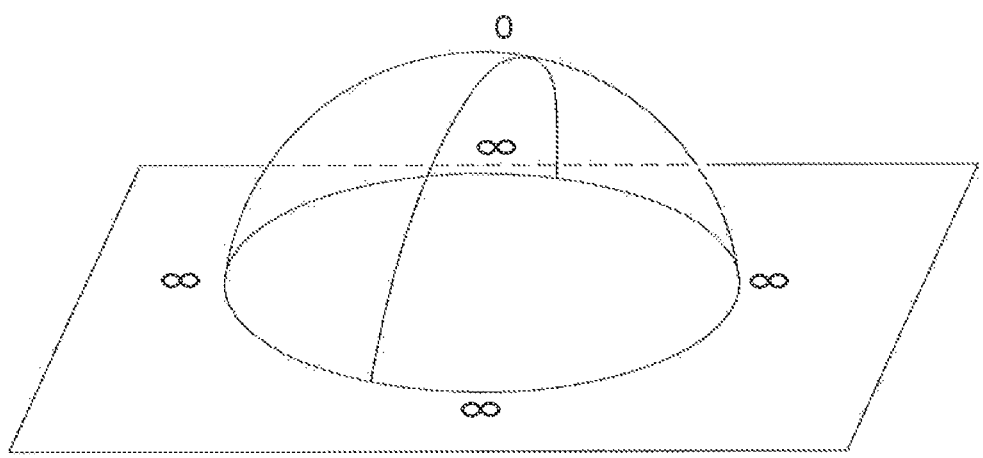
FIG. 4 is a graph Illustrating morphing of the entire complex plane of the perception to the cortical experience, represented by a Riemann complex half sphere.

In this simplified case, the cortical transformations can be modeled by a 2×2 matrix describing the transformation of the dominant positive and negative emotional components (d,f) through reflection on the left and right cortex, where (d,f) are the emotional coordinates in the positive quadrant of the complex emotion plane at the left side of FIG. 4, prior to the transformations to the emotion disk or square.

$$\begin{bmatrix} d_{t+1} \\ f_{t+1} \end{bmatrix} = \begin{bmatrix} RC^d + LC^d & 0 \\ 0 & RC^f + LC^f \end{bmatrix} \begin{bmatrix} d_t \\ f_t \end{bmatrix}$$

In this formula, $d_{t+1}$ and $f_{t+1}$ are the dominant basic emotions at the time just after reflection, whereas $d_t$ and $f_t$ are the same dominant basic emotions at the time just before reflection. $RC^d$ and $LC^d$ are respectively the amplification factor (greater than 1) of the right cortex and the reduction factor (smaller than 1) of the left cortex on the Desire component, during the time of reflection. Analogously, $RC^f$ and $LC^f$ are respectively the amplification factor of the right cortex and the reduction factor of the left cortex on the Fear component, during the time of reflection.

The actual values of $RC^d$, $LC^f$, $RC^f$ and $LC^d$ depend on the starting conditions, as discussed further, and on how effective and efficient (or quick) one iteration is. Subject representations are not effective in reducing Fear, as object representations are not effective in increasing Desire. And not all object and subject representations are equally efficient in increasing Desire or in decreasing Fear.

In a successful dealing with emotions $RC^d$ will typically be large, $LC^f$ will be small, and $RC^f$ and $LC^d$ will be close to 0. When this is the case, positive emotion will increase in intensity and negative emotions will decrease in intensity. The equation can then be simplified as:

$$[d_{t+1}, f_{t+1}] = \begin{bmatrix} RC^d & 0 \\ 0 & LC^f \end{bmatrix} \begin{bmatrix} d_t \\ f_t \end{bmatrix}$$

Once a mood stabilizes, $RC^d$ and $LC^f$ will converge to 1. The d and f values as used on the axes of the mood or emotion disk or square are both the unstable or stable ($d_{t+1}$, $f_{t+1}$) values, expressed on a logarithmic scale after transformation to the mood disk or square. A mood may never become fully stable and transient behavior may continue. An important transient case is the one where new dominant emotions in the limbic system emerge, due to new emotional input during the time of reflection.

Cortical Activity Axis

In the absence of unsuccessful transient behavior, negative emotions coincide with left frontal activity, positive emotions with right frontal activity. As discussed earlier, The human left hemisphere is typically specialized in stress reduction. Therefore, high Fear typically coincides with increased blood flow in the left cortex that tries to converge the Fear. Thus, referring to the emotion equations described earlier, if stress reduction is successful, LCf is small and ft+1 is lower than ft.

Analogously, a relatively high d component typically coincides with a high $RC^d$. To nurture the Desire, the right cortex executes an effective and efficient $RC^d$, causing the blood flow in the right cortex to increase.

Based on this typical coinciding of negative emotion and left cortical activity and positive emotion with right cortical activity, in the simplified case, the mood square X/Y axis of FIG. 1H can also be related to or replaced by the level of lateralized cortical activity as shown in FIG. 1I. This does not however apply, in case the stable mood resulted from unsuccessful transient behavior, as will be discussed in next section. Depending on the relative strength or intensity of the Desire and Fear component after reflection, people end up in a different mood, as shown in FIG. 1J.

Studies have shown that people who feel relaxed, show increased right frontal blood flow (Johansson at al. 1998). In 1999 Mayberg et al. found that depressive people, typically in an apathic mood, have relatively higher blood flow in paralimbic regions, the deeper levels of the brain and relatively lower blood flow in cortical regions. Patients for whom treatment was effective showed a reversal of this balance: blood flow decreased to paralimbic areas and increased to neocortical areas.

Modeling Transient Behavior

Unsuccessful transient behavior typically occurs when an active right hemisphere is confronted with Fear, or an active left hemisphere with Desire. At the moment a new important emotional input arrives, $RC^f$ or $LC^d$ can be different from zero and equal to the $RC^d$ or $LC^f$ of the previous dominant mood. When a new negative emotion enters the system, while the cortex was mainly occupied in subjectively diverging Desire, then: the 2nd sleeve or was it but do it is.

$$RC^f_{t+1} = RC^d_t$$

When a new positive emotion enters the system, while the cortex was mainly occupied in objectively converging Fear, then:

$$LC^d_{t+1} = LC^f_t$$

This mathematically models the process that initiates the failure by cortical misuse, as described earlier.

Cortical Activity During Transient Behavior

The emotional axis cannot without precaution be exchanged for cortical activity. When emotions and moods are changing, the emotion axis cannot without precaution be exchanged for cortical activity. For example, Anger usually leads transiently to increased left cortical activity that tries to calm down the negative emotion that characterizes Anger. This only applies however if people believe something can objectively be done to alter the reality causing the Fear inducing change. But when people, as Harmon Jones showed in 2003, believe there is nothing they can do to rectify an angering situation they show no increase in left frontal activity, indicating they have already surrendered, while they still report being angry.

This surrendering may even have caused the angry emotion. When a negative emotion is subjectively diverged and projected on an evil subject, often the left cortex does not recall the known solution to the objective problem. In such case the left cortex does not know or remember a pattern to decrease Fear while the right cortex surrenders to and increases Fear, ultimately causing panic as the highest level of Fear and the lowest level of Desire. In such case, the angry or panic emotion was caused by a transient behavior with a high level of right cortex activity and a low level of left cortex activity.

Emotional Changes Resulting from Cortical Reflection

Emotional changes do not require sensory input. They can also occur when existing, but unattended cortical representations become attended. As discussed earlier, new emotionally associated sensory input can conquer dominance and ultimately change our mood. However, we do not necessarily need new input for our emotions and mood to change. The attention of our working memory can shift from a certain cortical representation to an associated, already existing but unattended other cortical representation. When the emotional coordinates (d,f) associated with the latter cortical representation gain dominance in our limbic system, they will change our emotions and ultimately our mood.

Naming the Characteristic Mood Domains

The naming of the mood domains shown in FIG. 10 are not exclusive neither exhaustive. More mood nuances or alternatives can be given. For example, the (d,f) coordinates corresponding to the mood Anger can also result in feelings of guilt or self-hatred when the subject onto whom the negative emotion is projected is the self and not the other.

The naming of FIGS. 1J and 1K is proposed based on personal introspection, empathic understanding, symmetry considerations, etymology and semantics. e.g. Passion and Apathy should be symmetrical opposites since passion and apathy etymologically and therefore semantically are each other opposites. Also Relaxed and Panic are symmetrical opposites. The pleasant feeling of being in control is a less intense form of the mood Dominant, based on personal introspection and empathic understanding.

Any human mood, besides the eight basic mood names used in FIGS. 1J and 1K, can be mapped on the mood disk. This is illustrated in FIG. 1M, which shows a non-exhaustive list of moods, with their corresponding position on the mood disk. For example, the pleasant feeling of being in control is a less intense form of the mood Dominant. The position of the control mood, as well as the position of any of the other moods in the list, is based on personal introspection and empathic understanding. Depending on the application for which the mood square or disk is used and depending on semantics, one or more of the eight basic moods may be refined in one of its variants.

Some indirect corroborative evidence for the correctness of the given naming is the empirical work of Csíkszentmihályi, briefly described in next paragraph.

Csíkszentmihályi Model

FIG. 1M illustrates a prior art mental state square published by Csíkszentmihályi in his theory of motivation at work. The two dimensions of Csíkszentmihályi's model are challenge level and skill level. Csíkszentmihályi's square is a special case for motivation at work where when challenge is high, uncertainty for social rejection as a form of Fear is high and the left brain cortex needs to be active to hedge such Fear. While when skill level is high, the desire for self-realization by socially contributing as a form of Desire is high, resulting from a higher level of right brain cortical activity.

Locating Selling & Buying on the Mood Disk

Locating Sales on the Mood Disk

Referring to FIG. 5B, business-to-consumer sales is best done in the $-\pi/8$ to $-3\pi/8$ area, whereas business-to-business sales can be best positioned in the $\pi/8$ to $+3\pi/8$ area. Or, in words, sales and/or marketing will be most successful if they bring consumers in a relaxed mood and businesses in a passionate mood. Indeed, fear is usually greater when purchasing on behalf of a business than when purchasing as a consumer. The reason is twofold: first, the purchasing sum in B2B sales is usually (much) higher, so the risk of loss is bigger. Second, social pressure is usually higher in B2B purchase. If a consumer purchases a product, e.g. a closet, he can only make a mistake in his own eyes (or in that of close family or friends). If a buyer purchases a product on behalf of a business, he feels the social pressure of colleagues, bosses, etc. Not only can he cause the business to lose money, he can also lose his reputation or even his job.

Within these respective areas, the areas of the relaxed and passionate mood, we want to find the area of maximal motivational strength. Contradicting typical claims of behavioral psychology marketers, it's difficult, if not impossible, to create desire. Seeding is possible, but growing is a natural process. It can be fostered, but not easily stimulated. Fear, however, can be actively hedged or treated trough Left Brain Activity. Therefore, given a certain level of Desire which is represented by the Desire coordinate d, Fear, represented by the Fear coordinate f, can be reduced to the level that the motivational strength m is maximal or close thereto, being at $-\pi/4$ for consumer sales or $+\pi/4$ for business-to-business sales.

Locating B2C Buying on the Mood Disk

To make a consumer optimally sell instead of buy, a value should be located at the $-3\pi/4$ mood in the mood disk. Meaning; it's usually in the advantage of a business/consumer to buy from an individual who feels apathy towards the product you want to buy from him. In all other cases, the selling price will usually end up higher. For example, when the consumer/seller is worried he may still need the product or regret the sale, or when he absolutely loves the product (passionate mood), he will probably be less willing to sell it.

Locating B2B Buying on the Mood Disk

To make a business optimally sell instead of buy, a value should be located at the $+3\pi/4$ mood in the mood disk. For example, it's usually in the advantage of a purchaser to buy from a B2B sales person who is anxious (e.g. about not hitting his target). Similarly, it is usually in the advantage of a consumer to buy from a brand who lowered their prices because they are anxious about competition.

Locating Applications on the Mood Disk

Applying the foregoing model specifically to interface design/development, without losing priority on other fields of application, enables accurate modeling of user psychology.

Television Watching=>Relaxed Mood

Television viewing is visual and therefore a specialization or virtuous habit of the right brain hemisphere. This has been confirmed by brain research: in 1979 Herbert E. Krugman showed TV is relatively a right-brain medium, with the right brain in general being about twice as active as the left brain during TV watching. Thus TV viewing should be positioned in the bottom right quadrant of the mood disk. Indeed, the main reason people watch TV is to relax (Barbara & Robert Lee, 1995). An important consequence of the above, is that TV user interfacing should be right brain interfacing, i.e. it should excite the right brain and not the left.

Figure 6A:
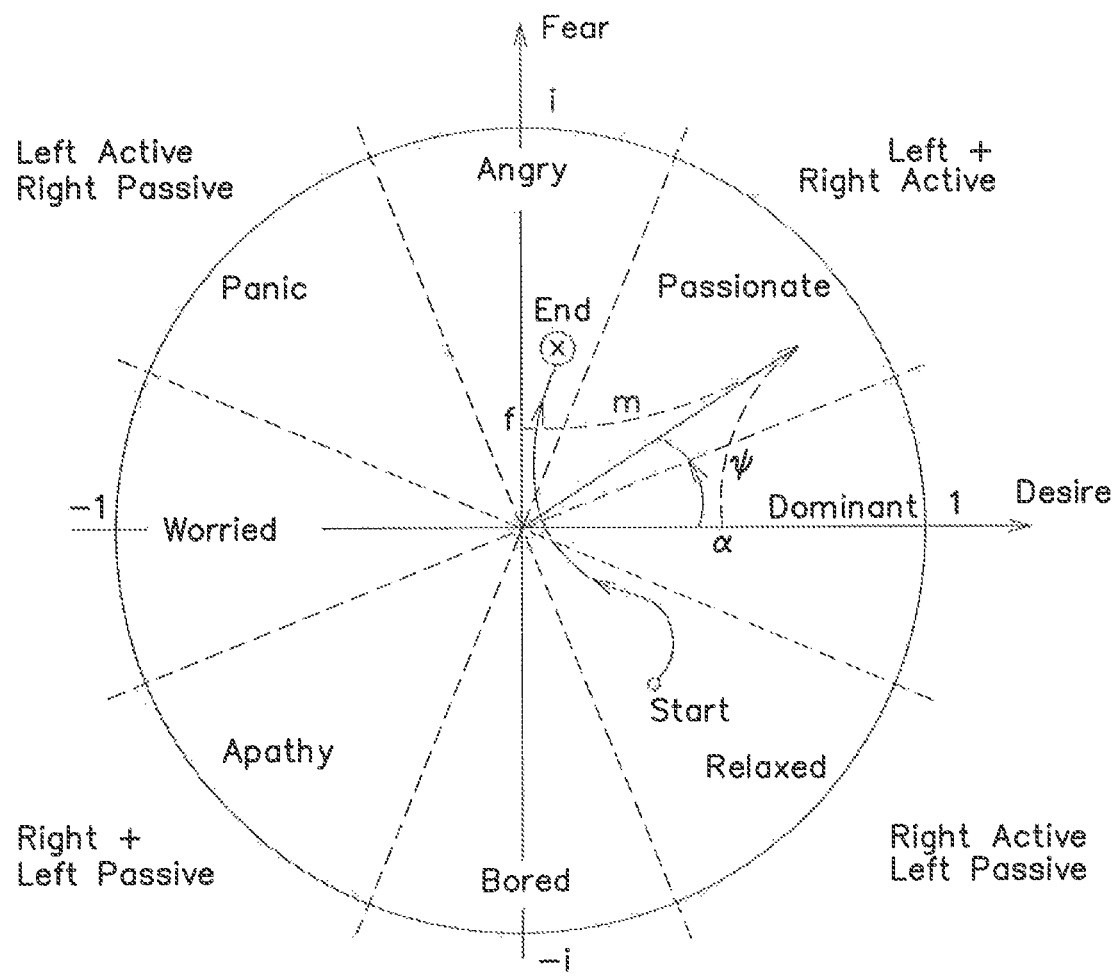
FIG. 6A illustrates conceptually the effect of an undesirable TV user interfacing, represented as a path in the Mood disk starting at relaxed mood and ending in an angry mood.

FIG. 6A illustrates conceptually the effect of an undesirable TV user interface experience, represented as a path in the mood disk starting at relaxed mood and ending in an angry mood. If the viewer's user interface contains too much textual content or requires the user to navigate sequentially through pull-down menus, wizards or other typical personal computer operating system based user interfaces, the left brain will have to be activated. Therefore the position in the mood disk moves up from the right bottom to the right top quadrant. When the left brain has been used in work all day, this causes frustration which is a negative emotion categorized under Fear. In 1980 Herbert E. Krugman showed that, indeed, interruption during TV watching causes frustration, which appears to be related to the left brain being 'turned on' again, thereby interrupting right brain relaxation. The viewer will stop being relaxed, reducing his or her motivational strength. The left brain typically controls and therefore suppresses the right brain. Therefore the desire coordinate will be reduced. The viewer's fear coordinate dramatically rises, bringing the viewer finally over the path indicated in FIG. 6A to a position in the Angry area. The viewer will get angry at the provider of the TV services or content who is forcing him through a user interface that is perceived as hostile. Successfully soliciting a purchase from an angry person is not entirely impossible, although very difficult. A left brain interface inhibits Video on Demand (VOD) sales and other sales over TV from growing Desire, actively frustrates existing Desire and creates Fear.

Television Sales=>Relaxed Mood

Knowing that both B2C sales and television watching is positioned in the $-\pi/4$ area, we can optimize sales on television as following: First, content is aggregated across all channels, including the Internet and other media sources, to screen the entire contents market. Then, this content is ranked based on the viewer's Desire, that is the desire coordinate attached at the reference to the content. Accordingly, it is desirable to select content that, given a certain level of Fear hedging, represented by the Fear coordinate f, is within the required Desire component range, so that the mood $\psi$ is in the $-\pi/8$ to $-3\pi/8$ area, the ideal point at which sales on television should be proposed to yield maximally chance for success.

Television Management=>Passionate Mood

The management of one's television system, including such things as choosing the content of virtual channels, choosing which Facebook users can post recommendations on one's Facebook channel, setting a channels' order number, managing one's recommendation list, etc. Is typically done in an excited mood. Therefore, systems for television management are located in the top right quadrant. As a result, they should excite both the right and left brain, by balancing visual with textual or analytical data.

Reading and Researching=>Relaxed & Passionate Mood

Reading and researching on an e-reader device is preferably done in a relaxed mood. E-reader user who want or need to buy material, don't want to be interrupted by the typical operations required for online order placement and payment, such as selecting a supplier, entering credentials, etc. These latter kind of actions are typically done in another mood, which is characterized by a higher level of fear, and thus, is located in the Dominant or Passionate mood area of the mood disk.

Trading of Securities=>Panic & Passionate Mood

Securities are best bought from traders who are in panic and sold to traders who are passionate about them.

Banking/Investing=>Worried/Panic Mood

Banking systems should not create value, but secure it. Good banking is an objective left brain activity that does not subjectively speculate (which is a right brain activity) and therefor does not desire profit or value, it only hedges the fear of money not being trustworthy. Good banking is not entrepreneurial, but is a collaborative effort of objectively securing value in money. Therefore, banking is located in the top left quadrant of the mood disk.

Selling=>Relaxed & Passionate Mood

The mood paths, typically followed by a consumer or business when buying a product or service, are represented in FIG. 15. For business-to-business sales Desire should be seeded and nurtured, and, when Desire starts growing, Fear should be actively hedged and sometimes created to close a business sale. In consumer sales of e.g. distributed non-proprietary products, Desire needs to grow as fast as Fear diminishes, and if the resulting intensity is strong enough, a relaxed purchase can take place.

Locating Platform Sales on the Mood Disk

It is possible that the mood, optimal for the type of sale at hand, differs from the mood, typically related to the platform at the hand.

As explained earlier, business-to-consumer sales is best done in the $-\pi/8$ to $-3\pi/8$ area (relaxed mood), whereas business-to-business sales can be best positioned in the $\pi/8$ to $+3\pi/8$ area (passionate mood). We also know that right brain platforms like e.g. television are typically located in the $-\pi/8$ to $-3\pi/8$ area, whereas e.g. internet websites are typically located in the $\pi/8$ to $+3\pi/8$ area.

In general, the type of sale, has a stronger influence on the design of a purchasing platform/process, than the type of platform. This means that, for example, a business-to-consumer website for books, is optimally designed in such a way as to relax consumers. Reading itself on the other hand, is something people typically do in a passionate mood. Thus, when it comes to reading, the optimal purchasing experience (relaxed mood) differs from the optimal product experience (passionate mood).

Modeling Fear and Desire Components

Modeling a user's Fear and/or Desire component towards a specific product or content, can be done through collecting conscious user feedback and/or through unconscious measuring of e.g. viewing and surfing behavior during TV watching or website browsing.

Reducing the Fear component f is preferably done in a Left Brain Activity environment, such as with a text based work environment, and not e.g. during TV viewing. Accordingly, viewing and surfing behavior is well suited to model the d coordinate, while active text based input is suited to model the f coordinate. Thus, for the example of television: watching a show entirely will increase the desire component associated with that show, whereas zapping away from the show decreases that same desire component. On the other hand, ordering one's list of preferred TV programs on an internet site on a computer, allows modeling of the f coordinate: moving a program up in the list, decreases its fear coordinate, moving it down increases its fear coordinate.

Alternative Mathematical Model for the Right Brain Transformation

The right prefrontal cortex of the human brain has evolutionarily been developing to deal with visual data. Not the actual reception and ordering of this data, which is done in the left and right basal cortex for the right and left eye, but in order to imagine a three-dimensional space outside the brain. The right brain prefrontal cortex imagines: projects an image outside us. The transformation of imagination projecting from basal to frontal cortex is a 1/X transformation. Light which is passing through the diaphragm formed by the pupil in the centre of the iris of the eye and projected on the retina follows exactly the same path as projecting the complex Riemann sphere onto another Riemann sphere, where zero is projected on infinite and vice versa. In order for the right brain to not feel the light in the same way a person feels the pain of a needle on the tip of their finger—humans don't see the light at the inside of our eyes at the sensitive retina, but outside us in a sphere with a 1/focal length diameter—the right brain hemisphere needed to specialize in this inverting transformation mapping a small internal sphere of the eye on a sphere outside the eyes or a plane, both representing the same image. Since the 1/X transformation is the only non-identical map that transforms the complex Riemann sphere holomorphically on itself and the Riemann sphere can holomorphically be mapped on the complex plane the right brain had no other option than to develop the 1/X function physically in the projection the basal cortex onto the prefrontal cortex. This projection simulates the inverse projection of light through the pupil onto the retina, which is a 1/X transformation by itself and the 1/X transformation executed after another 1/X gives the identity transformation, meaning humans imagine the world as it is. This 1/X transformation is known to be divergent, creating the notion of infinity and zero in the brain. This links the visual character of the right brain with its divergent inverting character and explains why psychopathic behavior is a use of our right brain, uncontrolled by our left brain. Desire is in its natural dynamic divergent; it starts with a small seed of attraction towards an object and without any effort grows by itself to an obsession if not tamed by the left brain.

The left brain pre frontal cortex has been developing to cope with sound (not music, music is a combined effort of left and right brain, such as mathematics is). Instead of at each period of the brain wave inverting by projecting a two-dimensional map of the whole picture on the prefrontal cortex, the left brain has been specialized to find patterns in details when analyzing two-dimensional maps found by writing a column of Fourier transformed (by the cochlea) amplitudes in function of frequency. Therefore the left brain is specialized in detail and control. The best way to deal with Fear is to control it by a detailed analysis and action. Fear starts bigger and through hard labor of the left brain can be controlled or hedged. Therefore the dynamic of Fear is virtuously convergent and viciously divergent.

A Mathematical Model for Emotions

Fear and Desire are independent and together constitute the entire human (and probably also animal) state space of emotions, called the psychology space, which can be mathematically translated as Fear and Desire are the eigenvectors of the psychology space. Any psychological transformation, such transformation may occur for example as a result of one's interaction with a potential customer when trying to sell something to him/her, can be decomposed in two components, one in the Fear and one in the Desire dimension, that are independent of each other and together constitute the entire psychological transformation or process. The psychology space therefore can be represented by a two dimensional surface, more specifically, a function range of the two dimensional surface of the brain cortex. Therefore, the dimension of the psychology eigen space is two. The right brain hemisphere is specialized in dealing with Desire and therefore is most virtuously used to deal with Desire, but can also deal with Fear, but then typically viciously. The left brain hemisphere is specialized in dealing with Fear and therefore is most virtuously used to deal with Fear, but can also deal with Desire, but then typically viciously.

Every emotion can therefore be decomposed in its natural components of Desire and Fear, mathematically expressed as:

$$E=E_d+E_f$$

Every Emotion E is a vector with a magnitude E and a direction $\phi$ which is graphically represented in FIG. 1C.

FIG. 1C illustrates graphically the decomposition of an Emotion into its independent and fully constituent components of Fear and Desire which may be mathematically expressed as follows:

$$E=|E|=(|E_d|^2+|E_f|^2)^{1/2}$$

$$E_d=|E_d|=E \cos \phi$$

$$E_f=|E_f|=E \sin \phi$$

Where $\phi$ is the angle between the direction of the Emotion E and the Desire unit vector. The projection of E on this Desire direction gives $E_d$ which is the product of $E_d$ and the Desire unit vector. Using complex number notation, where the Desire part of a complex Emotion z is the real part x and its Fear part is the imaginary part y, and the magnitude of the Emotion z is represented by r, the following complex notation applies:

$$z=x+yi$$

$$x=r \cos \phi, y=r \sin \phi$$

$$z=r(\cos \phi + i \sin \phi)$$

$$\phi=\arctan x/y$$

$$z=re^{i\phi}$$

Using complex Riemann mathematics the single quadrant Fear and Desire map depicted in FIG. 1C can be conformally and holomorphically mapped to the unity circle in the complex plane as depicted in FIG. 2, making sure that all deductions derived from the psychology space of FIG. 2 are actually applicable to the human emotions represented in FIG. 1C.

FIG. 2 is a conceptual illustration of the natural representation of the state space of human psychology. The starting space spanned by Fear and Desire is a single quadrant of the complex plane since no negative attraction or reluctance exists, since Fear and Desire are independent and not each other's opposite or inverse.

The human ear or eye, which, together with the internal states of the cortex, are the source of a certain phenomenon yielding a specific perception, are both characterized by a logarithmic transmission from senses to brain. Therefore, internal emotion states can more naturally be represented on a logarithmic scale. Representing the X an Y axis of FIG. 1C logarithmically is a conformal, holomorphic transformation, subtracting $(0, \infty)$ mappings in both directions meaning this transformation can be executed without losing validity of the final psychological space in the real life emotional world. The representation of such transformation is given in FIG. 3.

FIG. 3 is a graph illustrating morphing of the single quadrant phenomenon to the entire complex plane of the perception.

Furthermore, the transformation of the entire complex plane of FIG. 3 to the Riemann complex half sphere of FIG. 4 is known to be a meromorphic map, meaning, again, this transformation can be executed without losing validity.

FIG. 4 is a graph illustrating morphing of the entire complex plane of the perception to the cortical experience, represented by a Riemann complex half sphere.

Finally, the half complex Riemann sphere can be transformed holomorphically and conformally to the complex unit circle, being the equatorial circle of the Riemann sphere, using a projective Poincaré model, yielding the end result of FIG. 2. The mathematical characteristics of these transformations suffice to secure mathematical validity of this new representation of Emotion and its eigenvector decomposition through the Fear coordinate f, the Desire coordinate d, the mood $\psi$ and the motivational strength m, all being scalars. Orthogonal projections through circles, rather than straight lines are necessary to correctly determine the d and f coordinates. Psychology, emotions, subjective buying and selling behavior and also the viewer-consumer psychology can therefore validly be described in terms of mood $\psi$ and motivational strength m.

Mapping Emotions to Right and Left Brain

Figure 5:
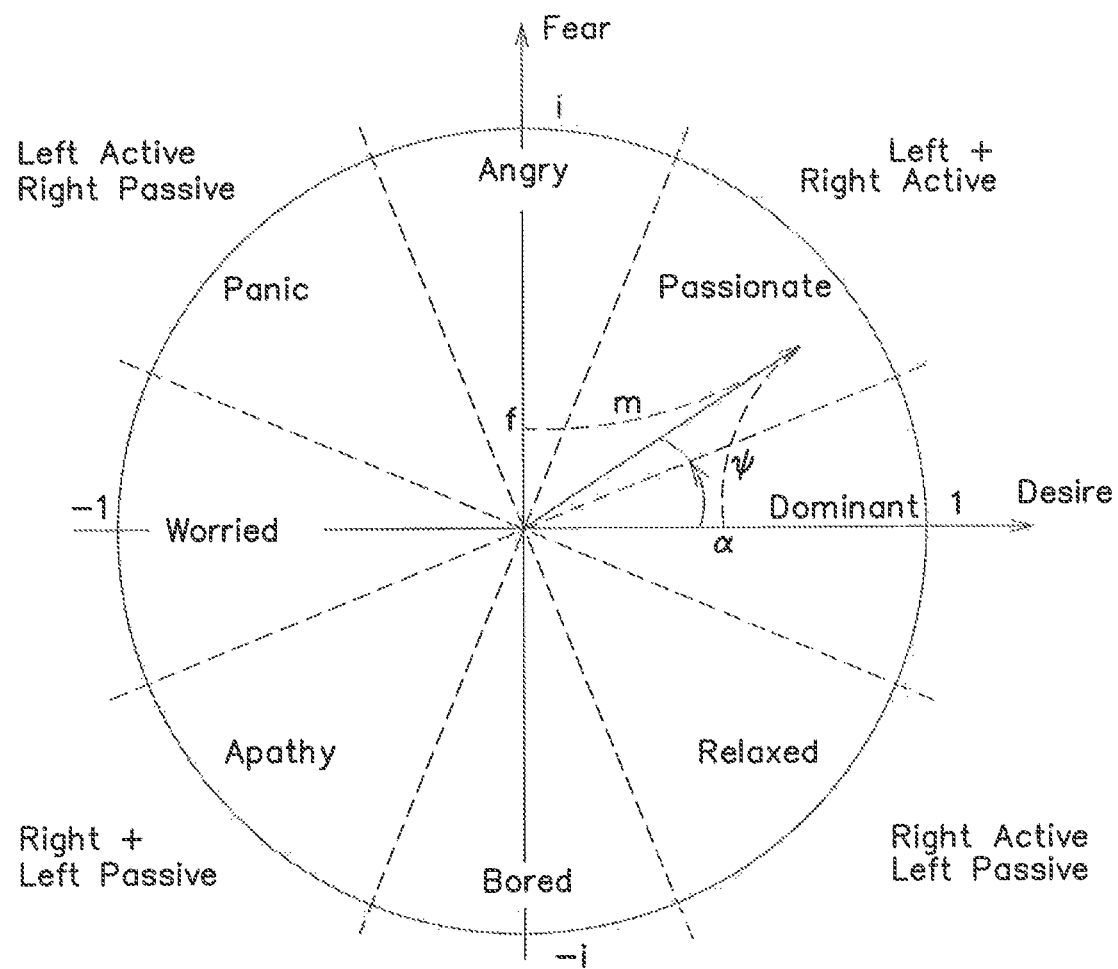
FIG. 5 illustrates conceptually effect of a desirable TV user interfacing, including exemplary values for the Fear coordinate f, the Desire coordinate d, the mood ψ and the motivational strength m, in the Mood disk in accordance with the disclosure.

The extension of the left/right brain analysis enables the subdivision of the Emotion disc, illustrated in FIG. 2, into Left and Right brain, active and passive areas, as shown in FIG. 5. FIG. 5 illustrates conceptually the Emotion disc with brain activity varying in function relative to the Real and Imaginary axis, therefore alternating per quadrant.

Transformations Yielding a State Space Path

Buying and Viewing Psychology

Applying the foregoing model specifically to buying psychology, without losing priority on other fields of application, enables accurate modeling of buyer/purchaser psychology. Purchasing behavior can occur in different moods, represented by different angels $\psi$ in the Emotion disc. Although a passionate buyer is different from a relaxed buyer, in every buying decision, or action in general, the motivational strength has to move over a particular threshold, which may differ from one person to another.

Television viewing is visual and therefore a specialization or virtuous habit of the right brain hemisphere. The right brain is specialized to deal virtuously with Desire, and, when it deals with Fear, it does it typically viciously, meaning TV viewing should be positioned in the bottom right quadrant of the Emotion disc, where the right brain is active and the left brain is passive. An important consequence, therefore, is that TV user interfacing should be right brain interfacing.

FIG. 6A illustrates conceptually the effect of an undesirable TV user interface experience, represented as a path in the Emotion disc starting at relaxed mood and ending in an angry mood. If the viewer's user interface contains too much textual content or requires the user to navigate sequentially through pull-down menus, wizards or other typical personal computer operating system based user interfaces, the left brain will have to be activated. Therefore the position in the Emotion disc moves up from the right bottom to the right top quadrant. When the left brain has been used in work all day, this causes frustration which is a negative emotion categorized under Fear. The viewer will stop being relaxed, reducing his or her motivational strength. The left brain typically controls and therefore suppresses the right brain. Therefore the desire coordinate will be reduced. The viewer's fear coordinate dramatically rises, bringing the viewer finally over the path indicated in FIG. 6A to a position in the Angry area. The viewer will get angry at the provider of the TV services or content who is forcing him through a user interface that is perceived as hostile. Successfully soliciting a purchase from an angry person is not entirely impossible, although very difficult. A left brain interface inhibits Video on Demand (VOD) sales and other sales over TV from growing Desire, actively frustrates existing Desire and creates Fear.

Figure 6B:
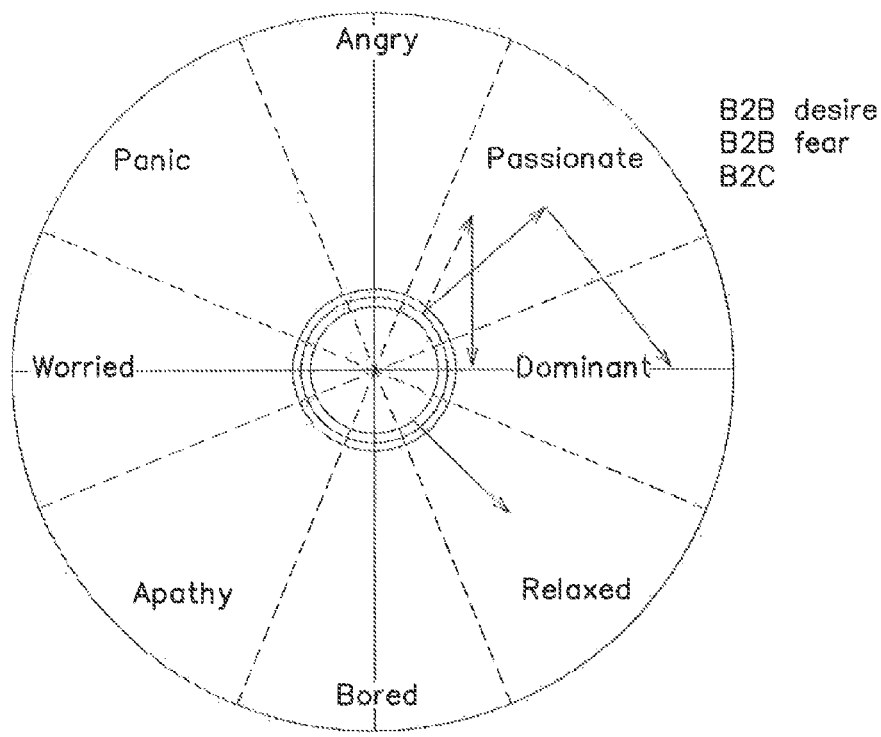
FIG. 6B illustrates conceptually the sales paths of desire-based B2B sales, fear-based B2B sales and B2C sales on the mood disk in accordance with the disclosure.

Referring to FIG. 6B, Soliciting buying behavior with television viewers is best done in the $-\pi/8$ to $-\pi/8$ area. The best business-to-business sales can be best positioned in the $\pi/8$ to $+3\pi/8$ area. Within this TV area, we want to find the area of maximal motivational strength. Contradicting typical claims of behavioral psychology marketers, desire is a difficult, nearly impossible Emotion to actively create. Seeding is possible, but growing is a natural process that can be frustrated, but not easily stimulated. Fear, however, can be actively hedged or treated trough Left Brain Activity. Therefore, given a certain level of Desire which is represented by the Desire coordinate d, Fear, represented by the Fear coordinate f, can be reduced to the level that the motivational strength m is maximal or close thereto, being at $-\pi/4$ for consumer sales or $+\pi/4$ for business-to-business sales. To make consumers or businesses optimally sell instead of buying, a value should be located at the $+/-3\pi/4$ mood in the emotion disc.

For business-to-business sales Desire should be seeded, and, when Desire starts growing, Fear should be actively hedged and sometimes created to close a business sale. In consumer sales of e.g. distributed non-proprietary products, Desire can simply be harvested but Fear should still be hedged. Aggregating of content across all channels, including the Internet and other media sources to screen the entire contents market is first performed followed by ranking based on the viewer's Desire, that is the desire coordinate attached at the reference to the content. Accordingly, it is desirable to select content that, given a certain level of Fear hedging, represented by the Fear coordinate f, is within the required Desire component range, so that the mood $\psi$ is in the $-\pi/8$ to $-3\pi/8$ area, the ideal point at which sales on television should be proposed to yield maximally chance for success.

Therefore it is necessary through unconscious measuring of viewing and surfing behavior and/or conscious user feedback to model the Desire and/or Fear vectors. Reducing the Fear component f is preferably done in a Left Brain Activity environment, such as with a text based work environment, and not during viewing. Accordingly, viewing and surfing behavior is well suited to model the d coordinate, while active text based input is suited to model the f coordinate.

The foregoing concepts for modeling of Desire and Fear vectors relative to their mapping on the Emotion disc can be performed with a unique neuropsychological modeling engine as described herein. Such modeling engine serves as a mechanism by which content objects may be ranked given a subject's (viewer's) unconscious measuring of viewing and surfing behavior and/or conscious user feedback. Once ranked, the specialized set of user interfaces described herein may be utilized to enable multidimensional surfing of the previously ranked content objects.

Unique to this disclosure is the concept of a truly subjective channel. Unlike prior art content channels in which subject content has been objectively categorized by the content provider source and delineated according to available viewing times, a channel in accordance with the disclosure comprises one or more groups of content objects which have been specifically selected according to a viewer's subjective preferences and mood and arranged in order from lowest to highest emotional motivation for the viewer to select and view such content. In an exemplary system, a viewer or group of viewers, such as a family, may have multiple personalized channels that comprise content programs which has been autonomously aggregated and screened according to their personal interests using the modeling system 35 disclosed herein and which are viewable using the user interfaces application controls associated with the viewer system 32 described herein or are created by using individual channels to mix.

The Television Recommender

The foregoing concepts for modeling of Desire and Fear vectors relative to their mapping on the mood disk can be performed with a unique neuropsychological modeling engine as described herein. For reasons of clarity and understandability, we describe the working of such engine for the example of a television experience system. The principles are applicable to a wide range of applications however, namely all those who could benefit from recommender functionality. Thus, the modeling engine described here serves as a mechanism by which content objects may be ranked given a subject's (viewer's) unconscious measuring of viewing and surfing behavior and/or conscious user feedback. Once ranked, the specialized set of user interfaces described herein may be utilized to enable multidimensional surfing of the previously ranked content objects.

Unique to this disclosure is the concept of a truly subjective channel. Unlike prior art content channels in which subject content has been objectively categorized by the content provider source and delineated according to available viewing times, a channel in accordance with the disclosure comprises one or more groups of content objects which have been specifically selected according to a viewer's subjective preferences and mood and arranged in order from lowest to highest emotional motivation for the viewer to select and view such content. In an exemplary system, a viewer or group of viewers, such as a family, may have multiple personalized channels that comprise content programs which has been autonomously aggregated and screened according to their personal interests using the modeling system 35 disclosed herein and which are viewable using the user interfaces application controls associated with the viewer system 32 described herein or are created by using individual channels to mix.

Network Implementation of Recommender Engine for Viewing Experience

Figure 7:
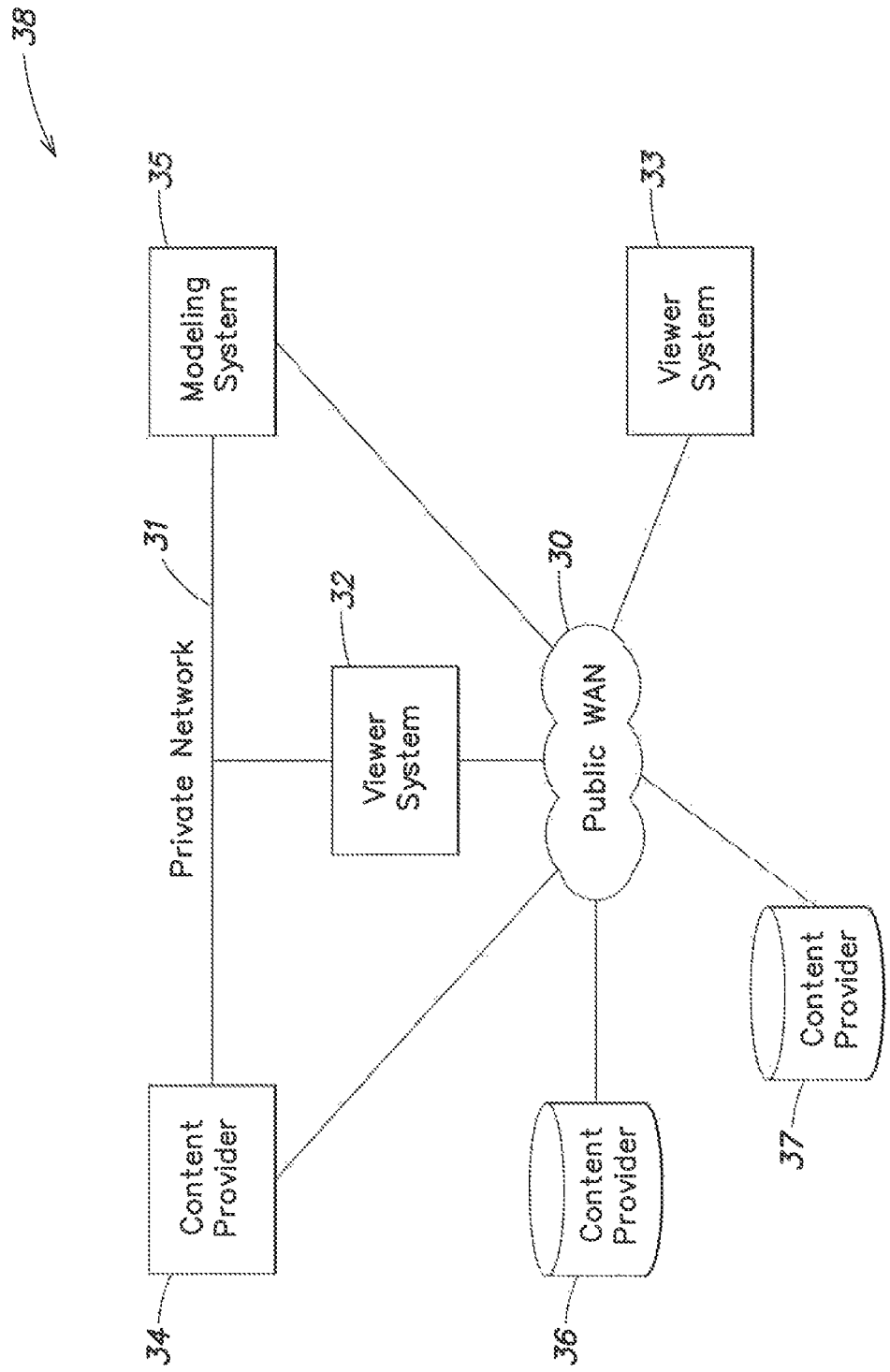
FIG. 7 illustrates conceptually a network environment in which the neuropsychological modeling engine disclosed herein may be implemented.

FIG. 7 illustrates conceptually a network environment 38 in which the neuropsychological modeling engine disclosed herein may be implemented. Network environment 38 comprises one or more private networks 31 and a public wide area network (WAN) 30, such as the Internet. Private networks 31 may be implemented with any known networking technology such as a cable packet network from a cable service provider or a packet-switched local area network (LAN), or wireless network. Public network 30 may comprise a married collection of other networks utilizing any currently known networking technology including both wireless, optical, etc. Operably coupled to each of networks 31 and 30 is a content provider 34, a viewer system 32 and a modeling system 35 which contains the neuropsychological modeling engine disclosed herein. Also connected to network 30 are additional content providers 36 and 37 as well as an additional viewer system 33. The viewer systems 32 and 33 may be implemented as described with reference to FIG. 11.

Modeling System Embodiments

Figure 8:
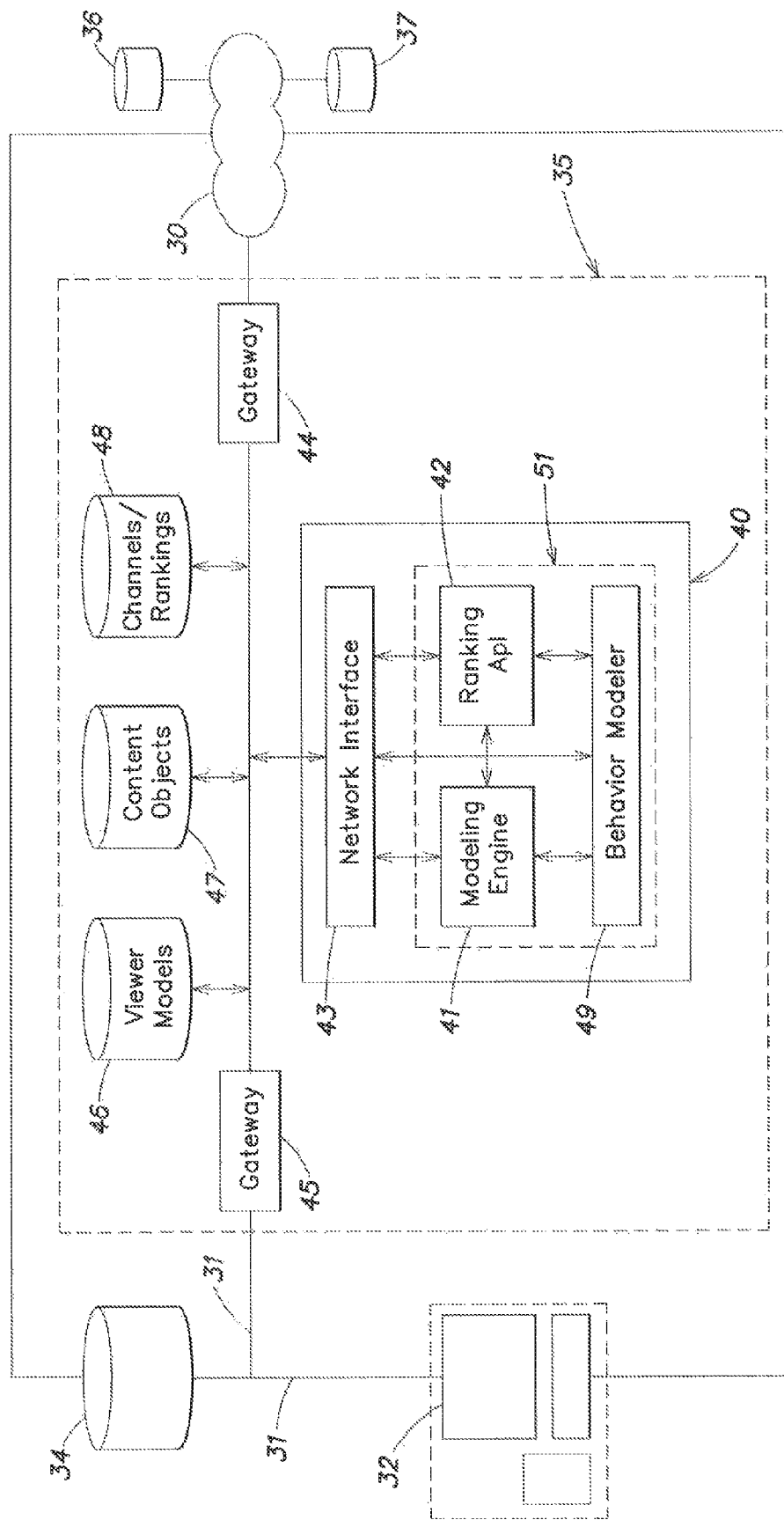
FIG. 8 illustrates conceptually a block diagram of a computer implemented neuropsychological modeling engine relative to a plurality of content objects in accordance with the disclosure.

FIG. 8 illustrates conceptually a block diagram of modeling system 35 which contains neuropsychological modeling engine 41. Specifically, system 35, outlined in phantom, comprises a pair of gateways 44 and 45 connecting system 35 to networks 30 and 31, respectively. In an exemplary embodiment, system 35 further comprises a server platform 40 and one or more databases 46-48. Server 40, which may be implemented with a single server or multiple servers, executes neuropsychological modeling engine 41 and ranking application 42, behavior modeler 49 all of which communicate with each other as well as with databases 46-48 and other entities through network interface 43 which couples server 40 to databases 46-48, as well as networks 30 and 31.

Database 46 may be utilized to store records or other data structures representing the neuropsychological model of one or more viewers associated with the viewer system 32, as well as other viewer systems. Database 47 may be utilized to store the content objects, e.g. the files of various multimedia content, available for viewing by the viewer systems 32. Database 47 may also store metadata associated with the respective content files. FIG. 10C illustrates conceptually a exemplary content object metadata file 75. Database 48 may be utilized to store one or more channels 90A-C which hold the rankings or orders of multiple content objects associated with channel model(s) 72 and viewer model 70. Note that although each of databases 46-48 are illustrated as a single database, it is contemplated here in that any of them may be implemented with a number of databases in different configurations, including distributed, redundant and peer-to-peer continuously migrating configurations. Alternatively, the data from one or more of databases 46-48 may be combined into a single database. For example, the ranking of content associated with a specific viewer channel model may be stored along with the data defining the viewer model. In addition, each of databases 46-48 may include their own respective database server for interfacing with server 40 or may share a database server.

FIG. 9D illustrates conceptually the elements of an embodiment of modeling system 35 necessary for the derivation of the relationship between metadata associated with a content object and an individual viewer model relative to the ranking of the content object associated with the particular channel model. Specifically, each content object stored in database 47 has associated therewith a metadata file 75 which contains various data parameters describing the content of the file, such as the format, duration, title, genre, actor, producer, year of initial release, etc. Any number of different data structure formats may be utilized for this particular structure. Such content file metadata files may also be stored in database 47.

Similarly, each individual viewer (or group of viewers, e.g. a family) associated with viewer system 32 has associated therewith a viewer model 70 which contains data describing the behavior model comprising viewer metadata such as gender, age, occupation, product/description service level, etc. and idealized preferences for the viewer (or groups of viewers) in terms of genre, actors, specific series, area of interest, past selection history, viewing duration or other parameters. FIG. 10A illustrates a sample data structure which may be used to implement the behavior model 70 for a specific viewer (or groups of viewers). As noted previously, such viewer metadata files may be stored in database 46.

To assist with the efficiency of their search engines services such as Google, Bing, Yahoo, etc. create ontologies of reality. Ontologies are used in artificial intelligence, the Semantic Web, systems engineering, software engineering, biomedical informatics, library science, enterprise bookmarking, and information architecture as a form of knowledge representation about the world or some part of it. Essentially, such search engines create an objective index of content representing reality, such indexed content may be stored in one or more databases as represented in FIG. 9A by database 60. In an exemplary body, database 60 and the indexed content may or may not be part of modeling system 35 but maybe accessible thereby through a public or private network.

FIGS. 9E-F illustrate the process flow between components of modeling system 35 to update a viewer's model and channel model, retrieve new content and determine if such content is suitable for ranking according to the system model of the viewer's emotional motivation. Referring to FIGS. 9A-F, viewer behavior, including events such as requesting a specific program, completion of the viewing of a content object, storing, or purchasing of content, management of a channel, causes viewer system 32 to send event data packet (s) to behavior modeler 49 of modeling system 35 as illustrated by arrow A of FIG. 9D and decisional blocks 61 of FIG. 9E. Upon receipt of such event data, behavior modeler 49 modifies the viewer model 70 associated with the specific viewer, as illustrated by process blocks 62A and, if necessary channel model(s) 72, as illustrated by process blocks 62B both of FIG. 9E. In one embodiment, the event data received by behavior modeler 49 may include an identifier of the content object which was the subject of the event, the elapsed viewing time of the content object, a descriptor of an action such as storing, purchasing, changing the order of, specifying a like/dislike of, or deleting such content object, and identifiers of the channel by which the content object was manipulated, and an identifier of the subject viewer or viewers. If the event is an implicit event the event data received by behavior modeler 49 may include the channel by which the content object was manipulated (since a content object may belong to multiple channels). Also, If the event is implicit event the event data received by behavior modeler 49 may include the timestamp of the action (elapsed time may be calculated at the source of the content object data stream since actions such as fast-forward and/or rewind are mapped to start/stop in order to calculate the cumulative viewing time) and the position in the content object, e.g. after x seconds. If the event is an explicit event regarding channel management, the event data may contain an identifier of the channel that is being added or removed or changed and/or the search term/keyword associated with the change. If the event is an explicit event regarding one of the dedicated feedback (colored button) commands described herein the event data may contain identifiers of any of the command/button, content object and channel.

FIG. 10B1 illustrates conceptually a data structure defining an exemplary channel model 72C. Behavior modeler 49 then retrieves from database 46 the model associated with the specific viewer and the metadata file 72C defining the channel. In addition, behavior modeler 49 also retrieves from database 47, the metadata file describing the content object. Next, behavior modeler 49 compares the received event data with metadata file 75 of the content object and the current viewer model 70 and modifies the channel model(s) 72c appropriately, (indicated by the circular arrow within behavior modeler 49), as illustrated by process block 62A and 62B of FIG. 9E. In each case the viewer model 70 is modified and optionally the channel model could also be modified, as would be in case of channel management and search term change.

In embodiments, modifying the viewer model 70 may be performed with the following algorithm. Each event is mapped onto the mood disc 20 according to a prescribed rule, e.g. purchase of a content object results in a predefined $\psi$ and m value (or equivalent Fear coordinate f and Desire coordinate d). In a first step the location on the mood disc 20 of the content object is determined for a particular user.

Figure 6C:
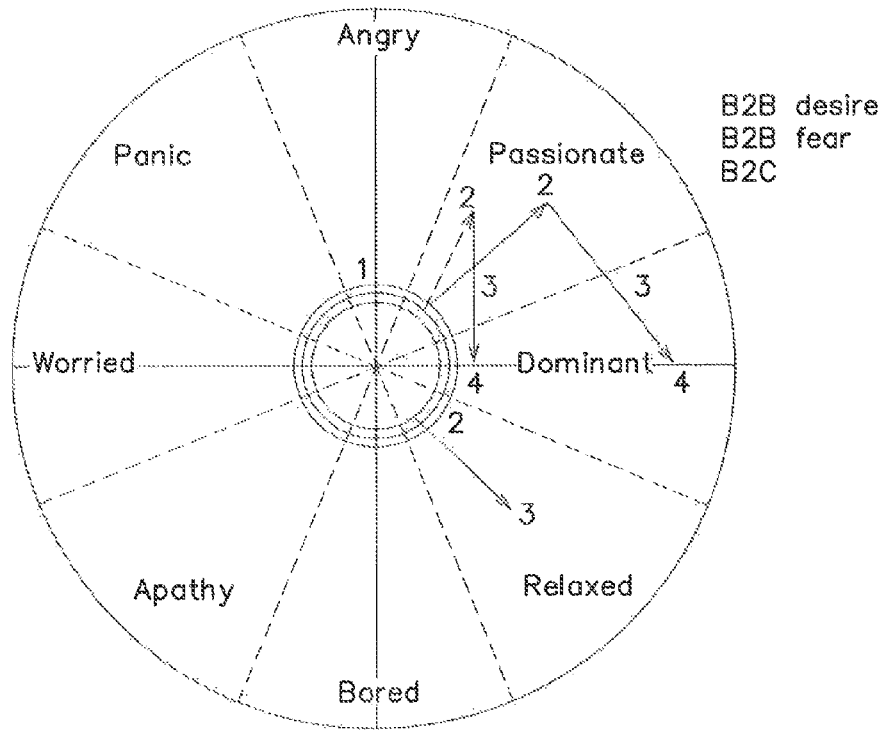
FIG. 6C illustrates the sales paths of desire-based B2B sales, fear-based B2B sales and B2C sales on the mood disk, with their numbered stages in accordance with the disclosure.
Figure 6D:
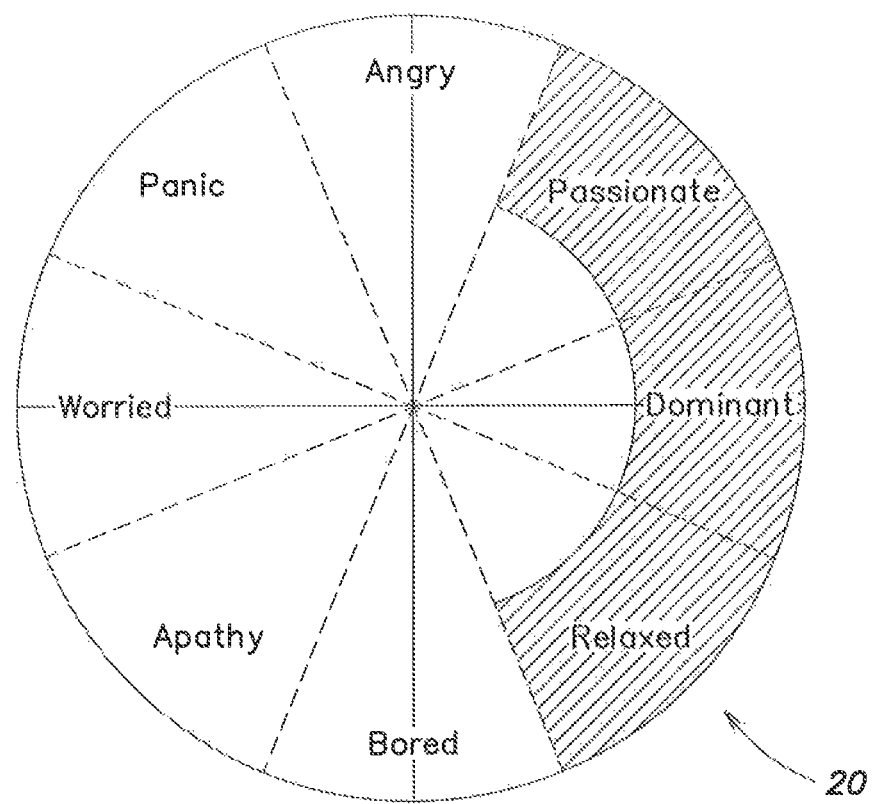
FIG. 6D illustrates conceptually a mood disk with highlighted regions in the passionate, dominant, and relaxed sections thereof in accordance with the disclosure.

Viewers mainly watch television for relaxation. However, a viewer may also watch a program because they are fascinated by it, or interested for professional reasons. Thus, in the absence of any other implicit or explicit data, other than the fact that a viewer associated a positive event (e.g. watch from start to end, purchased, use of a colored button to indicate explicit feedback, etc. . . . ) with the content object, an assumption is made that for the particular viewer the content object is probably located somewhere in the delineated area adjacent the right perimeter of the disc, as illustrated in FIG. 6D.

The first time a viewer is using the system 35, it is difficult to predict in which mood exactly the user currently exists: passionate, dominant or relaxed. Hence programs may be pre-catalogued in either the passionate or relaxed area of the mood disk 20. Programs that will typically be pre-catalogued in the relaxed area are series, movies, reality shows, etc. Programs that will typically be pre-catalogued in the passionate area are news programs, debates on financial, economic or political topics, scientific documentaries, etc. A script may be written that does this pre-ordering automatically, for example based on specific metadata like program type (series, movie, documentary, . . . ) and genre, and/or based on the channel on which the program is broadcasted. This is Depending on a viewers' implicit and explicit behavior, related to a content object, the position of that content object on the personal mood disk of that viewer, may differ from its default, general starting position. The default starting positions themselves may also shift, based on collaborative data as outlined in the following examples. In a first example, individual refinements are based on implicit and explicit data. Imagine a viewer who mainly watches content objects, which are typically considered relaxing, and in between also regularly watches the daily news. If he/she displays similar viewing patterns for both the series and news, a presumption can be made that the daily news is also relaxing for him, and (gradually) move the daily news from the passionate area to the relaxed area of the mood disk of that particular viewer. Now imagine a viewer who, from Mondays to Thursdays, mainly watches programs, which are typically pre-catalogued in the passionate area of the mood disk, e.g. the daily news, the financial news and interviews with business people. For this user a presumption can be made that, from Mondays to Thursdays, television is mainly a source of information and/or inspiration, rather than relaxation. Thus, for this user, the daily news stays in the passionate area of the mood disk, and noted that for this user, the passionate mood is the preferred mood from Mondays to Thursdays.

In a second example, general refinements can be based on collaborative data. If a program that is pre-catalogued in the passionate mood, moves to the relaxed area of the mood disk of a significant percentage of the viewers' of that particular program, then the default starting position may be updated from passionate to relaxed. Further a predefined rule that defines in which location within the mood sector a certain event should be placed may be applied, for example, purchase of a content object in "relaxed" mood is mapped onto $\psi=-\pi/4$ and m value=1. Analogous rules may apply for other relevant events.

A linear combination of the metadata of the content object (or a representation thereof in terms of the ontology in use) results in the defined Fear coordinate f and the Desire coordinate d. E.g. suppose $x_{f1}, x_{f2}, \ldots x_{fn}$ are the coefficients applied to, respectively, ontology component 1 . . . n whenever component j (where j=1, . . . n) is involved in a linear combination that results in fear coordinate $f_i$ (for each event i, i=1 . . . m) yielding a system of equations that can be represented as:

$$[O] \begin{bmatrix} x_{f1} \\ x_{f2} \\ \ldots \\ \ldots \\ x_{fn} \end{bmatrix} = \begin{bmatrix} f_1 \\ f_2 \\ \ldots \\ \ldots \\ f_m \end{bmatrix}$$

whereby O is an m×n matrix in which each element $o_{ij}$ indicates the involvement of component j in fear coordinate i. In one embodiment, matrix O may look like:

$$O = \begin{bmatrix} 1 & 0 & \ldots & 1 & 1 \\ 1 & 0 & & & \\ \ldots & & \ldots & & \\ 0 & & & 1 & \\ \ldots & & & & 0 \end{bmatrix}$$

To calculate the coefficients this system of equations must be solved. Based on the sizes of m and n and/or the rank of matrix O an algorithmic routine is applied (either a direct or iterative solver from numerical linear algebra, e.g. least squares solution) to determine each coefficient $x_i$. An analogous system of variables may be used to calculate the desire coefficients. Due to the fact that the coefficients of the viewer model are updated based on new events, a change in the fear and/or desire of the viewer can be made by giving a lower weight to the oldest equations or discarding them from the system to be solved.

In the illustrative embodiments, modifying the channel model 70 can be performed upon explicit events, such as a viewer's initiated modification of the channel model with the left brain user interface, described herein. A viewer initiated event to create/update/delete a channel results in creating/updating or deleting the channel record. A viewer initiated event to modify the search terms/keywords associated with the channel results in updating the filter values associated with that channel. A viewer initiated event to explicitly modify the "mood" associated with the channel results in updating the Fear and Desire coordinate value associated with that channel (a default value assumption is that the viewer watches the channel in "relaxed" mood).

Modifying the channel model 70 can be performed upon implicit events as well. For example, if it is determined that the content objects that a user watches in a certain channel tend to be located in another region of the mood disk than the region associated with the channels' mood vector the mood vector may be changed, e.g. from the "relaxed mood" to the "passionate" area. If the modified viewer model has strong coefficient values for a number of ontology components that are not yet part of a channel's filter criteria, a new channel is created (for suggestion to the viewer) that has these components as the filter values.

Upon certain events, e.g. periodically (a timer event), viewer event, content event (e.g. new VOD content available) the modeling engine 41 is run. As first step, modeling engine 41 performs content based filtering based on the viewer and channel model. The modeling engine 41 requests from database 60 any indexed content material that may be relevant, as illustrated by arrow D of FIG. 9D and process blocks 63 of FIG. 9F. In an exemplary embodiment, modeling engine 41 formulates and formats the database queries provided to database 60. Referring to FIG. 10A1, queries can be based on any combination of ontology components (having strong coefficient values in the viewer model) and filter criteria from the channel model (ranging from simple criteria like "broadcasted by X" to criteria linked to viewing context stored in the viewer model e.g. "similar to items I like to watch on Friday evening").

In this matter, modeling engine 41 may be programmed to interact with the querying format of any number of different indexed content sources or content libraries, such as YouTube and various popular Web search engines, in addition to more traditional content providers such as cable service providers, VOD providers, etc. . . . Database 60 or other content source returns the metafiles for one or more content object satisfying the query to modeling engine 41, as illustrated by arrow E of FIG. 9D.

Neuropsychological modeling engine 41 examines the metadata file for each content object retrieved, and, in conjunction with the viewer's metadata file and/or channel model, calculates where on the mathematical model of human emotion, i.e. the mood disc 20, described previously with reference to FIGS. 1A-6D, the viewer's mood and motivational strength are relative to that specific content object. Specifically, modeling engine 41 examines the various values of the parameters within the metadata file for the content object, such as the genre of the program, actor, title, director, etc. and maps these onto the corresponding components of the ontology used. Based on the coefficient corresponding to each selected component available in the viewer model (as calculated by process block 62A), the mood disk Fear coordinate f, and Desire coordinate d for this content object are computed.

For each channel model associated with the viewer model ranking application 42 assesses whether the content object satisfies the filter criteria for the channel. In a next step, the similarity of each selected content object's mood vector to the mood vector associated with this channel is calculated using the "cosine similarity measure". This measure allows the application 42 to rank the content objects selected for this channel relatively according to their similarity with the channel's mood vector. In an optional second step, a "collaborative filtering" post-processing step to update the rank of content objects in the selection of engine 41 for this channel and viewer—similar to traditional hybrid recommendation algorithms (collaborative and content based filtering) algorithms. Specifically, ranks of objects (a certain selection of e.g. low rank objects) based on the viewing behavior (e.g. likes) of viewers having a viewer model similar to this viewer's model. However, contrary to traditional "collaborative filtering" implementations the "similarity" of the viewers is calculated not only based on preferred content objects and a correspondence in preferred content object metadata but also the correspondence in the mood disk stored in the viewer's model. In one implementation viewer similarity is calculated using the "cosine similarity" applied to both a vector comprising the fear and desire coefficients of the respective viewers. Note that in another implementation the "content based" and "collaborative filtering" mechanisms may be combined in different ways e.g. a different sequence of steps or parallel. Optionally, as specified in the channel model, the next step is a cut-off of the lower ranked content objects according to certain cut-off criteria. In one embodiment this criteria can be "after a certain similarity measure value all content is omitted" or "after a certain number of content objects"; such value can also be dynamically calculated by the system. Optionally, as specified in the channel model, in a final step a sorting operation can be done on the remaining content objects for this channel, given a certain sorting criteria (e.g. time of broadcasting, oldest first or last). Note that the channel content may also be enriched with content added by the program director.

Channel 90 may be implemented using the data structure 95 illustrated in FIG. 12C in conjunction with any number of other data structures, including bidirectional stacks, doubly linked lists, relational database records, etc. and contains a plurality of entries for holding any of an address, identifier or link to the actual file containing the multimedia content in database 47. Note any number of different channels may be associated with the same viewer.

In the disclosed embodiment, the process performed by modeling engine 41 is performed for each content object and for each channel associated with a specific subject viewer. In this manner, the rankings of content objects for a specific viewer can be updated periodically, for example, daily, every 8 hours, etc. Note that neuropsychological modeling engine 41 rather than computing values for the Fear coordinate f and Desire coordinate d, for every content object may utilize a look-up table which, given the weighted input values of the dominant preferences from a channel model 72 and viewer model 70 generates appropriate values for Fear coordinate f and Desire coordinate d.

FIGS. 10A, 10A1, 10B, 10B1, 10C, and 10C1 illustrate conceptually the data structures utilized by neuropsychological modeling engine 41, ranking application 42 and behavior modeler 49 to create ranking of content objects. FIGS. 10A and 10A1 collectively illustrate a conceptual viewer metadata file 70. In addition to viewer information such as gender, age, marital status, subscription type/level and a viewer identifier, the viewer metadata file 70 also contains information useful to behavior modeler 49 and neuropsychological modeling engine 41, such data as a list of preferences to any of actors, genres, producers, specific topics of interest, specific topics of disinterest, any of which has associated therewith a type identifier and a weighted preference value, usually an integer value selected from a range of possible values, e.g. on a scale of 0 to 100. Such preference information may be derived from the viewing history which has occurred by behavior modeler 49. In addition, viewer metadata file 70 may further comprise a list of specific system events, typically arranged in reverse chronological order, with each entry defining the nature of the event, the date the action taken and, optionally, an elapsed time value.

Modeling System Additional Embodiment

FIGS. 9B-C illustrate the process flow between components of modeling system 35 to update a viewer's model and channel model, retrieve new content and determine if such content is suitable for ranking according to the system model of the viewer's emotional motivation according to another embodiment of the disclosure. Referring to FIGS. 9A-C, viewer behavior, including events such as requesting a specific program, completion of the viewing of a content object, storing, or purchasing of content causes viewer system 32 to send event data packet(s) to behavior modeler 49 of modeling system 35 as illustrated by arrow A of FIG. 9A and decisional blocks 61 of FIG. 9B. Upon receipt of such event data, behavior modeler 49 modifies the channel model(s) 72, and, if necessary, viewer model 70 associated with the specific viewer, as illustrated by process blocks 62. In one embodiment, the event data received by behavior modeler 49 may include an identifier of the content object which was the subject of the event, the elapsed viewing time of the content object, a descriptor of an action such as storing, purchasing, changing the order of, specifying a like/dislike of, or deleting such content object, and identifiers of the channel to which the content object belongs, along with its ranking, and an identifier of the subject viewer or viewers. Behavior modeler 49 then retrieves from database 46 the model associated with the specific viewer and the metadata file 72A defining the channel. In addition, behavior modeler 49 also retrieves from database 47, the metadata file describing the content object. Next, behavior modeler 49 compares the received event data with metadata file 75 of the content object and the current viewer model 70 and modifies the channel model(s) 72 appropriately, (indicated by the circular arrow within behavior modeler 49), as illustrated by process block 62 of FIG. 9B.

Next, neuropsychological modeling engine 41 periodically requests the metadata file describing the current channel model associated with the viewer, as illustrated by arrows B and C of FIG. 9A. Upon receipt thereof, neuropsychological modeling engine 41 uses the metadata file describing the current channel to request from database 60 any indexed content material that may be relevant, as illustrated by arrow D of FIG. 9A and process blocks 63 of FIG. 9B. In an exemplary embodiment, neuropsychological modeling engine 41 examines the metadata file describing the current channel model and formulates and formats the database queries provided to database 60. In this matter, modeling engine 41 may be programmed to interact with the querying format of any number of different indexed content sources or content libraries, such as YouTube and various popular Web search engines, in addition to more traditional content providers such as cable service providers. Database 60 or other content source returns the metafiles for one or more content object satisfying the query to modeling engine 41, as illustrated by arrow E of FIG. 9A.

Neuropsychological modeling engine 41 examines the metadata file for the content object, and, in conjunction with the viewer's metadata file and/or channel model, calculates where on the mathematical model of human emotion, i.e. the emotion disc, described previously with reference to FIGS. 1-6, the viewers mood and motivational strength are relative to that specific content object. Specifically, modeling engine 41 examines the various values of the parameters within the metadata file for the content object, such as the genre of the program, actor, title, serious etc. and, in light of the metadata file associated with the viewer, specifically any preferences, and the channel model, having been updated in light of any preceding behavioral events computes where on the emotion disc Fear coordinate f, the Desire coordinate d, reside. From the values of Fear coordinate f and the Desire coordinate d, the angular position representing the viewers mood $\psi$ and the effect of the object on the viewer's mood and the motivational strength m, are determined using the mathematical relationships disclosed herein, as illustrated by process block 64 of FIG. 9B. If the resulting mood value $\psi$ is located in a desirable angular position on the emotion disc, based on the desired result, i.e. selection of the program or purchasing of the content, the content object qualifies for the channel in question and neuropsychological modeling engine 41 provides the motivational strength value m and the content object metafile to ranking application 42, as illustrated by arrow F of FIG. 9A and process block 68 and the "Y" branch of decisional block 65 of FIG. 9B. If the resulting mood value $\psi$ is located in an undesirable angular position on the emotion disc, the content object does not qualify for the channel in question. In such instance, no data is provided to ranking application 42. Instead, modeling engine 41 recomputes the mood value $\psi$ for any other channeling model associated with the same viewer model using the previously described process until there are no more channel models associated with the viewer, as illustrated by process block 67 and the "Y" branch of decisional block 66 and the "N" branch of decisional block 65 of FIG. 9B. Once a content object has been compared with all channel models, as indicated by "N" branch of decisional block 66, neuropsychological modeling engine 41 then compares the next content object within the query results from database 60 to each of the channel models 72, as indicated by "Y" branch of decisional block 71 and process block 73 of FIG. 9C. Once all content objects have been compared to all channel model 72 associated with a particular viewer, modeling engine 41 then utilizes the model of the next channel associated with the viewer model to generate another set of queries to database 60, in the manner as previously described. Thereafter, the process from process blocks 63 and thereafter repeats, as described previously relative to the next channel model associated with the same viewer model. Once all channel models have been updated in relation to the same viewer model, other channel models associated with other viewer models within the system may be similarly updated at the occurrence of a viewing event, with a predetermined periodicity, or based on some other criteria.

Ranking application 42 examines the m value provided by neuropsychological modeling engine 41 and generates a value representing the relative ranking of the content object relative to other content objects in the data structure associated with the specific viewer channel 90. Channel 90 may be implemented using the data structure 95 illustrated in FIG. 12C in conjunction with any number of other data structures, including bidirectional stacks, doubly linked lists, etc. and contains a plurality of entries for holding any of an address, identifier or link to the actual file containing the multimedia content in database 47. Note any number of different channels may be associated with the same viewer.

In the disclosed embodiment, the process performed by modeling engine 41 is performed for each content object and for each channel associated with a specific subject viewer. In this manner, the rankings of content objects for a specific viewer can be updated periodically, for example, daily, every 8 hours, etc. Note that neuropsychological modeling engine 41 rather than computing values for the Fear coordinate f and Desire coordinate d, for every content object may utilize a look-up table which, given the weighted input values of the dominant preferences from a channel model 72 and viewer model 70 generates appropriate values for Fear coordinate f and Desire coordinate d.

FIGS. 10A-C illustrate conceptually the data structures utilized by neuropsychological modeling engine 41, ranking application 42 and behavior modeler 49 to create ranking of content objects. FIG. 10A illustrates conceptually a viewer metadata file 70. In addition to viewer information such as gender, age, marital status, subscription type/level and a viewer identifier, the viewer metadata file 70 also contains information useful to behavior modeler 49 and neuropsychological modeling engine 41, such data as a list of preferences to any of actors, genres, producers, specific topics of interest, specific topics of disinterest, any of which has associated therewith a type identifier and a weighted preference value, usually an integer value selected from a range of possible values, e.g. on a scale of 0 to 100. Such preference information may be derived from the viewing history which has occurred by behavior modeler 49. In addition, viewer metadata file 70 may further comprise a list of specific system events, typically arranged in reverse chronological order, with each entry defining the nature of the event, the date the action taken and, optionally, an elapsed time value.

FIG. 10B illustrates conceptually an exemplary channel model 72 comprising metadata file portion 72A and accompanying bucket buffer area 72B for data relevant to a particular viewers viewing history, but delineated on a preference by preference basis. The metadata file portion 72A of channel model 72, in one embodiment, contains a list of dominant preferences and accompanying values, usually an integer value selected from a range of possible values, e.g. on a scale of 0 to 100, as well as sub-dominant preferences and respective accompanying values. Bucket portion 72B of channel model 72, in an exemplary embodiment, contains multiple sub-bucket areas each containing its own preference identifier and storage area for event data. Such data may be contained within the bucket in an unsorted or chronological order, but in a format which is recognizable by behavior modeler 49 and neuropsychological modeling engine 41. In this manner, specific parameters such as favorite actor, favorite genre, specifically requested topics, content most purchased or stored, etc., may have historical data factored into a respective preference value, and a determination of which parameters will be weighted most heavily within a specific viewers channel identified by behavior modeler 49 accordingly. In an exemplary embodiment, in process block 62 of FIG. 9B, behavior modeler 49 will determine the nature of each event from viewer system 32 and consider the metadata associated with the content object, the viewer model, and the dominant preferences of channel model metadata file 72A, the relationships between which may have been previously derived and embodied into predetermined formula to achieve the most accurate representation of a viewer's emotional motivation for a particular content object. Behavior modeler 49 then manipulates the respective weight of one or more dominant and subdominant preferences within channel model metadata file 72A. For example, the repeated viewing of the movie with a particular actor will cause an increase in the weighted value of the dominant preference for that actor relative to other dominant and/or subdominant preferences, such as producer, specific genre, or category of interest within the channel model metadata. In this manner, the combined weight of dominant and subdominant preferences within channel model metafile 72A remains substantially constant while the respective weights of the individual constituent preferences may vary dynamically per viewing events. As such, the metadata parameters of a channel model 72 are being continually updated and compared with each other to determine which preferences are currently more heavily weighted given the immediate past viewing history of the viewer. When a viewing event occurs, as described herein, behavior modeler 49 will update the appropriate preference bucket areas within section 72B or instantiate a new bucket region within the model, the model being dynamically expandable. Behavior modeler 49 then determines based on the event whether any of the preference values associated with either the dominant or sub dominant preferences need to be modified, and makes any changes to the preference values in section 72A, if appropriate. When requested by neuropsychological modeling engine 41, behavior modeler 49 transmits the metadata portion 72A from which modeling engine 41 generates request queries using the dominant and subdominant preferences, after reviewing their respective accompanying values.

Viewer System

FIG. 11A illustrates conceptually a viewer interface system 32 relative to public network 30, content provider sources 34 and 36 and modeling system 35 in accordance with the disclosure. Also illustrated in FIG. 11A is the remote control 88 associated with display 80. The viewer system 32 comprises a first or right brain user interface display 80, used predominantly for viewing of video content which, in the illustrative embodiment, may be implemented with television display 80 and an accompanying remote control 88. Display 80 may be implemented with a "connected TV" or other devices that connect the TV to the networks 30 or 31 such as a connected Blu-ray player or a connected game console, e.g. a device capable of connecting directly to the Internet, e.g. network 30, as well as a cable packet network or satellite network, e.g. network 31. Viewer system 32 further comprises a second or left brain user interface 84 which presents a content surfing interface and purchasing interface and may be implemented on a Personal Digital Assistant (PDA) or smart phone, tablet computer or even laptop computer. Such second user interface predominantly uses and/or stimulates activity in the left hemisphere of the human brain, and also, to a limited extent, the right hemisphere of the human brain. A viewer will typically utilize the second user interface 84 to perform activities such as storing, purchasing, changing the order of, specifying a like/dislike for a particular content object within the rankings of a channel 90. Viewer system 32 further comprises optional, third and fourth user interface 86 and 87, respectively, capable of presenting both the textual based interfaces for content surfing and purchasing, as well as visual content and may be implemented with a traditional personal computer, including a desktop or laptop system, as well as other systems. In an exemplary embodiment, display 80 presents visual, non-textual information while one, two or all three of phone/PDA 84, personal computer 86, and/or tablet computer 87 display textual information, such as a representation of the content contained with channels 90A-C of FIG. 12B, or other textual based data. Note also that personal computer 86 and tablet 87 may also be used to display visual information. The predominance of brain activity for the various user interfaces in viewer system 32 is indicated in the table below:

Display 80: full Right, minimal Left
Tablet 87: mainly Left, limited Left, full Right optionally
Smartphone/PDA 84: mainly Left/limited Left, limited Right optionally
Personal Computer 86: full Left, limited Right optionally In the disclosed embodiments, the elements of viewer system 32 may be implemented with existing commercially available technology. For example, display 84 may be implemented with any number of smartphones or personal digital assistant devices including, but not limited to the Apple iPhone and Android operating system based smartphones commercially available from any number of manufacturers including Samsung, HTC, Alcatel, Acer, Sony Ericsson, HTC, LG, Google Nexus, ZTE, Motorola, etc. This display 87 may be implemented with the tablet computer including, but not limited to the Apple iPad and Android operating system based tablets, commercially available from any number of manufacturers including Acer, Archos, Dell, Motorola, Samsung, Sony, Toshiba, ZTE, etc. . . . . As described previously, display 80 may be implemented with a connected TV, as well as a traditional television display devices which rely on supplemental equipment, such as set top box 82, for connection to a source of content, including, but not limited to those commercially available from any number of manufacturers including LG, JVC, Panasonic, Philips, Samsung, Sharp, Sony, etc.

Display 86 may be implemented with any number of computer systems including, but not limited to the Apple iMac and IBM PC compatible personal computers, commercially available from any number of manufacturers including Acer, Hewlett-Packard, Asus, Samsung, Sony, Dell, Toshiba, etc. Set top box 82 may be implemented with any number of commercially available set-top box devices or gaming platforms of either an open architecture or proprietary architecture, depending on the source of the content accessed thereby, including those commercially available from any number of manufacturers including Sony Playstation, Apple Mac Mini, Nintendo Wii, Microsoft Xbox, etc. Remote 88 may be implemented with any number of standard design remote controls from TV manufacturers, or, alternatively, may be implemented with an if market remote such as those manufactured by Logitech, Inc.

According to the disclosure, the traditional cursor navigation controls of remote 88 are utilized as the primary mechanism for surfing the channel(s) of previously aggregated and ranked content associated with the viewer's neuropsychological profile, as described previously. The traditional functions of the cursor navigation control commands generated by remote control 88 may be overridden and/or redirected utilizing a redirection application 85 selectable with the remote or directly from the front panel of display 80. Such programs may execute either directly on the processor and operating system of display 80 in case of a connected TV or other connected devices, or, alternatively, on the set top box 82 associated with display 80, or remotely on server 40 of modeling system 35 remotely connected to viewing system 32 through public network 30.

In an exemplary embodiment, each of the cursor navigation controls are redirected to initiate retrieval and review of a content object which has been previously ranked within a channeling, as described herein. FIG. 11B illustrates the algorithmic processes performed by redirection application 85. First, upon activation, application 85 waits for commands signals sent remotely from remote control 88. As will be understood by those reasonably skilled in the arts, such signals may be transmitted through either tangible electrical conductors or wirelessly through any number of technologies, including optical, microwave, etc. Application 85 examines the data of a received signal, typically the field within a header file or data stream which identifies a command, to determine if the received signal associated with a received command identifies one of the signals to be redirected, such as the Up, Down, Left and Right cursor navigation signals of remote 88. If so, depending on which cursor navigation command is received, the redirection application 85 transmits to modeling system 35 the data necessary to identify the new content object to be viewed. Such data may be implemented in any number of different techniques, such as with a memory off-set to a currently or recently viewed content object, with a sequence number identifying the next content object within the channel data structure 95, or with a resolvable link retrieved from the metadata file contents associated with the currently displayed object, as stored locally within viewer system 32 or remotely within modeling system 35.

FIG. 11C illustrates the algorithmic processes performed by server application 51 of modeling system 35 upon receipt of handle or reference data from redirection application 85 identifying the next content object to be displayed. Depending on the nature of the handle or reference data, server application 51 resolves any addresses, links or references to the next content object to be displayed and then retrieves the metadata file associated with such content object, typically from database 47. Thereafter, the actual data associated with content object is retrieved from database 47 and streamed to first user interface 80 of viewer system 35 via either public network 30 or private network 31, depending on the exact implementation of the system. Simultaneously with the initiation of content streamed to viewer system 32, server application 49 may start a timer to determine the last time until streaming is terminated, typically when the next content object to be viewed is selected. Upon receipt of a command to terminate streaming, server application 51 transmits a value representing the elapsed time of the previously reviewed content object along with the metadata of the content object to behavioral model module 49 for updating of the viewer's behavioral model. Other available commands may similarly cause content streaming to terminate and the viewer's behavioral model to be updated with the elapsed time, including, but not limited to, channel up/down, back button (results in starting another content object), pause, fast-forward, rewind (within the content object), etc. Alternatively, rather than maintaining an elapsed time value, server application 51 may examine the time code embedded within the header of the last streamed data packet to determine approximately how much of the content object was viewed by the viewer before streaming was terminated. Data representing the elapsed time based on this value can then similarly be sent to behavioral model module 49. Thereafter, a similar process occurs for identifying, retrieving and streaming the next content object to be viewed.

Both Implicit and explicit data/events can cause "arrow A" function. Implicit data/events may include:

Basic viewing operation events (either from right brain user interface on display 84, 86, 87 or using remote control 88):

Play (request a specific program, continue viewing of content object)

Pause

Fast forward/rewind

Stop (completion of viewing)

Surf to other content object within channel

Surfing to other channel

Purchasing of content

Sequence of events within a certain time frame (e.g. surfing multiple times back and forth to a certain content object)

Operation around a certain time frame "within" the content object e.g. surfing away when a commercial starts, a bloody scene, . . .

Explicit data/events may include:

Provide feedback using the colored buttons on the remote control 88 (or equivalent right brain user interface element of display 84, 86, 87)

Manage channel using left brain user interface on display 84, 86, 87

Enter search term using left brain user interface on display 84, 86, 87

Additional commands that may result in transmission of a new content object Include Double arrow left, Double arrow right, Back button, and "OK" button (if it is an item that should be purchased only a trailer is retrieved when accessing this item using the arrows; OK triggers the transmission of paid content).

The process of utilizing the cursor navigation controls to perform multi-dimensional surfing of content objects within a particular viewer channel is illustrated with reference to FIG. 12A-B. Referring to FIG. 12A, a multidimensional channel 90 is shown conceptually to illustrate the concept of multidimensional surfing of content along desire and time vectors 92 and 94, respectively, using traditional cursor navigation controls 91, 93, 95, and 97. Specifically, channel 90 associated with a specific subject/viewer includes a first plurality of content objects $C1t, C2t, C3t, C4t, C5t, \ldots Cnt$ along a first dimension 92 which had been arranged in order decreasing desire, typically from highest to lowest. In an illustrative embodiment, activation by the viewer of the Up cursor control 91 initiates viewing of the next content object in dimension 92 of channel 90 for which the subject/viewer will have an increased motivational desire to view or purchase the content thereof. Similarly, activation by the viewer of the Down cursor control 97 initiates viewing of the next content object in dimension 92 of channel 90 for which the subject/viewer will have an decreased motivational desire to view or purchase the content.

One or more of the first plurality of content objects $C1t$-$Cnt$ have associated there with through links or references, a second plurality of content objects related chronologically along a second dimension 94 and which share one or more common metadata parameters. For example, as illustrated, content object $C4t$ has associated therewith a plurality of content objects $C4t-1, C4t-2, C4t-3, C4t-4, \ldots C4t-n$ arranged chronologically in a first direction, for example, sequentially in order of increasing age in the leftward direction. Content object $C4t$ also has associated therewith a plurality of content objects $C4t+1, C4t+2, C4t+3, C4t+4, \ldots C4t+p$ arranged chronologically in a second direction, opposite the first direction, for example, in order of decreasing age in the rightward direction. In an illustrative embodiment, activation by the viewer of the Left cursor control 93 initiates viewing of the next content object in the leftward direction of dimension 94 of channel 90 for which the subject/viewer will have at least the same motivational desire to view or purchase the content. Similarly, activation by the viewer of the Right cursor control 95 initiates viewing of the next content object in dimension 94 of channel 90 for which the subject/viewer may have also have at least the same or different motivational desire to view or purchase the content.

Accordingly, utilizing the disclosed multidimensional channel configuration, the Up and Down cursor navigation controls 91 and 97, respectively, of remote 88 may be utilized to move through the content objects in the first dimension 92 that have been previously ranked by modeling system 35 associated with the currently viewed channel 90 while the Left and Right cursor navigation controls 93 and 95, respectively, of remote 88 may be utilized to surf backward or forward in time, respectively for content, for example, for past or future episodes of the same program currently being viewed or just viewed. Also illustrated in phantom in FIG. 12A are other possible selection options to illustrate that a content object may be accessed from multiple dimensions, at the discretion of the system designer. Any of the second interface 84, third user interface 86, or fourth user interface 87 of viewer system 32 may also be utilized to access the content objects of either dimension 92 or 94 of a channel 90.

FIG. 12B illustrates conceptually the implementation of channel 90 associated with a specific subject/viewer within database 48. Channel 90 may comprise a plurality of channels 90A-C, stored in database 48 of modeling system 35. As illustrated, channel 90A comprises a plurality of groups. In one implementation first dimension 92 of channel 90 in FIG. 12A is illustrated by Group 1 in FIG. 12B while second dimension 94 is represented by Group 2 of FIG. 12B. The content objects within Groups 1 and 2 may be linked depending on the nature of the implementation of each slot or ranking location within the channel data structure. In another implementation, each of Groups 1-n may represent a single dimension. Note that a group may have multiple or single items therein. Channels 90B and 90C may be implemented similar to or different than channel 90A.

FIG. 12C illustrates conceptually a sample data structure 96 from which the groups within channels 90A-C may be constructed. The structure 96 may be implemented as an object, record, file or other storage construct and may comprise a field or parameter identifying its associated content object, and an address or link resolvable to a storage location at which the actual content object may be retrieved. In addition, data structure 96 may further comprise, optionally, a position value, identifying its position within the group/channel, as well as one or more links references or pointers to adjacent data structures. Such adjacent data structures represent those content objects accessible within channel 90 along the first dimension 92 or second dimension 94 utilizing the cursor navigation controls of remote control 88 in conjunction with redirection application 85, as disclosed herein. Data structure 96 may have none, one or multiple pointers or references associated therewith. Data structure 95 may further comprise a field or parameter identifying the viewer and/or channeling with which the content object is associated.

Referring to FIG. 12D, C1$t$, . . . C$n t$: is further referred to as "the horizontal dimension"; this is the main dimension of a channel; content in this channel is indeed selected according to the ranking of the content; however, the ordering of the content could be motivational in which case then C$n t$ is the content with the highest rank, or time-based: in which case C$n t$ is the most recent item. C4$t$-3, . . . C4$t$-1: is the dimension that is entered when pressing the double left arrow once in the position of item C4$t$; content is related according to a certain metadata item e.g. episodes of a series and ranked according to its age (oldest episodes on the left) once in this dimension again the left and right buttons are used to navigate this dimension; to leave this dimension selection of "back" will return to C4$t$. C4$tu$1, . . . C4$tu$3: is the dimension that is navigated to when pressing the up button when based on item C4$t$; note that in this "upper" dimension content with the highest motivation for viewing/buying is in the most accessible position i.e. C4$tu$1, with decreasing motivation when going up. C4$td$1, . . . , C4$td$3: is the dimension that is navigated to when pressing the down button when based on item C4$t$; note that in this "down" dimension content with the highest motivation is in the most accessible position i.e. C4$td$1; hence, motivation is decreased when going down. Hence, it is not necessarily the case that going up or down always represents higher motivation; it depends on the context i.e. relative location towards the C4$t$item. In one embodiment, content in the up dimension is from one source (i.e. VOD), content in the down dimension from another (i.e. YouTube). FIG. 11D illustrates conceptually the algorithmic processes performed viewer system 32 to perform the above-described navigation and display of content objects.

Distributed Upload System

The foregoing disclosed systems may be utilized in conjunction with the distributed upload system described hereafter. Referring specifically to FIGS. 13A-B, selected elements of the network environment 38, as illustrated in FIGS. 7, 8 and 11A, are shown conceptually. Specifically, FIG. 13A illustrates a plurality of viewer systems 32$a$-$n$ operably coupled to both a content source 36 and a modeling system 35. Viewer systems 32$a$-$n$ may be implemented as described previously herein with the additional modification as described below. Similarly, modeling system 35 may be implemented as described previously herein. Content source 36 may be implemented as previously described herein with reference to source 60 of FIG. 9A which contains indexed content material, or, any of content providers 34 or 37 of FIG. 7, or, may comprise any of Cable TV service provider through cable packet network, Satellite TV service provider through satellite network, or live broadcast over the internet (internet TV).

FIG. 13B illustrates an alternative conceptual network configuration, similar to FIG. 13A, except that content file source 30 communicates with modeling system 35, in addition to, or in place of viewer systems 32$a$-$n$.

FIG. 14 illustrates conceptually selected elements of viewer interface system 32 relative to public network 30, content provider source 36 and modeling system 35 in accordance with the disclosure. The viewer system 32 comprises a first or right brain user interface display 80, used predominantly for viewing of video content which, in the illustrative embodiment, may be implemented with television display 80 and an accompanying remote control 88. Display 80 may be implemented with a "connected TV" or other devices that connect the TV to the networks 30 such as a connected Blu-ray player or a connected game console, e.g. a device capable of connecting directly to the Internet, e.g. network 30, as well as a cable packet network or satellite network, e.g. network 31. Viewer system 32 further comprises a second or left brain user interface 84 which presents a content surfing interface and purchasing interface and may be implemented on a Personal Digital Assistant (PDA) or smart phone, tablet computer or even laptop computer. Such second user interface predominantly uses and/or stimulates activity in the left hemisphere of the human brain, and also, to a limited extent, the right hemisphere of the human brain.

In the illustrative embodiment, television display 80 further comprises an application process 100 for interfacing with content provider source 36 and modeling system 35. Specifically, application 100 comprises modeling system interface process 102 and crawler process 104. Modeling system interface process 102 enables viewer system 32 to interact with source 36 and modeling system 35 in a manner described hereafter with reference to FIGS. 13A-B. Crawler process 104 interacts with process 102 and content source 36, and, where applicable, a scheduling application or electronic program guide function 106 associated with content source 36 in a manner described hereafter.

Crawler process 104 interacts with content source 36 and modeling system 35, via process 102, in the following manner. Crawler process 104 continuously queries scheduling function 106 associated with content source 36 to determine which content programs are currently accessible for download streaming from the content source 36 to viewer system 32. The determination of such accessibility will typically be defined by the viewer's subscription agreement with the content source provider. Each time process 104 identifies content to which the viewer has legally authorized access, crawler process 104 initiates download streaming of the content to display 80 and buffers a fractional percentage of the content in memory associated with display 80, along with selected metadata associated with content, including data identifying the content, and one or more temporal or sequential identifiers or markers identifying the specific portion of the content contained within the buffer, as illustrated by arrow A of FIG. 13A. FIG. 13C illustrates conceptually an algorithmic processes to capture and upload of content object fractions y viewer system 32. Crawler process 104 then transmits to process 102, one or more packets of data containing the buffer content along with the information identifying the content, or, alternatively, provides the addresses in memory where such information is stored and accessible by both processes. Process 102 appends to this information, a data structure 120, as illustrated in FIG. 15 and transmits or streams such information to modeling system 35, as illustrated by arrow B of FIG. 13A. In one embodiment, process 102 may query aggregation server 110 of modeling system 35 to determine if a complete copy of the content object already resides with the aggregation server database 112 or database 47. If so, process 102 will send only the data structure 120 to the aggregation server 110 to eliminate unnecessary network bandwidth utilization. If aggregation server 110 requires a specific segment of the content object, it will specify to process 102 the specific segment(s), identifiable by temporal or sequential identifiers. Process 102 will provide such information to crawler process 104 for forwarding and acquisition of the content to/from the source 36.

Referring to FIG. 15, in one embodiment, data structure 120A may comprise data identifying a the content object and/or a portion thereof 122A, temporal or sequential identifiers associated with the content object 124A, and authorization indicia 126A identifying a viewer process. In addition, data structure 120A may further optionally comprise data 128A identifying a user defined channel associated with the viewer process 127A and data identifying an encryption key 129A for decrypting the content object.

In the illustrative environment, the authorization indicia 126A may take any number of different forms including one or more binary values arranged in a mask, special codes, keys, hash values, etc. In addition, such authorization indicia 126A may be received from the content source 36 or may be derived therefrom by process 102. In an embodiment in which the content object from content source 36 is provided in an encrypted form, decryption keys or codes may be similarly provided to modeling system 35 by process 102 as part of the authorization indicia 126A.

The functionality performed by crawler processes 104 is repeated, continuously while display device 80 is operably connected to content source 36, for all content to which the viewer process has access. Process 104 may utilize the channel selection drivers associated with display 80 or any associated cable box 82, as applicable, to query source 36. In addition, the functionality performed by crawler process 104 occurs typically without any video or audio content being read from the display buffer to the actual display itself. In this manner, such process may be conducted while the viewer is not utilizing the system, e.g. during system "down time" and transparently without the viewer being aware.

In the illustrative embodiment, referring to FIG. 8, modeling system 35, further comprises an aggregation server 110 and accompanying database 112 and network streaming interface 114. The data contained within the structure 120 received from process 102 of the viewer system 32 is utilized by aggregation server 110 to assemble a complete copy of the content object for retention within database 112 or 47, as applicable. Specifically, an application process within aggregation server 110 utilizes the temporal or sequential identifiers or markers associated with the content and arranges the received portion of the content according to its relationship to other portions previously received. In this manner, a complete copy of the content object (program) is assembled from a plurality of viewer systems 32a-n and retained by modeling system 35 for later viewing upon request of any of the viewer systems 32a-n authorized to view such content. Specifically, when a viewer requests a content object as part of a viewer channel 90, or specifically through interface 84, aggregation server 110 determines if the identified content object is stored in database 112. If so, the streaming interface 114 will verify that the requesting viewer is authorized to view such content, and, upon confirmation thereof, begins streaming the content to the requesting system 32, as illustrated by arrow C in FIG. 13A. FIG. 13D illustrates conceptually an algorithmic process of a request from viewing system to modeling system for viewing content object(s). Aggregation server 110 maintains within database 112 records for each viewer system 32 indicating which content objects within database 112 the viewer is authorized to download, such records being continually updated via processes 102 and 104 for each of the viewer systems 32a-n. In this manner, each of the viewer systems 32a-n authorized to view a specific content may view the content at will, upon request, at a time which is not the same as the time frame in which the content provider, such as a cable service, make such content available.

FIG. 13B illustrates a second embodiment of the disclosed technique in which the content source 36 is operably coupled over a network with modeling system 35, and, specifically, aggregation server 110. In this embodiment, content source 36 can upload to aggregation server 110 at least one copy of all or select content objects, thereby eliminating the need for each of viewer systems 32a-n to upload fractional portions of content to viewing system 35 in the previously described manner. FIG. 13E illustrates conceptually an algorithmic process to upload of content object metadata and fraction to aggregation server. In this embodiment, crawler process 104 also continuously queries scheduling application 106 associated with content source 36 to determine which content programs are currently accessible for download streaming from content source 36 to viewer system 32. Again, the determination of such accessibility will typically be defined by the viewer's subscription agreement with the content source provider. Each time process 104 identifies content to which the viewer has legally authorized access, crawler process 104 initiates download of just the metadata associated with content, including data identifying the content, as illustrated by arrow A of FIG. 13B. Crawler process 104 then transmits to process 102, the information identifying the content. Process 102 appends to this information, the data structure 120, and transmits such information to modeling system 35, as illustrated by arrow B of FIG. 13B. As before, data structure 120 may comprise authorization indicia 126 received from the content source 36 or generated by process 102. In an embodiment in which the content from content source 36 is provided in an encrypted form, corresponding decryption keys or codes may be provided to modeling system 35 by process 102 as part of the authorization indicia 126.

In this embodiment, the content available from source 36 is also stored in database 112 associated with aggregation server 110 and streaming interface 114. As before, aggregation server 110 maintains within database 112 records for each viewer system 32 indicating which content objects within database 112 the viewer is authorized to download, such records being continually updated via processes 104 and 102 of each of the viewer systems 32a-n. When a viewer requests a content object as part of a viewer channel 90, or specifically through interface 84, streaming interface 114 will verify that the requesting viewer is authorized to view such content and, upon confirmation, begin streaming the content to the requesting viewer system 32, as illustrated by arrow C in FIG. 13B.

User Interface for Presentation and Surfing of Multiple Content Objects

According to one aspect of the disclosure, a system and technique for presenting multiple, simultaneous content object data streams on a user interface is provided in a manner that facilitates surfing by the viewer in multiple dimensions. A primary content stream, representing the currently selected content object within a dimension of a viewer channel, is presented in a substantial portion of the right brain user interface display area while a plurality of secondary content object data streams, representing selectable content objects to which the viewer may navigate, are presented in smaller sized or thumbnail format in the balance of the display area of user interface. The multiple secondary content streams presented on the user interface each represent selectable content objects having a queued relationship to the currently selected primary content object data stream. Such a queued relationship may exist between and among different content object streams in the same dimension of a viewer channel or between separately selectable portions of a single content object stream or program, or between different content objects in this dimensions of a viewer channel, e.g. chronologically arranged episodes of the same program.

The process of utilizing the cursor navigation controls to perform multi-dimensional surfing of content objects within a particular viewer channel is described herein with reference to FIGS. 12A-B. FIG. 12A illustrates conceptually a multidimensional channel 90, which facilitates multidimensional surfing of content along desire and time vectors 92 and 94, respectively, using traditional cursor navigation controls. FIG. 12B illustrates conceptually the implementation of channel 90 associated with a specific subject/viewer within database 48. Channel 90 may comprise a plurality of channels 90A-C, stored in database 48 of modeling system 35.

The process by which navigation controls may be utilized to perform multi-dimensional surfing and viewing of content object streams displayed on viewer system 32 within a particular viewer channel 90 is described with reference to FIGS. 16-22 referring to FIG. 16, database 48 of modeling system 35 interacts with content database 47 or other content sources 34, 36 to ensure that a data stream representing the content object(s) within viewer channel 90 are buffered in memory associated with viewer system 32 for rendering and display on display 80.

Viewer interface system 32 comprises the right brain user interface display 80, used predominantly for viewing of video content and an accompanying remote control 88. As noted previously, display 80 may be implemented with a "connected TV" or other devices that connect the TV to the networks 30 or 31 such as a connected Blu-ray player or a connected game console, e.g. a device capable of connecting directly to the Internet, e.g. network 30, as well as a cable packet network or satellite network, e.g. network 31. FIG. 16 illustrates conceptually the relationship between the components of display 80 (in phantom), including User Interface (UI) display area 120, graphics engine 115, a primary stream buffer 116 and multiple secondary stream buffers 118a-n associated with the content objects comprising a viewer channel. Graphics engine 115 is typically part of display 80 and controls the streaming, decryption, windowing, and rendering of multiple data streams based on the content data and command/formatting data contained within the data packets associated with each stream. Buffers 116 and 118 may be implemented as segmented sections of local memory associated with graphics engine 115, or, alternatively, may be stored separately and remotely from display 80. Display 80 and viewer system 32 are connected through the network 30, represented as a cloud in FIG. 16, to modeling system 35 and the source of the content object data streams, typically any of database 34, 36, 37 or 47. A multitasking/multi-threaded operating system may be used in viewer system 32 to control the streaming, buffering and rendering of the content object data stream. Specifically each stream may have associated therewith multiple threads of execution, including a thread for buffering and one or more threads for formatting and rendering the content object data on display area of display 80. As illustrated in FIG. 16, the primary content object stream has a buffer 116 associated therewith and one or more threads, labeled collectively as 117. The plurality of secondary content object streams each have a perspective buffer 118a-n associated therewith and respective sets of one or more threads, labeled collectively as 119a-n, as illustrated. In the disclosed embodiment, primary content object data stream 128 is continuously streamed from its original source via its respective buffer while secondary content object data streams 121-126 may optionally loop through a portion of their respective content, typically the first several minutes or another amount stored in each of the respective buffers. In this manner, the presentation of visual information to the viewer on UI display area 120 is more informative, particularly regarding secondary content object data streams 121-126, will efficiently using processor resources within graphic engine 115 and network bandwidth into and out of viewer system 32.

Each content object having data streamed to display 80 has associated therewith a data structure 111, as illustrated in FIG. 17, which comprises information relating to the viewable parameters of the content object, including, but not limited to formatting parameters, status, navigation options and proprietary rights data. In addition to metadata relating to the content object, such as the object identifier, format identifier, links to other content objects within the viewer channel, the memory address where the data comprising the object is stored, and the size of the content object, data structure 111 further comprises data fields indicating the license status of the object, whether free (prepaid), pay-per-view, or pay for limited use, elapsed viewing time, whether the content object was compiled by modeling system 35, the name of someone recommending the content object, an image of the person recommending the content object, and other data necessary for representation of the various graphical elements and indicia surrounding the rendering of the content object, as explained in more detail with reference to FIGS. 18-22.

Referring to FIGS. 18 and 21, the UI display area 120 of display 80 is illustrated. Multiple content object data streams are capable of being simultaneously presented in UI display area 120. A primary content object data stream 128, illustrated in phantom, representing the currently selected content object within a dimension of viewer channel 90, is presented in the substantial majority portion of the UI display area, while a plurality of secondary content object data streams 121-126, representing selectable content objects within the viewer channel to which the viewer may navigate, are presented in smaller-sized or thumbnail format at the bottom of the UI display area 120. In this manner, the multiple secondary content object streams presented on the user interface each represent selectable content having a relationship to the currently selected primary content object stream. In FIG. 18, the plurality of secondary content object data streams 121-126, and icon 127 representing the primary content object data stream, arranged along the bottom dimension of UI display area 120, and may be associated, for illustrative purposes, with the time or second dimension is described elsewhere herein. Similarly, in FIG. 18, icon 127 and the plurality of secondary content object data streams 121-126, arranged along a side dimension of UI display area 120, and may be associated, for illustrative purposes, with the association or first dimension, as described elsewhere herein. Note that icon 127 and the secondary content object data streams 121-126 may be arranged vertically along either the left or the right side of UI display area 120. The thumbnail frames representing the content object streams of a dimension may be arranged linearly along any portion of UI display area 120 including any of the left, right, top, and bottom sides of UI display area 120. Alternatively, other arrangements of the thumbnail frames may be utilized within UI display area 120, for example circular or cluster arrangements of the thumbnail frames to provided the viewer with navigable options representative of the dimensions available for surfing relative to the currently displayed primary content object data stream 128.

Referring to FIG. 19, and as described elsewhere herein, such a queued relationship may exist between and among different content object streams or between separately selectable portions of a single content object stream or program. For example, secondary content object data streams 121-126 may represent successively ordered content objects 131-136, respectively, relative to the primary content object stream 128, which represents the currently selected content object 138 in second dimension 94 in a viewer channel 90. Alternatively, secondary content object streams 121-126 may represent successively ordered content objects representing a viewer selectable segments of the currently viewed content object in display area 120. For example, a primary content object stream representing a news program may have separately selectable secondary content object streams for program segments directed to weather, sports, business/finance, consumer reporting, etc. As another example, a primary content object stream representing the sports section of a news program may have multiple separately selectable secondary content object streams representing different video clips of sports highlights within the sports segment. In a similar manner, referring to FIG. 19, a queued relationship may exist between and among different content object streams or between separately selectable portions of a single content object stream or program. For example, secondary content object data streams 121-126 may represent successively ordered content objects 131-136, respectively, relative to the primary content object stream 128, which represents the currently selected content object 138 in first dimension 92 in a viewer channel 90. Alternatively, secondary content object streams 121-126 may represent successively ordered content objects representing a viewer selectable segments of the currently viewed content object in display area 120.

In one embodiment, secondary content object data streams 121-126 are displayed on UI display area 120 for a predetermined period of time, e.g. between 2 to 20 seconds after the last navigation command, or for some other predetermined period of time, so as not to distract the viewer from the primary content object data stream 128. Pressing of a navigation command button on the remote 88 will cause secondary content object data streams 121-126 to reappear, therefore providing the viewer with the necessary video cues to facilitate surfing among the various content objects within a dimension of a viewer channel. In another embodiment, as the viewer navigates or "surfs" among the various content objects, selection of a new primary content object data stream 128 will cause the repositioning of the remaining secondary content object data streams 121-126 so that, relative to the frames or thumbnail window of the screen 120 in which the secondary content object data streams 121-126 are currently displayed, each of the secondary content object data streams 121-126 either: a) move gradually from its currently displayed window to an adjacent window; b) moves in substantially instantaneously from its currently displayed window to an adjacent window, or c) the frames or thumbnail window in which the secondary content object data streams 121-126 are currently displayed actually move across the screen 120, all under any of the foregoing techniques, either to the right or to the left depending on the nature of the navigation command selected by the viewer, as illustrated conceptually by the bidirectional phantom arrow in FIG. 20 of secondary content object data streams 121-123. In this manner, the relative order of the content object data streams in the viewer's memory is maintained to facilitate more efficient and more relaxed selection of content on the right brain interface. Similarly, any of the supplemental graphic indicia associated with the content objects, such as sidebars navigation indicators or icons will similarly scroll along with the content object with which they are associated. Referring again to FIG. 18, information relevant to identification of the currently viewed primary content object stream may be displayed on-screen, either temporarily or persistently, within UI display area 120, such information including, but not limited to, any of program name, type, date of original airing, current date and time, on-air status, current viewing start time, estimated viewing end time (based on current time), duration/elapsed viewing time, and recommendation posting time and name of third-party recommender or recommendation source if other than system 35 (in the case of content recommended from a third party through a social media channel, such as Facebook, etc.). In FIG. 18, such information is indicated by the box 113 within display area 120. Such information is typically stored within data structure 111 and may be displayed upon selection of the content object for viewing as the primary content object data stream 128 or upon selection of an appropriate command button on the remote control 88 of viewer system 32. In addition, such information may be presented in various colors, fonts, formats and with a level of opacity as determined by the system designer so as not to interfere with the viewers enjoyment of the presented video data stream. Alternatively, the information designated by box 113 may be presented not on display 80, but on any of displays 84, 86, or 87 of viewer system 32, so as to avoid textual data on the right brain interface.

In a similar manner, a subset of the information typically stored within data structure 111 associated with each of secondary content object streams 121-126 may be displayed within their respective frame or thumbnail windows, such information comprising any of the information described above as displayable in box 113 and in a format similar to that described above.

Referring to FIG. 20, the lower half of UI display area 120 is illustrated, including the icon 127 representing primary content object stream 128 and the secondary content object streams 121-123. In addition to providing an area on user interface display 120 where the primary and secondary content object streams may be displayed, viewer system 32, in conjunction with the graphics engine 115, utilizes various other graphic indicia associated with each content object data stream to provide further useful information to the viewer during his viewing/surfing experience in a manner that remains essentially true to the right brain experience, i.e. with a minimum of textual information. Icon 127 represents the primary content object stream 128 and its conceptual position within the viewer channel relative to the secondary content object data streams. In an alternative embodiment, icon 127 may represent both the primary content object stream 128 and each of the secondary content object streams 121-126 displays on user interface 120 when the source of both the primary and secondary content objects is the same, for example, when all content objects are from the same broadcast or network source, icon 127 may represent the logo of such source, or, alternatively, when all content objects are from system 35, icon 127 may comprise an icon or other graphic element associated with system 135.

The positions of secondary content object streams 121-123 within UI display area 120 relative to icon 127 conceptually indicate the position of secondary content objects along a dimension of the viewer channel relative to the currently selected primary content object stream 128, and provides the viewer with a point of reference from which to navigate in the current dimension of the viewer channel or two different dimensions using the navigation controls of the remote 88, as described previously. For example, pressing the left navigation button on remote 88, e.g. "<", will cause the primary content object stream 128 to change to the secondary content object data stream 123 to the left of icon 127. The former primary content object stream will then assume the position of secondary content object stream 124 and the other secondary content object streams will be reorder accordingly within the appropriate dimension of the viewer channel. Similarly, sequentially pressing the left navigation twice would have caused the primary content data stream 128 to change to secondary content object stream 122, with the other content objects being repositioned in order along the appropriate dimension of the viewer channel. In this manner, the viewer, using the navigational commands of remote 88, or other navigation control device as explained herein, may sequentially move through the displayed secondary content object data streams searching for a new primary content object data stream until the viewer finds content which is desirable to view. Similarly, selection of the right, e.g. ">", navigation button on remote 88 will cause similar navigation along the same dimension of the viewer channel with the same repositioning of content objects, but in the opposite direction.

In another embodiment of the disclosed system, double-clicking of one of the navigation command buttons of remote 88 may be utilized to navigate either a chronological order of a content object from chronologically ordered content objects or a vertical fear/desire dimension. Referring to FIG. 22, for example, if a viewer is currently watching primary content object stream 128 and single clicks the left navigation button on remote 88, e.g. "<", the primary content object stream 128 will change to secondary data content object data stream 123. As described previously, thereafter, double-clicking the left navigation button on remote 88, e.g. "<<", rather than advancing to the newly repositioned secondary data content object data stream 122 will switch to a new nested dimension in viewer channel 90, causing the primary content object stream 128 to remain the same, however, the secondary content object data streams 121-126, previously represented by content objects 131-136 in the second dimension (time) will then be represented by content objects 141-144, respectively, representing a new dimension nested relative to the second dimension (time) and the primary content object, such as previously aired episodes of the same program. For example, if the original set of primary and secondary content object data streams as presented on UI display area 120 represented, chronologically ordered content, such as sequentially arranged unrelated programs, after double-clicking the left navigation command of remote control 88, the surfing paradigm or dimension will change so that the new set of primary and secondary content object data streams represent episodes of the same program, including previously aired episodes of the same program currently being viewed as the primary content object data stream 128, as well as, if available, any as yet un-aired episodes, which may be available on pay per view basis, as represented by streams 124-126.

The use of the double-clicking of the directional navigation control is not limited to a particular dimension, e.g. either time or association, but may be utilized to access content objects within any nested dimension associated with a current primary content object stream. In another embodiment of the disclosed system that there is no limitation to the number or levels of nestings that may occur within a particular viewer channel. Any dimension of a channel may have multiple dimensions which may be successively accessed in a recursive manner.

In addition, the visual characteristics of icon 127 may be utilized to indicate to the viewer the status of the primary content object stream. For example, any of the color, shape, transparency, size, or other visual aspects of icon 127 may be associated with a specific parameter of the primary and secondary content object stream and may be manipulated by color, animation or in another manner, to indicate a change in the parameter value. For example, icon 127 may have a first shape or color for content objects recommended by system 35 and a second shape or color for content objects recommended by a third party or from a source other than system 35. In another embodiment, the icon or other graphic element may be used to indicate that the use or license status of the primary content object is about to change, for example, viewing more than a threshold percentage of the primary content object may automatically cause status of a content object representing a recorded broadcast program to change from "unviewed" to "viewed" or may automatically cause the purchase of content objects offered on a single or limited view basis. In such instance, the icon or other graphic element may begin to blink, pulse, modulate between colors, or change in any of shape, size, color or opacity, or may be associated with a sound or audio wave file, or any combination thereof, to indicate that a threshold condition is about to be met.

Similar to icon 127, the visual characteristics associated with secondary content object streams 121-126 may be utilized to indicate to the viewer various parameters of the secondary content object streams. For example, any of the color, shape, transparency, size, or other visual aspects of any frame or border surrounding the actual display area in which the secondary content object data stream is rendered may be associated with a specific parameter of the secondary content object stream and may be manipulated by color, shape, animation or in another manner, to indicate a change in the parameter value. Specifically, as illustrated in FIG. 20, a colored sidebar 129 associated with each of the selectable secondary content object streams indicates the license status of the content, e.g. blue for free, red for pay per view, etc. In another embodiment, each of the thumbnail frames representing selectable secondary content contains graphic indicia 139 indicating the navigational options to other queued content within a viewer channel, e.g. "^", "v", "<", ">" characters or symbols arranged around the thumbnail frame, as illustrated in FIG. 20. For example, the "^" symbol 139*a* above stream 121 or 123 indicates that the viewer, once having navigated to streams 121 or 123 for viewing as the primary content stream 128, may navigate since from the currently viewed primary content stream to another content object in the first dimension (e.g. association), while the "v" symbol 139*c* below streams 121 or 123 indicates that the viewer may navigate to another content object in the first dimension but in an opposite direction. Similarly, the "<" symbol 139*b* to the left of stream 121 indicates that the viewer, once having navigated to streams 121 for viewing as the primary content stream 128, may navigate to another content object in the second dimension (e.g. time), while a ">" symbol 139*d* (not shown in FIG. 20) to the right of stream 126 indicates that the viewer may navigate from the currently viewed primary content stream to another content object in the second dimension, but in an opposite direction.

In another embodiment, navigational directions and commands may be used to select free content versus paid content. For example, in a vertical navigation dimension, if the viewer pushes the down arrow navigation control on remote control 88, the viewer will be presented with free content. Conversely, if the viewer pushed the up arrow navigation control, the viewer will be presented with pay (pay per view) content. As another example, in a horizontal navigation dimension, if the viewer pushes the left arrow navigation control on remote control 88, the viewer will be offered free content of a previously broadcasted program. Conversely, if the viewer pushes the right arrow navigation control, the viewer will be presented with pay (pay per view) content, e.g. content that has not yet been broadcasted and which is viewable only for a fee.

In another embodiment, navigation commands used to surf through time, desirability/fear and other dimensions may originate from display remotes having accelerometers for detecting horizontal, vertical and other gesture patterns for use as navigation and selection commands on the right brain interface and/or left brain inter face, as well as from traditional remote control 88 with a standard up, down, right, left, and enter button command set. In such embodiments, a translation program, similar to redirection application 85 is utilized to translate the outputs from a controller having either an accelerometer or gyroscope into commands which may be utilized by modeling system 35 and viewer system 32.

According to another aspect of the disclosure, a channel may be associated with system 35 for instructional materials which the viewer to access regarding various functions and procedures associated with the system. Many broadcasters and content providers do not utilize channel "0". In the disclosed embodiment, channel 0 is the instructional channel for system 35. For example, at any time pressing the 0 button on remote 88 will cause the primary viewing stream to switch to one or more specific content objects associated with channel 0 and their instructional content for use of the system. Alternatively, such instructional content objects may be associated with another specific channel designator or icon for display on screen 128.

As noted previously, both primary and secondary content objects may be recommended from third parties or sources other than modeling system 35. The presentation format for such recommended content objects is illustrated in FIG. 21, where UI display area 120 presents a primary content object data stream 128 and multiple secondary content object data streams 121-126 of Internet content from YouTube or other Internet sources, each having been recommended by a source other than modeling system 35. The manner in which the viewer may navigate between and among the primary and secondary content object data streams 121-126 and 128 is similar as previously described herein, using navigation controls of remote 80 or other navigation input device. In the contemplated embodiment, in addition to navigating between and among the primary and secondary content object data streams, the viewer may navigate in a separate dimension among recommendation sources which may be either individuals, e.g., friends, family, etc., or specific sites on the Internet, e.g., YouTube, Facebook, etc. As illustrated in FIG. 21, a plurality of images 150, 152, and 154, representing the recommendation sources, are arranged on one UI display area 120 in a manner which allows the viewer to navigate among the recommendation sources using navigation commands from remote control 88. For example, the currently displayed set of primary and secondary content object data streams 121-126 and 128 may be associated with a recommender having an associated image 152. Use of the "up" and "down" navigation command buttons on remote 88 will allow the viewer to move from a dimension of content objects recommended by such source, to a dimension of content objects recommended by a recommender having an associated image 150. Images 150, 152 and 154 may have frames or orders which provide additional information to the viewer, similar to that previously described with content object data streams 121-126, for example, border around the image of the currently selected recommendation source may have a different shape, color and animation than that around the other images. Similarly, the loop buffering of any secondary content object data streams may likewise be implemented with content from such recommendation sources, as described previously.

Although the system described herein is intended to be utilized to display content compiled by modeling system 35, the reader can appreciate and understand that any content object may be utilized as the initial point of the viewing experience, including commercially broadcast channels from cable providers or other sources, including one or more virtual channels as described herein, and, thereafter, using the system described herein, the user may navigate to content objects which are either compiled by modeling system 35 or recommended from sources outside modeling system 35.

Virtual Channels

Referring to FIG. 23, a plurality of virtual channels 160-230 are illustrated conceptually relative to viewer systems 32a-b and a modeling system 35, as described herein, and other sources of content. Virtual channels 160-230 enable content objects from sources considered to have possible left brain content to be implemented in a right brain user interface in accordance with the objectives of the disclosure. Virtual channels 160-230 may be logically arranged similar to channels 90A-C of FIG. 12B and may contain content objects from a single source or multiple sources as described in greater detail with reference to FIGS. 24-31.

Referring to FIG. 24, a first type of virtual channel, Recommendation Channel 160, allows the posting of recommendations of friends and/or family or other individuals from other sources such as TWITTER, FACEBOOK, PICASA, VIMEO, groups within FACEBOOK, LINKEDIN, or any other website or networking mechanisms 162a-n to modeling system 35 for display via viewer system 32. One or more recommendation channels may be associated with a particular viewer profile. For example, in various embodiments, a single Recommendation Channel 160a may be defined by the user for posting all recommendations of friends/groups independent of the source, or, multiple recommendation channels may exist and may be defined per source, per group of sources, per friend, or per group of friends, illustrated in phantom as recommendation panels 160b-n. Such recommendation channel comprising content object recommendations from friends and/or family, colleagues, etc. may arranged in a queued manner and displayed with viewer system 32 as illustrated in and previously described with reference to FIGS. 21 and 23. Specifically, the viewer may navigate Recommendation Channel 160 in a separate dimension among recommendation sources which may be either individuals, e.g., friends, family, etc., or specific sites on the Internet, e.g., YOUTUBE, TWITTER, FACEBOOK, PICASA, VIMEO, groups within FACEBOOK, LINKEDIN, etc. As illustrated in FIG. 21, a plurality of images 150, 152, and 154, representing the recommendation sources, are arranged on one UI display area 120 in a manner which allows the viewer to navigate among the recommendation sources using navigation commands from remote control 88, in a manner as described herein. In the contemplated embodiment, recommendations may be forwarded to a viewer's Recommendation Channel 160 via a specific electronic mail address or other handle mechanism associated with the particular viewer system 32.

Referring to FIG. 25, a second type of virtual channel, a Program Director Channel 170 enables explicit (left brain) control over the experience of the viewing session and active control of the content of that channel. Management and set up of the Program Director Channel 170 may be performed on any of the left brain user interfaces 84, 86, or 87 of FIG. 11A to enable selection of content objects, posting of that content object in channel, ranking of the content object in the channel, and upfront payment of content, e.g. pay per view, if applicable, prior to display on the right brain display 80, via modeling system 35 and viewer system 32. Control commands and data from the left brain interface are provided to modeling system 35 which in turn generates the arrangement of content objects within the Program Director Channel 170 prior to its displayed on the right brain display 80. Note that sources of content objects for the program Director Channel 170 may be content sources within the system, such as database 47 of FIG. 8 or from external sources 172a-n which may be selected content providers 34, 36 or 37 or sources 162a-n. Program Director Channel 170 when used in conjunction with a Recommendation Channel 160 of another viewer, or a social media facility such as YOUTUBE, TWITTER, FACEBOOK, groups within FACEBOOK, LINKEDIN, etc., enables the viewer/director to act as program director in a broadcast-like manner enabling recommendations of content from a viewer to groups viewer/recipient's using a content object recommendation via others Recommendation Channels 160 or a social media facility such as Twitter. Such functionality may be useful to a viewer/director who is an expert in a certain subject matter, enabling the viewer to compose and maintain a complete expert channel via system 35 and/or subscriptions to social media facilities, as applicable.

Director Channel 170 may be useful for viewers who love film, viewers who want to plan a specific viewing session, professionals who want to schedule a specific presentation sequence, such as a demo for a customer. Viewers who also subscribe to third party content subscriptions such as Netflix or Lovefilm (UK) can have content from such sources integrated into the viewer's regular channel through the recommendation system 35 described herein according to the calculation of the fear and desire component of the content object for that particular viewer's profile, in a manner as previously described herein. Using the left brain user interface 172 and display system described herein, viewers can actively schedule content objects coming from sources such as Netflix or Lovefilm into a dedicated Program Director Channel 170 and determine the location in queue of each content object in that channel.

In addition, using the foregoing, system 35 enables a viewer to take an "option" to view video on demand content objects by scheduling them to one of the virtual channels described herein, using either remote control 88 of the viewer system 32 or utilizing the Program Director Channel 170. For example, a content object recommended by system 35 or a content object actively retrieved from a remote source such as either Netflix or Lovefilm may be a movie which a viewer would like to see but for which he/she is either not in the current mood or does not have the time or money to commit to purchasing at that exact instance. Instead, the viewer create an option, typically in the form of a link which includes access data and the metadata describing the content object, including its price and viewing availability, into one of the channels described herein or into a separate virtual option channel similar in logical structure and function to Program Director Channel 170. Such option will then show up in queued format within the channel in the same manner as other content objects and may be purchased at the time of viewing, in a manner similar to that described elsewhere herein.

Referring to FIG. 26A, a third type of virtual channel, the Third Party Channel 180 enables content that is sourced from the third party applications or data streams 182a-n to be available for display, via modeling system 35 and viewer system 32, in conjunction with the viewer's current channel. For example, an application related to a sporting event may provide or stream additional background information for a specific game, for example all goals scored by the player who scored a goal during a match that is viewed live through the display 120 of viewer system 32. Such background information can be posted on a separate Third Party Channel 180 or integrated with the on-screen viewing of the current content object in box 113 of screen 120, as illustrated in any of FIGS. 18, 21 and 22. FIG. 26B illustrates conceptually an algorithmic process that enables content aggregation for the Third Party Channel 180.

Referring to FIG. 27, a fourth type of virtual channel, the Library Channel 190 enables access to content objects which are privately owned in the viewer's library, such content objects being a collection of previously paid for materials which are therefore always permanently available for viewing. The library comprising the viewer's privately owned content objects may be stored locally on the viewer system 32, as indicated by storage mechanism 193, which may be similar to database 47, or stored remotely over a network on a dedicated storage mechanism 194 or retained on any of content sources 192a-n. The content objects within the viewer's private library may be recommended and arranged or queued within the Library Channel 190 by recommendation system 35 and distributed for viewing via viewer system 32 in a manner as previously described with regard to other content objects. However, content objects within the Library Channel 190 may be stored in modified formats, i.e. for privacy and security reasons as well as for network accessibility reasons. Library Channel 190 provides a "view" on all the content that is available in the viewer's library arranged into one channel, Such content could be arranged according to dominant preferences, metadata (e.g. genre) and ranked according to viewer's mood or sorted according to a certain predefined or dynamically defined criteria.

The Library Channel 190 may be implemented with three modes of the use: active, inactive and exclusive or library only. In active mode, the library is used by the recommendation system disclosed herein as one of the content sources for creating content recommendations in a manner as previously described. In inactive mode, the library is not used as one of the content sources for creating content recommendations. In exclusive or library only mode, only content from the viewer's private library or a private library to which a viewer has access is used as one of the content sources for creating content recommendations in a manner as previously described.

A fifth type of virtual channel, the Off-Line Channel 200, in one embodiment, may be implemented not as a channel having a specific content source(s), similar to the other of the virtual channels 160-190 and 210-230 described herein, but as a mechanism for viewing content objects associated with another channel when not actively or operatively coupled to either a network or to recommendation system 35, such as when the viewer is on an extended plane flight, as is illustrated by the lack of connection between viewer system 32 and recommendation system 35 and content sources 202a-n in FIG. 28A. In such instances, the content objects within a particular channel, which may be the viewer's regular channel or a virtual channel as described herein, are stored locally on storage mechanism 203 of viewer system 32 all of which may be implemented within an apparatus such as a PDA, tablet computer or laptop, and are available for viewing therefrom. Note that with the Off-Line Channel 200 mode of operation, the apparatus on which the viewer system 32 is implemented may serve as both the left brain interface and, typically sequentially, as the right brain interface for the viewer. FIG. 28B illustrates conceptually an algorithmic process that enables viewing of content off-line via Off-Line Channel 200.

With the Off-Line Channel 200 mode of operation, the particular viewing habits of the viewer may be stored locally and loaded to recommendation system 35 in an asynchronous manner for updating of the viewers profile and viewing history once the viewer is reconnected to the system. Also, in the Off-Line Channel 200 mode, the content objects within a particular viewer channel are limited to those items already queued within such particular channel or channels. The ability to have content objects reordered within a viewer channel in synchronization with immediately preceding viewing habit events is also limited. In embodiments, the format in which content objects are stored for off-line viewing may be modified for increased security to prevent unauthorized viewing, in comparison to other storage formats utilized for normal online viewing from a specific viewing device or platform. In one embodiment, so as to comply with copyright and licensing requirements of the content objects, browsing and rewinding/fast forwarding through the locally stored content objects while a viewer is off-line is allowed, but substantive viewing of a content object is allowed only once, unless such content object is part of the viewer's private library or the viewer is authorized to view a content object multiple times.

Content selection for off-line mode can be done in a number of ways, for example: A) viewer selects from each channel the content he would like to view off-line using the left brain user interface; B) content with highest recommendation according to the viewer's preferences and mood is selected by the recommendation system 35; or C) viewer manages his/her Program Director Channel and content therein is selected for off-line mode.

A sixth type of virtual channel, the Picture/User Generated Content (UGC) Channel 210 is used to post pictures and UGC, movies, audio, etc., created by the viewer(s), from any of other internal or external sources and to view such pictures and UGC with the appropriate viewing player depending on the file type of the content object as posted to the channel. As such, Picture/UGC Channel 210 may be similar in construction and function to Library Channel 190 as described herein with reference to FIG. 27. As illustrated in FIG. 29A, the content objects representing UGC may be stored locally on the viewer system 32, as indicated by storage mechanism 216, which may be similar to or database 47, or stored remotely over a network on a dedicated storage mechanism 213 or retained on any of content sources 212a-n. The UGC content objects may be recommended and arranged or queued within the Picture/UGC Channel 210 by recommendation system 35 and distributed for viewing via viewer system 32 in a manner as previously described with regard to other content objects. However, content objects within the Picture/UGC Channel 210 may be stored in modified formats, i.e. for privacy and security reasons as well as for network accessibility reasons. A viewer is able to edit Picture/UGC Channel 210 channel using the left brain interface for changing order, deleting items, etc. . . . . FIG. 29B illustrates conceptually an algorithmic process that enables content collection and creation of a Picture/UGC Channel 210.

A seventh type of virtual channel, the Post Channel 220, enables friends, family, coworkers, etc. and other third parties to actively post their pictures or UGC to a channel associated with the viewer and allow viewing of such pictures and UGC with the appropriate viewing player depending on the file type of the content object as posted to the channel. As such, the Post Channel 220 may be similar in construction and function to Picture/UGC Channel 210 as described herein with reference to FIG. 29A. As illustrated in FIG. 30A, the content objects representing third-party or externally generated UGC may be stored locally on the viewer system 32, as indicated by storage mechanism 226, which may be similar to or database 47, or stored remotely over a network on a dedicated storage mechanism 223 or retained on any of content sources 222a-n. The UGC content objects may be recommended and arranged or queued within the Post Channel 220 by recommendation system 35 and distributed for viewing via viewer system 32 in a manner as previously described with regard to other content objects. The Post Channel 220 is useful for viewers who wish to enjoy viewing content objects from multiple sources without having an established relationship with such source. For example, grandparents may have a Post Channel 220 on reserved for the pictures and the UGC movies posted by their children, grandchildren and/or other family members to Facebook, Twitter, or other media sites. In this way, such viewers can enjoy content sourced from Facebook and Twitter without having to access the internet and establish Facebook, Twitter, or other accounts. As with Recommendation Channel 160, recommendations may be forwarded to a viewer's Post Channel 220 via a specific electronic mail address or other handle mechanism associated with the particular viewer system 32. FIG. 30B illustrates conceptually an algorithmic process that enables a virtual Post Channel 220.

An eighth type of virtual channel, the Mail Channel 230, which is operatively coupled with one or more of the viewer's electronic mail service, enables right brain hemisphere type content objects, typically attachments associated with electronic messages, e.g. those that contain pictures, graphics, video material, etc. to be viewed on the right brain display 80 of the viewer system 32, as illustrated in FIG. 31A. In one embodiment, the viewer may be given the option of entering a command with, for example, remote control 88, which enables the complete text of the relevant email message to be viewed as well as email messages which have no attachments. FIG. 31B illustrates conceptually an algorithmic process that enables a Mail Channel 230.

Virtual channels 160-230 described herein may be presented to the viewer via display 80 of viewer system 32 either as the primary content object data streams or secondary content object data stream, similar to other channels 90A-C, stored in database 48 of modeling system 35 or locally within viewer system 32 and which facilitates multidimensional surfing of content, using traditional cursor navigation controls as described herein with reference to FIGS. 16-22. In other embodiments, the viewer may navigate in a separate dimension any of the virtual channels 160-230 described herein in addition to the primary and secondary content object data streams on screen 120 of display 80 in a similar manner as described with reference to the recommended content illustrated in FIG. 21.

Explicit Viewer Feedback

In addition to the implicit feedback detectable from a viewer's selections and viewing habits, the disclosed system also affords the opportunity to provide explicit feedback to the recommendation system in a manner which requires little left brain activity. Specifically, traditional navigation controls originating from display remotes, e.g. specifically colored coded controls, may be utilized to provide explicit feedback to the recommendation system in a manner which requires little left brain activity. Selection of different color coded buttons may be used to associate each of a negative or positive valence emotion with the instances of a certain recurrently broadcasted content (e.g. a series) and/or its metadata. In addition, selection of a different color coded control may be used to socially share the link to the currently viewed content with the applicable social networks or to provide a gratuity to the author(s) of the content currently viewed or to the recommender of that content.

More specifically, as part of the disclosed system and technique for relaxed TV viewing, the command controls 240-246 of a typical TV remote 88 or other device are given new functions, as illustrated in FIG. 32. The existing typical remote control command controls are part of the available interface hardware and therefore pose a minimal set-up and learning curve effort to use. The new functions that are associated with the existing command control are chosen based on the disclosed neuropsychological modeling technique to support the natural relaxing TV experience. A description of command controls and their assigned operation, based on the neuropsychological modeling technique are given below.

As illustrated in FIG. 32, selection of a first colored control 240, e.g. a red button, may be used to associate negative valence emotion with the instances of a certain recurrently broadcasted content (e.g. a series) and/or its metadata. Such negative valence emotion association may result in that particular recurrent content not be scheduled in a personalized channel and/or a time-shifted content list and therefore the content is not recorded for that user. This can be implemented as the red button meaning: "Do not record for time shifting purpose for my profile anymore".

Selection of a second colored control 242, e.g. a blue button, may associate positive valence emotion with the instances of a certain recurrently broadcasted content (e.g. a series) and/or its metadata. Such positive valence emotion association results in that particular recurrent content being scheduled in a personalized channel and/or a time-shifted content list and therefore the content is recorded for that user. This can be implemented as the blue button meaning: "Do record for time shifting purpose for my profile".

Selection of a third colored control 244, e.g. a yellow button, may socially share the link to the currently viewed content with the applicable social networks. The applicable social networks may be Facebook, LinkedIn, Twitter, blog, email or other. A practical implementation may be a preformatted email or other electronic message that is sent from a general or personalized account to a user predetermined account, which may be his own account, for manual processing and actual publishing or communication or an account which causes the publishing or communication to occur automatically.

Selection of a fourth colored control 246, e.g. a green button, may associate gratitude with the author(s) of the content currently viewed or to the recommender of that content. Such gratitude may have as a result the donation of gratuity or thank you fee. The distinguisment between author and recommender may be made based on the home content of a recommendation channel being viewed or the recommended content itself or may be based on a simple iconic viewable interface popping up after the button has been pushed. The amount of gratuity can be pre-set automatically and changed based on a left brain interface as part of the TV tandem interface. The backend payment and management system is created in order to manage correct and confidential management of author, recommender and service provider (the license holder to this patent) credentials. In case donations are not correctly attributable to authors or recommender, they can flow to a non-profit fund.

Explicit right brain feedback becomes even more powerful when the red and blue button are not just specified in association with a particular content object, but with one or more metadata values associated with the content object. For example, in embodiments, when the viewer presses the red button or specifies an equivalent command during viewing of a specific content object, then the metadata associated with that content object may be visually displayed at the bottom of the screen, e.g. a menu bar. Such bar may show a picture of the leading actor, e.g. Jack Nicholson, next to a graphic representation characterizing a genre, e.g. horror movie, etc. The user can then select what in particular he likes or dislikes about the content object using the explicit feedback buttons or commands and thereafter, the fear and desire components related to the selected metadata are subsequently updated accordingly.

It will be obvious to those reasonably skilled in the art that variations of the above described system and technique may be utilized. For example, there does not need to be a specific one to one correspondence between controls and the type of explicit feedback provided from the viewer to the recommendation system. For example, instead of one button for each of the described feedback types, a two-position rocker switch may be utilized in which one position is used to designate a negative valence emotion with content and/or its metadata while the other position is used to designate a positive negative valence emotion with content and/or its metadata. Also, a control itself need not be colored but could have a color designation of any shape, color, graphic pattern or image affixed thereto. In addition, the choice of colors, patterns or images may be at designer's discretion. Further, any physical control on either the remote 88 or a virtual control on the user interface such as a PDA or laptop through which the viewer communicates with the primary right brain display 80, may be utilized, including the traditional navigation cursor controls in a configuration allowing for multi-mode functionality, as well as traditional keyboards, gesture recognition user interfaces or voice command user interfaces.

Sales Training, Sales Consultancy and Software

From the neuropsychological model described herein follow important insights into best sales practices; insights, which can be shared in sales trainings and sales consultancy, as well as in M& A consultancy.

Buyers' psychology is central in sales, hence why any sales cycle should be buyer-aligned. A buyer typically goes through a number of stages before buying a product. Multiple sales models have already tried to identify and name these stages. Typical stages are: identification of needs, evaluations of options, resolution of concerns. Or: satisfaction stage, hedging/shopping stage, consensus stage. However, none of these theories have linked the different stages with the basic emotions and moods of buyers.

An important distinction is made between two types of B2B sales: new and known application sales. In new application sales, the buyer sees the offering of the sales person as something that is new to him, either because the type of product/service or its application is new to him. In known application sales, the buyer sees the offering of the sales person as something he's familiar with, either because he is familiar with the type of product/service or with the kind of application. Thus, whether a particular sales project is considered a new or known application sales project, depends on the view of the buyer. It is up to the sales person to assess the buyers' view.

According to the disclosed system and technique, new application B2B sales, the buying cycle starts with the seeding and nurturing of Desire and that this is optimally done using mainly visual sales/marketing material and storytelling, which appeals to the right hemisphere and allows Desire to grow. For this reason, new application B2B sales are referred to as desire-based B2B sales. This does not mean however, this type of sales does not involve any hedging of fears. Once Desire has grown up to a significant level, and the buyer buys into the vision and is willing to change, Fear still need to be hedged. The buying cycle for desire-based B2B sales is represented in FIG. 34.

For the case of known application B2B sales, some seeding and growing of Desire may be required, but usually to a much lesser extent. Known application B2B sales is mostly about hedging fears, hence it is referred to as "fear-based" selling. The buying cycle for fear-based B2B sales is represented in FIG. 35.

Fear consists of both private and social Fears. These private Fears are typically hedged during the second phase. In this phase the buyers typically wants to find out if a product or service will actually work for him and/or if the option, proposed to him by the sales person, is the overall best option, taking into account alternatives, competitive offerings, etc. It is our insight that in this phase, the buyer is best served with data and results that address his Fears and that are mostly textual and/or analytic, like specification lists, demo reports and the like, since these will mostly appeal to his left hemisphere and allow him to converge his Fears down to an acceptable level. Thus, in this phase, it is the job of the sales person to assess the buyers' Fears and then help him address them. While the focus in this phase lies on the reduction of Fears, the sales person still needs to keep an eye on the Desire level, making sure it stays high enough.

During the third stage of the buying cycle of both fear- and desire-based B2B sales, social Fears typically need to be hedged. In this stage it is important for the sales person to guide the buyer in taking the right actions with the other decision makers, so also their Desire and Fear components, like the ones of the buyer, are brought into or kept into the range $-\pi/8$ to $+3\pi/8$, corresponding to the dominant or passionate mood. The sales person can e.g. make sure the buyer has appropriate documentation, like a value-based proposal, which illustrates and supports the vision and which can be shared between the decision makers. Such document will typically address its audience's psychology in the same way the buying cycle does, i.e. it will start by seeding Desire and subsequently address the typical Fears. The seeding of Desire can be e.g. done by using visual elements that illustrate the vision, by showing the most compelling and desired end results, etc. The hedging of Fear can be e.g. be done by going through the concrete lists of needs and showing that each one of them is covered. It's important to note that the sales person needs to keep monitoring the Fear and Desire levels throughout the complete buying cycle. E.g. in the third phase, the sales person may actually need to increase Fear in order to be able to close the deal, since a B2B buyer, who feels too much in control or too relaxed, may unnecessarily delay a purchasing decision or put a too high pressure on the price.

The buying cycle of B2C sales is represented in FIG. 36. In this case, Desire needs to grow as fast as Fear diminishes. Social fear hedging is limited to non-existing. The different buying cycles with their respective, numbered stages, can also be mapped onto the mood disk, as shown in FIG. 6C.

The purchase and sales of a company, as part of an M&A transaction, resembles a desire-based B2B sales process. The selling party may lead the purchasing party through the B2B sales process; however it may also be the buying party who leads the selling stakeholders through the stages of the buying process, to sell an integrated vision for both companies and create buy-in for a common cause. Such process is very similar to how a B2B sales person leads a buying organization through the buying cycle in a classic B2B sales process.

The potential buyer of a company, after he/she has done the necessary networking, strategizing and scouting, needs to create a vision and nurture desire in e.g. the board and executive team of both companies. Once he/she received buy-in for the acquisition or merger, personal and social fears still need to hedged. Personal fear hedging, or subjective due diligence, in practice typically boils down to such things as creating a new organization chart, planning the business and the integration. Social fear hedging, or objective due diligence, consists of such things as checking and securing all legal, financial and tax-related issues.

FIG. 37 illustrates conceptually the elements of an embodiment of a modeling system 35A necessary for the derivation of the relationship between metadata associated with a sales object and an individual buyer model relative to the ranking of the sales object associated with the particular sales channel model. In FIG. 37, B2B buyer application 32A, sales offerings 60A, buyer models 46A, rankings/sales channels 48A, sale objects 47A, behavior modeler 49A, ranking application 42A and neuropsychological modeling engine 41A may be structurally and functionally similar to viewer application 32, content material 60, viewer models 46, rankings/channels models 48, content objects 47, behavior modeler 49, ranking application 42 and neuropsychological modeling engine 41, respectively, described with reference to FIGS. 9A and 9D disclosed herein, including the respective algorithmic processes and communication protocols with either similar or dissimilar data structures. Specifically, each sales object stored in database 47A has associated therewith a metadata file, which may be similar or dissimilar to file 75, which contains various data parameters describing the content of the file, such as the format, product ID, specifications, target customer description, price, special pricing/discounts, duration (subscription services), special terms and conditions, licenses/working information, etc. Any number of different data structure formats may be utilized for this particular structure. Such content file metadata files may also be stored in database 47A.

Similarly, each individual buyer associated with a B2B buyer application 32A has associated therewith a buyer model, which may be similar or dissimilar to model 70 which contains data describing the behavior model. The process flow between components of modeling system 35A to update a buyer's model and sales channel model, retrieve new sales objects and determine if such objects are suitable for ranking according to the system model of the buyer's emotional motivation may be similar to those described previously with reference to FIGS. 9B-C and 9E-F. Behavior modeler 49A retrieves from database 46A the model associated with a specific buyer and the metadata file defining the sales channel. In addition, behavior modeler 49A also retrieves from database 47A, the metadata file describing the sales object. Next, behavior modeler 49A compares the received event data with metadata file of the sales object and the current buyer model and modifies the sales channel model(s) appropriately, (indicated by the circular arrow within behavior modeler 49) In each case the buyer model 70 is modified and optionally the sales channel model could also be modified, as would be in case of sales channel management. In various embodiments, modifying the buyer model may be performed by mapping each event onto the mood disc 20 according to a prescribed rule, e.g. purchase of sales object results in a predefined $\psi$ and m value (or equivalent Fear coordinate f and Desire coordinate d), described previously.

The other context to which the neuropsychological model derived herein and the modeling system 35 disclosed herein may be applied, including, but not limited to any of 1) an automatic internet bank or investment fund, 2) a tandem interface for reading and/or researching and/or writing, 3) a tandem user interface for an automatic internet enabled buying system for recurrent consumer purchases, or 4) an automatic trading system for securities, may utilize systems which are structurally and functionally similar to those described with reference to FIGS. 9A, 9D and 37 disclosed herein, including the respective algorithmic processes and communication protocols with either similar or dissimilar data structures.

Although the various embodiments of the system and techniques disclosed herein have been described with reference to content objects containing video data, the system described herein, particularly the tandem user interface and the neuropsychological modeling engine may be equally utilized with other types of content, including audio, art, advertisement, literature, physical objects, etc. with only minor modifications to the disclosed system and techniques as would be understood by those reasonably skilled in the relevant arts, given the disclosures as set forth herein.

It will be obvious to those reasonably skilled in the art that modifications to the systems and processes disclosed herein may occur, without departing from the true spirit and scope of the disclosure. For example, any two elements which communicate over a network or directly, may utilize either a push or a pull technique in addition to any specific communication protocol or technique described herein. Further, notwithstanding the network implementation described, any existing or future network or communications infrastructure technologies may be utilized, including any combination of public and private networks. In addition, although specific algorithmic flow diagrams or data structures may have been illustrated, these are for exemplary purposes only, other processes which achieve the same functions or utilized different data structures or formats are contemplated to be within the scope of the concepts described herein. As such, the exemplary embodiments described herein are for illustrative purposes and are not meant to be limiting.

What is claimed is:

1. A method for distributed delayed streaming of content comprising:
   A) providing a network accessible memory for storing content representing a first program;
   B) receiving into the network accessible memory portions of the first program from a plurality of viewers having access to the first program from another source;
   C) assembling the portions received from the plurality of viewers into an aggregate version of the first program; and
   D) upon receiving a request from one of the plurality of viewers, transmitting the aggregate version of the first program to the requesting viewer, wherein the transmitted aggregate version of the first program is larger than a portion of the first program from the requesting viewer.

2. The method of claim 1 wherein the portions the first program are received from the plurality of viewers asynchronously.

3. The method of claim 1 wherein the first program is accessible to the plurality of viewers from the other source during a first time period and wherein the aggregate version of the first program is transmitted to the requesting viewer during a second time period not identical to the first time period.

4. A system for distributed delayed streaming of content comprising:
A) an aggregation server comprising:
A1) a network accessible memory for storing data representing a first program;
A2) a network interface for asynchronously receiving, into the network accessible memory, portions of the first program from a plurality of viewers having access to the first program from a source;
A3) an aggregation engine for assembling the portions of the first program received from the plurality of viewers into an aggregate version of the first program; and
A4) a streaming interface for transmitting the aggregate version of the first program to one of the plurality of viewers upon request, wherein the transmitted aggregate version of the first program is larger than a portion of the first program from the one of the plurality of requesting viewers.

5. The system of claim 4 wherein the portions of the first program received from the plurality of viewers are identified by one of temporal or sequential identifiers associated with the first program.

6. The system of claim 5 wherein the aggregation engine assembles the portions of the first program received from the plurality of viewers based on the temporal or sequential identifiers.

7. The system of claim 4 wherein the network accessible memory is configured to store multiple copies of the first program.

8. The system of claim 4 wherein the network accessible memory is further configured to store a data structure received with the portion of the first program from one of the plurality of viewers, the data structure comprising any of :
i) data identifying a portion of the first program;
ii) data identifying at least one authorized viewer;
iii) data identifying one of temporal or sequential identifiers associated with the first program;
iv) data identifying a network address of the authorized viewer; or
v) data identifying an encryption key for decrypting the first program.

9. The system of claim 8 wherein the data structure further comprises data identifying a user defined channel associated with the viewer process.

10. The system of claim 4 further comprising:
B) a viewer system operably coupled over a network to the source of content programs, the viewer system further comprising:
B1) program logic for determining which of a plurality of content programs are accessible from the source and for requesting download transmission of at least a portion of the first program from the source to the viewer system at a first time; and
B2) program logic for upload transmitting at least a portion of the first program received by the viewer system to the aggregation server along with authorization indicia identifying of the viewer system.

11. The system of claim 10 wherein B) further comprises:
B3) program logic for requesting download transmission of the aggregate version of the first program from the aggregation server to the viewer system at a second time different from the first time.

12. The system of claim 11 further comprising:
B4) program logic for receiving a streamed download of a portion of the aggregate version of the first program from the aggregation server, wherein the streamed download portion of the aggregate version of the first program received from the aggregation server is larger than the uploaded portion of the first program transmitted to the aggregation server from the viewer system.

13. The system of claim 4 wherein the data representing the first program may be stored at plural locations operatively coupled to a network in distributed configuration.

14. The system of claim 4 wherein the data representing the first program may be stored temporarily among multiple locations operatively coupled to a network in a migrating configuration.

15. A method for distributed delayed streaming of content comprising:
A) providing a network accessible memory for storing content representing a first program received from a source;
B) receiving into the network accessible memory authorization indicia identifying a plurality of viewers having access to the first program from the source; and
C) upon receiving a request from one of the plurality of viewers, verifying the authorization indicia to determine if the requesting viewer has authorized access to an aggregate version of the first program; and
D) transmitting the aggregate version of the first program to the requesting viewer upon verification of authorization, wherein the transmitted aggregate version of the first program is larger than a portion of the content program from the requesting viewer.

16. The method of claim 15 wherein the first program is accessible to the plurality of viewers from the source during a first time period and wherein the aggregate version of the first program is transmitted to the requesting viewer during a second time period not identical to the first time period.

17. An apparatus for distributed delayed streaming of content comprising:
A) a network accessible memory for storing content representing a first program received from a source;
B) a network interface for receiving into the network accessible memory authorization indicia identifying a plurality of viewers having access to the first program from the source;
C) a verification engine for determining, upon receiving a request from one of the plurality of viewers, if the requesting viewer has authorized access to the first program; and
D) a streaming interface for transmitting an aggregate version of the first program to the requesting viewer upon verification of authorization, wherein the transmitted aggregate version of the first program is larger than a portion of the first program from the requesting viewer.

18. The apparatus of claim 15 wherein the network accessible memory is further configured to store a data structure received with the at least portion of the first program from one of the plurality of viewers, the data structure comprising any of :
i) data identifying a portion of the first program;
ii) temporal or sequential identifiers associated with the first program;
iii) authorization indicia identifying a viewer process; or iv) data identifying a network address of the authorized viewer; or
v) data identifying an encryption key for decrypting the first program.

19. The system of claim 8 wherein the data structure further comprises data identifying a user defined channel associated with the viewer process.

* * * * *